US012792448B1

(12) United States Patent
Edwards et al.

(10) Patent No.: US 12,792,448 B1
(45) Date of Patent: Nov. 10, 2026

(54) INSTRUCTION TO CHECK ALLOCATION GRANULARITY

(71) Applicant: NVIDIA Corporation, Santa Clara, CA (US)

(72) Inventors: Harold Carter Edwards, Campbell, CA (US); Gokul Ramaswamy Hirisave Chandra Shekhara, Bangalore (IN); Maciej Piotr Tyrlik, Durham, NC (US); Sean Jeffrey Treichler, Piedmont, CA (US); Edward H Gornish, Palo Alto, CA (US); Rishkul Kulkarni, Austin, TX (US); Anis Ladram, New York, NY (US); Sandarbh Sunil Jain, Fremont, CA (US)

(73) Assignee: NVIDIA Corparation, Santa Clara, CA (US)

( * ) Notice: Subject to any disclaimer, the term of this patent is extended or adjusted under 35 U.S.C. 154(b) by 0 days.

(21) Appl. No.: 18/978,572

(22) Filed: Dec. 12, 2024

(51) Int. Cl.
*G06F 11/07* (2006.01)

(52) U.S. Cl.
CPC ........ *G06F 11/079* (2013.01); *G06F 11/0727* (2013.01)

(58) Field of Classification Search
CPC ............... G06F 11/079; G06F 11/0727; G06F 11/1016; G06F 11/3037; G06F 12/00; G06F 2009/45583
USPC .................................................... 714/42, 763
See application file for complete search history.

(56) References Cited

U.S. PATENT DOCUMENTS

| | | | | |
|---|---|---|---|---|
| 6,697,971 | B1 | 2/2004 | Dwyer | |
| 7,062,761 | B2 | 6/2006 | Slavin et al. | |
| 8,180,980 | B2 | 5/2012 | Biles et al. | |
| 9,384,795 | B1 | 7/2016 | Hoff et al. | |
| 9,823,955 | B2 | 11/2017 | Satoyama et al. | |
| 2002/0162050 | A1 | 10/2002 | Milojicic et al. | |
| 2007/0088987 | A1 | 4/2007 | Kimizuka et al. | |
| 2012/0059993 | A1 | 3/2012 | Haselsteiner et al. | |
| 2012/0185741 | A1 | 7/2012 | Grekhov et al. | |
| 2014/0215176 | A1* | 7/2014 | Iga | G06F 12/0223 711/170 |
| 2015/0052315 | A1* | 2/2015 | Ghai | G06F 12/0802 711/145 |
| 2015/0095625 | A1 | 4/2015 | Hassanein et al. | |

(Continued)

FOREIGN PATENT DOCUMENTS

| | | | | | |
|---|---|---|---|---|---|
| CN | 116107919 | A * | 5/2023 | G06F 12/0246 |
| CN | 116360961 | A * | 6/2023 | G06F 9/5016 |
| WO | WO-2025193593 | A1 * | 9/2025 | G06F 12/1483 |

OTHER PUBLICATIONS

IEEE "IEEE Standard for Floating-Point Arithmetic", Microprocessor Standards Committee of the IEEE Computer Society, IEEE Std 754-2008, dated Jun. 12, 2008, 70 pages.

(Continued)

*Primary Examiner* — Chae M Ko
(74) *Attorney, Agent, or Firm* — Davis Wright Tremaine LLP

(57) ABSTRACT

Apparatuses, systems, and methods to perform memory access checks. In at least one embodiment, a processor includes circuitry to perform an instruction to generate an error if one or more other instructions are to cause invalid allocation of storage.

20 Claims, 46 Drawing Sheets

(56) References Cited

U.S. PATENT DOCUMENTS

| | | | | |
|---|---|---|---|---|
| 2016/0019168 | A1* | 1/2016 | Rychlik | G06F 12/1009 711/152 |
| 2018/0088988 | A1 | 3/2018 | Rabet et al. | |
| 2018/0107568 | A1 | 4/2018 | Sheldon et al. | |
| 2018/0307614 | A1 | 10/2018 | Luo et al. | |
| 2019/0317857 | A1* | 10/2019 | Khan | G06F 11/1012 |
| 2020/0364088 | A1* | 11/2020 | Ashwathnarayan | G06F 9/5044 |
| 2021/0255968 | A1* | 8/2021 | Zacay | G06F 12/1416 |
| 2021/0311821 | A1 | 10/2021 | Ryu et al. | |
| 2021/0311884 | A1 | 10/2021 | Grocutt | |
| 2022/0318015 | A1* | 10/2022 | Alsop | G06F 9/30076 |
| 2024/0160530 | A1 | 5/2024 | Das et al. | |
| 2025/0085943 | A1 | 3/2025 | Jindel | |
| 2025/0265140 | A1 | 8/2025 | Hanebutte et al. | |
| 2025/0284832 | A1* | 9/2025 | Durham | G06F 12/1441 |
| 2025/0291502 | A1* | 9/2025 | Choquette | G06F 3/0631 |
| 2025/0291915 | A1* | 9/2025 | Nasim | G06F 21/56 |

OTHER PUBLICATIONS

Society of Automotive Engineers On-Road Automated Vehicle Standards Committee "Taxonomy and Definitions for Terms Related to Driving Automation Systems for On-Road Motor Vehicles", Standard No. J3016-201806, dated Jun. 15, 2018, 35 pages.

Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.

Google Scholar, "Patents Search",—Text Refined, 2026, 2 pages.

Wijerante et al., "Dynasor: A Dynamic Memory Layout for Accelerating Sparse MTTKRP for Tensor Decomposition on Multi-core CPU." 2023 IEEE 35th International Symposium on Computer Architecture and High Performance Computing, 11 pages.

* cited by examiner

302

```
.weak .func (.reg .b32 dummy)
_guardrails_trap_is_phase_valid (.reg .b32 phase)
{
  brkpt;
}
```

FIG. 3A 304, 306, 310

```
// Function to allocate tensor memory
__global__ void allocate_tmem(float* tmem_base, int size) {
  if (!_guardrails_trap_is_phase_valid (phase) {
    // Handle the error, e.g., log it or return early
    printf("Error: Memory allocation phase is invalid.\n");
    return;
  }

  // Proceed with memory allocation
  // tmem_base = (allocate tensor memory here);
}
```

FIG. 3B 312, 313

```
.section .symtab
index  value  size  info  other  shndx    name
0xc    0x60   0x20  0x22  0      0xc      $s_internal_1$_guardrails_trap_is_phase_valid
```

316

```
...
/*0060*/   BPT.TRAP 0x1
/*0070*/   RET.REL.NODEC R20 0x0
...
/*0840*/   ISETP.NE.AND P0, PT, R4, RZ, PT
/*0850*/   @!P0 BRA 0x8a0
...
/*0890*/   CALL.REL.NOINC 0x60
/*08a0*/   ...
        LDTM
```

FIG. 3C

INSTRUCTION TO CHECK ALLOCATION GRANULARITY

CROSS-REFERENCE TO RELATED APPLICATIONS

This application incorporates by reference for all purposes the full disclosure of co-pending U.S. patent application Ser. No. 18/978,542, filed concurrently herewith, entitled "INSTRUCTION TO CHECK ALLOCATION RIGHT," U.S. patent application Ser. No. 18/978,554, filed concurrently herewith, entitled "INSTRUCTION TO CHECK UNALLOCATED MEMORY ACCESS," U.S. patent application Ser. No. 18/978,559, filed concurrently herewith, entitled "INSTRUCTION TO CHECK UNAVAILABLE MEMORY ACCESS," U.S. patent application Ser. No. 18/978,566, filed concurrently herewith, entitled "INSTRUCTION TO CHECK SUB-PARTITION ACCESS," U.S. patent application Ser. No. 18/978,582, filed concurrently herewith, entitled "COMPILER TO GENERATE DEBUGGING INSTRUCTIONS," and U.S. patent application Ser. No. 18/978,598, filed concurrently herewith, entitled "INSTRUCTION TO INDICATE INVALID STORAGE ACCESS,".

FIELD

Apparatuses, systems, and methods to perform memory access checks. In at least one embodiment, a processor includes circuitry to perform an instruction to generate error information when a memory access instruction commits a memory access violation.

BACKGROUND

Memory access violation checks can be performed by hardware, software, or a combination of both. When hardware does not contain these checks, software can access memory without restraint, leading to errors in software performance.

BRIEF DESCRIPTION OF THE DRAWINGS

FIG. 3A is a code snippet illustrating an example of a trap function in accordance with at least one embodiment;

FIG. 3B is a code snippet illustrating how a trap function is integrated with a guardrail instruction and a memory access instruction in accordance with at least one embodiment;

FIG. 3C is a code snippet illustrating an example of a symbol table and SASS code in accordance with at least one embodiment;

DETAILED DESCRIPTION

In the following description, numerous specific details are set forth to provide a more thorough understanding of at least one embodiment. However, it will be apparent to one skilled in the art that the inventive concepts may be practiced without one or more of these specific details.

Systems, methods, and apparatuses for checking tensor memory access errors. In at least one embodiment, a system includes tensor memory that does not contain or contains limited hardware to manage how that memory is used (e.g., whether a program has permission to allocate, read, or write to that memory). In at least one embodiment, a compiler, when compiling a software program to use tensor memory, inserts one or more software instructions into a compiled software program. In at least one embodiment, said inserted instructions cause a processor to check whether one or more memory access instruction in said compiled software program attempt to perform one or more illegal memory accesses to tensor memory and to prevent said memory access instructions from being performed if they attempt to perform one or more illegal memory accesses to said tensor memory.

Figure 1:
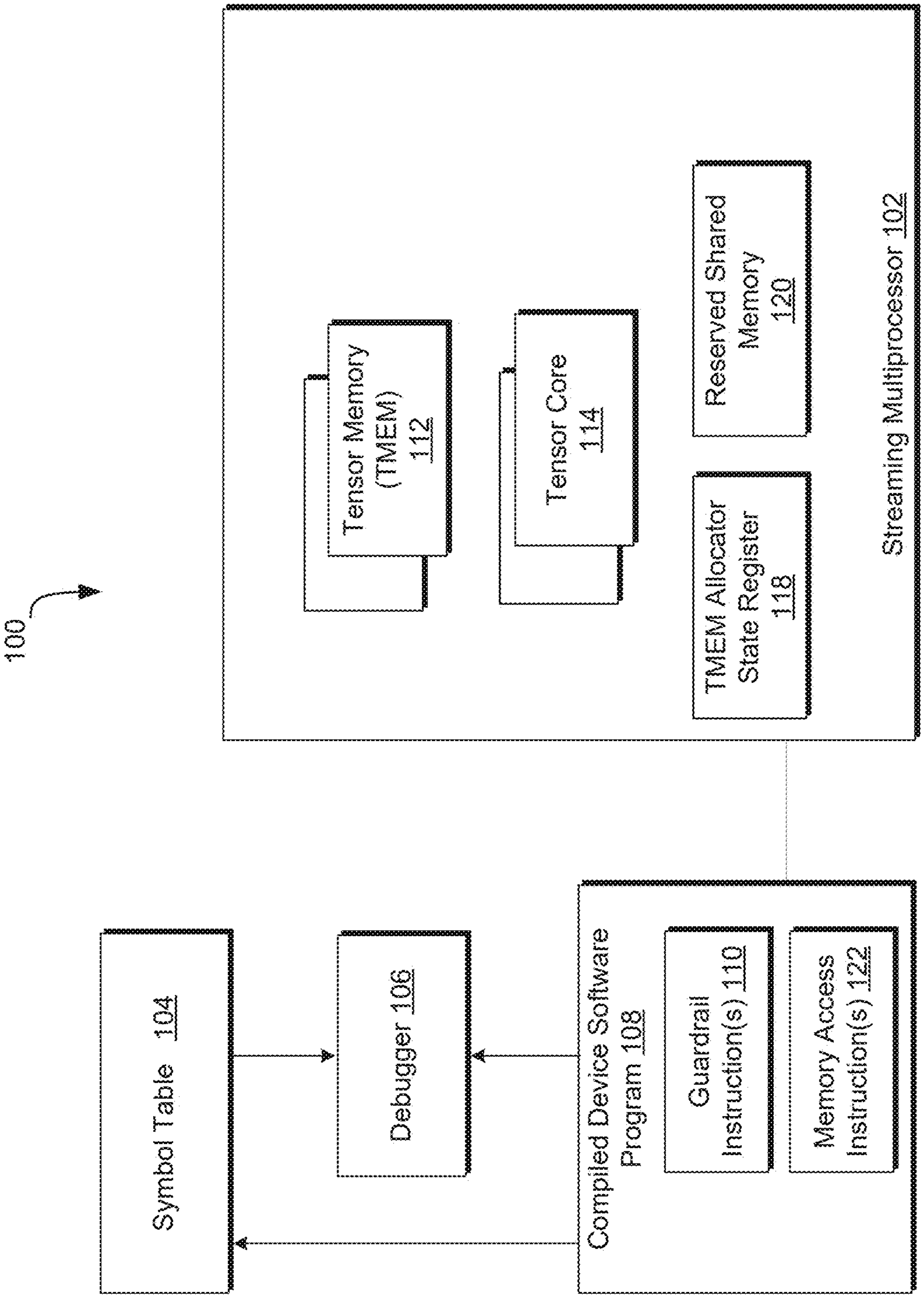
FIG. 1 is a block diagram illustrating an architecture of a system for checking tensor memory access errors in accordance with at least one embodiment.

FIG. 1 is a block diagram illustrating an architecture of a system 100 for checking tensor memory access errors in accordance with at least one embodiment. In at least one embodiment, system 100 includes a streaming multiprocessor (SM) 102, a symbol table 104, a debugger 106, and a compiled device software program 108.

In at least one embodiment, SM 102 is an SM such as SM 2010 as described in connection with FIG. 20. In at least one embodiment, SM 102 includes one or more tensor memories (TMEM) 112 such as TMEM 2040 as described in connection with FIG. 20 and one or more tensor cores 114 such as tensor cores 2020 as described in connection with FIG. 20.

In at least one embodiment, SM 102 includes a TMEM allocator state register 118 used for controlling TMEM allocations across various CTAs running on SM 102. In at least one embodiment, TMEM allocation state register 118 is a register, such as a 32-bit wide register, where each bit is associated with one or more TMEM columns and/or one or more TMEM rows to indicate which columns and/or rows are allocated and which columns and/or rows of TMEM 112 are not allocated. In at least one embodiment, TMEM allocation state register 118 can be used by all CTAs running concurrently on SM 102.

In at least one embodiment, using said 32-bit wide register as an example, top 16 bits of said 32 bits are used arbitrarily for any purpose, and bottom 16 bits of said 32 bits are used to track allocation status of one or more TMEMs. In at least one embodiment, each of said bottom 16 bits tracks an allocation status of a slice of a TMEM. In at least one embodiment, bit 5 set to 1 means that column 128-159 are allocated to a CTA. In at least one embodiment, each of said bottom 16 bits corresponds to multiple columns. In at least one embodiment, TMEM allocation state register 118 serves as a centralized, hardware-backed resource for real-time, atomic tracking of TMEM availability across concurrent CTAs.

In at least one embodiment, SM 102 further includes reserved shared memory 120, which is a portion of a shared memory (e.g., SMEM 2030 as described in connection with FIG. 20) reserved for storing TMEM allocation status information and other information. In at least one embodiment, reserved shared memory 120 can include a bitmask that indicates allocation or deallocation states of each row or column of TMEM 112. In at least one embodiment, shared memory 120 includes such a bitmask for each CTA running on SM 102. In at least one embodiment, in other words, each CTA maintains its TMEM allocation status in reserved shared memory 120. In at least one embodiment, said bit masks maintain ground truth of allocation states of one or more TMEMs for each CTA. In at least one embodiment, TMEM allocation states information can be stored in one or more variables in said reserved shared memory 120.

In at least one embodiment, TMEM allocator state register 118 can communicate with reserved shared memory 120 such that TMEM allocator state register 118 can retrieve information from reserved shared memory 120 and store information back to reserved shared memory 120. In at least one embodiment, instructions 110 can use TMEM allocation state information of columns and/or rows of TMEM at runtime, where said state information can be used to validate whether a CTA or a thread or a program has permission to access a particular column and/or rows of TMEM or has relinquished permission to allocate storage on a particular TMEM. In at least one embodiment, said state information can be updated at runtime if a CTA, a thread, or a program makes additional storage allocations at runtime. In at least one embodiment, a processor can store said updated allocation state information to reserved shared memory 120 such that reserved shared memory 120 can have updated allocation state information for CTAs on TMEM.

In at least one embodiment, reserved shared memory 120 store information indicating a CTA or threads or a program has relinquished its right to allocate at least a portion of TMEM 112. In at least one embodiment, when a program (e.g., a GPU kernel) starts, said program has right to allocate tensor memory. In at least one embodiment, once said program relinquishes its right (permission) by performing an instruction, such as "relinquish-alloc-permit" instruction, said program is not allowed to perform any tensor memory allocation.

In at least one embodiment, device software program 108 is a program such as device code 210 as described in connection with FIG. 2. In at least one embodiment, device software program 108 includes one or more memory access instructions 110 and one or more guardrail instructions 110. In at least one embodiment, each guardrail instruction 110 corresponds to a memory access instruction 122. In at least one embodiment, each memory access instructions 122 is pathed with a guardrail instructions. In at least one embodiment, at least one memory access instruction 122 uses macros for these checks.

In at least one embodiment, when a memory access instruction 122 attempts to illegally accesses TMEM 112 on SM 102, a corresponding guardrail instruction 110 detects said attempts, and triggers a trap function to handle said illegal access.

In at least one embodiment, for example, guardrail instructions 110 include an instruction that checks whether a memory access instruction attempts to access columns of TMEM 122 that have not been allocated, or was previously allocated but has been deallocated. In at least one embodiment, a processor (e.g., processor 2000 as described in connection with FIG. 20) uses information in TMEM allocator state register 118 and/or said bitmask in reserved shared memory 120 to check if unallocated portion of TMEM 112 is to be accessed.

In at least one embodiment, compiler 206 inserts one or more trap functions into compiled device software program 108. In at least one embodiment, compiler 206 inserts one trap functions for each of memory access instructions 122. In at least one embodiment, these trap functions include traps to catch attempts of illegal memory access by memory access instructions 122.

In at least one embodiment, compiler 206 inserts symbols or other identifiers of these trap functions into a symbol table 104. In at least one embodiment, each trap function symbol or identifier is associated with an offset or other information to indicate a distance or position of that trap function from a specific reference point within compiled device software program 108 or within memory. In at least one embodiment, additionally, these trap functions inserted by compiler 206 during compilation follow a standard application binary interface (ABI) such that all relevant information related to an illegal memory access attempt is passed to one or more of these trap functions. In at least one embodiment, these trap functions store error information about an illegal memory access into one or more of a predetermined set of registers (e.g., R4, R5, etc.) in accordance with said ABI. In at least one embodiment, said set of registers are error-reporting registers.

In at least one embodiment, debugger 106 can retrieve error information from those registers and said trap function offsets to generate user-friendly error message for debugging. In at least one embodiment, debugger 106 includes mappings between low-level error information and user-friendly information. In at least one embodiment, debugger 106 presents said corresponding user-friendly information when an error occurs.

In at least one embodiment, at least one feature described in connection with FIG. 1 is implemented using at least one feature of any system(s) and/or process(es) depicted in and/or described in connection with FIGS. 2-44. In at least one embodiment, at least one feature described in connection with FIG. 1 is used to implement at least a portion of any system(s) and/or process(es) depicted in and/or described with respect to FIGS. 2-44.

Compiler to Generate Debugging Instructions

Figure 2:
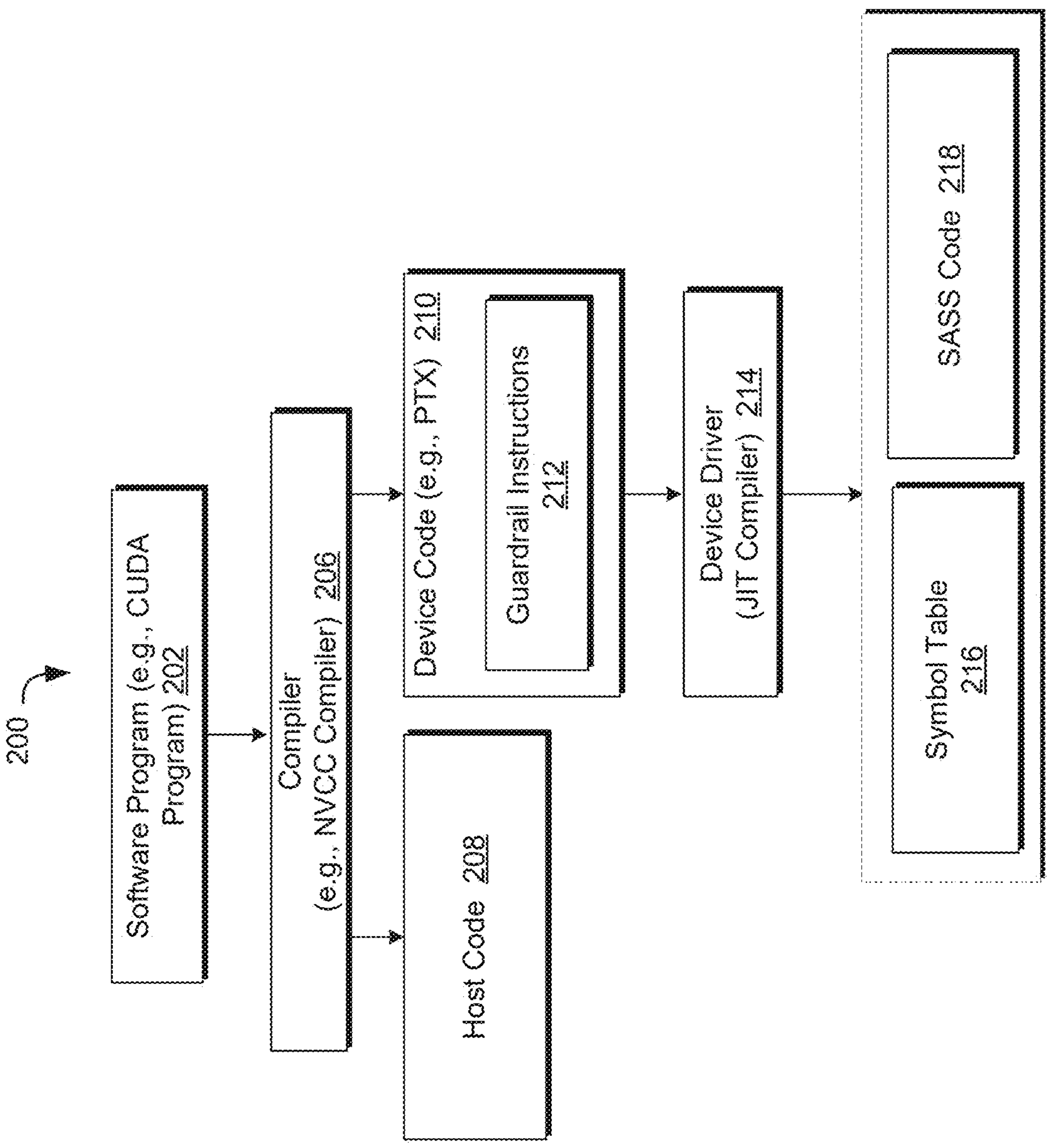
FIG. 2 is a block diagram illustrating a compilation process of a software program in accordance with at least one embodiment.

FIG. 2 is a block diagram illustrating a compilation process 200 of a software program in accordance with at least one embodiment. In at least one embodiment, a software program 202, such as a CUDA program, is compiled by a compiler 206, such as NVIDIA CUDA Compiler (nvcc), into host code 208 and device code 210. In at least one embodiment, host code 208 runs on a CPU. In at least one embodiment, device code 210 runs on a GPU such a processor 2000 as described in connection with FIG. 20.

In at least one embodiment, host code 208 is compiled by a standard host compiler, such as gcc, resulting in executable CPU code. In at least one embodiment, concurrently, device code 210 is compiled into an intermediate representation known as PTX (Parallel Thread Execution). In at least one embodiment, PTX is architecture-agnostic and serves as a low-level parallel thread execution virtual machine and instruction set architecture.

In at least one embodiment, compiler 206, during this compilation, inserts guardrail instructions 212 into compiled device code 210. In at least one embodiment, guardrail instructions are memory access check instructions, such as those described in connection with FIG. 1.

In at least one embodiment, a device driver 214, which includes a Just-In-Time (JIT) compiler, takes said PTX code and compiles it into SASS (streaming assembly) code at runtime. In at least one embodiment, SASS is actual machine code specific to a particular GPU architecture, providing final instructions that said GPU executes. In at least one embodiment, said JIT compilation step allows for optimization based on specific GPU hardware in use, enhancing performance and compatibility.

In at least one embodiment, device driver 214 generates a symbol table 216 alongside SASS code 218. In at least one embodiment, symbol table 216 maps memory addresses and registers to human-readable symbols, such as function names and variable identifiers, facilitating debugging and error diagnosis. In at least one embodiment, SASS code 218 represents low-level machine instructions tailored for said GPU architecture.

FIG. 3A is a code snippet illustrating an example of a trap function in accordance with at least one embodiment. In at least one embodiment, said trap function includes one or more guardrail instructions (e.g., such as those described in connection with FIG. 1). In at least one embodiment, said trap function include a guardrail instruction 302 to check whether a program has relinquished its right to allocate tensor memory.

FIG. 3B is a code snippet illustrating how a trap function is integrated with a guardrail instruction and a memory access instruction in accordance with at least one embodiment.

In at least one embodiment, a body of a memory access instruction 304 to allocate tensor memory can include code for calling a trap function 306 to check whether a program or thread calling this memory access instruction 304 has relinquished its right to allocate tensor memory. In at least one embodiment, if said program or thread has relinquished its right to allocate tensor memory, memory access instruction 304 causes a processor (e.g., processor 2000 as described in connection with FIG. 20) to prevent this program or thread from proceeding to a tensor memory allocation function 310.

In at least one embodiment, said program or thread can exit. In at least one embodiment, said program or thread provides all relevant information to trap function 306, for example, information about a state of said program at a moment when an illegal memory access (e.g., allocating tensor memory after having relinquished right to do so) occurs. In at least one embodiment, this information includes contextual data about where an error occurs, such as function name and specifics about nature of said error. In at least one embodiment, said information includes a type of error, such as out-of-bounds memory access. In at least one embodiment, trap function 306 stores all this information in one or more designated registers.

In at least one embodiment, at least one feature described in connection with FIG. 2 is implemented using at least one feature of any system(s) and/or process(es) depicted in and/or described in connection with FIGS. 1 and 3-57. In at least one embodiment, at least one feature described in connection with FIG. 2 is used to implement at least a portion of any system(s) and/or process(es) depicted in and/or described with respect to FIGS. 1 and 3-44.

FIG. 3C is a code snippet illustrating an example of a symbol table and SASS code in accordance with at least one embodiment. In at least one embodiment, a symbol table 312 shows a trap function 313 as an entry of said symbol table. In at least one embodiment, said entry includes offset information of trap function 313. In at least one embodiment, for example, "0x60" indicates that trap function 313 starts at a memory address of "0×60", and has a size of" 0x20 bytes ", which suggests that from said start address, machine code of trap function 313 spans 32 bytes (0x20 is 32 in decimal). In at least one embodiment, this entry can be used by a debugger (e.g., debugger 106 as described in connection with FIG. 1) to determine a line number in source code where an error has occurred.

In at least one embodiment, section 316 is an accompanying SASS code, which shows instructions and their corresponding memory addresses. In at least one embodiment, said corresponding memory addresses are memory locations where said instructions are loaded and executed. In at least one embodiment, SASS code snippet in section 316 includes a register R4. In at least one embodiment, said register contains error information stored by one or more trap functions when one or more illegal memory access attempts are detected.

In at least one embodiment, said debugger uses information (e.g., information in said entry for trap function 313) and information for register "R4" to generate user-friendly error messages. In at least one embodiment, said debugger can map low-level machine instructions back to high-level source code, which allows developers to set breakpoints, step through code, and inspect variables using their original source code names.

In at least one embodiment, symbol table 312 and SASS code in section 316 are generated by compiler (e.g., compiler 206) at compile time.

In at least one embodiment, at least one feature described in connection with FIGS. 3A-3C is implemented using at least one feature of any system(s) and/or process(es) depicted in and/or described in connection with FIGS. 1-2 and 4-44. In at least one embodiment, at least one feature described in connection with FIG. 3A-3C is used to implement at least a portion of any system(s) and/or process(es) depicted in and/or described with respect to FIGS. 1-2 and 4-44.

Figure 4:
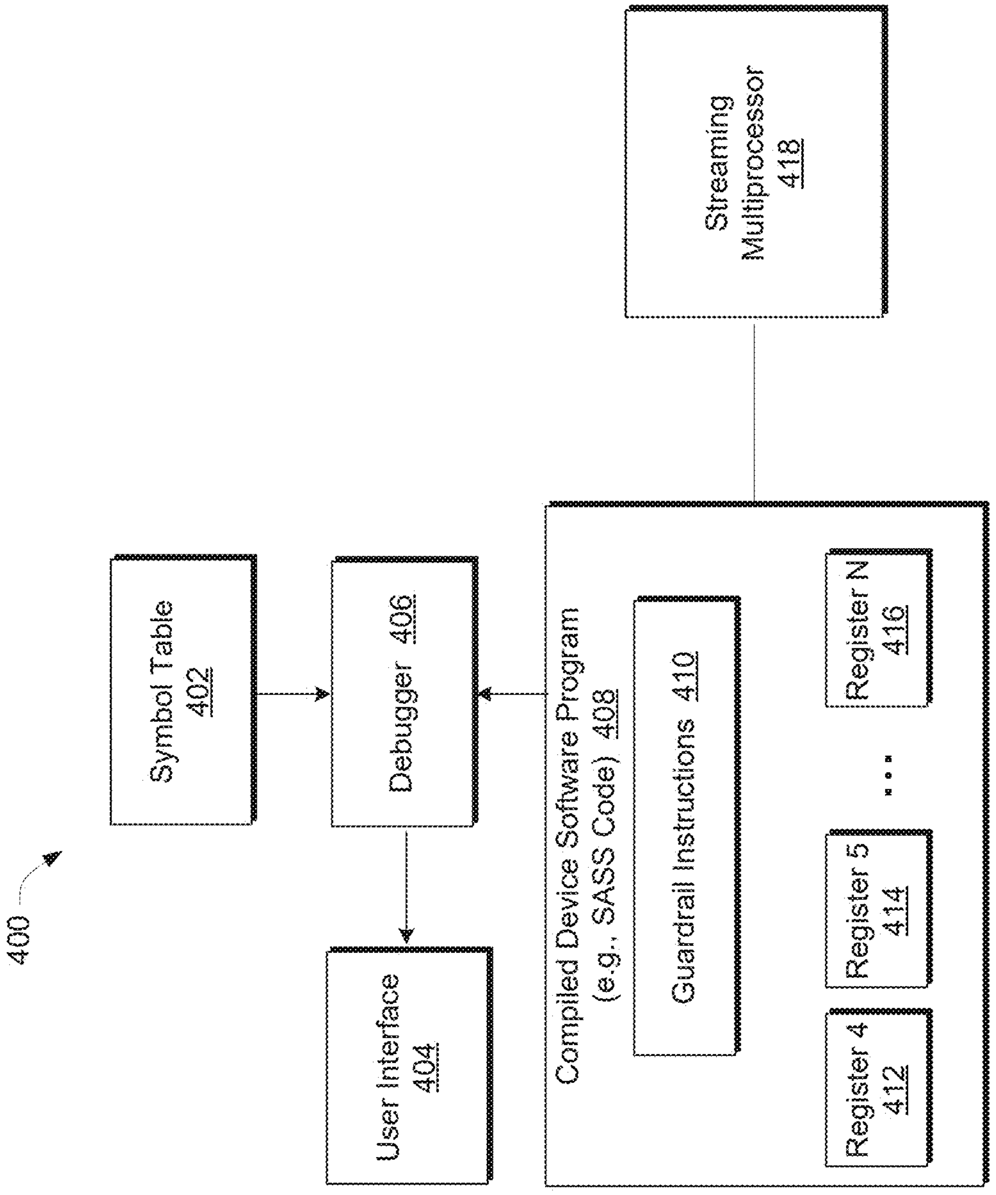
FIG. 4 is a block diagram illustrating a system for debugging a program, showing integration of guardrail instructions and use of a debugger to monitor program execution, in accordance with at least one embodiment.

FIG. 4 is a block diagram illustrating a system 400 for debugging a program, showing integration of guardrail instructions and use of a debugger to monitor program execution, in accordance with at least one embodiment.

In at least one embodiment, system 400 includes an SM 418, a device software program 408, a debugger 406, a symbol table 402 and a user interface 420.

In at least one embodiment, SM 418 corresponds to SM 102 as described in connection with FIG. 1. In at least one embodiment, device software program 408 corresponds to SASS code 218 as described in connection with FIG. 2. In at least one embodiment, debugger 406 corresponds to debugger 106 as described in connection with FIG. 1. In at least one embodiment, symbol table 402 corresponds to symbol table 216 as described in connection with FIG. 2.

In at least one embodiment, device software program 408 includes guardrail instructions 410, which correspond to guardrail instructions 110 as described in connection with FIG. 1. In at least one embodiment, device software program is a SASS program, and includes a number of registers 412, 414, 416, which are used to store error information generated by trap functions for guardrail instructions 410 when their corresponding memory access instructions attempt to perform memory access operations that violate one or more predetermined rules. In at least one embodiment, a memory access attempt that violates any of those one or more rules is an illegal memory access attempt.

In at least one embodiment, these predetermined rules include that a device software program is not allowed to allocate tensor memory after this program has relinquished its right to allocate tensor memory. In at least one embodiment, these predetermined rules include that a device software program is not allowed to access tensor memory that has not been allocated. In at least one embodiment, these predetermined rules include that a warp is not allowed to allocate a portion of tensor memory that belongs to a different warp. In at least one embodiment, these predetermined rules include that a device program is not allowed to access tensor memory that is out of physical bounds of said tensor memory. In at least one embodiment, these predetermined rules include that a device program is not allowed to access tensor memory with an incorrect granularity. In at least one embodiment, these predetermined rules include that a device program is not allowed to pass incorrect row numbers in tensor memory addresses in parameters to MMA operations. In at least one embodiment, said tensor memory is tensor memory that a CTA is allowed to access.

In at least one embodiment, when one of those rules is violated, a trap function is triggered. In at least one embodiment, trap functions are included in symbol table 402 as entries. In at least one embodiment, each trap function has a corresponding information to indicate an offset of said trap function. In at least one embodiment, this offset can be used to determine an exact location in a device program where a memory access error occurs.

In at least one embodiment, debugger 406 includes mappings between low-level error messages retrieved from registers 412, 414, 416 and user-friendly error messages. In at least one embodiment, debugger 406 presents these user-friendly error messages to user interface 420 for use by users in debugging.

In at least one embodiment, at least one feature described in connection with FIG. 4 is implemented using at least one feature of any system(s) and/or process(es) depicted in and/or described in connection with FIGS. 1-3 and 5-44. In at least one embodiment, at least one feature described in connection with FIG. 4 is used to implement at least a portion of any system(s) and/or process(es) depicted in and/or described with respect to FIGS. 1-3 and 5-44.

Figure 5:
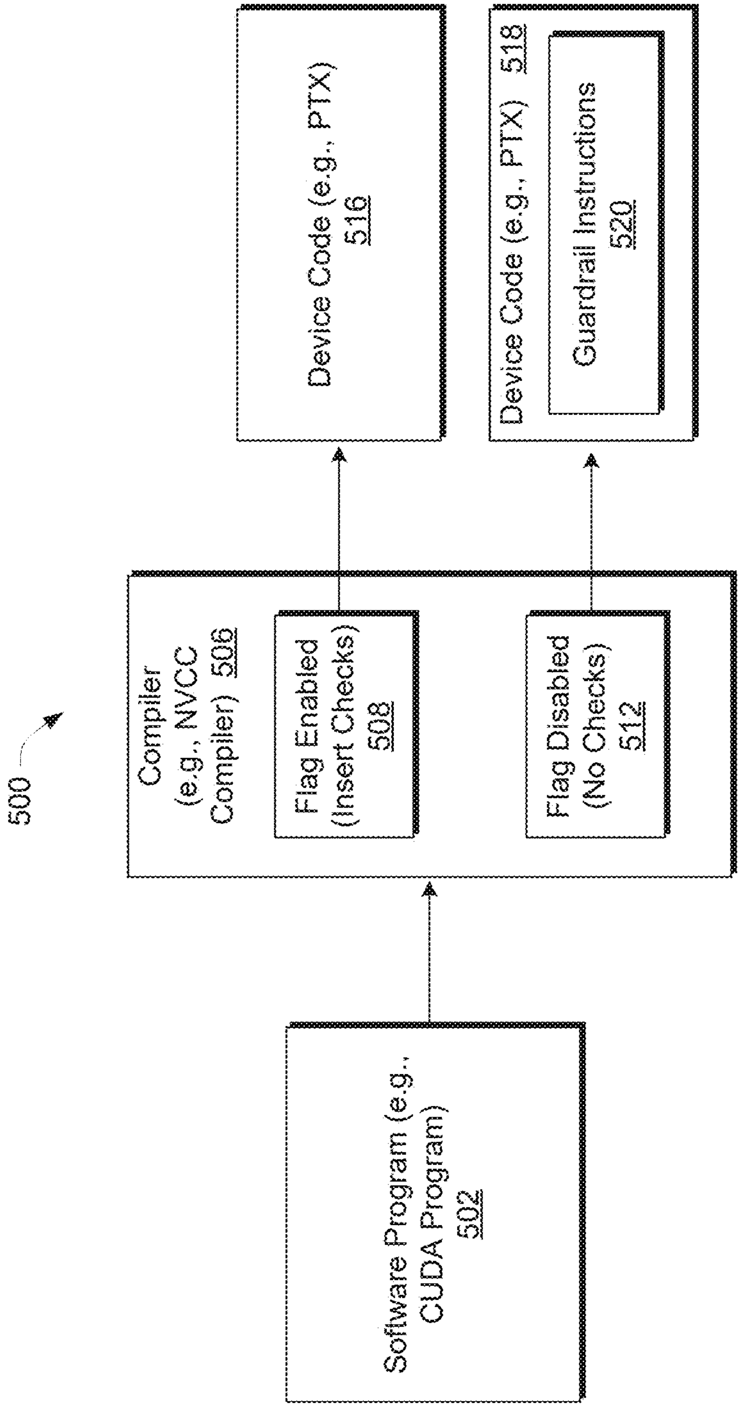
FIG. 5 illustrates a block diagram illustrating a system for compiling a CUDA program, showing how guardrail instructions are selectively included based on a compiler flag, in accordance with at least one embodiment.

FIG. 5 illustrates a block diagram illustrating a system 500 for compiling a CUDA program, showing how guardrail instructions are selectively included based on a compiler flag, in accordance with at least one embodiment. In at least one embodiment, system 500 depicts a process involved in compiling a CUDA program, illustrating how guardrail instructions can be selectively included based on a compiler flag.

In at least one embodiment, a software program 502 (e.g., CUDA Program) is original source code, which includes CUDA code. In at least one embodiment, software program 502 is provided to a compiler 506. In at least one embodiment, this compiler can translate software program 502 into host code (not shown) (e.g., host code 208 as described in connection with FIG. 1.) and device code 516 or device code 518. In at least one embodiment, device code 516 or device code 518 corresponds to device code 210 as described in connection with FIG. 1.

In at least one embodiment, device code 516 and device code 518 are results of different compiling paths depending on whether a flag is enabled or not. In at least one embodiment, when this flag is enabled 508 or otherwise provided as an option during compilation, compiler 506 generates guardrail instructions 520 in device code 518. In at least one embodiment, when such a flag is not enabled 512 or not otherwise provided as an option when software program 502 is compiled, compiler 506 does not generate guardrail instructions 520 in device code 518.

In at least one embodiment, compiler 506 or its debugger component includes logic to insert, into software program 502 being compiled, guardrail instructions 520. In at least one embodiment, for example, compiler 506 can generate an intermediate representation (IR) of software program 502, parse said IR to identify memory access operations, and then modify said IR by inserting additional nodes representing guardrail instructions 520 immediately prior to any memory access operations so that, when compiler 506 generates compiled software (e.g., device code 518 or 516) from said IR, said compiled software includes guardrail instructions 520 before each instruction that will access memory. In at least one embodiment, guardrail instructions generate one or more errors if memory access instructions are to access memory not allocated to those second instructions (e.g., to a thread comprising said memory access instructions).

In at least one embodiment, at least one feature described in connection with FIG. 5 is implemented using at least one feature of any system(s) and/or process(es) depicted in and/or described in connection with FIGS. 1-4 and 6-44. In at least one embodiment, at least one feature described in connection with FIG. 1 is used to implement at least a portion of any system(s) and/or process(es) depicted in and/or described with respect to FIGS. 1-4 and 6-44.

Figure 6:
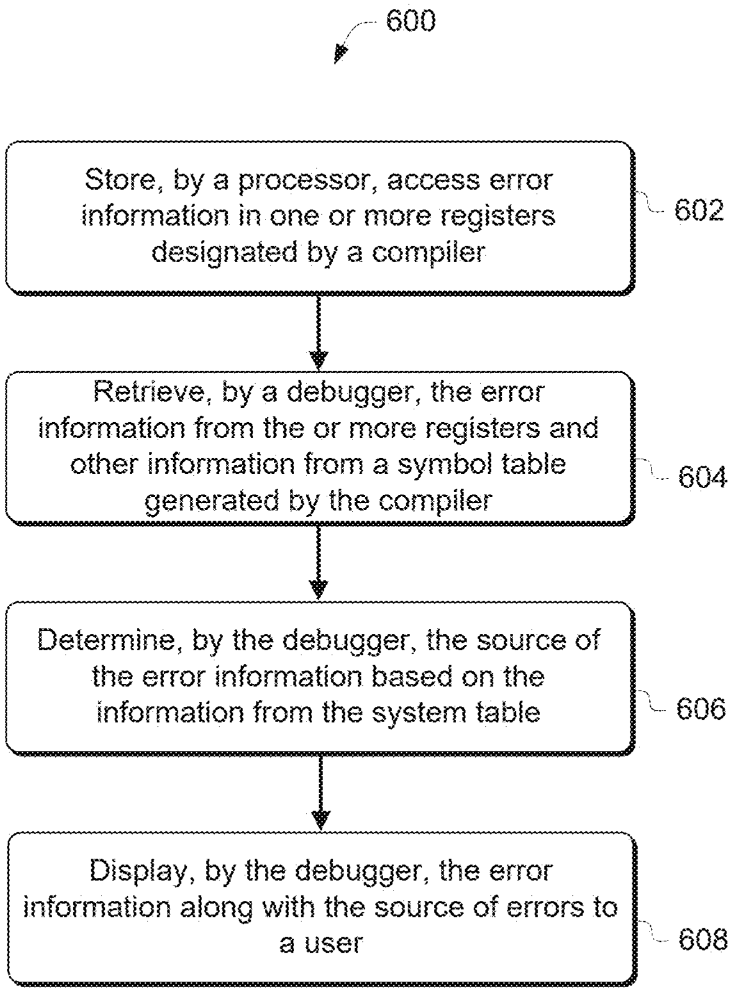
FIG. 6 is a flowchart diagram illustrating a process of debugging a CUDA program, showing integration of guardrail instructions and use of a debugger to monitor performance, in accordance with at least one embodiment.

FIG. 6 is a flowchart diagram illustrating a process 600 of debugging a CUDA program, showing integration of guardrail instructions and use of a debugger to monitor performance, in accordance with at least one embodiment.

In at least one embodiment, at step 602, a processor stores (e.g., processor 2000 as described in connection with FIG. 20) access error information in one or more registers designated by a compiler. In at least one embodiment, these registers are designated to store error information generated by a compiled program at runtime.

In at least one embodiment, at step 604, a debugger retrieves said error information from said one or more registers and other information from a symbol table. In at least one embodiment, said symbol table is also generated by said compiler when compiling a program.

In at least one embodiment, at step 606, said debugger determines a source of said error information based on information from said symbol table. In at least one embodiment, for example, said information in said symbol table can be used to determine a line number where an error occurred in source code of said compiled program.

In at least one embodiment, at step 608, said debugger displays said error information and a source (e.g., a line number in source code) to a user.

In at least one embodiment, at least one feature described in connection with FIG. 6 is implemented using at least one feature of any system(s) and/or process(es) depicted in and/or described in connection with FIGS. 1-5 and 7-44. In at least one embodiment, at least one feature described in connection with FIG. 6 is used to implement at least a portion of any system(s) and/or process(es) depicted in and/or described with respect to FIGS. 1-5 and 7-44.

Allocation Permission Relinquishment Check

Figure 7:
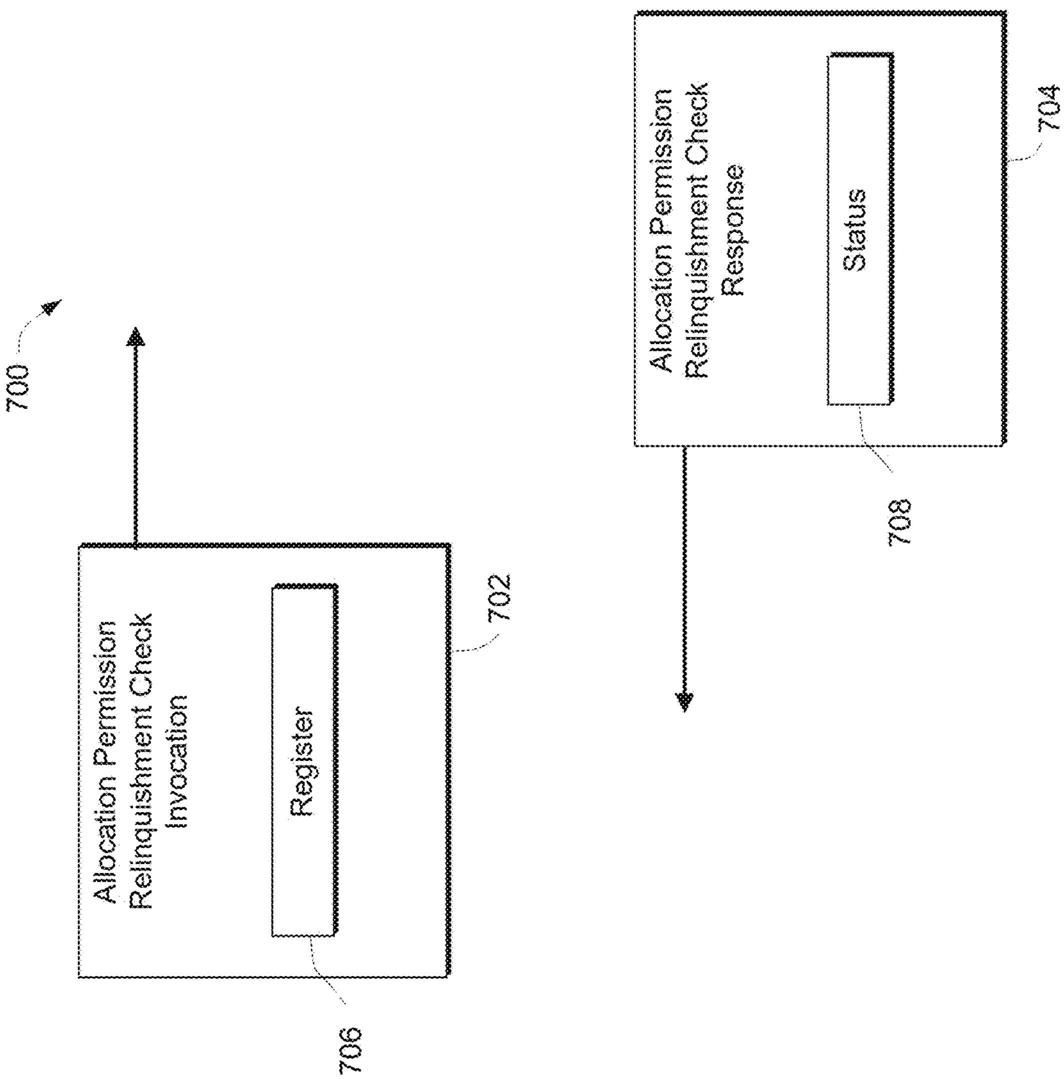
FIG. 7 is a block diagram illustrating an allocation permission relinquishment check operation in accordance with at least one embodiment.

FIG. 7 is a block diagram illustrating an allocation permission relinquishment check operation 700 ("operation 700") in accordance with at least one embodiment.

In at least one embodiment, operation 700 is one or more computational operations that, if performed, cause a processor (e.g., processor 2000 as described in connection with FIG. 20) to check whether a thread has permission to allocate a storage location in memory (e.g., tensor memory). In at least one embodiment, more specifically, operation 700 is one or more computational operations that, if performed, cause a processor to check whether a thread has relinquished its right (permission) to allocate at least a portion of a tensor memory.

In at least one embodiment, when a program (e.g., a GPU kernel) starts, said program has right to allocate tensor memory. In at least one embodiment, once said program has relinquished its right to allocate TMEM by performing an allocation right relinquishment instruction, such as "relinquish-alloc-permit" instruction, said program is not allowed to perform any tensor memory allocation.

In at least one embodiment, operation 700 includes an allocation permission relinquishment check invocation 702 ("invocation 700") and an allocation permission relinquishment check response 704 ("response 704"). In at least one embodiment, invocation 702 is a function call to be performed by one or more software programs, such as kernels to be performed by one or more processing units, such as GPUs. In at least one embodiment, invocation 702 is to invoke an instruction (e.g., one of guardrails instructions 110 as described in connection with FIG. 1) to cause one or more processors to perform an allocation permission relinquishment check and generate response 704. In at least one embodiment, invocation 702 is an invocation of an API to cause one or more processors to perform an allocation permission relinquishment check and generate response 704.

In at least one embodiment, invocation 702 receives an input parameter, which is a register 706. In at least one embodiment, register 706 is similar to TMEM allocator state register 118 as described in connection with FIG. 1. In at least one embodiment, register 706 can retrieve allocation phase information of all CTAs from reserved shared memory, such as reserved shared memory 120 as described in connection with FIG. 1. In at least one embodiment, said allocation phase information indicates whether a CTA has relinquished its right to allocate storage on TMEM of a SM.

In at least one embodiment, said allocation phase information for each CTA can be stored in a variable in said reversed shared memory. In at least one embodiment, said variable is an example of a data storage entity that may be used to store phase information to indicate whether a CTA has relinquished its right to allocate tensor memory. In at least one embodiment, said data storage entity includes storage locations, memory addresses, buffers, caches, or similar data-holding constructs. In at least one embodiment, said data storage entity can be in reserved shared memory.

In at least one embodiment, said information can be programmatically changed. In at least one embodiment, for example, when a program starts, said data storage entity, said phase variable in said revered is initialized to 0, indicating that a program is ready to allocate TMEM. In at least one embodiment, if said value of allocation phase variable 706 has changed to any value other than 0, either said CTA has relinquished its right to allocate TMEM or corruption has occurred in said reserved shared memory.

In at least one embodiment, register 706 can retrieve phase information for each CTA from said reserved shared memory at runtime. In at least one embodiment, a processor can check said phase information when determining whether a CTA has relinquished its right to allocate storage on TMEM of an SM.

In at least one embodiment, said data storage entity can store information to indicate whether a CTA can exclusively or non-exclusively allocate storages in tensor memory. In at least one embodiment, exclusive allocation means that storage allocations in tensor memory can be made only by said CTA, with no other CTA allowed to allocate storages in said tensor memory. In at least one embodiment, non-exclusive allocation means that a CTA other than said CTA performing said memory allocation instruction is allowed to allocate storages on tensor memory.

In at least one embodiment, only one CTA is permitted to allow storage on tensor memory of a SM at any given time. In at least one embodiment, said data storage entity can store one or more exclusive storage bits to indicate that a CTA has rights to allocate TMEM or not. In at least one embodiment, said one or more exclusive storage bits can be storage bits on a register, such as TMEM state allocation register 118 as described in connection with FIG. 1. In at least one embodiment, information represented by said one or more exclusive storage bits can be stored in reserved shared memory, such as reserved shared memory 120 as described in connection with FIG. 1.

In at least one embodiment, when said one or more exclusive storage bits are set to a value, such as 0, a CTA with threads corresponding to said one or more exclusive can exclusively allocate storage on a TMEM, where no other CTA can allocate storage on said TMEM while said CTA are allocating storage on said TMEM. In at least one embodiment, threads corresponding to said one or more exclusive bits belong to one CTA.

In at least one embodiment, when said one or more exclusive storage bits are set to a different value, such as 1, a CTA with threads corresponding to said one or more exclusive storage bits can non-exclusively allocate storage on said TMEM, where said CTA can allocate storage on a portion of said TMEP. In at least one embodiment, when said one or more exclusive storage bits are set to a different value, such as 1, a CTA with threads corresponding to said one or more exclusive are not allowed to allocate storage on said TMEM.

In at least one embodiment, an example instruction that corresponds to operation 700 is as follows:

_tcgen05.guardrails.is_phase_valid *r*.

In at least one embodiment, in said example instruction above, "r" represents a register that stores allocation phase information to whether a program or a thread or a CTA has relinquished permission to allocate TMEM.

In at least one embodiment, response 704 is output generated by an instruction or an API that has been invoked by invocation 702. In at least one embodiment, said output is data to be output by an API, if invocation 702 has caused said API to be performed. In at least one embodiment, said output is data to be output by an instruction, if invocation 702 has caused said instruction to be performed. In at least one embodiment, said information includes status 708, which is a value, code, or other information that indicates whether a thread, program, or CTA is permitted to allocated TMEM. In at least one embodiment, for example, a status code of 0 or true indicates that said thread, program, or CTA is permitted to allocate TMEM, while a status code of 1 or false indicates that said thread, program, or CTA is not permitted to allocated TMEM.

In at least one embodiment, at least one feature described in connection with FIG. 7 is implemented using at least one feature of any system(s) and/or process(es) depicted in and/or described in connection with FIGS. 1-6 and 8-44. In at least one embodiment, at least one feature described in connection with FIG. 7 is used to implement at least a portion of any system(s) and/or process(es) depicted in and/or described with respect to FIGS. 1-6 and 8-44.

Figure 8:
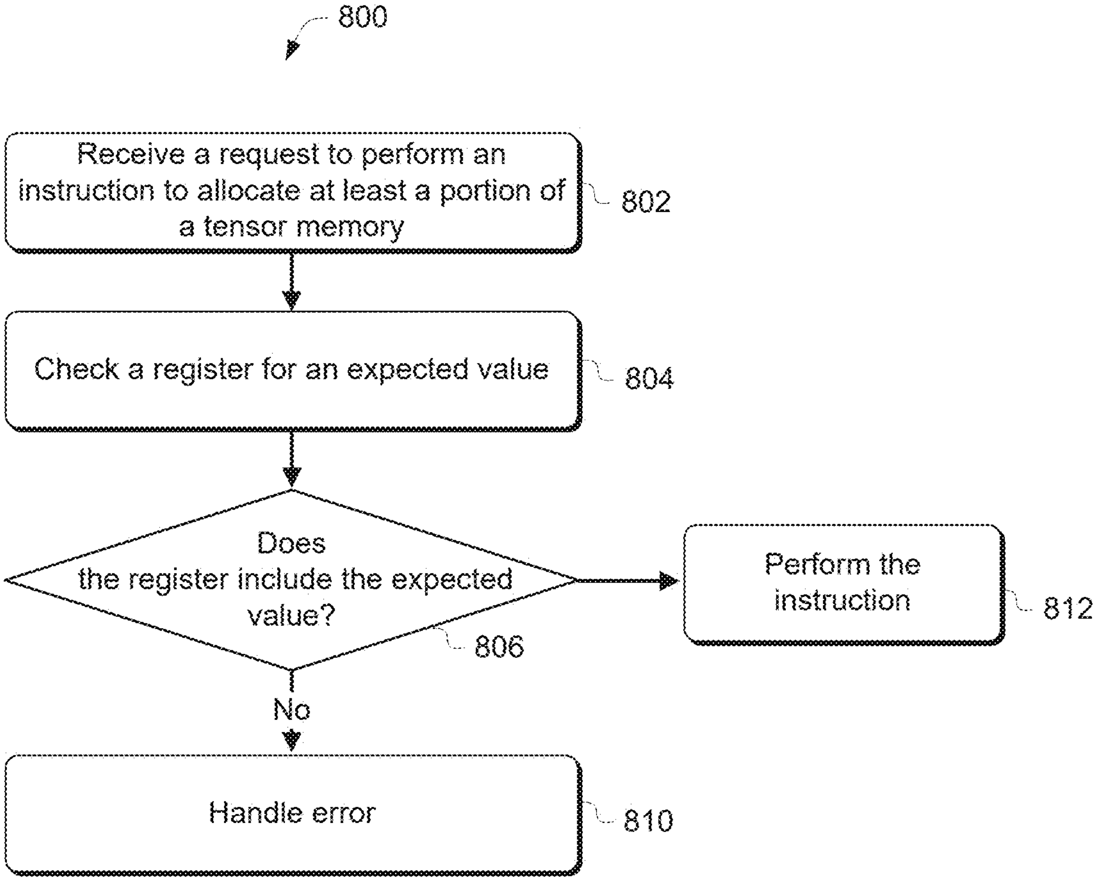
FIG. 8 is a flowchart diagram illustrating a process of performing an allocation permission relinquishment check operation in accordance with at least one embodiment.

FIG. 8 is a flowchart diagram illustrating a process 800 of performing an allocation permission relinquishment check operation in accordance with at least one embodiment. In at least one embodiment, process 800 is performed by a processor such as processor 2000 as described in connection with FIG. 20. In at least one embodiment, process 800 is described in connection with FIGS. 1-7 and 24-28, which describe one or more features and components used in process 800.

In at least one embodiment, at step 802, said processor receives a request to perform an instruction to allocate storage in a tensor memory. In at least one embodiment, said instruction is performed by a thread within a CTA. In at least one embodiment, said request is received from a CPU.

In at least one embodiment, at step 804, said processor checks a register for an expected value. In at least one embodiment, said register stores information retrieved from a variable in a reserved shared memory (e.g., reserved shared memory 120 as described in connection with FIG. 1)

to determine whether a CTA corresponding to said variable has relinquished its right to allocate at least a portion of tensor memory.

In at least one embodiment, at step 806, said processor compares a value in said register or similar information in said reserved shared memory against an expected value or against expected information. In at least one embodiment, said expected value is true or 0. In at least one embodiment, said expected information is any information indicating that said thread performing said request has relinquished its right to make storage allocations in tensor memory.

In at least one embodiment, at step 810, if said register includes a value indicating that said thread performing said request has relinquished its right to make storage allocations tensor memory, or said reserved shared memory includes any information indicating such, said processor determines that said thread has relinquished its right to allocate tensor memory, and therefore will generate an error and trigger a trap function to handle said errors, including preventing said instruction from being performed.

In at least one embodiment, at step 812, if said register does not include a value indicating that said thread performing said request has relinquished its right to make storage allocations in tensor memory, or said reserved shared memory does not include any information indicating such, said processor determines that said thread has not relinquished its right to allocate tensor memory, and therefore will perform said instruction.

In at least one embodiment, at least one feature described in connection with FIG. 8 is implemented using at least one feature of any system(s) and/or process(es) depicted in and/or described in connection with FIGS. 1-7 and 9-44. In at least one embodiment, at least one feature described in connection with FIG. 8 is used to implement at least a portion of any system(s) and/or process(es) depicted in and/or described with respect to FIGS. 1-7 and 9-44.

Unallocated Memory Access Check

Figure 9:
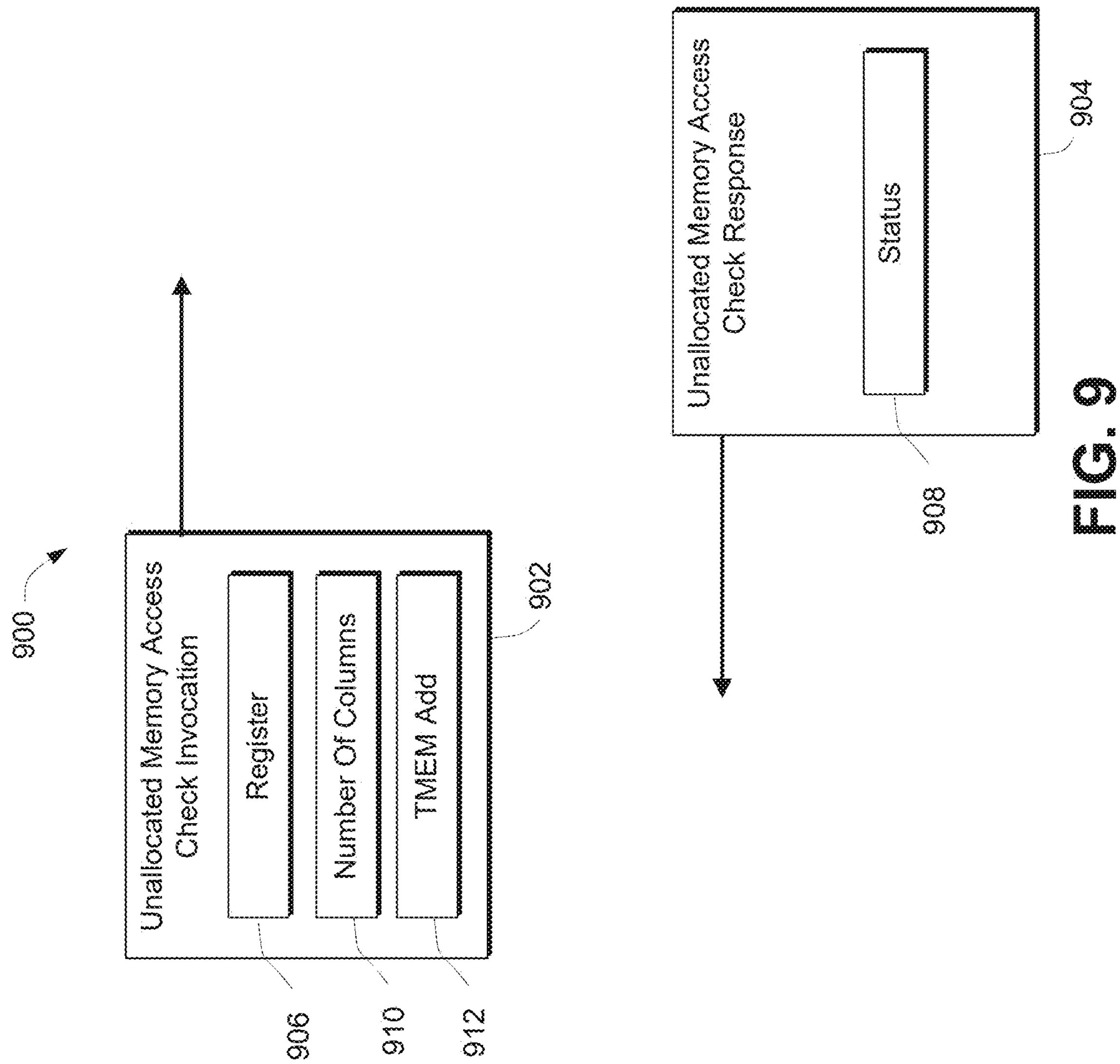
FIG. 9 is a block diagram illustrating an access permission check operation in accordance with at least one embodiment.

FIG. 9 is a block diagram illustrating an access permission check operation 900 ("operation 900") in accordance with at least one embodiment. In at least one embodiment, operation 900 is one or more computational operations that cause a processor (e.g., processor 2000 as described in connection with FIG. 20) to check whether an instruction in a thread attempts to access a storage location that said thread is not permitted to access.

In at least one embodiment, more specifically, operation 900 is one or more computational operations that, if performed, cause a processor to check whether a thread attempts to access a portion of tensor memory that has been allocated to that thread. In at least one embodiment, this check ensures that that a thread performing an operation or a memory deallocation is to access tensor memory that was previously allocated to said thread. In at least one embodiment, this check traps if one or more unallocated columns in tensor memory are being accessed by said thread. In at least one embodiment, said operation is a load operation that retrieves data from tensor memory and saves said data to registers. In at least one embodiment, said operation is a store operation that moves data from registers to tensor memory. In at least one embodiment, said operation is an MMA operation that needs to access operand data stored in tensor memory.

In at least one embodiment, operation 900 checks whether a portion of tensor memory has been properly allocated and is accessible before that portion of tensor memory is to be operated on. In at least one embodiment, operating on that portion of tensor memory includes loading data from that portion of tensor memory. In at least one embodiment, operating on that portion of tensor memory includes storing data to that portion of tensor memory. In at least one embodiment, operating on that portion of tensor memory includes shifting data in that portion of tensor memory. In at least one embodiment, operating on that portion of tensor memory includes copying data from share memory to tensor memory. In at least one embodiment, operating on that portion of tensor memory includes deallocating that portion of tensor memory.

In at least one embodiment, operation 900 includes an unallocated memory access check invocation 902 ("invocation 902") and an allocation permission relinquishment check response 904 ("response 904"). In at least one embodiment, invocation 902 is a function call to be performed by one or more software programs, such as kernels to be performed by one or more parallel processing units (PPUs), such as GPUs. In at least one embodiment, invocation 902 is an invocation of an instruction (e.g., one of guardrails instructions 110 as described in connection with FIG. 1.) to cause one or more processors to perform an unallocated memory access check and generate response 904. In at least one embodiment, invocation 902 is an invocation of an API to cause one or more processors to perform an unallocated memory access check and generate response 904.

In at least one embodiment, when said processor performs an instruction that accesses storage in memory, said memory contains circuitry that validates that a thread causing said processor to perform said instruction has permission to access that storage (e.g., that storage is allocated to said thread). In at least one embodiment, however, a tensor memory does not have this circuitry. In at least one embodiment, as a result, instructions performed by a processor can cause the processor to access any storage in memory regardless of permission.

In at least one embodiment, said instruction, if performed, causes an error if another instruction (e.g., a next instruction to be performed) will cause a processor to access storage in memory not allocated to a thread causing said processor to perform said instruction. In at least one embodiment, this instruction, for example, can be inserted into a software program by a debugger. In at least one embodiment, this error will cause a SM to not perform additional instructions of that thread and to generate debugging information.

In at least one embodiment, invocation 902 receives, as input parameters, a register 906, a number of columns 910 in tensor memory, and an address 912 of said tensor memory. In at least one embodiment, register 906 is similar to TMEM allocator state register 118 as described in connection with FIG. 1. In at least one embodiment, register 906 stores information indicating allocation status/state of each column in said tensor memory. In at least one embodiment, said information is stored in a bitmask in reserved shared memory such as reserved shared memory 120 as described in connection with FIG. 1, and is retrieved from said bitmask to be stored in register 906 for faster access. In at least one embodiment, in either register 906 or said bitmask in said reserved shared memory, each bit corresponds to a specific column of tensor memory indicated by tensor memory address 912. In at least one embodiment, said allocation status of each column indicates whether that column is allocated (1) or unallocated (0).

In at least one embodiment, tensor memory address 912 specifies a base address with a row index and a column index that respectively indicate a starting row and a starting column to be accessed. In at least one embodiment, column number 910 specifies a number of columns to be accessed by a thread.

In at least one embodiment, an example instruction that corresponds to operation 900 is as follows:

_tcgen05.guardrails.are_columns_allocated.*dealloc r*, [*tmem*], *ncols*;

In at least one embodiment, in said instruction above, "[tmem]" is an address of tensor memory to be at least partially deallocated, "ncols" specifies a number of columns in said tensor memory that are to be deallocated, and "r" is a register that stores allocation information of said tensor memory.

In at least one embodiment, an example instruction that corresponds to operation 900 is as follows:

_tcgen05.guardrails.are_columns _allocated.*ld*/*st*. < shape > .*num*{.*packexp*} *r*, [*tmem*];

In at least one embodiment, in said above instruction, "[tmem]" is an address of tensor memory from which a thread loads data, or to which a thread stores data, and "r" is a register that stores allocation information of said tensor memory.

In at least one embodiment, an example instruction that corresponds to operation 900 is as follows:

_tcgen05.guardrails.are_columns_allocated.*cp*. < shape > *r*, [*tmem*];

In at least one embodiment, "[tmem]" is an address of tensor memory to which a thread copies data from shared memory, and "r" is a register that stores allocation information of said tensor memory.

In at least one embodiment, an example instruction that corresponds to operation 900 is as follows:

_tcgen05.guardrails.are_columns_allocated.shift *r*, [*tmem*];

In at least one embodiment, in said shift instruction above, "[tmem]" is an address of tensor memory that stores data to be shifted, and "r" is a register that stores allocation information of said tensor memory.

In at least one embodiment, response 904 is output generated by an instruction or an API that has been invoked by invocation 902. In at least one embodiment, said output is data to be output by an API, if invocation 902 has caused said API to be performed. In at least one embodiment, said output is data to be output by an instruction, if invocation 902 has caused said instruction to be performed. In at least one embodiment, status 908 is a code, value, or other information that indicates whether said thread attempts to perform an illegal memory access. In at least one embodiment, a value of 0 or true indicates that said thread attempts to perform an illegal memory access to at least a portion of tensor memory of a CTA that includes said thread, while a value of 1 or false indicates that said thread is authorized to access at least a portion of tensor memory of said CTA.

In at least one embodiment, at least one feature described in connection with FIG. 9 is implemented using at least one feature of any system(s) and/or process(es) depicted in and/or described in connection with FIGS. 1-8 and 10-44. In at least one embodiment, at least one feature described in connection with FIG. 9 is used to implement at least a portion of any system(s) and/or process(es) depicted in and/or described with respect to FIGS. 1-8 and 10-44.

Figure 10:
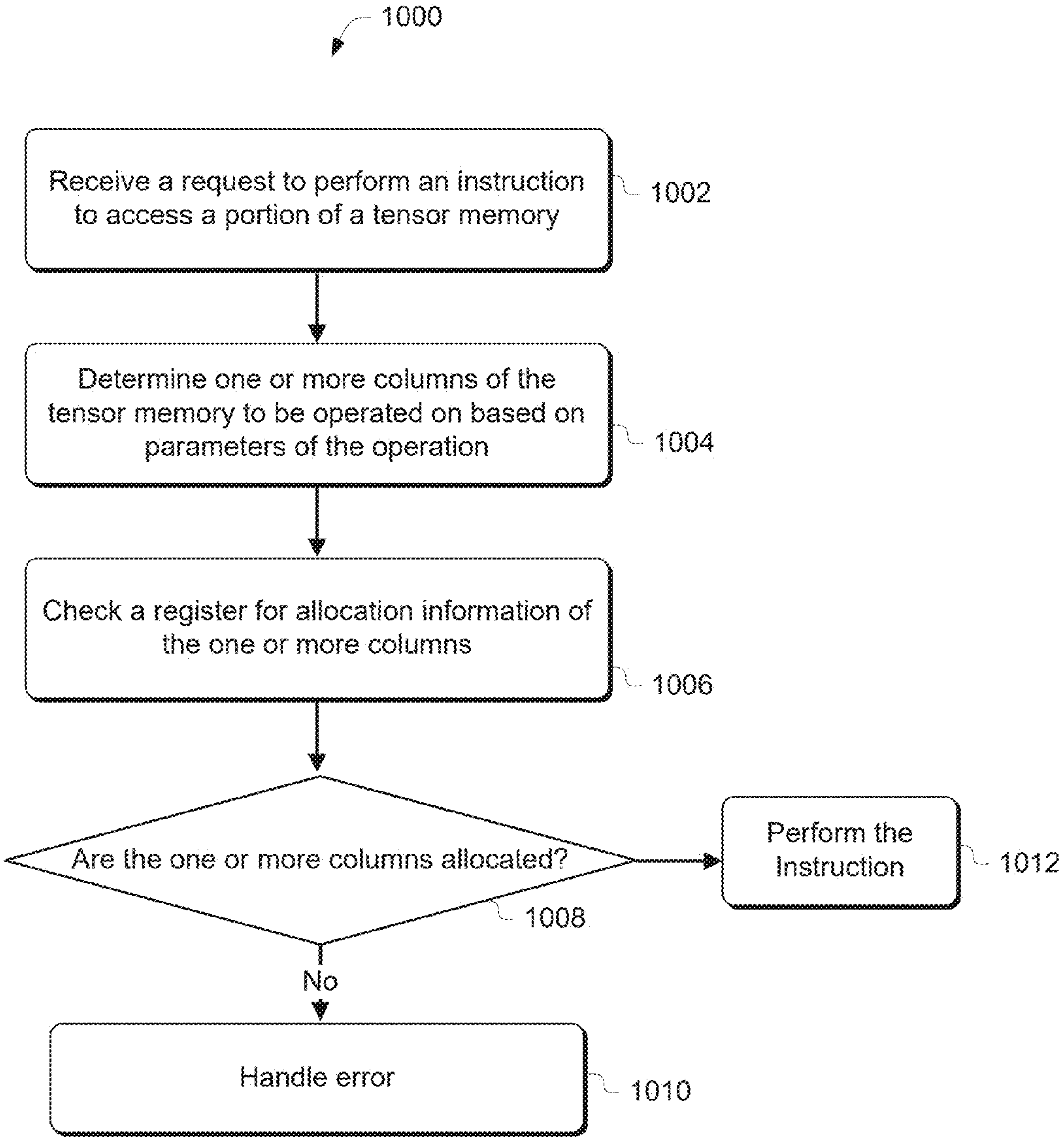
FIG. 10 is a flowchart diagram illustrating a process of performing an access permission check operation in accordance with at least one embodiment.

FIG. 10 is a flowchart diagram illustrating a process 1000 of performing an access permission check operation in accordance with at least one embodiment. In at least one embodiment, process 1000 is performed at least in part on a computer system such as those described elsewhere in this disclosure. In at least one embodiment, process 1000 is performed by a processor such as processor 2000 as described in connection with FIG. 20.

In at least one embodiment, process 1000 checks whether a portion of tensor memory being operated on by a program was previously allocated and has not been deallocated. In at least one embodiment, this check triggers a trap if unallocated columns are accessed by a memory access operation.

In at least one embodiment, at step 1002, said processor receives a request to perform an instruction to access storage on a tensor memory. In at least one embodiment, this instruction is one of a plurality of instructions, examples of which include instructions to load data into said tensor memory, deallocate a portion of tensor memory, and copy data stored in said tensor memory to shared memory. In at least one embodiment, this instruction triggers operation 900 as described in connection with FIG. 9. In at least one embodiment, said instruction includes, as input parameters, a register indicating an allocation status of each column in said tensor memory, a base memory address that specifies a starting row and a starting column to be accessed, and a number of columns be accessed by a thread.

In at least one embodiment, at step 1004, said processor determines one or more columns of tensor memory that are to be operated on based on parameters of said operation. In at least one embodiment, this step identifies specific portions of said tensor memory (columns) that will be affected by said upcoming operation. In at least one embodiment, said processor makes such determination using parameters of said operation, such as a memory address and a number of columns.

In at least one embodiment, at step 1006, said processor checks a register for allocation information of said identified columns. In at least one embodiment, said register contains information indicating whether each column of tensor memory has been allocated (i.e., is available for use). In at least one embodiment, information in said register indicates whether said identified columns have not been deallocated even though they were previously allocated.

In at least one embodiment, said register includes information that indicates allocation states of various columns in said tensor memory. In at least one embodiment, each bit in this register corresponds to a specific column within said tensor memory. In at least one embodiment, for example, a bit value of "1" indicates that a column is allocated, and "0" indicates it is unallocated. In at least one embodiment, said processor checks said register for said identified columns to determine if they are allocated and therefore ready to be accessed.

In at least one embodiment, at step 1008, said processor determines whether each of said identified columns are allocated and is ready to be operated on. In at least one embodiment, at step 1012, said processor performs said intended operation on said tensor memory if it determines each identified column is allocated and ready for use. In at least one embodiment, at step 1010, said processor handles error if it determines at least one of said identified columns is not allocated, was previously allocated but has been deallocated. In at least one embodiment, said processor handles errors by aborting said operation to prevent said operation from being performed. In at least one embodiment, said error includes information of one or more errors were accessed but are not allocated to a thread. In at least one embodiment, this information is stored one or more error reporting registers (e.g., registers 412, 414, 416 as described in connection with FIG. 4) for debugging.

In at least one embodiment, at least one feature described in connection with FIG. 10 is implemented using at least one feature of any system(s) and/or process(es) depicted in and/or described in connection with FIGS. 1-9 and 11-44. In at least one embodiment, at least one feature described in connection with FIG. 10 is used to implement at least a portion of any system(s) and/or process(es) depicted in and/or described with respect to FIGS. 1-9 and 11-44.

Warp Access Permission Check

Figure 11:
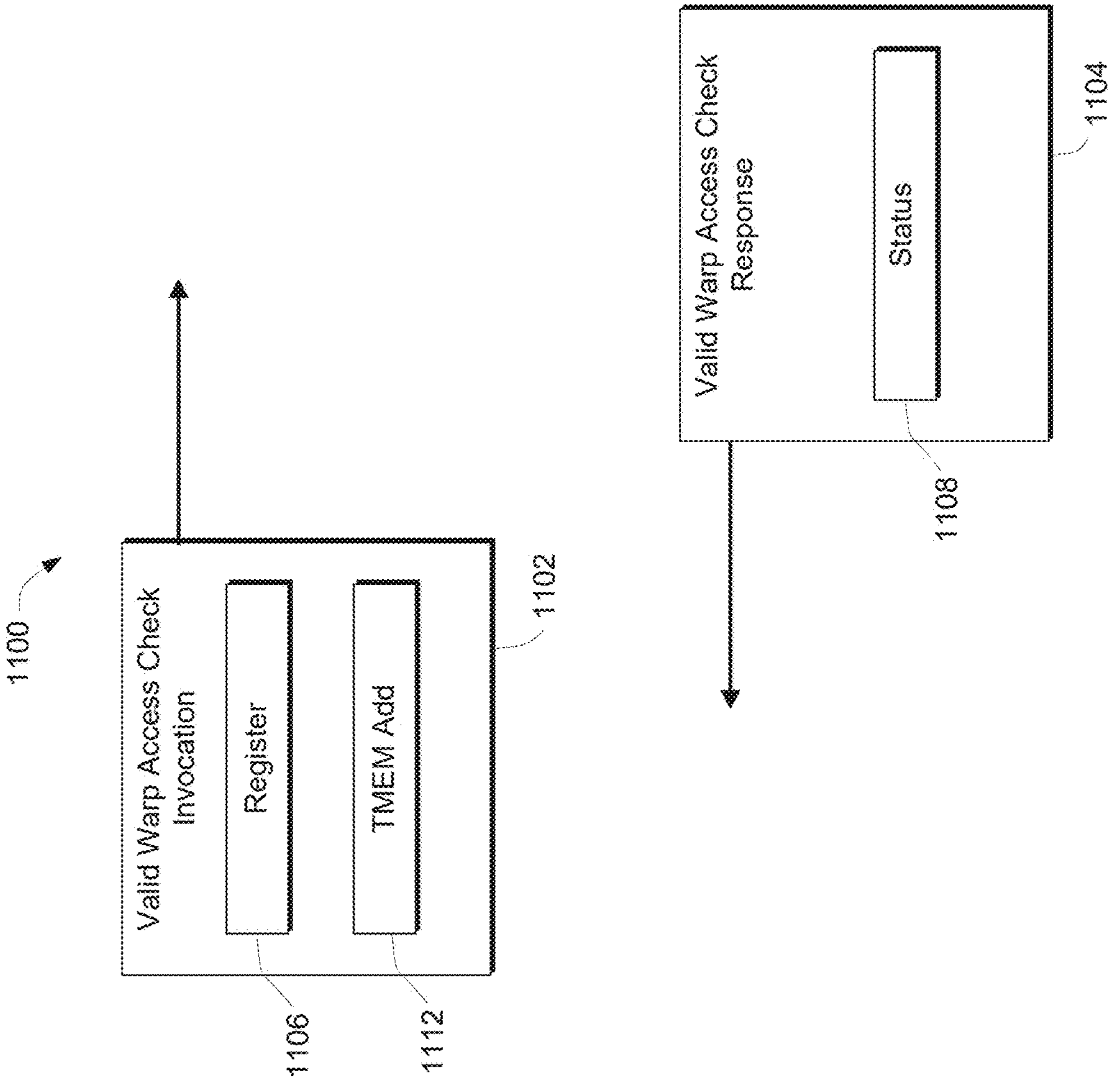
FIG. 11 is a block diagram illustrating an access permission check operation in accordance with at least one embodiment.

FIG. 11 is a block diagram illustrating an access permission check operation 1100 ("invocation 1100") in accordance with at least one embodiment. In at least one embodiment, more specifically, operation 1100 is one or more computational operations that, if performed, cause a processor (e.g., processor 2000 as described in connection with FIG. 20) to check if an instruction attempts to access a storage location that a thread including said instruction does not have permission to access. In at least one embodiment, more specifically, operation 1100 is one or more computational operations that cause a processor (e.g., processor 2000 as described in connection with FIG. 20) to check if a thread within a warp attempts to access a portion of tensor memory that corresponds to that warp.

In at least one embodiment, warps access tensor memory in logical groups of contiguous warps (e.g., a warp group of 4 warps), and a single warp in a CTA can access only a portion (e.g., $1/4^{th}$) of said entire tensor memory. In at least one embodiment, each warp can access all columns of tensor memory, but that warp can only access a subset of rows across all columns depending on that warp's position in said warp group. In at least one embodiment, therefore, a warp can only access a portion of TMEM corresponds to that warp.

In at least one embodiment, operation 1100 includes a valid warp access check invocation 1102 ("invocation 1102") and a valid warp access check response 1104 ("response 1104"). In at least one embodiment, invocation 1102 is a function call to be performed by one or more software programs, such as kernels to be performed by one or more parallel processing units (PPUs), such as GPUs. In at least one embodiment, invocation 1102 is an invocation of an instruction (e.g. one of guardrails instructions 110 as described in connection with FIG. 1) to cause one or more processors to perform a valid warp access check and generate response 1104. In at least one embodiment, invocation 1102 is an invocation of an API to cause one or more processors to perform a valid warp access check and generate response 1104.

In at least one embodiment, said instruction, if performed, causes a processor to prevent another instruction (e.g., a next instruction to be performed) from accessing storage in memory not allocated to a thread causing said processor to perform said other instruction. In at least one embodiment, when said other instruction is decoded by said processor, said processor identifies that the instruction is to access storage in memory allocated to another instruction and prevents said other instruction from being performed (e.g., by halting a thread that caused said other instruction to be performed and generating an error).

In at least one embodiment, invocation 1102 receives input parameters. In at least one embodiment, these input parameters include a register 1106, such as TMEM allocator state register 118 as described in connection with FIG. 1. In at least one embodiment, register 1106 includes information that indicates an allocation status of each column in tensor memory, including which warp that column belongs to. In at least one embodiment, these parameters include a TMEM address 1112. In at least one embodiment, TMEM address 1112 points to a portion of tensor memory to be accessed by another memory access instruction to be checked by operation 1100.

In at least one embodiment, an example instruction that corresponds to operation 1100 is as follows:

```
_tcgen05.guardrails.is_current_warp_valid_owner r, [tmem];
```

In at least one embodiment, in said above example instruction, "[tmem]" is an address of tensor memory that a warp attempts to access, and "r" is a register that stores allocation information of said tensor memory.

In at least one embodiment, response 1104 is output generated by an instruction or an API that has been invoked by invocation 1102. In at least one embodiment, said output is data to be output by an API, if invocation 1102 has caused said API to be performed. In at least one embodiment, said output is data to be output by an instruction, if invocation 1102 has caused said instruction to be performed. In at least one embodiment, status 1108 is a code, value, or other information that indicates whether said thread attempts to perform an illegal memory access. In at least one embodiment, a value of 0 or true indicates that said thread attempts to perform an illegal memory access to at least a portion of tensor memory of a CTA that includes said thread, while a value of 1 or false indicates that said thread is authorized to access at least a portion of tensor memory of said CTA.

In at least one embodiment, at least one feature described in connection with FIG. 11 is implemented using at least one feature of any system(s) and/or process(es) depicted in and/or described in connection with FIGS. 1-10 and 12-44. In at least one embodiment, at least one feature described in connection with FIG. 11 is used to implement at least a portion of any system(s) and/or process(es) depicted in and/or described with respect to FIGS. 1-10 and 12-44.

Figure 12:
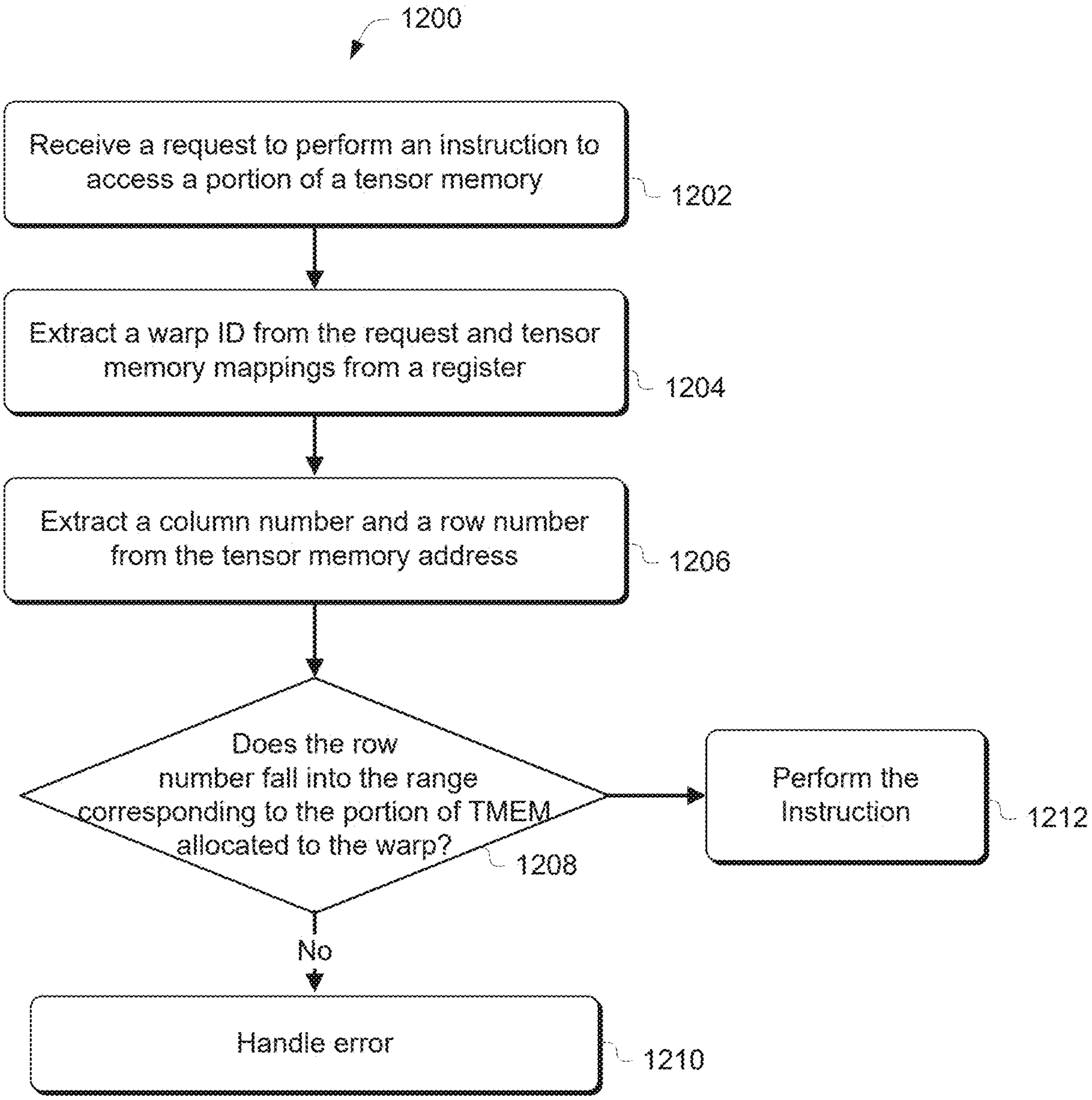
FIG. 12 is a flowchart diagram illustrating a process of performing an access permission check operation in accordance with at least one embodiment.

FIG. 12 is a flowchart diagram illustrating a process 1200 of performing an access permission check operation in accordance with at least one embodiment. In at least one embodiment, process 1200 is performed at least in part on a computer system such as those described elsewhere in this disclosure. In at least one embodiment, process 1200 is performed by a processor such as processor 2000 as described in connection with FIG. 20.

In at least one embodiment, said processor restricts access to tensor memory across different warps such that a warp can only access a portion of tensor memory corresponding to its sub-partition within a CTA. In at least one embodiment, this check triggers a trap if a warp attempts to access tensor memory that does not belong to its sub-partition.

In at least one embodiment, at step 1202, said processor receives a request to perform an instruction to access a specific portion of a tensor memory. In at least one embodiment, this instruction includes, as input parameters, a tensor memory address and a register as part of said instruction. In at least one embodiment, this instruction triggers operation 1100 as described in connection with FIG. 11.

In at least one embodiment, at step 1204, said processor extract a warp ID from said request and tensor memory mappings from said register. In at least one embodiment, said processor extracts a warp ID, which identifies a specific warp that issued said request. In at least one embodiment. said warp ID is derived from a thread's context, which said processor automatically manages as part of its scheduling and execution control. In at least one embodiment, said processor also fetches tensor memory mapping details from a dedicated register (e.g., TMEM allocator state register 118 as described in connection with FIG. 1). In at least one embodiment, said register contains information about how said tensor memory is partitioned and allocated among different warps, indicating which specific rows and columns of tensor memory each warp is allowed to access.

In at least one embodiment, accessing tensor memory include reading from tensor memory, writing to tensor memory, and copying data from tensor memory, and shifting data in tensor memory.

In at least one embodiment, at step 1206, said processor extracts a column number and a row number from said tensor memory address. In at least one embodiment, said row number and column number indicate a row and column, within said tensor memory of said CTA, which said thread attempts to access. In at least one embodiment, said row number and column number are a starting row and a column that said thread attempts to access. In at least one embodiment, said column number and row number are used by said processor to determine an exact location within said tensor memory that said thread attempts to access.

In at least one embodiment, at step 1208, said processor determines if said row number fall into a range corresponding to a portion of TMEM allocated to said warp. In at least one embodiment, said processor compares said extracted row number against a range of tensor memory rows allocated to said warp based on said warp ID and tensor memory mappings described at step 1204.

In at least one embodiment, at step 1210, said processor handles errors if it determines that said row number is outside said allocated range by aborting said operation to prevent said operation from being performed. In at least one embodiment, other error handling operations includes stores error information in one or more error reporting registers (e.g., registers 412, 414, 416 as described in connection with FIG. 4) for debugging.

In at least one embodiment, at step 1212, said processor performs said memory access operation if said row number falls within an allocated range because said access is determined as valid.

In at least one embodiment, at least one feature described in connection with FIG. 12 is implemented using at least one feature of any system(s) and/or process(es) depicted in and/or described in connection with FIGS. 1-11 and 13-44. In at least one embodiment, at least one feature described in connection with FIG. 12 is used to implement at least a portion of any system(s) and/or process(es) depicted in and/or described with respect to FIGS. 1-11 and 13-44.

Memory Physical Bounds Check

Figure 13:
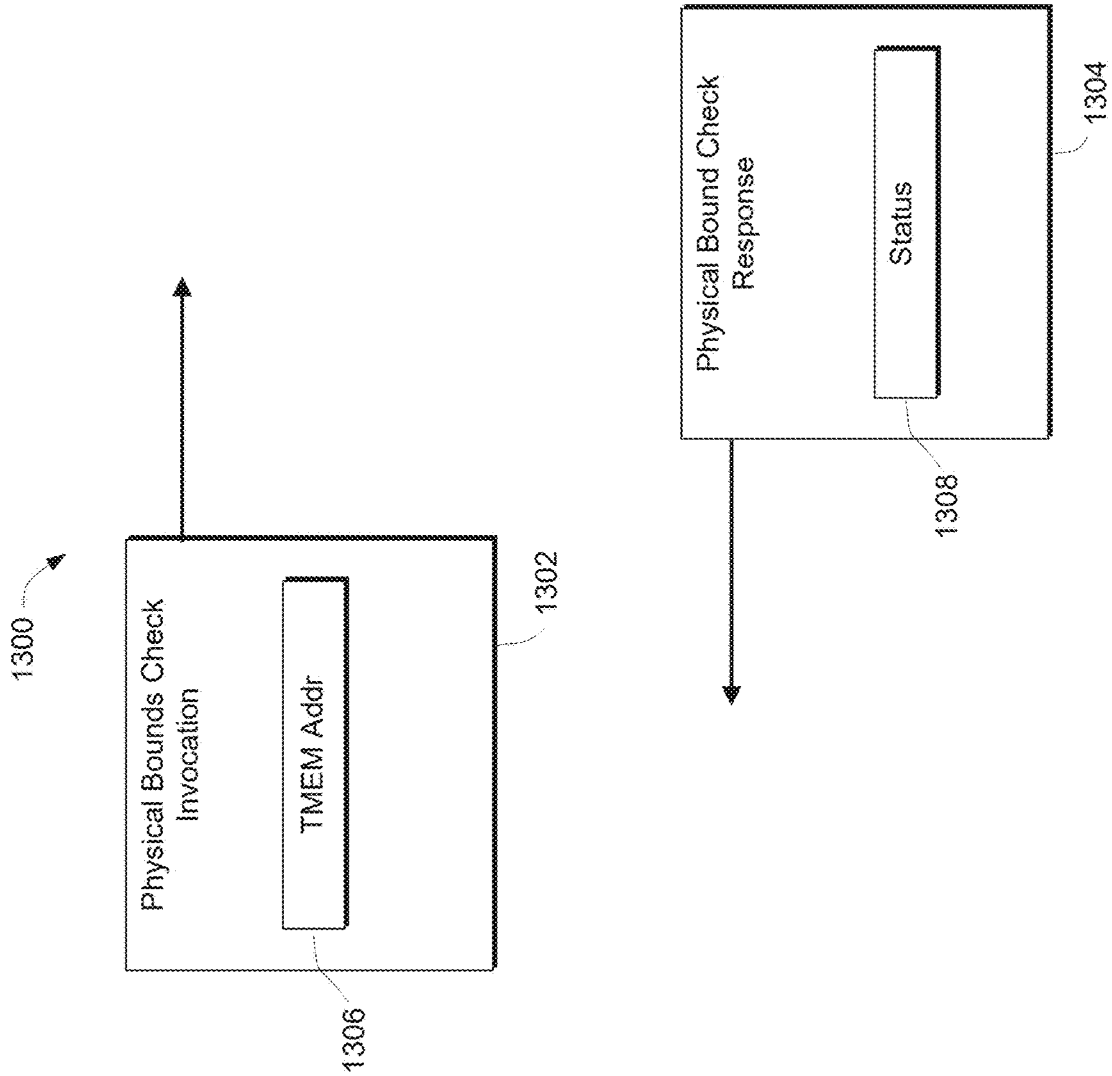
FIG. 13 is a block diagram illustrating a physical bounds check operation in accordance with at least one embodiment.

FIG. 13 is a block diagram illustrating a physical bounds check operation 1300 ("operation 1300") in accordance with at least one embodiment. In at least one embodiment, operation 1300 is one or more computational operations that, if performed, cause a processor (e.g., processor 2000 as described in connection with FIG. 20) to check if an instruction attempts to access a storage location using row and column indices that are outside of a physical boundary of memory. In at least one embodiment, more specifically, operation 1300 is one or more computational operations that, if performed, cause a processor to check if a thread attempts to access a portion of tensor memory that does not exist or invalid.

In at least one embodiment, tensor memory has a predefined range, for example, 512 columns from column 0 through column 511. In at least one embodiment, tensor memory also has a predetermined rows. In at least one embodiment, a column is a vertical slice of tensor memory that includes a set of storage locations. In at least one embodiment, a row is a horizontal slice of tensor memory includes a set of storage locations from each column at a same depth.

In at least one embodiment, when an instruction causes a processor to attempt to access storage locations in tensor memory with row and column indices that are outside of this range of available memory, undefined processor behavior occurs.

In at least one embodiment, operation 1300 includes a physical bounds check invocation 1302 ("invocation 1302") and a physical bounds check response 1304 ("response 1304"). In at least one embodiment, invocation 1302 is a function call to be performed by one or more software programs, such as kernels to be performed by one or more parallel processing units (PPUs), such as GPUs. In at least one embodiment, invocation 1302 is an invocation of an instruction (e.g., one of guardrails instructions 110 as described in connection with FIG. 1) to cause one or more processors to perform a physical bounds check and generate response 1304. In at least one embodiment, invocation 1302 is an invocation of an API to cause one or more processors to perform a physical bounds check and generate response 1304.

In at least one embodiment, invocation 1302 takes a memory address 1306 as an input parameter. In at least one embodiment, memory address 1306 a row index or a column index in TMEM that a thread attempts to access.

In at least one embodiment, response 1304 is output generated by an instruction or an API that has been invoked by invocation 1302. In at least one embodiment, said output is data to be output by an API, if invocation 1302 has caused said API to be performed. In at least one embodiment, said output is data to be output by an instruction, if invocation 1302 has caused said instruction to be performed. In at least one embodiment, response 1304 includes a status 1308, which is a code, value, or other information that indicates whether said thread attempts to perform an illegal memory access. In at least one embodiment, a value of 0 or true indicates that said thread attempts to perform an illegal memory access to at least a portion of tensor memory of a CTA that includes said thread, while a value of 1 or false indicates that said thread is authorized to access at least a portion of tensor memory of said CTA.

In at least one embodiment, at least one feature described in connection with FIG. 13 is implemented using at least one feature of any system(s) and/or process(es) depicted in and/or described in connection with FIGS. 1-12 and 14-44. In at least one embodiment, at least one feature described in connection with FIG. 13 is used to implement at least a portion of any system(s) and/or process(es) depicted in and/or described with respect to FIGS. 1-12 and 14-44.

Figure 14:
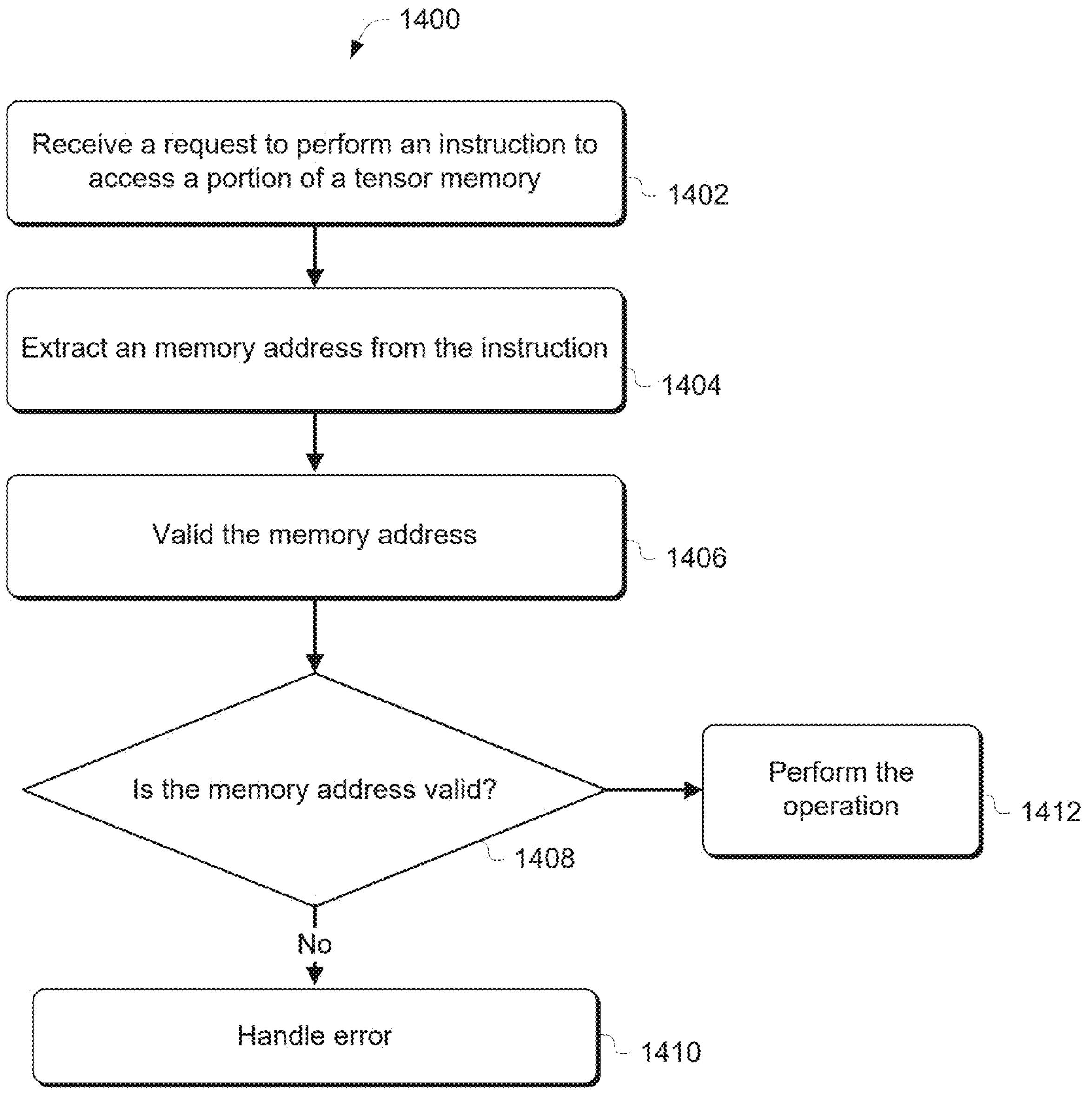
FIG. 14 is a flowchart diagram illustrating a process of performing a physical bounds check operation in accordance with at least one embodiment.

FIG. 14 is a flowchart diagram illustrating a process 1400 of performing a physical bounds check operation in accordance with at least one embodiment. In at least one embodiment, process 1400 is performed at least in part on a computer system such as those described elsewhere in this disclosure. In at least one embodiment, process 1400 is performed by a processor such as processor 2000 as described in connection with FIG. 20.

In at least one embodiment, at step 1402, said processor receives a request to perform an instruction to access a specific portion of a tensor memory. In at least one embodiment, this instruction includes, as an input parameter, a memory address in tensor memory of an SM. In at least one embodiment, said memory address can include a row index, a column index, or both that said threads attempts to access. In at least one embodiment, this instruction triggers operation 1300 as described in connection with FIG. 13.

In at least one embodiment, at step 1404, said processor extracts said memory address from said instruction. In at least one embodiment, said processor retrieves said memory address from a register or a memory location that said processor can access. In at least one embodiment, said register or memory location stores parameters of instructions, such as said memory address.

In at least one embodiment, at step 1406, said processor determines whether said memory address is within a valid range of rows or columns that are physically available on a tensor memory of a CTA that said thread attempts to access. In at least one embodiment, if said tensor memory has only 512 columns and said memory address indicates a $515^{th}$ column, then said memory address is invalid. In at least one embodiment, an invalid memory address is a memory address that is out of physical bounds of said tensor memory or does not physically exist on said tensor memory.

In at least one embodiment, at step 1408, said processor validates said memory address. In at least one embodiment, at step 1410, if said memory address is invalid, said processor handles errors by returning a corresponding status indicator and preventing said thread from proceeding to perform said specific instruction to access said specified portion of tensor memory. In at least one embodiment, at step 1412, if said processor successfully validates said memory address, said processor proceeds to return a corresponding status indicator indicating said validation is successful and allows said thread to perform said specific instruction to access said specified portion of tensor memory.

In at least one embodiment, at least one feature described in connection with FIG. 14 is implemented using at least one feature of any system(s) and/or process(es) depicted in and/or described in connection with FIGS. 1-13 and 15-44. In at least one embodiment, at least one feature described in connection with FIG. 14 is used to implement at least a portion of any system(s) and/or process(es) depicted in and/or described with respect to FIGS. 1-13 and 15-44.

Allocation Size Granularity Check

Figure 15:
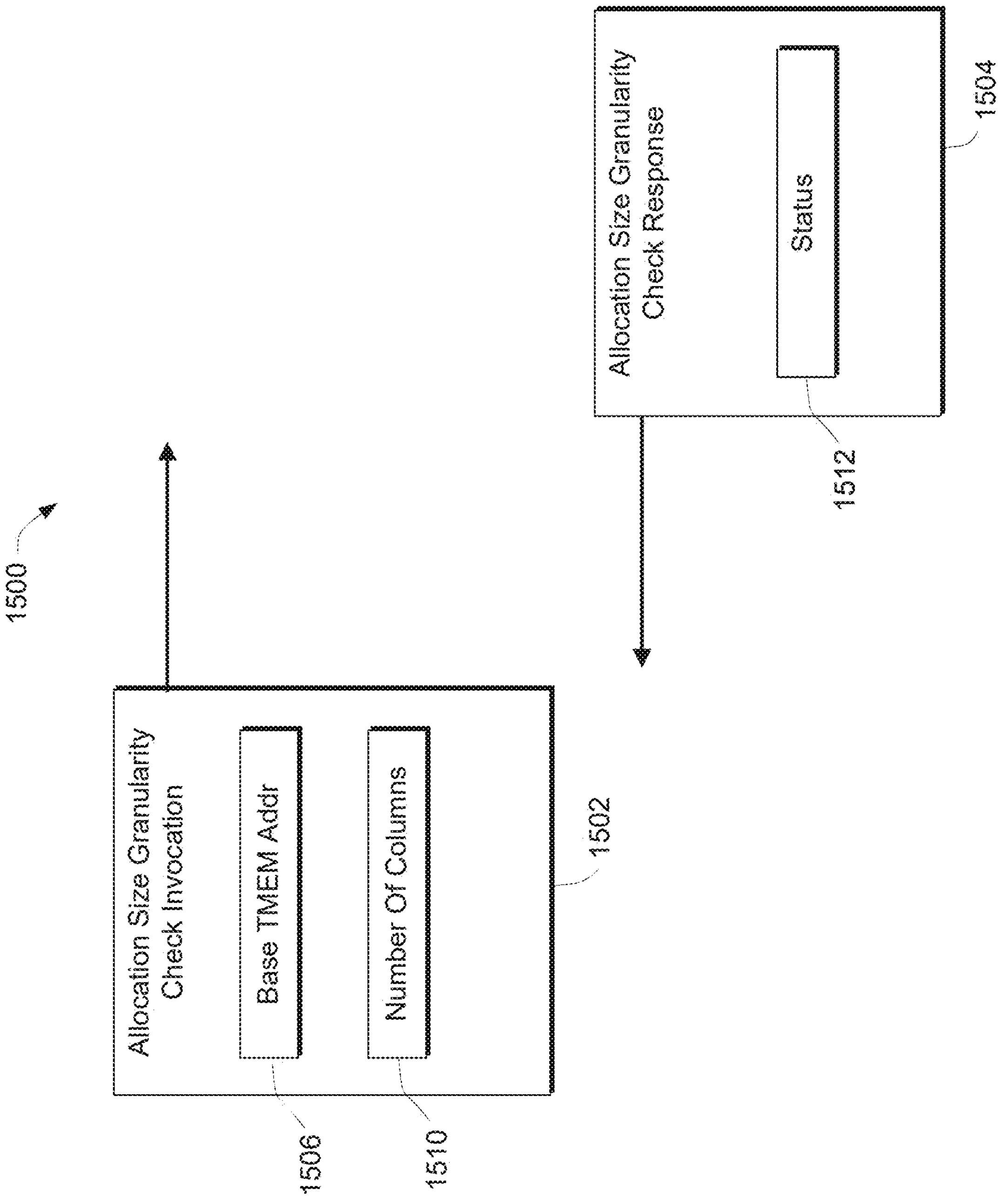
FIG. 15 is a block diagram illustrating an allocation size granularity check operation (operation) in accordance with at least one embodiment.

FIG. 15 is a block diagram illustrating an allocation size granularity check operation 1500 ("operation 1500") in accordance with at least one embodiment. In at least one embodiment, operation 1500 is one or more computational operations that, if performed, cause a processor (e.g., processor 2000 as described in connection with FIG. 20) to check if an adjacent instruction attempts to allocate storage in a tensor memory with a size granularity specific to that tensor memory (e.g., said allocated storage must contain 32 columns, 64 columns, 96 columns, etc.).

In at least one embodiment, tensor memory is dynamically allocated by a single warp in a CTA. In at least one embodiment, a tensor memory has 512 columns and 129 rows. In at least one embodiment, allocation and deallocation of tensor memory is performed in terms of columns. In at least one embodiment, a unit of allocation or deallocation is 32 columns. In at least one embodiment, if a thread attempts to allocate tensor memory of a size that is not a multiple of 32 columns, it results in inefficient use of that limited tensor memory. In at least one embodiment, operation 1500 causes a processor to generate an error if a unit of tensor memory allocation is not a multiple of 32 columns, and prevents such allocation from being performed.

In at least one embodiment, operation 1500 includes an allocation size granularity check invocation 1502 ("invocation 1502") and an allocation size granularity check response 1504 ("response 1504"). In at least one embodiment, invocation 1502 is a function call to be performed by one or more software programs, such as kernels to be performed by one or more parallel processing units (PPUs), such as GPUs. In at least one embodiment, invocation 1502 is an invocation of an instruction (e.g., one of guardrails instructions 110 as described in connection with FIG. 1) to cause one or more processors to perform an allocation size granularity check and generate response 1504. In at least one embodiment, invocation 1502 is an invocation of an API to cause one or more processors to perform an allocation size granularity check and generate response 1504.

In at least one embodiment, invocation 1502 receives, as input parameters, a base tensor memory address 1506 and a number of columns 1510. In at least one embodiment, based tensor memory address 1506 includes a row index and a column index. In at least one embodiment, said row index indicates a row number where memory allocation starts. In at least one embodiment, said column index indicates a column number where memory allocation starts. In at least one embodiment, number of columns 1510 specifies how many columns of tensor memory are to be allocated.

In at least one embodiment, response 1504 is output generated by an instruction or an API that has been invoked by invocation 1502. In at least one embodiment, said output is data to be output by an API, if invocation 1502 has caused said API to be performed. In at least one embodiment, said output is data to be output by an instruction, if invocation 1502 has caused said instruction to be performed. In at least one embodiment, response 1504 includes a status 1512, which is a code, value, or other information that indicates whether said thread attempts to perform an illegal memory access. In at least one embodiment, a value of 0 or true indicates that said thread attempts to perform an illegal memory access to at least a portion of tensor memory of a CTA that includes said thread, while a value of 1 or false indicates that said thread is authorized to access at least a portion of tensor memory of said CTA.

In at least one embodiment, at least one feature described in connection with FIG. 15 is implemented using at least one feature of any system(s) and/or process(es) depicted in and/or described in connection with FIGS. 1-14 and 16-44. In at least one embodiment, at least one feature described in connection with FIG. 15 is used to implement at least a portion of any system(s) and/or process(es) depicted in and/or described with respect to FIGS. 1-14 and 16-44.

Figure 16:
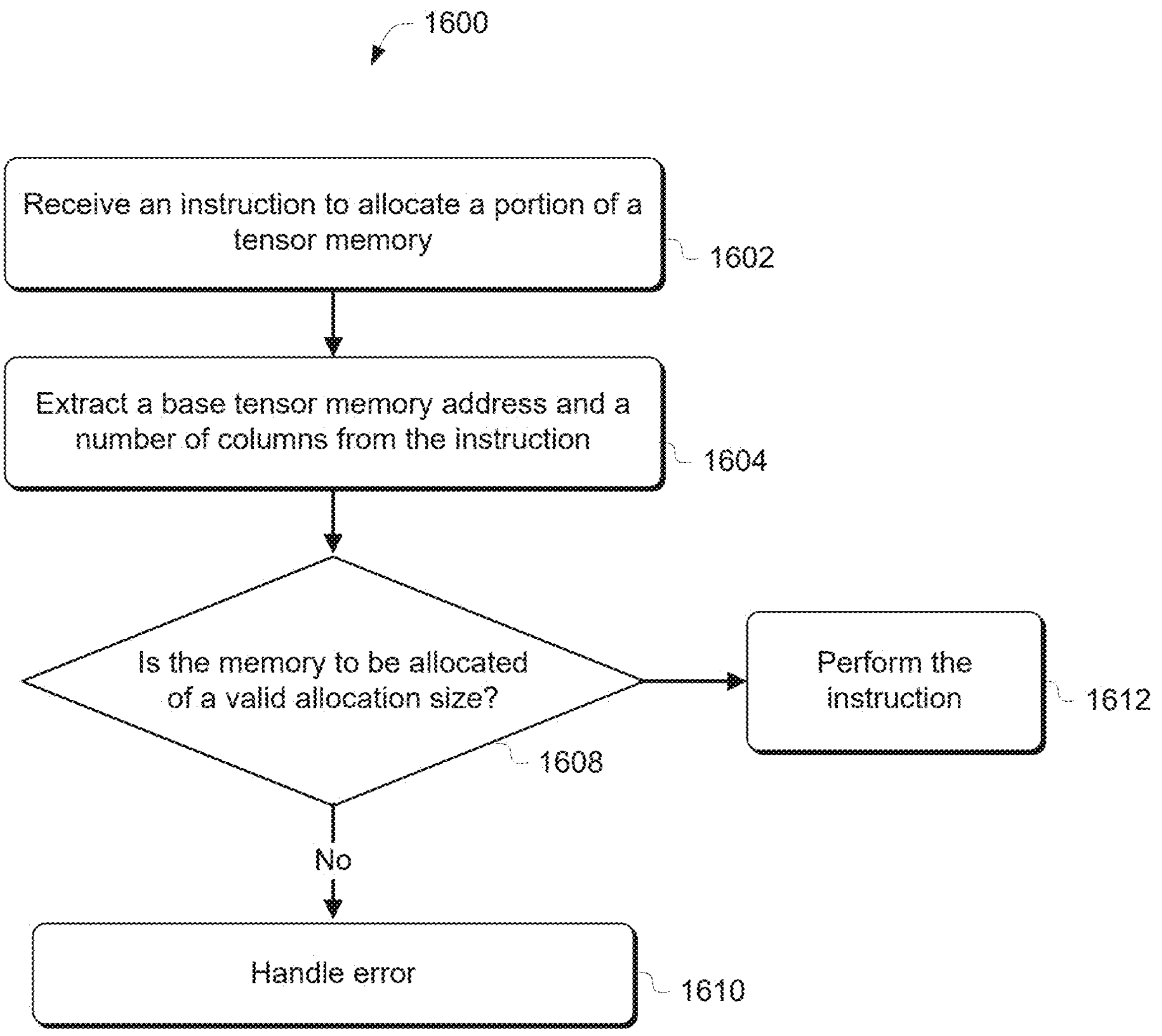
FIG. 16 is a flowchart diagram illustrating a process of performing an allocation size granularity check in accordance with at least one embodiment.

FIG. 16 is a flowchart diagram illustrating a process 1600 of performing an allocation size granularity check in accordance with at least one embodiment. In at least one embodiment, process 1600 is performed at least in part on a computer system such as those described elsewhere in this disclosure. In at least one embodiment, process 1600 is performed by a processor such as processor 2000 as described in connection with FIG. 20.

In at least one embodiment, at step 1602, said processor receives an instruction to allocate a specific portion of a tensor memory. In at least one embodiment, this instruction includes, as input parameters, a base tensor memory address and a number of columns to be allocated.

In at least one embodiment, at step 1604, said processor extracts said number of columns from said instruction. In at least one embodiment, said processor can also retrieve said number of columns from a register or a memory location that said processor can access. In at least one embodiment, said register or memory location stores said parameters of said instruction.

In at least one embodiment, at step 1606, said processor determines a range of columns in a tensor memory that said instruction attempts to allocate. In at least one embodiment, said tensor memory corresponds to a CTA. In at least one embodiment, said range of columns can be determined from said number of columns extracted from said instruction.

In at least one embodiment, at step 1608, said processor validates whether memory to be allocated is of a valid allocation size. In at least one embodiment, a valid allocation size is a number of columns that is a power of 2. In at least one embodiment, a valid allocation size is a number of columns that is a power of 32. In at least one embodiment, a valid allocation size is a number of columns not exceeding a number of columns available on a tensor memory. In at least one embodiment, a valid allocation size is a number of columns not exceeding a size of any prior allocation performed by one or more threads.

In at least one embodiment, at step 1610, said memory to be allocated is not of a valid allocation size, and said processor handles errors by returning a corresponding status indicator and preventing said thread from proceeding to perform said specific instruction to allocate storage on said tensor memory.

In at least one embodiment, at step 1612, said memory to be allocated is of a valid allocation size, and said processor proceeds to return a corresponding status indicator, indicating said validation is successful, which causes said processor to perform said specific instruction to allocate storage of said valid allocation size in said tensor memory.

In at least one embodiment, at least one feature described in connection with FIG. 16 is implemented using at least one feature of any system(s) and/or process(es) depicted in and/or described in connection with FIGS. 1-15 and 17-44. In at least one embodiment, at least one feature described in connection with FIG. 16 is used to implement at least a portion of any system(s) and/or process(es) depicted in and/or described with respect to FIGS. 1-15 and 17-44.

Invalid Storage Access Indication

Figure 17:
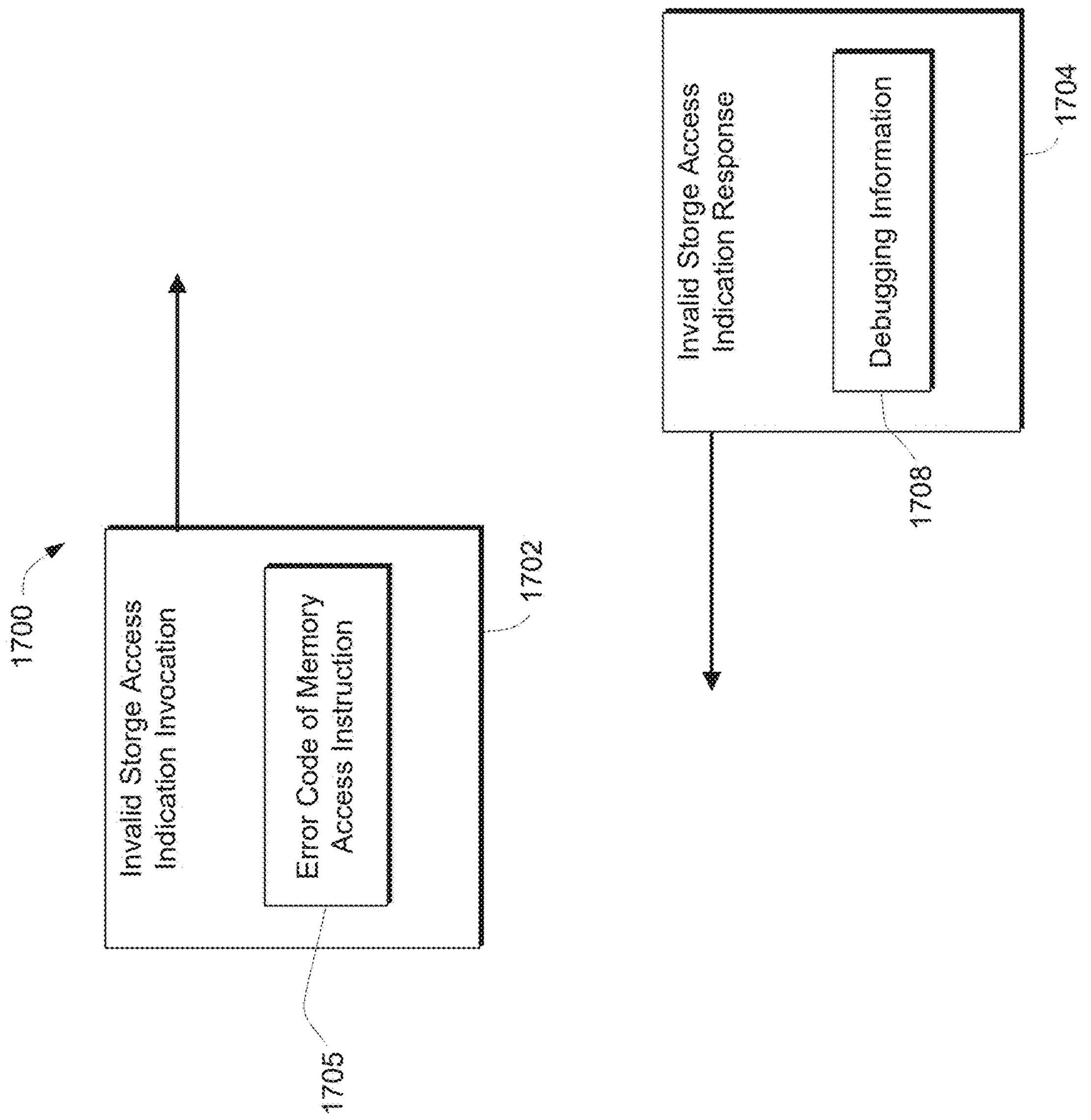
FIG. 17 is a block diagram illustrating a row index alignment check operation in accordance with an embodiment.

FIG. 17 is a block diagram illustrating an invalid storage access indication operation 1700 ("operation 1700") in accordance with at least one embodiment. In at least one embodiment, operation 1700 includes one or more computational operations that cause a processor (e.g., a GPU) to process invalid memory access attempts by invoking an API that handles error detection and provides debugging information related to the error.

In at least one embodiment, operation 1700 includes an invalid storage access indication invocation 1702 ("invocation 1702") and an invalid storage access indication response 1704 ("response 1704"). In at least one embodiment, invocation 1702 is a function call initiated by one or more software programs, such as kernel functions executed by GPUs or other parallel processing units. In at least one embodiment, invocation 1702 is an invocation of an instruction to cause one or more processors to perform an invalid storage access indication operation and generate response 1704. In at least one embodiment, invocation 1702 is an invocation of an API to cause one or more processors to perform a perform an invalid storage access indication operation and generate response 1304.

In at least one embodiment, said function call receives, as input, an error code 1705, which is a status code generated by a memory access instruction upon encountering an error condition. In at least one embodiment, error conditions include accessing unallocated memory, violating memory alignment rules, or exceeding physical memory boundaries.

In at least one embodiment, response 1704 is output generated by an instruction or an API that has been invoked by invocation 1702. In at least one embodiment, said output is data to be output by an API, if invocation 1702 has caused said API to be performed. In at least one embodiment, said output is data to be output by an instruction, if invocation 1702 has caused said instruction to be performed. In at least one embodiment, response 1704 includes debugging information 1708. In at least one embodiment, debugging information 1708 includes one or more memory addresses involved in an error, one or more memory accessing instructions that caused the issue, and contextual information, such as a warp ID or thread ID. In at least one embodiment, said API stores this debugging information in one or more registers or memory locations accessible to a debugger, e.g., debugger 106 as described in connection with FIG. 1. In at least one embodiment, debugging information 1708 can be retrieved by said debugger or other developer tools, enabling efficient identification and resolution of issues.

In at least one embodiment, at least one feature described in connection with FIG. 17 is implemented using at least one feature of any system(s) and/or process(es) depicted in and/or described in connection with FIGS. 1-16 and 18-44. In at least one embodiment, at least one feature described in connection with FIG. 17 is used to implement at least a portion of any system(s) and/or process(es) depicted in and/or described with respect to FIGS. 1-16 and 18-44.

Figure 18:
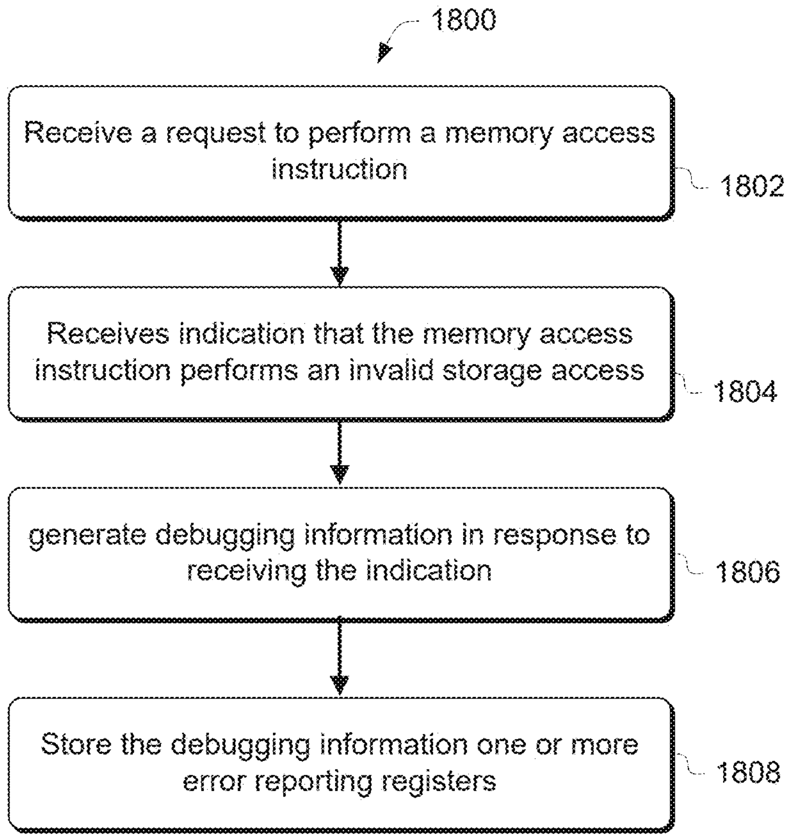
FIG. 18 a block diagram illustrating a process of performing a row index alignment check operation in accordance with an embodiment.

FIG. 18 is a flowchart diagram illustrating a process 1800 for handling invalid storage access in accordance with at least one embodiment. In at least one embodiment, process 1800 is performed at least in part on a computer system, such as those described elsewhere in this disclosure. In at least one embodiment, process 1800 is performed by a processor such as a GPU.

In at least one embodiment, at step 1802, the processor receives a request to perform a memory access instruction. In at least one embodiment, said request originates from a thread or a program executing on said processor. In at least one embodiment, said request includes parameters such as said memory address, access type (e.g., load, store, or deallocate), and other relevant execution context.

In at least one embodiment, at step 1804, said processor detects that said memory access instruction performs an invalid storage access. In at least one embodiment, said detection involves checking said validity of said memory address against said allocated memory range. In at least one embodiment, invalid access conditions include unallocated memory access, accessing memory outside physical bounds, or alignment violations.

In at least one embodiment, at step 1806, said processor generates debugging information in response to detecting said invalid storage access. In at least one embodiment, said debugging information includes details about said id memory address involved in said invalid access, said instruction causing said invalid access, and contextual information (e.g., warp ID, thread ID, or program counter).

In at least one embodiment, at step 1808, said processor stores said generated debugging information in one or more error-reporting registers or designated memory locations. In at least one embodiment, said registers or memory locations are accessible to debugging tools. In at least one embodiment, said information facilitates efficient error diagnosis and resolution during program execution. In at least one embodiment, said one or more registers are designed registers by a compiler when said compiler compiles a software program that includes said memory access instructions.

In at least one embodiment, at least one feature described in connection with FIG. 18 is implemented using at least one feature of any system(s) and/or process(es) depicted in and/or described in connection with FIGS. 1-17 and 19-44. In at least one embodiment, at least one feature described in connection with FIG. 18 is used to implement at least a portion of any system(s) and/or process(es) depicted in and/or described with respect to FIGS. 1-17 and 19-44.

Figure 19:
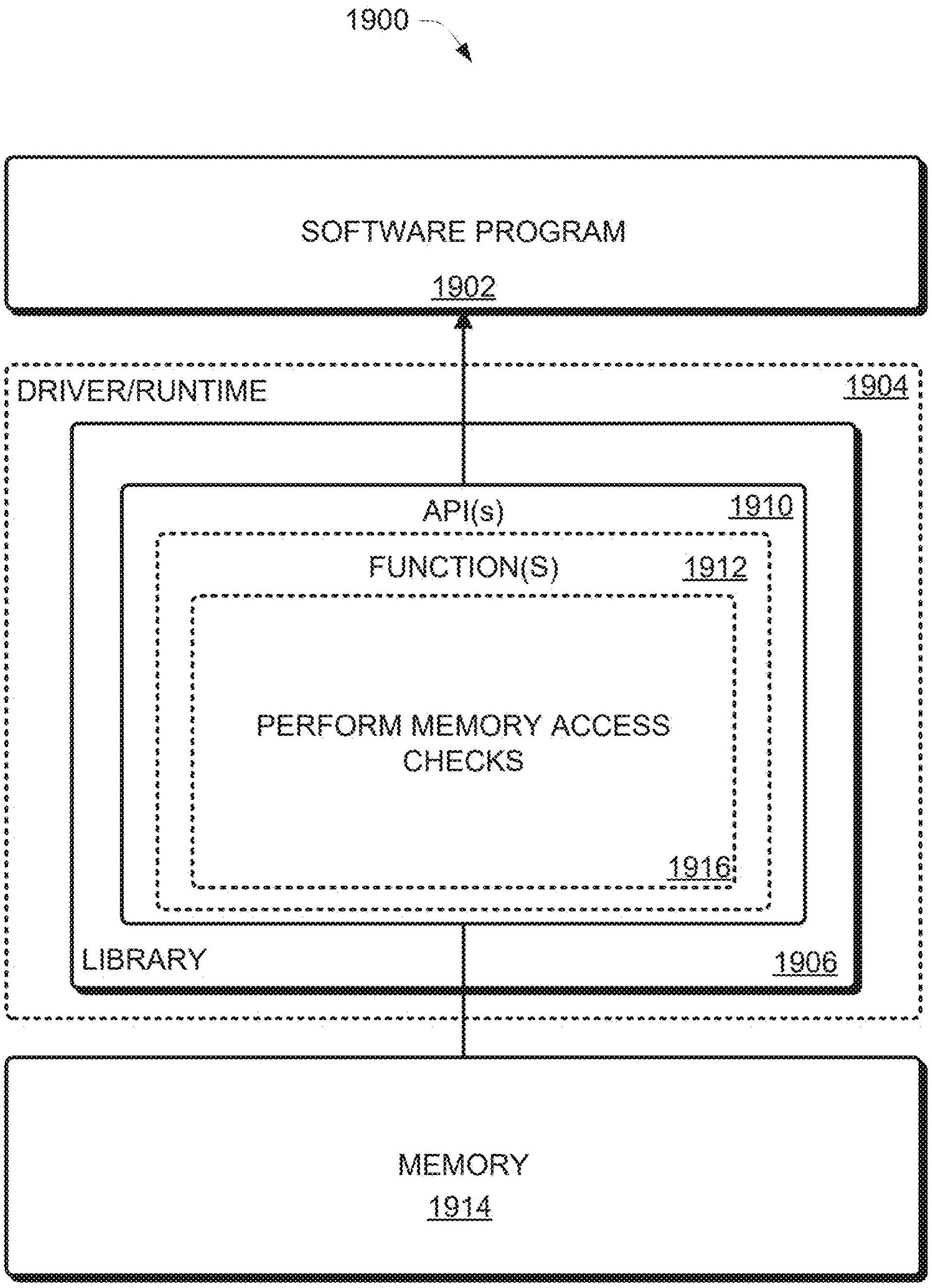
FIG. 19 is a block diagram illustrating a driver and/or runtime comprising one or more libraries to provide one or more application programming interfaces (APIs), in accordance with at least one embodiment.

FIG. 19 is a block diagram 1900 illustrating a driver and/or runtime comprising one or more libraries to provide one or more application programming interfaces (APIs), in accordance with at least one embodiment. In at least one embodiment, a software program 1902 is a software module stored on a processor, such as those described in FIG. 1. In at least one embodiment, software program 1902 comprises one or more software modules. In at least one embodiment, software program 1902 is a collection of software code, commands, instructions, or other sequences of text to instruct a computing device to perform one or more computational operations and/or invoke one or more other sets of instructions, such as one or more APIs 1910 or one or more API functions 1912, to be executed. In at least one embodiment, a software program is a compiler.

In at least one embodiment, one or more APIs 1910 are sets of software instructions that, if executed, cause one or more processors to perform one or more computational operations. In at least one embodiment, one or more APIs 1910 are distributed or otherwise provided as a part of one or more libraries 1906, runtimes 1904, drivers, and/or any other grouping of software and/or executable code further described herein. In at least one embodiment, one or more APIs 1910 perform one or more computational operations in response to invocation by software program 1902. In at least one embodiment, functionality provided by one or more APIs 1910 includes one or more software functions 1912, such as those usable to accelerate one or more portions of software program 1902 using one or more parallel processing units (PPUs), such as graphics processing units (GPUs).

In at least one embodiment, one or more APIs 1910 are hardware interfaces to one or more circuits to perform one or more computational operations. In at least one embodiment, one or more APIs 1910 described herein are implemented as one or more circuits to perform one or more techniques described in conjunction with FIGS. 1-18. In at least one embodiment, software program 1902 comprises instructions that, if executed, cause one or more hardware devices and/or circuits to perform one or more techniques described above in conjunction with FIGS. 1-18.

In at least one embodiment, software program 1902, such as user-implemented software programs, utilizes one or more APIs 1910 to perform various computing operations, such as memory reservation, matrix multiplication, arithmetic operations, or any computing operation performed by parallel processing units (PPUs), such as graphics processing units (GPUs), as further described herein. In at least one embodiment, one or more APIs 1910 provide a set of callable functions 1912, referred to herein as APIs, API functions, and/or functions, that individually perform one or more computing operations, such as computing operations related to parallel computing.

In at least one embodiment, software programs 1902 interacts or otherwise communicates with one or more APIs 1910 to perform one or more computing operations using one or more PPUs, such as GPUs. In at least one embodiment, said computing operations comprise at least one or more groups of computing operations to be accelerated by execution at least in part by said PPUs. In at least one embodiment, software program 1902 interacts with one or more APIs 1910 to facilitate parallel computing using a remote or local interface.

In at least one embodiment, an interface is software instructions that, if executed, provide access to one or more functions 1912 provided by one or more APIs 1910. In at least one embodiment, software program 1902 uses a local interface when a software developer compiles said software program in conjunction with one or more libraries 1906 that comprise or otherwise provide access to one or more APIs 1910. In at least one embodiment, software program 1902 is compiled statically in conjunction with pre-compiled libraries 1906 or uncompiled source code comprising instructions to perform one or more APIs 1910. In at least one embodiment, software program 1902 is compiled dynamically and said one or more software programs utilize a linker to link to one or more pre-compiled libraries 1906 comprising one or more APIs 1910.

In at least one embodiment, a software program 1902 uses a remote interface when a software developer executes a software program that utilizes or otherwise communicates with a library 1906 comprising one or more APIs 1910 over a network or other remote communication medium. In at least one embodiment, one or more libraries 1906 comprising one or more APIs 1910 are to be performed by a remote computing service, such as a computing resource services provider. In another embodiment, one or more libraries 1906 comprising one or more APIs 1910 are to be performed by any other computing host providing said one or more APIs 1910 to software program 1902.

In at least one embodiment, software programs 1902 utilizes one or more APIs 1910 to allocate and otherwise manage memory to be used by software program 1902. In at least one embodiment, software program 1902 utilizes one or more APIs 1910 to allocate and otherwise manage memory to be used by one or more portions of software program 1902 that are to be accelerated using one or more PPUs, such as GPUs or any other accelerator or processor further described herein. In at least one embodiment, software program 1902 selects one or more portions of one or more neural networks to deactivate during training of said one or more neural networks based, at least in part, on whether said one or more portions would be used after training of said one or more neural networks.

In at least one embodiment, each of one or more APIs 1910 is an API to facilitate parallel computing. In at least one embodiment, each of one or more API 1910 is any other API further described herein. In at least one embodiment, each of one or more APIs 1910 is provided by a driver and/or runtime 1904. In at least one embodiment, each of one or more API 1910 is provided by a CUDA user-mode driver. In at least one embodiment, each of one or more APIs 1910 is provided by a CUDA runtime. In at least one embodiment, a driver is data values and software instructions that, if executed, perform or otherwise facilitate operation of one or more functions 1912 of one of one or more APIs 1910 during load and execution of one or more portions of software program 1902. In at least one embodiment, a runtime 1904 is data values and software instructions that, if executed, perform or otherwise facilitate operation of one or more functions 1912 of one of one or more APIs 1910 during execution of software program 1902. In at least one embodiment, software program 1902 utilizes one or more APIs 1910 implemented or otherwise provided by a driver and/or runtime 1904 to perform combined arithmetic operations by said software program 1902 during execution by one or more PPUs, such as GPUs.

In at least one embodiment, software program 1902 utilizes one or more APIs 1910 provided by a driver and/or runtime 1904 to perform combine arithmetic operations of one or more PPUs, such as GPUs. In at least one embodiment, one or more APIs 1910 provide combined arithmetic operations through a driver and/or runtime 1904, as described above. In at least one embodiment, software program 1902 utilizes one or more APIs 1910 provided by a driver and/or runtime 1904 to allocate or otherwise reserve one or more blocks of memory 1914 of one or more PPUs, such as GPUs. In at least one embodiment, software program 1902 utilizes one or more APIs 1910 provided by a driver and/or runtime 1904 to allocate or otherwise reserve blocks of memory. In at least one embodiment, one or more APIs 1910 are to perform combined arithmetic operations, as described herein in conjunction with any FIGS. 1-18.

In at least one embodiment, block diagram 1900 depicts a processor, comprising one or more circuits to perform one or more software programs to combine two or more application programming interfaces (APIs) into a single API. In at least one embodiment, block diagram 1900 depicts a system, comprising one or more processors to perform one or more software programs to combine two or more application programming interfaces (APIs) into a single API. In at least one embodiment, an API is used to identify one or more expected software outputs to be used to compare with one or more other software outputs to be generated by software.

In at least one embodiment, some or all of processes described herein (or any other processes described, or variations and/or combinations of those processes) may be performed under control of one or more computer systems configured with executable instructions and/or other data and may be implemented as executable instructions executing collectively on processor 2000 as described in connection with FIG. 20 or a combination of a plurality of processors. In at least one embodiment, executable instructions and/or other data may be stored on a non-transitory computer-readable storage medium (e.g., a computer program persistently stored on magnetic, optical, or flash media).

Figure 20:
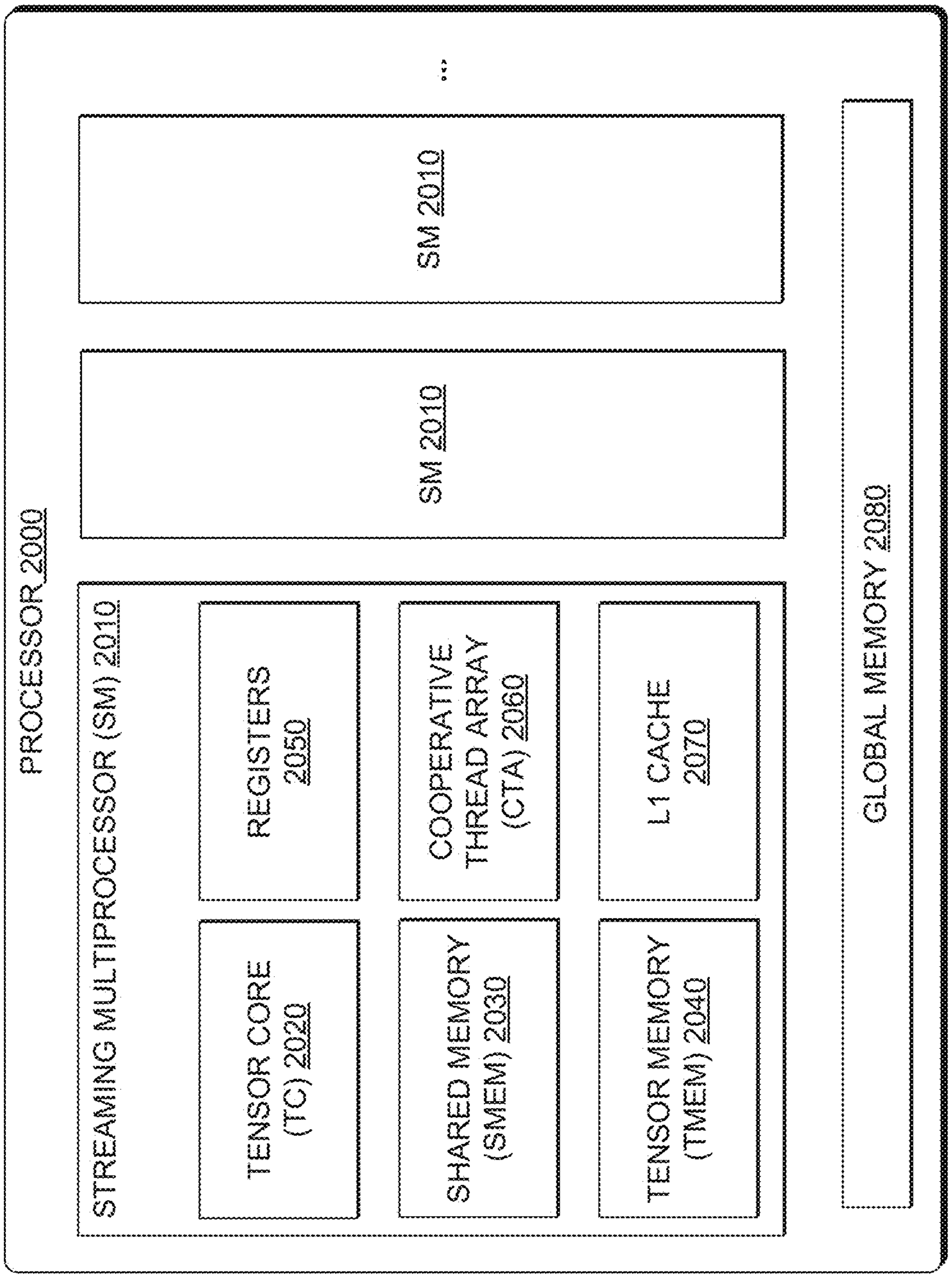
FIG. 20 illustrates a processor to perform a matrix multiply-accumulate (MMA) operation in accordance with at least one embodiment.

FIG. 20 illustrates a processor 2000 to perform an MMA operation in accordance with at least one embodiment. In at least one embodiment, processor 2000 is a graphics processing unit (GPU), general-purpose GPU (GPGPU), parallel processing unit (PPU) central processing unit (CPU)), a data processing unit (DPU), a part of a system on chip (SoC), and/or combination thereof. In at least one embodiment, processor 2000 comprises one or more streaming multiprocessors (SM) 2010 and a global memory 2080 that stores information for use by SMs 2010.

In at least one embodiment, each streaming multiprocessor 2010 comprises a tensor core 2020 that performs arithmetic or logic computations as instructed by a thread from a cooperative thread array (CTA) 2060. In at least one embodiment, tensor core 2020 is associated with various memory elements of SM 2010 that store instructions or operands to be used in said arithmetic or logic computations. In at least one embodiment, these various memory elements comprise shared memory 2030 and/or tensor memory 2040.

In at least one embodiment, performing MMA requires multiplying each element of a row in a first input matrix with each element of a column in a second input matrix and accumulating results of said multiplication operations. In at least one embodiment, said first input matrix is also referred to a first operand, a multiplicand operand, or operand A. In at least one embodiment, second input matrix is also referred to a second operand, a multiplier operand, or operand B. In at least one embodiment, said first operand is stored in tensor memory 2040 and/or shared memory 2030 while said second operand is stored in shared memory 2030. In at least one embodiment, said accumulated results is stored in tensor memory 2040.

In at least one embodiment, TMEM 2040 is an on-chip storage in SM 2010. In at least one embodiment, TMEM 2040 is local to SM 2010. In at least one embodiment, TMEM 2040 is not automatically managed, but rather requires explicit programmatical allocation and deallocation. In at least one embodiment, TMEM 2010 is organized as two-dimensional matrix where a horizontal dimension includes rows/data path (DP) lanes, and a vertical dimension includes columns. In at least one embodiment, TMEM has 512 columns and 128 rows. In at least one embodiment, TMEM 2010 is dynamically allocated by a single warp in a CTA 2060. In at least one embodiment, allocation and deallocation of TMEM 2040 is performed in terms of columns. In at least one embodiment, a unit of allocation is 32 columns. In at least one embodiment, a column is a vertical slice of TMEM that includes a set of memory storage locations. In at least one embodiment, a row is a horizontal slice of TMEM that includes a set of storage locations from each column at a same depth.

In at least one embodiment, warps access TMEM 2040 in a logical group of 4 contiguous warps (warp group). In at least one embodiment, logical warp IDs that comprise a warp group are 4-aligned, which means that a lowest logic warp ID is divisible by 4. In at least one embodiment, one or more CTAs such as CTA 2060 running on a given SM such as SM 2010 have access to said entire TMEM 2040; however, a single warp in a CTA can access only a fraction (such as $1/4^{th}$) of said entire TMEM space. In at least one embodiment, each warp can access all columns of TMEM 2040; however, which DP lanes can be accessed by a warp depends on its position with said warp.

In at least one embodiment, table 1 below outlines mappings between logical warp IDs and DP lanes.

TABLE 1

| Logical Warp ID %4 | TMEM DP Lane Range |
|---|---|
| 0 | 0-31 |
| 1 | 32-63 |
| 2 | 64-95 |
| 3 | 96-127 |

In at least one embodiment, allocations and access control of TMEM 2040 is performed by software and there are no hardware-backed protections preventing a CTA from reading TMEM 2040 or part thereof that is allocated to another CTA. In at least one embodiment, TMEM 2040 is not part of a regular memory hierarchy and has no backing stores.

In at least one embodiment, an address of TMEM 2040 is 32 bits wide and specifies two components. In at least one embodiment, a first component is a staring DP lane index encoded in upper 16 bits. In at least one embodiment, bits 20-16 indicates a starting DP lane index, while bits 21-23 are ignored. In at least one embodiment, a DP lane addressing is contiguous within TMEM 112, which means that lanes (rows) are numbered 0 to 127. In at least one embodiment, a second component is a starting column index encoded in lower 16 bits. In at least one embodiment, bits 8-0 specifies a starting column index and bits 15-9 are zeroed out.

In at least one embodiment, table 2 outlines various components of an address of TMEM 2040.

TABLE 2

| Bits | 21-23 | 22-16 | 15-9 | 8-0 |
|---|---|---|---|---|
| Description | Ignored | DP lane index | Zeros | Column index |

In at least one embodiment, addresses of TMEMs such as TMEM 2040 are not part of a generic address space. In at least one embodiment, for example, pointers and addresses used to access TMEM 2040 cannot be used with instructions that use generic, global, local, or shared memory addresses. In at least one embodiment, TMEM 2040 does not support atomic operations, such as atomic read-modify-write operations. In at least one embodiment, pointer arithmetic is not permissible on addresses of TMEM 2040 as these addresses do not wrap around to a next DP lane or column location.

In at least one embodiment, each of said one or more of these instructions causes SM 2010 to retrieve at least a portion of an operand from global memory 2080 and uses shared memory 2030 and/or tensor memory 2040 to store said portion for MMA computations. In at least one embodiment, this instruction causes SM 2010 to output an MMA computation result from tensor core 2020 and uses shared memory and/or tensor memory 2040 to store said output accumulating said output to previously stored computation results.

In at least one embodiment, SM 2010 further comprises registers 2050 to store data retrieved from global memory 2080 or shared memory 2030 or tensor memory 2040 and/or instructions provided from CTA 2060. In at least one embodiment, registers 2050 are not used to store information necessary to perform MMA and can instead be utilized for performing other arithmetic or logic computations as instructed by a different thread from CTA 2060. In at least one embodiment, SM 2010 further comprises L5 cache 2070 to provide low-level high-speed access to information to perform a given instruction.

In at least one embodiment, a plurality of streaming multiprocessors 2010 are communicatively cooperative with one another. In at least one embodiment, at least two adjacent SMs 2010 are connected such that a CTA 2060 of a first SM 2010 can control operation of a tensor core 2020 of a second SM 2010. In at least one embodiment, at least two adjacent SMs 2010 are connected such that a shared memory 2030 of a first SM 2010 is accessible by a tensor core 2020 of a second SM 2010. In at least one embodiment, shared memory 2030 of adjacent SMs 2010 are combined as a single virtual memory that is accessible by either tensor core 2020 of either SM 2010 in order to be able to process larger operands during a single MMA computation.

In at least one embodiment, some or all of said processes described herein (or any other processes described or variations and/or combinations of those processes) may be performed under control of one or more computer systems configured with executable instructions and/or other data and may be implemented as executable instructions executing collectively on processor 2000 or a combination of a plurality of processors 2000. In at least one embodiment, executable instructions and/or other data may be stored on a non-transitory computer-readable storage medium (e.g., a computer program persistently stored on magnetic optical or flash media).

Figure 21A:
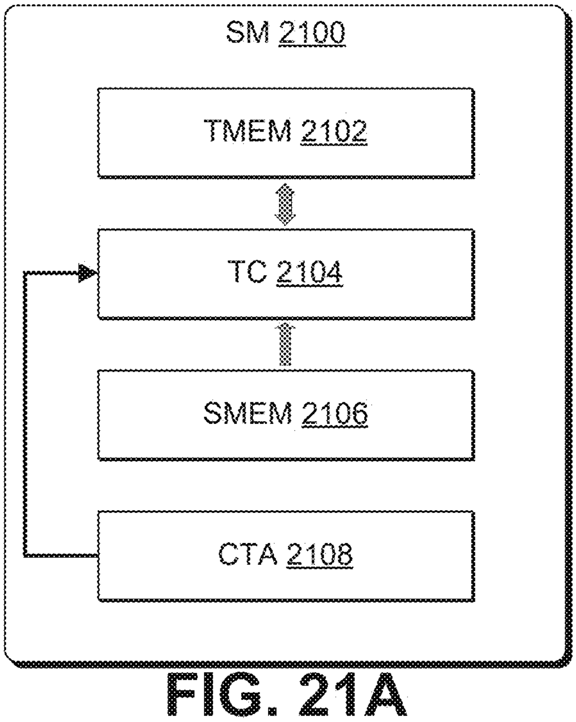
FIG. 21A illustrates an architecture of a streaming multiprocessor (SM) in accordance with at least one embodiment.

FIG. 21A illustrates an architecture of a streaming multiprocessor (SM) 2100 in accordance with at least one embodiment. In at least one embodiment, SM 2100 is used by a processor (e.g., processor 2220 of FIG. 22) to perform various MMA instructions. In at least one embodiment, performing an MMA instruction is to perform an MMA operation. In at least one embodiment, said processor uses storage (e.g., TMEM or SMEM) to store information to be used for performing various MMA instructions. In at least one embodiment, said processor uses SM 2100 to perform an MMA instruction to cause a plurality of portions of an MMA operation to be performed using a corresponding plurality of MMA accelerators or processor cores.

In at least one embodiment, SM 2100 operates in a single CTA operating mode (e.g., unpaired with other streaming multiprocessors.) In at least one embodiment, one or more threads of a CTA 2108 instructs a processor core (e.g., a tensor core 2104 or another MMA accelerator) to perform an MMA operation. In at least one embodiment, tensor core 2104 retrieves an operand from a SMEM 2106 and/or an operand from TMEM 2102. In at least one embodiment, tensor core 2104 retrieves both operands from SMEM 2106. In at least one embodiment, tensor core 2104 then performs MMA computations using said operands and then stores all computation results in TMEM 2102.

In at least one embodiment, after computations are complete, an epilogue stage of MMA is performed using computation results from TMEM 2102 to readout a final result to a designated memory location and deallocate memory for future use. In at least one embodiment, because an epilogue stage can be performed solely or exclusively using TMEM 2102, a next MMA operation can begin in response to a parallel thread concurrently using information from another memory location or asynchronously with another operation. In at least one embodiment, while an epilogue stage of MMA is being completed for a previous operation, a prologue stage of MMA starts for a next operation by allocating memory in SMEM for a new operand. In at least one embodiment, because only one or few threads of CTA 2108 is necessary to control both tensor core 2104, one or more other threads of CTA 2128 may be used to initiate operations other than MMA by utilizing other available resources.

Figure 21B:
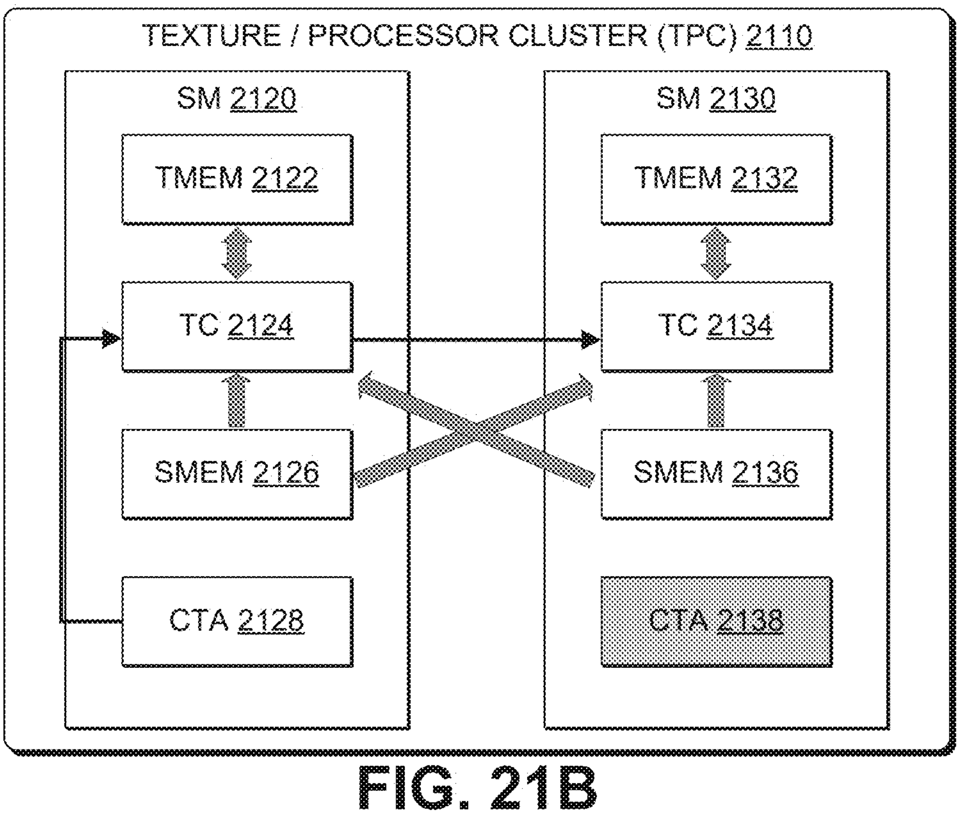
FIG. 21B illustrates a basic architecture of a texture/processor cluster (TPC) in accordance with at least one embodiment.

FIG. 21B illustrates a basic architecture of a texture/processor cluster (TPC) 2110 in accordance with at least one embodiment. In at least one embodiment, a processor (e.g., processor 2000 of FIG. 20) uses a plurality of SM s 2120 and 2130 paired as a texture/processor cluster 2110 to perform various MMA instructions. In at least one embodiment, said processor uses storage (e.g., SMEM 2126 and 2136 and/or TMEM 2122, 2132) to store information to be used exclusively by one or more tensor operations. In at least one embodiment, said processor uses TPC 2110 to perform an MMA instruction to use storage to store information to be used exclusively by said MMA instruction. In at least one embodiment, said processor uses TPC 2110 to perform an MMA instruction to cause a plurality of portions of an MMA operation to be performed using a corresponding plurality of MMA accelerators or processor cores.

In at least one embodiment, said processor uses TPC 2110 having a first SM 2120 and a second SM 2130 to operate in a paired CTA operating mode. In at least one embodiment, one of said paired SM is designated as a controlling SM. In at least one embodiment, one or more threads of a first CTA 2128 of SM 2120 instructs a processor core (e.g., a tensor core 2124 or other MMA accelerator) of SM 2120 to perform an MMA operation. In at least one embodiment, tensor core 2124 further instructs a paired tensor core 2134 of SM 2130 to additionally preform an MMA operation. In at least one embodiment, tensor core 2124 and tensor core 2134 each perform a portion of computations necessary to complete an MMA operation. In at least one embodiment, because only one or few threads of CTA 2128 is necessary to control both tensor cores 2124 and 2134, one or more other threads of CTA 2128 may be used to initiate operations other than MMA utilizing other resources. In at least one embodiment, because one or more threads of CTA 2128 control both tensor core 2124 and 2134, one or more threads of CTA 2138 may be unused or may be used to initiate other operations outside of said MMA controlled by CTA 2128 utilizing other resources.

In at least one embodiment, both tensor cores 2124 and 2134 retrieve an operand from SMEM 2126 and from SMEM 2136. In at least one embodiment, this retrieved operand may be either separate complete operands or may be different portions of a single operand from each of SMEM 2126 or SMEM 2136. In at least one embodiment, tensor core 2124 may additionally retrieve an operand and an operand from TMEM 2122, while tensor core 2134 may additionally retrieve an operand from TMEM 2132 In at least one embodiment, tensor cores 2124 and 2134 then perform MMA computations using said operands or operand portions.

In at least one embodiment, accumulated results of computations performed by tensor core 2124 are exclusively stored in TMEM 2122 and accumulated results of computations performed by tensor core 2134 are exclusively stored in TMEM 2132, and can be output together as a complete result. In at least one embodiment, all accumulated results of computations performed by either tensor core 2124 or tensor core 2134 are stored in one of TMEM 2122 and TMEM 2132.

In at least one embodiment, after computations are complete, an epilogue stage of MMA can be performed using computation results from TMEM 2122 or TMEM 2132 to readout a final result to a designated memory location and deallocate memory for future use. In at least one embodiment, because an epilogue stage can be performed solely or exclusively using TMEM 2122 or TMEM 2132, a next MMA operation can begin in response to a parallel thread concurrently using information from another memory location. In at least one embodiment, while an epilogue stage of MMA is being completed for a previous operation, a prologue stage of MMA starts for a next operation by allocating memory in SMEM for a new operand.

Figure 22:
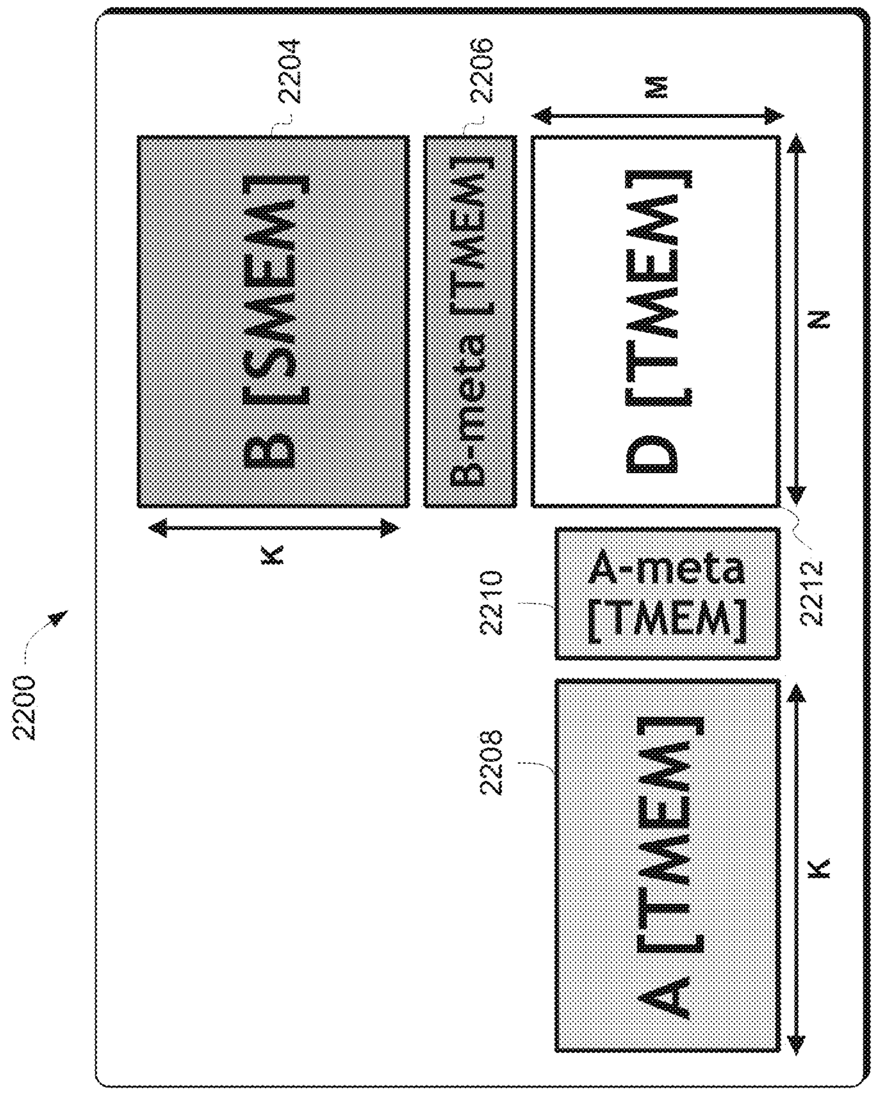
FIG. 22 illustrates a memory architecture to be used in an MMA operation by a processor in accordance with at least one embodiment.

FIG. 22 illustrates a memory architecture 2200 to be used in an MMA operation by a processor in accordance with at least one embodiment.

In at least one embodiment, operand A 2208 and said accumulated result (e.g., result matrix D) 2212 are stored in a tensor memory such as those described in connection with FIGS. 22 and 23, and operand B 2204 is stored in shared memory such as those described in connection with in FIGS. 22 and 23. In at least one embodiment, operand A metadata 2210 and operand B metadata 2206 are additionally stored in tensor memory and comprise information related to said respective operands, such as row or column sparsity, row or column scaling, disable flags, masks, weighting, computational shifting, or other metadata information.

In at least one embodiment, operand A 2208 has dimensions K×M. In at least one embodiment, operand B 2204 has dimensions N×K. In at least one embodiment, an MMA operation on operands A and B results in an accumulated result matrix D 2212 having dimensions N×M. In at least one embodiment, operand A 2208 and operand B 2204 are read from memory into a processor core, MMA accelerator, or tensor core such as those described in connection with FIGS. 22-23 to perform multiplication computations.

Figure 23:
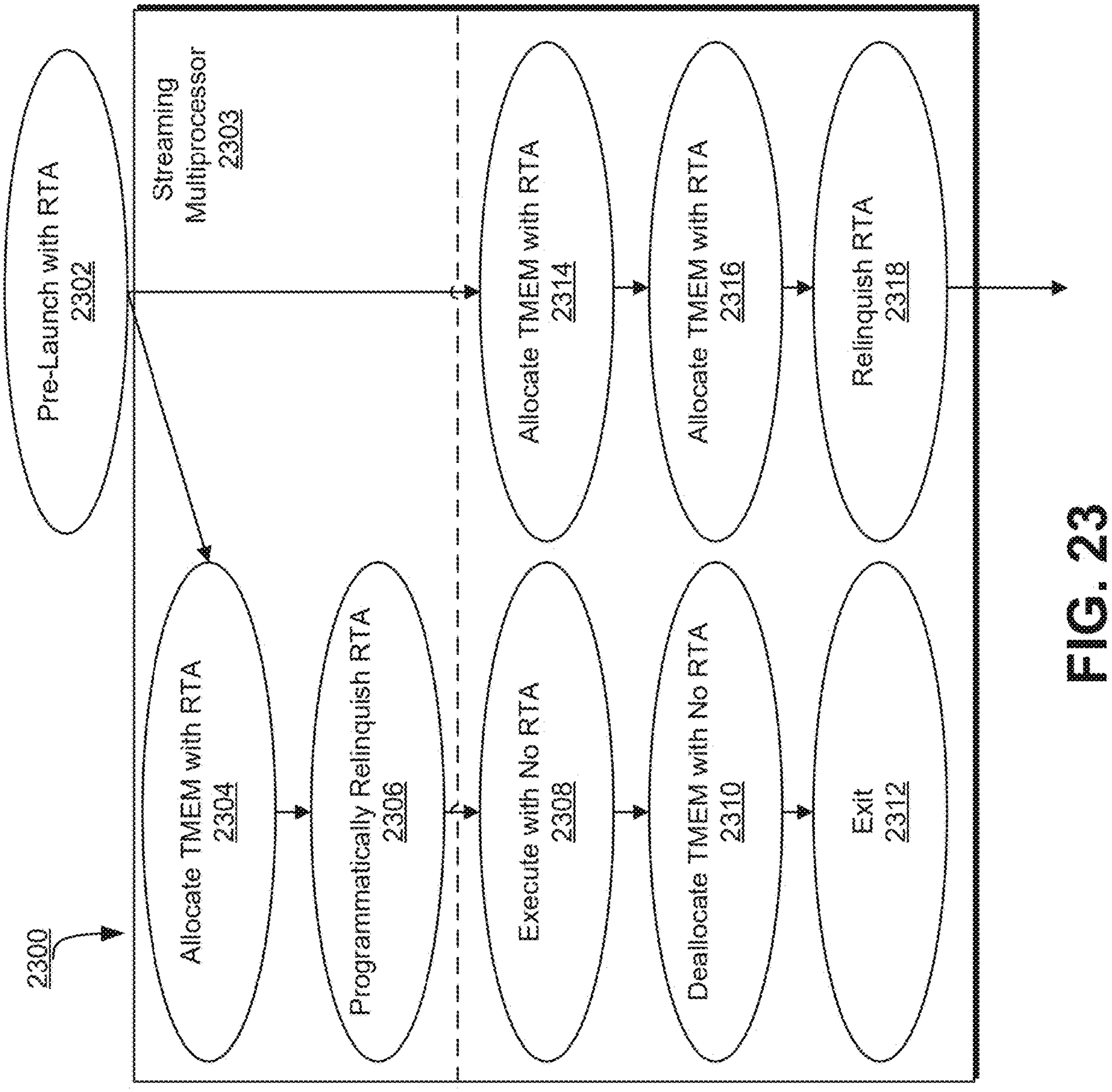
FIG. 23 is a block diagram illustrating a process of managing tensor memory in an SM in accordance with at least one embodiment.

FIG. 23 is a block diagram illustrating a process 2300 of managing tensor memory in a streaming multiprocessor (SM) in accordance with at least one embodiment. In at least one embodiment, process 2300 begins with a Pre-Launch state 2302 where a processor such a program or CTA holds a Right to Allocate (RTA). In at least one embodiment, in this initial state, TMEM allocation is authorized.

In at least one embodiment, process 2300 proceeds within SM 2303 with an allocation of TMEM while said program or CTA retains RTA 2304. In at least one embodiment, after TMEM is allocated, said program or CTA programmatically relinquishes said RTA 2306. In at least one embodiment, this step allows process 2300 to move forward to a state where execution occurs without holding RTA 2308. In at least one embodiment, following said execution phase, TMEM is deallocated in absence of RTA 2310, leading to a conclusion of process 2300 in an exit state 2312.

In at least one embodiment, in an alternative path within SM 2303, said system or program allocate TMEM with RTA initially 2314 and then proceed to allocate TMEM with RTA 2316. In at least one embodiment, following these allocations, said system or program relinquishes its RTA 2318.

Figure 24:
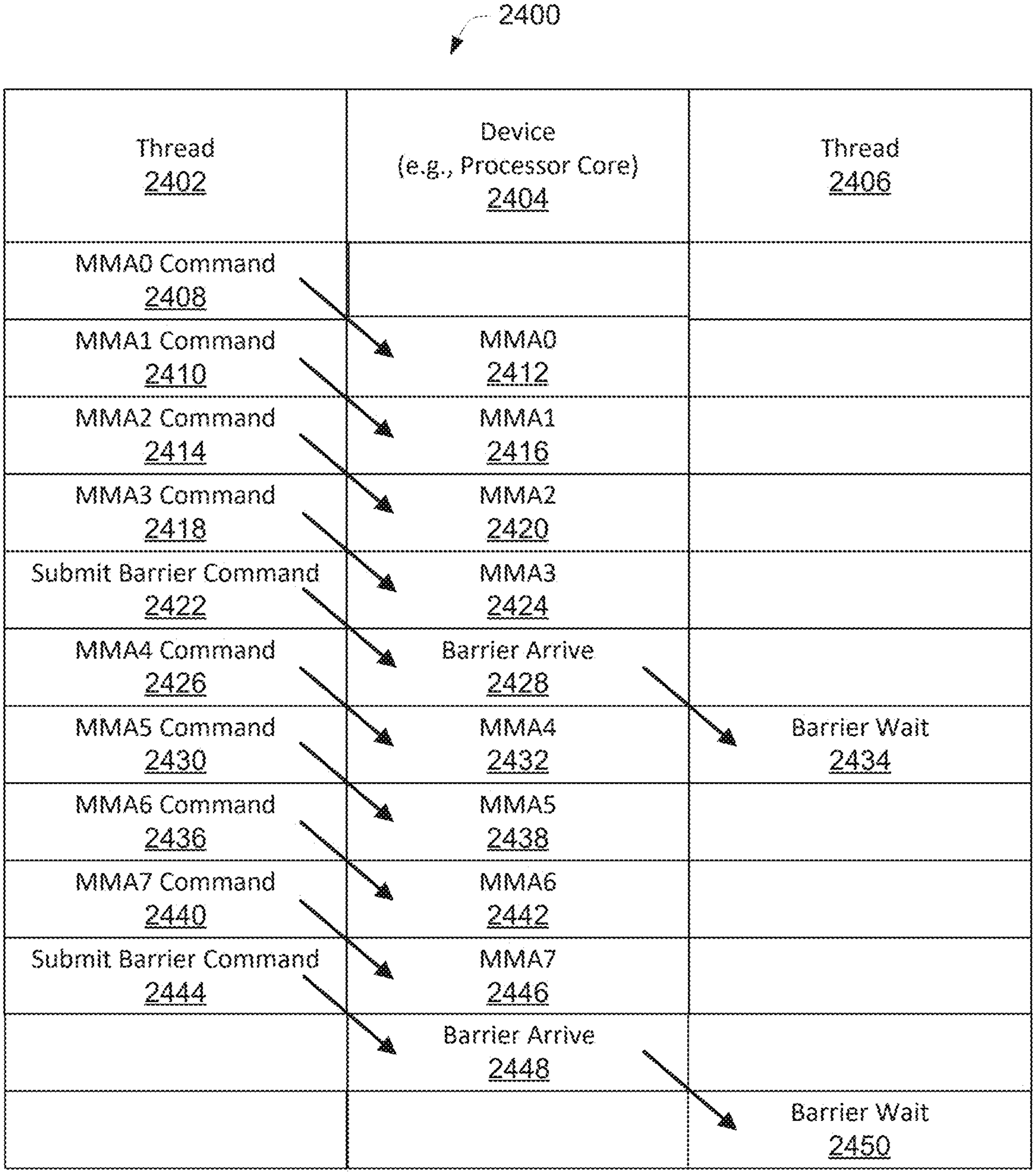
FIG. 24 illustrates a diagram illustrating a system for synchronizing asynchronous command sequences between threads and devices in accordance with at least one embodiment.

FIG. 24 illustrates a diagram illustrating a system 2400 for synchronizing asynchronous command sequences between threads and devices in accordance with at least one embodiment.

In at least one embodiment, this figure illustrates a synchronization pattern for MMA operations involving two threads 2402, 2406 and a device 2404. In at least one embodiment, thread 2402 submits a series of MMA commands 2408-2440, hereinafter referred to as MMA command 2408-2440), which are executed by device 2404 as MMAs 2412-2448, hereinafter referred to as MMAs 2412-2448). In at least one embodiment, each MMA command issued by thread 2402 is processed in sequence by device 2404, with corresponding results stored and synchronized.

In at least one embodiment, after a first set of MMA commands (2408, 2410, 2414, and 2418) are processed, thread 2402 submits a barrier command 2422. In at least one embodiment, this command ensures that all prior MMA operations are completed before proceeding to a next set of commands. In at least one embodiment, device 2404 then processes barrier arrival at 2425, ensuring synchronization before continuing with further MMA commands 2426-2440.

In at least one embodiment, said synchronization mechanism ensures that subsequent MMA commands 2430, 2436, 2440 are only executed after said barrier commands have been fully processed. In at least one embodiment, this pattern is repeated with another set of barrier commands submitted at 2444, ensuring proper synchronization and completion of all MMA operations before finalizing said sequence.

In at least one embodiment, more specifically, threads 2402 and 2406 each comprise one or more threads. In at least one embodiment, device 2404 comprises one or more processors, matrix multiplication accelerators, memory devices, and/or one or more compatible computational system components. In at least one embodiment, MMA commands 2408-2440 and/or MMAs 2412-2446 comprise asynchronous operations and/or instructions. In at least one embodiment, these MMA commands and MMAs comprise one or more devices linked via threads and asynchronous operations. In at least one embodiment, said asynchronous operations comprise a shift instruction to move data from an original memory location into a target memory location without first loading said data into a register. In at least one embodiment, thread 2402 submits MMA commands 2408-2440 to device 2404. In at least one embodiment, device 2404 processes and/or performs MMA commands 2408-2440 in an order they are received. In at least one embodiment, device 2404 performs MMAs 2412-2446 in response to receiving MMA commands 2408-2440, respectively.

In at least one embodiment, thread 2402 submits MMA commands 2408-2440 in an incorrect and/or inefficient order. In at least one embodiment, device 2404 needs synchronization between MMA commands 2408-2440. In at least one embodiment, thread 2402 submits a barrier to device 2404 to enforce said synchronization between these MMA commands. In at least one embodiment, thread 2402 transmits submit barrier command 2422 to device 2404. In at least one embodiment, submit barrier command 2422 corresponds to a single MMA command. In at least one embodiment, submit barrier command 2422 corresponds to all MMA commands of a specific type. In at least one embodiment, submit barrier command 2422 arrives at device 2404. In at least one embodiment, barrier arrive 2425 forces said corresponding MMA command(s) to wait until all commands are synchronized. In at least one embodiment, device 2404 transmits barrier arrive 2425 to thread 2406. In at least one embodiment, thread 2406 is thread 2402. In at least one embodiment, thread 2406 is a different thread. In at least one embodiment, thread 2406 processes asynchronous operations. In at least one embodiment, thread 2406 receives said barrier and forces barrier wait 2434. In at least one embodiment, barrier wait 2434 halts processing of an MMA command within thread 2406. In at least one embodiment, barrier wait 2434 halts processing of all MMA commands of a specific type within thread 2406. In at least one embodiment, barrier wait 2434 halts processing of all unsynchronized MMA commands and/or asynchronous operations.

In at least one embodiment, thread 2402 continues submitting MMA commands 2426-2440 to device 2404 after submit barrier command 2422. In at least one embodiment, MMA commands 2426-2440 correspond to any of MMA commands 2408-2418 submitted to device 2404 prior to submit barrier command 2422. In at least one embodiment, device 2404 halts processing of any and all MMA commands 2426-2440 corresponding to MMA commands 2408-2418 targeted by submit barrier command 2422. In at least one embodiment, device 2404 unhalts and processes said halted MMA commands. In at least one embodiment, thread 2406 triggers said unhalt and processing via barrier wait 2434. In at least one embodiment, barrier wait 2434 corresponds to MMA commands synchronizing. In at least one embodiment, barrier wait 2434 triggers thread 2406 and/or device 2404 to unhalt and process MMA commands. In at least one embodiment, barrier wait 2434 responds to MMA commands being synchronized with said trigger to thread 2406 and/or device 2404. In at least one embodiment, thread 2402 submits further barrier commands to device 2404 and/or thread 2406. In at least one embodiment, thread 2402 submits a barrier to device 2404 to enforce a synchronization between commands. In at least one embodiment, thread 2402 transmits submit barrier command 2444 to device 2404. In at least one embodiment, submit barrier command 2444 corresponds to a single MMA command. In at least one embodiment, submit barrier command 2444 corresponds to all MMA Commands of a specific type. In at least one embodiment, submit barrier command 2444 corresponds to one or more MMA commands 2408-2440. In at least one embodiment, submit barrier command 2444 corresponds to a same MMA command targeted by submit barrier command 2422. In at least one embodiment, submit barrier command 2444 corresponds to an MMA command not previously submitted to device 2404 via thread 2402. In at least one embodiment, submit barrier command 2444 arrives at device 2404. In at least one embodiment, barrier arrive 2448 forces said corresponding MMA command(s) to wait until all commands are synchronized. In at least one embodiment, device 2404 transmits barrier arrive 2448 to thread 2406. In at least one embodiment, thread 2406 receives said barrier and forces barrier wait 2450.

Figure 25:
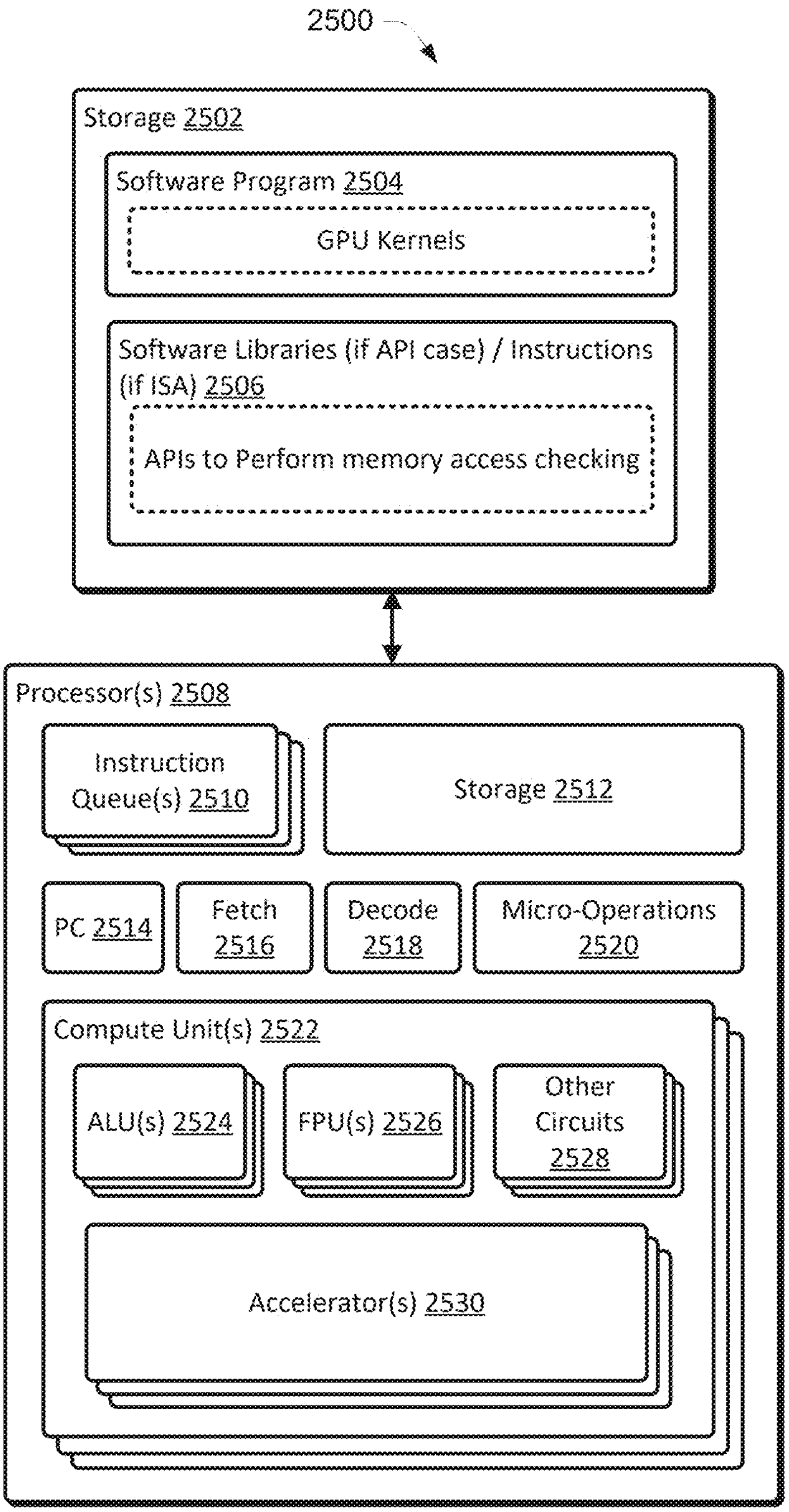
FIG. 25 illustrates an example of a system that can include software and hardware to perform illegal memory access checking or otherwise perform any of the operations described herein, according to at least one embodiment.

FIG. 25 illustrates an example of a system 2500 that can include software and hardware to perform illegal memory access checking or otherwise perform any of the operations described herein, according to at least one embodiment. System 2500 can include storage 2502 and processor(s) 2508. Storage 2502 can include, for example, memory, cache, or other storage described further herein. Storage 2502 can be separate from processor(s) 2508, or storage 2502 can be included in processor(s) 2508 (e.g., in storage 2512). In at least one embodiment, software program 2504 and/or software libraries (or instructions) 2506 can be stored in memory, cache, or other storage and provided to processor(s) 2508 to cause one or more circuits of processor(s) 2508 to perform operations described herein. In at least one embodiment, software program 2504 and/or software libraries (or instructions) 2506 can be integrated into one or more circuits of processor(s) 2508. Software program 2504, which can be used to perform any of the operations described herein, may be stored on storage 2502.

In at least one embodiment, software program 2504 can include one or more software modules. In at least one embodiment, said one or more software modules can include one or more GPU kernels. In at least one embodiment, as used in any implementation described herein, unless otherwise clear from context or stated explicitly to contrary, a module refers to any combination of software logic, firmware logic, hardware logic, and/or circuitry configured to provide functionality described herein. In at least one embodiment, software is embodied as a software package, code and/or instruction set or instructions, and "hardware," as used in any implementation described herein, includes, for example, singly or in any combination, hardwired circuitry, programmable circuitry, state machine circuitry, fixed function circuitry, execution unit circuitry, and/or firmware that stores instructions performed by programmable circuitry. In at least one embodiment, modules are, collectively or individually, embodied as circuitry that forms part of a larger system, for example, an integrated circuit (IC), system on-chip (SoC), and so forth. In at least one embodiment, a module performs one or more processes in connection with any suitable processing unit and/or combination of processing units, such as one or more CPUs, GPUs, GPGPUs, PPUs, and/or variations thereof including those further described herein.

In at least one embodiment, software program 2504 can include a collection of software code, commands, instructions, or other sequences of text to instruct a computing device to perform one or more computational operations and/or invoke one or more other sets of instructions, such as API(s) or API function(s) or Instruction Set Architecture (ISA) level instructions, to be executed or otherwise performed. Instructions (e.g., hardware instructions) or microcode can involve ISA level instructions, which can include native ISA instructions or non-native ISA instructions. Software program 2504 and/or software libraries (or instructions) 2506 (e.g., one or more modules) can be distributed among multiple processors that communicate over a bus, network, by writing to shared memory, and/or any suitable communication process such as those described herein.

In at least one embodiment, system 2500 can include one or more software libraries 2506 that can, for example, provide one or more APIs and/or ISA instructions. In at least one embodiment, one or more APIs and/or ISA instructions can be used to perform illegal memory access checking. In at least one embodiment, one or more software libraries 2506 can be included in drivers and/or runtimes. In at least one embodiment, software libraries 2506 (e.g., including one or more APIs and/or ISA instructions) can include sets of software instructions that, if executed or otherwise performed, cause processor(s) 2508 to perform one or more computational operations, such as any of the operations described herein. In at least one embodiment, one or more APIs and/or ISA instructions can be distributed or otherwise provided as a part of one or more software libraries 2506, runtimes, drivers, and/or any other grouping of software and/or executable code further described herein. In at least one embodiment, one or more APIs and/or ISA instructions can perform one or more computational operations in response to invocation by software program 2504.

Processor(s) 2508 may include any number of processors and any suitable processing unit and/or combination of processing units, such as, but not limited to, central processing units ("CPUs"), graphics processing units ("GPUs"), or other processors (including accelerators, field programmable gate arrays (FPGAs), graphics processors, parallel processors, GPGPUs, DPUs, and/or variations thereof including those further described herein), including any processors described herein, such as, but not limited to, processors in FIGS. 27-39. In at least one embodiment, processor(s) 2508 can retrieve or fetch instructions (e.g., one or more APIs and/or ISA instructions) from storage 2502 using, for example, instruction fetch 2516 (e.g., for an Instruction Fetch stage). Instructions can include instructions to perform illegal memory access checking. In at least one embodiment, processor(s) 2508 can include storage 2512 and instruction queue 2510 to store and queue instructions fetched from storage 2502. In at least one embodiment, fetched instructions can be decoded by decode 2518 to determine what operation should be performed by processor(s) 2508 (e.g., in an Instruction Decode stage). In at least one embodiment, processor(s) 2508 can fetch additional operands (data) that may be used for instructions, and operands can be stored, e.g., in registers or storage 2512. In at least one embodiment, micro-operations 2520 can perform operations on data stored in one or more registers or storage 2512. For example, each step of instructions fetched by processor(s) 2508 can be decomposed during execution so processor(s) 2508 can execute instructions in steps through a series of micro-operations 2520. In at least one embodiment, program counter (PC) 2514 can hold an address for a next instruction and can be updated to point to the next instruction to be executed by processor(s) 2508.

In at least one embodiment, processor(s) 2508 can perform instructions (e.g., in an Execution stage). For example, processor(s) 2508 can perform an operation specified by the instructions, such as an arithmetic operation, a logical operation, or a data transfer. In at least one embodiment, compute unit(s) 2522 can execute instructions to perform any of the operations described herein. In at least one embodiment, compute unit(s) can include ALU(s) 2524 (Arithmetic Logic Units), which may be used for performing arithmetic and logical operations. In at least one embodiment, compute unit(s) can include FPU(s) (Floating Point Units) 2526, which may be used for performing floating-point calculations. In at least one embodiment, other circuits 2528 can be used to perform other operations, such as vector and/or scalar operations. In at least one embodiment, accelerator(s) 2530 can include one or more matrix multiplication accelerators, one or more parallel processing units (PPUs), such as GPUs, or any other accelerator or processor further described herein. In at least one embodiment, software program 2504 can utilize one or more APIs and/or ISA instructions to perform various computing operations with accelerator(s) 2530, such as matrix multiplication, arithmetic operations, or any other computing operation further described herein. In at least one embodiment, one or more computing operations using accelerator(s) 2530 can include at least one or more groups of computing operations to be accelerated by execution at least in part by accelerator(s) 2530, including to perform illegal memory access checking.

In at least one embodiment, system 2500 can be used to perform one or more instructions that include functions or operations, such as those described in connection with FIGS. 1-18. In at least one embodiment, system 2500 comprising one or more processors causes one or more circuits to perform illegal memory access checking and/or otherwise perform operations described herein. In at least one embodiment, system 2500 is included in and/or otherwise includes systems illustrated in FIGS. 1-18 to cause one or more circuits to perform illegal memory access checking and/or otherwise perform operations described herein. In at least one embodiment, system 2500 includes one or more hardware illustrated in FIGS. 19-44, such as to perform illegal memory access checking and/or otherwise perform operations described herein.

In this description, numerous specific details are set forth to provide a more thorough understanding of at least one embodiment. However, it will be apparent to one of ordinary skill that these inventive concepts may be practiced without one or more of these specific details.

Data Center

Figure 26:
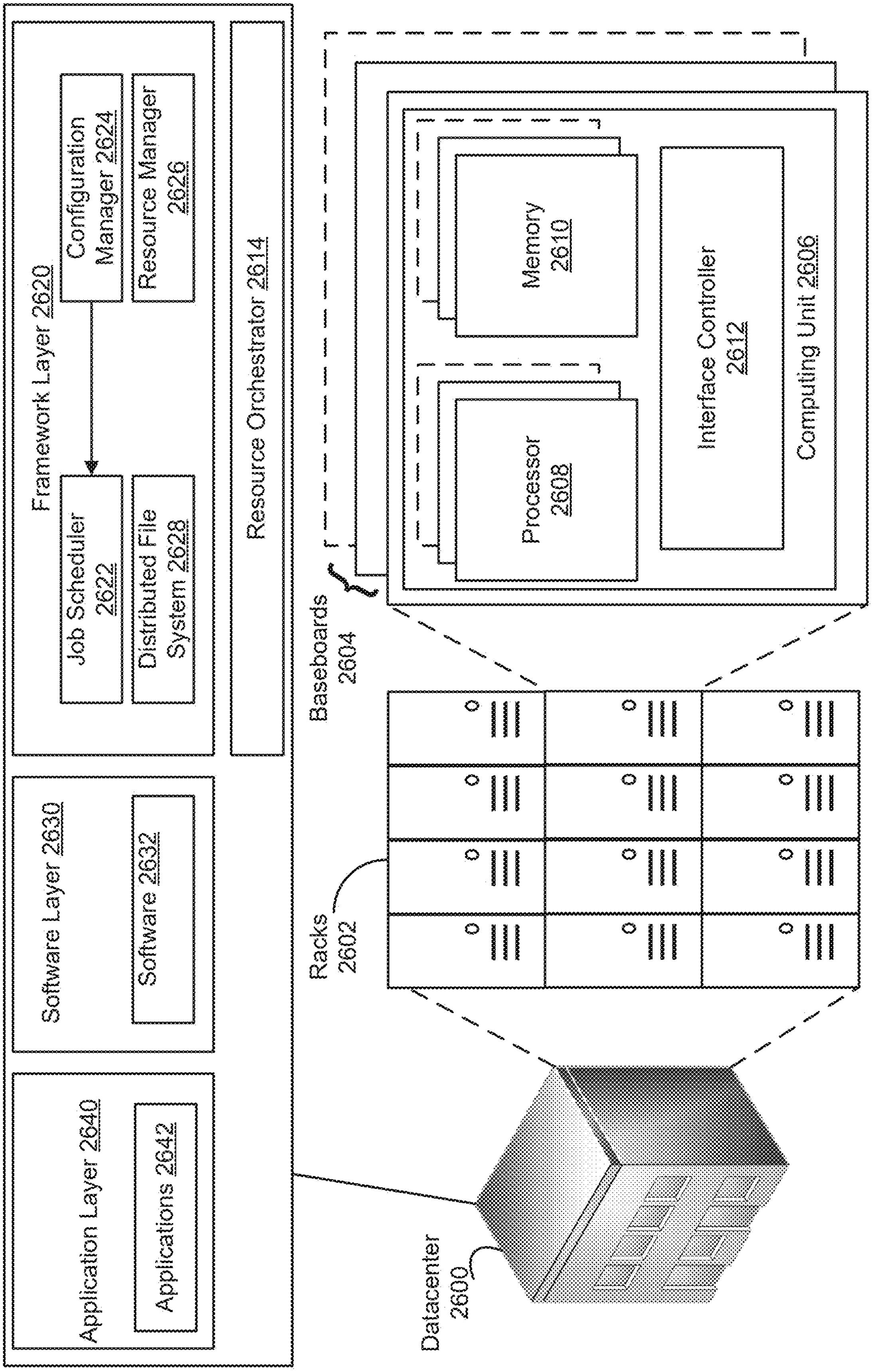
FIG. 26 illustrates an example data center system, in accordance with at least one embodiment.

FIG. 26 illustrates an example data center 2600, in accordance with at least one embodiment. Data center 2600 may include one or more rooms having racks 2602 and auxiliary equipment used to house one or more racks 2602 and one or more baseboards 2604. Rack 2602 can include one or more baseboards 2604. Rack 2602 can include a housing that receives and supports individual baseboards 2604. Operational aspects of rack 2602 may be regulated at a rack level, corresponding to a group of baseboards 2604, or at a baseboard level, corresponding to individual baseboards 2604, among other options. Rack 2602 or baseboards 2604 can have particularly selected maximum operating parameters, such as, but not limited to, power consumption, operating frequencies, and others. Data center 2600 can be supported by various cooling systems, such as, but not limited to, cooling towers, cooling loops, pumps, and other support systems. Cooling systems may include sensors and controllers to monitor and managing cooling properties for racks 2602. Baseboards 2604 within racks 2602 can get operational power from one or more power distribution units (PDUs; not shown). PDUs may be arranged within racks 2602, for example between racks 2602 including baseboards 2604, or within racks 2602 that also house baseboards 2604.

Racks 2602 and baseboards 2604 can include sub-systems, modules, add-in cards, and other semiconductor components. Baseboards 2604 can include one or more computing units 2606 that can include one or more processors 2608, one or more memory 2610, and an interface controller 2612. Computing units 2606 may include any number of processors, such as, but not limited to, central processing units ("CPUs"), graphics processing units ("GPUs"), or other processors (including accelerators, field programmable gate arrays (FPGAs), graphics processors, etc.), including any processors described herein, such as, but not limited to, the processors in FIGS. 27-39. Computing units 2606 can include one or more memory storage devices 2610 (e.g., dynamic read-only memory, solid state storage or disk drives), as well as network input/output ("NW I/O") devices, network switches, virtual machines ("VMs"), power modules, and cooling modules, etc. One or more computing units 2606 may be a server having one or more of above-mentioned computing resources.

Computing units 2606 can include separate groupings of computing units housed within one or more racks (not shown), or many racks housed in data centers at various geographical locations (also not shown). Separate groupings of computing units may include grouped compute, network, memory or storage resources that may be configured or allocated to support one or more workloads. Several computing units (e.g., including CPUs and/or other processors) may be grouped within one or more racks to provide compute resources to support one or more workloads. A resource orchestrator 2614 may configure or otherwise control one or more computing units 2606 or groups of computing units. Resource orchestrator 2614 may include a software design infrastructure ("SDI") management entity for data center 2600. Resource orchestrator 2614 may include hardware, software or some combination thereof.

Data center 2600 can include any one of or any combination of a framework layer 2620, a software layer 2630 and an application layer 2640. As shown in FIG. 26, framework layer 2620 includes a job scheduler 2622, a configuration manager 2624, a resource manager 2626 and a distributed file system 2628. Framework layer 2620 may include a framework to support software 2632 of software layer 2630 and/or one or more application(s) 2642 of application layer 2640. Software 2632 or application(s) 2642 may respectively include web-based service software or applications, such as, but not limited to, those provided by Amazon Web Services, Google Cloud and Microsoft Azure. Framework layer 2620 may be a type of free and open-source software web application framework such as, but not limited to, Apache Spark™ (hereinafter "Spark") that may utilize distributed file system 2628 for large-scale data processing (e.g., "big data"). Job scheduler 2622 may include a Spark driver to facilitate scheduling of workloads supported by various layers of data center 2600. Configuration manager 2624 may be capable of configuring different layers such as, but not limited to, software layer 2630 and framework layer 2620 including Spark and distributed file system 2628 for supporting large-scale data processing. Resource manager 2626 may be capable of managing clustered or grouped computing units 2606 mapped to or allocated for support of distributed file system 2628 and job scheduler 2622. Resource manager 2626 may coordinate with resource orchestrator 2614 to manage these mapped or allocated computing resources.

Software 2632 can be included in software layer 2630 and may include software used by at least portions of a computing unit 2606, one or more computing units 2606, groups of computing units 2606, and/or distributed file system 2628 of framework layer 2620. One or more types of software may include, but are not limited to, Internet web page search software, e-mail virus scan software, database software, and streaming video content software.

Application(s) 2642 can be included in application layer 2640 and may include one or more types of applications used by at least portions of a computing unit 2606, one or more computing units 2606, groups of computing units 2606, and/or distributed file system 2628 of framework layer 2620. One or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

Any of configuration manager 2624, resource manager 2626, and resource orchestrator 2614 may implement any number and type of self-modifying actions based on any amount and type of data acquired in any technically feasible fashion. Self-modifying actions may relieve a data center operator of data center 2600 from making possibly bad configuration decisions and possibly avoiding underutilized and/or poor performing portions of a data center.

Data center 2600 may include tools, services, software or other resources to train one or more machine learning models or predict or infer information using one or more machine learning models in accordance with one or more embodiments described herein. For example, a machine learning model may be trained by calculating weight parameters in accordance with a neural network architecture using software and computing resources described above with respect to data center 2600. Trained machine learning models corresponding to one or more neural networks may be used to infer or predict information using resources described above with respect to data center 2600 by using weight parameters calculated through one or more training techniques described herein.

Data center 2600 may use CPUs, application-specific integrated circuits (ASICs), GPUs, FPGAs, or other hardware (e.g., embodiments in FIGS. 27-39) to perform some or all of processes and techniques described elsewhere herein, such as, but not limited to, training and/or inferencing using above-described resources. Moreover, one or more software and/or hardware resources described above may be configured as a service to allow users to train or performing inferencing of information, such as, but not limited to, image recognition, speech recognition, or other artificial intelligence services.

In at least one embodiment, processor 2608 can include one of the processors below and/or comprises one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. In at least one embodiment, processor 2608 is configured by software 2632 to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. Data center 2600 may use logic, CPUs, application-specific integrated circuits (ASICs), GPUs, FPGAs, or other hardware (e.g., embodiments in FIGS. 27-39) to perform any of the operations described above or elsewhere herein.

Processors

Figure 44A:
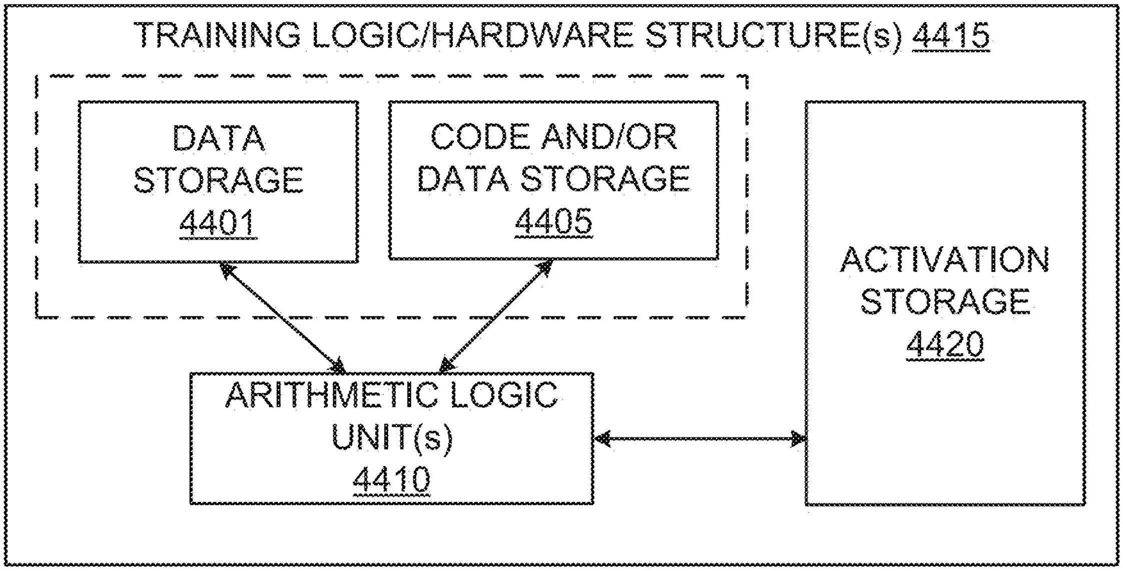
FIG. 44A illustrates inference and/or training logic, in accordance with at least one embodiment.
Figure 44B:
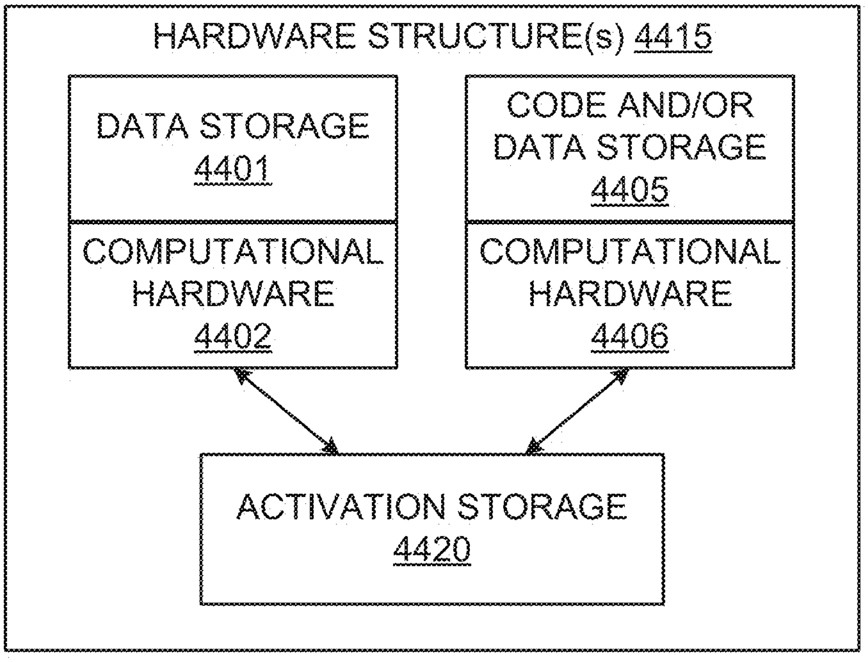
FIG. 44B illustrates inference and/or training logic, in accordance with at least one embodiment.

The following figures set forth, without limitation, example processors and processing systems that can be used to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform some or all of processes, operations and/or and techniques described elsewhere herein. Example processors and processing systems can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. Processors and processing systems can include logic, central processing units (CPUs), application-specific integrated circuits (ASICs), graphics processing units (GPUs), field programmable arrays (FPGAs), XPUs (i.e., any compute architecture that best fits the need of an application) or other hardware (e.g., embodiments in FIGS. 27-39) to perform any of the operations described above, below, or elsewhere herein. Processors and/or processing systems described herein can include one or more circuits that can be used to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. As used herein, one or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. FIGS. 44A and 44B illustrate logic 4415 which, as described elsewhere herein, can be used in one or more devices to perform operations such as, but not limited to, those discussed herein in accordance with at least one embodiment. Logic can refer, for example, to any combination of software logic, hardware logic, and/or firmware logic to provide functionality and/or operations described herein, wherein logic may be, collectively or individually, embodied as circuitry that forms part of a larger system, for example, an integrated circuit (IC), an application-specific integrated circuit (ASIC), a field programmable array (FPGA), system-on-chip (SoC), or one or processors (e.g., CPU, GPU).

Figure 27:
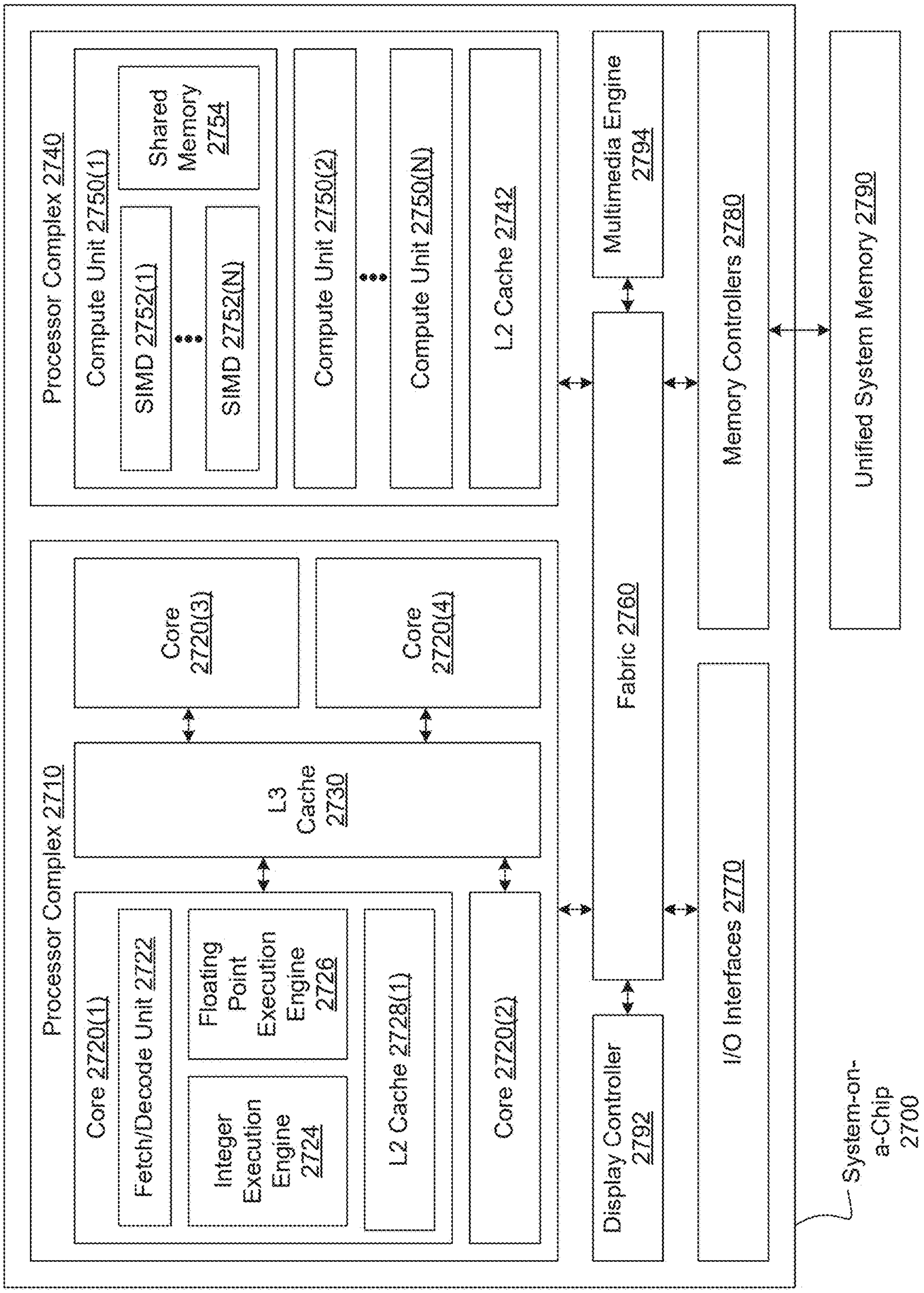
FIG. 27 illustrates an system-on-a-chip (SOC), in accordance with at least one embodiment.

FIG. 27 illustrates a processor which is a system-on-a-chip (SOC) 2700 (which may be referred to as system-on-chip, a superchip, or another name), in accordance with at least one embodiment. SOC 2700 can include processor complex 2710 and processor complex 2740. SOC 2700 can include any number of processor complexes 2710 and/or processor complexes 2740 that may include any number of processors that are described herein, such as, but not limited to, those in FIGS. 27-39, in any combination. For example, processor 2710 may include a central processing unit (CPU), and processor 2740 may include a graphics processor. Alternatively, processor 2710 may include a graphics processor, and processor 2740 may include a graphics processor. SOC 2700 may include any number of display controllers 2792, any number of multimedia engines 2794, any number of I/O Interfaces 2770, any number of memory controllers 2780, and any number of fabrics 2760 in any combination. For explanatory purposes, multiple instances of like objects are denoted herein with reference numbers identifying the object and parenthetical numbers identifying the instance where needed. SOC 2700 can include a processor from Broadcom in Palo Alto, CA.

Processor complex 2710 can include a CPU, processor complex 2740 can include a GPU, and SOC 2700 can include a processing unit that integrates 2710 and 2740 onto a single chip. Some tasks may be assigned to processor complex 2710 and other tasks may be assigned to processor complex 2740. Processor complex 2710 can be configured to execute main control software associated with SOC 2700, such as, but not limited to, an operating system. Processor complex 2710 can be the master processor of SOC 2700, controlling and coordinating operations of other processors. Processor complex 2710 can issue commands that control the operation of processor complex 2740 to perform some or all of the operations described herein. Processor complex 2710 can be configured to execute host executable code derived from CUDA or other source code (e.g., HIP source code), and processor complex 2740 can be configured to execute device executable code derived from CUDA or other source code in order to perform any of the operations described herein.

Processor complex 2710 can include cores 2720(1)-2720(4) and a cache (e.g., L3 cache) 2730 to store information to perform operations described herein. Processor complex 2710 may include any number of cores 2720 and any number and type of caches in any combination. Cores 2720 can be configured to execute instructions of a particular instruction set architecture ("ISA") to perform some or all of the operations described herein. Each core 2720 can include a CPU core. Core 2720(1)-2720(4) can be referred to as a computing units or compute units. SOC 2700 can includes any number of processor complexes 2710, fabric 2760, I/O interfaces 2770, and memory controllers 2780.

Each core 2720 can include a fetch/decode unit 2722, an integer execution engine 2724, a floating point execution engine 2726, and an L2 cache 2728. Fetch/decode unit 2722 can fetch instructions to perform some or all of the operations described herein (such as, but not limited to, an API that is compiled into instructions) and decode such instructions, generate micro-operations, and dispatch separate micro-instructions to integer execution engine 2724 and/or floating point execution engine 2726. Fetch/decode unit 2722 can concurrently dispatch one micro-instruction to integer execution engine 2724 and another micro-instruction to floating point execution engine 2726. Integer execution engine 2724 can execute integer and memory operations. Floating point engine 2726 can execute floating point and vector operations. Fetch-decode unit 2722 can dispatch micro-instructions to one or more execution engines that replaces both integer execution engine 2724 and floating point execution engine 2726.

Each core 2720(*i*), where i is an integer representing a particular instance of core 2720, may access L2 cache 2728(*i*) included in core 2720(*i*). Each core 2720 included in core complex 2710(*j*), where j is an integer representing a particular instance of core complex 2710, can be connected to other cores 2720 included in core complex 2710(*j*) via L3 cache 2730 (*j*) included in core complex 2710(*j*). Cores 2720 included in core complex 2710(*j*), where j is an integer representing a particular instance of core complex 2710, can access all of L3 cache 2730 (*j*) included in core complex 2710(*j*). L3 cache 2730 may include any number of slices.

Processor complex 2740 can be a graphics complex that can be configured to perform compute operations (e.g., compute operations involved in operations described herein) in a highly-parallel fashion. Processor complex 2740 can be configured to execute graphics pipeline operations such as, but not limited to, draw commands, pixel operations, geometric computations, and other operations associated with rendering an image to a display. Processor complex 2740 can be configured to execute operations unrelated to graphics, such as, but not limited to, neural network training and/or simulations. Processor complex 2740 can be configured to execute both operations related to graphics and operations unrelated to graphics.

Processor complex 2740 can include any number of compute units 2750(1)-2750(N), where N is any integer greater than 1, and an L2 cache 2742. Compute units 2750 can share L2 cache 2742, which may store information to be used to perform some or all of the operations described herein. L2 cache 2742 can be partitioned. Processor complex 2740 can include any number of compute units 2750 and any number (including zero) and type of caches. Processor complex 2740 can include any amount of dedicated graphics hardware.

Each compute unit 2750 can include any number of SIMD units 2752(1)-2752(N), where N is any integer greater than 1, and a shared memory 2754. Each SIMD unit 2752 can implement a SIMD architecture and can be configured to some or all of the operations described herein, in parallel. Each compute unit 2750 may execute any number of thread blocks, but each thread block can execute on a single compute unit 2750, although in some embodiments a thread block can execute on multiple compute units. A thread block can include any number of threads of execution. A workgroup can be a thread block. Each SIMD unit 2752 can execute a group of threads. A group of threads (e.g., 16 threads), which can also be referred to as a warp, or subgroup, or wavefront (e.g., as used by AMD and Intel), where each thread in the warp, wave, subgroup, or wavefront can belong to a single thread block and is configured to process a different set of data based on a single set of instructions. Predication can be used to disable one or more threads in a warp, subgroup, or wavefront. A lane can be a thread. A work item can be a thread, such as, but not limited to, e.g., with OpenCL. Different warps, subgroups, or wavefronts in a thread block may synchronize together and communicate via shared memory 2754. Each compute unit 2750 can include one or more thread block clusters, where a thread block cluster can enable programmatic control of locality at a granularity larger than a single thread block of a single streaming multiprocessor (SM). Thread block clusters (also referred to as "clusters") can enable multiple thread blocks running concurrently across streaming multiprocessors to synchronize and collaboratively fetch, exchange, or otherwise use data. In at least one embodiment, streaming multiprocessors ("SMs") can be referred to streaming microprocessors, stream processors ("SPs"), stream processing units ("SPUs"), compute units ("CUs"), execution units ("EUs"), and/or slices, where a slice in this context can refer to a portion of processing resources in a processing unit (e.g., 16 cores, a ray tracing unit, a thread director or scheduler).

Fabric 2760 can be a system interconnect that facilitates data and control transmissions across processor complex 2710, processor complex 2740, I/O interfaces 2770, memory controllers 2780, display controller 2792, and multimedia engine 2794, e.g., to perform some or all of the operations described herein. SOC 2700 may include any amount and type of system interconnect in addition to or instead of fabric 2760 that facilitates data and control transmissions across any number and type of directly or indirectly linked components that may be internal or external to SOC 2700. I/O interfaces 2770 can be representative of any number and type of I/O interfaces (e.g., PCI, PCI-Extended ("PCI-X"), PCIe, gigabit Ethernet ("GBE"), USB, etc.). Various types of peripheral devices can be coupled to I/O interfaces 2770. Peripheral devices that can be coupled to I/O interfaces 2770 may include keyboards, mice, printers, scanners, joysticks or other types of game controllers, media recording devices, external storage devices, network interface cards, and so forth.

Display controller 2792 may display images on one or more display device(s), such as, but not limited to, a liquid crystal display ("LCD") device. Multimedia engine 2794 can include any amount and type of circuitry that is related to multimedia, such as, but not limited to, a video decoder, a video encoder, an image signal processor, etc. Memory controllers 2780 may facilitate data transfers between SOC 2700 and a unified system memory 2790. Processor complex 2710 and processor complex 2740 may share unified system memory 2790. Unified system memory 2790 can include various types of memory devices, including dynamic random access memory (DRAM) or graphics random access memory, such as, but not limited to, synchronous graphics random access memory (SGRAM), including graphics double data rate (GDDR) memory. Unified system memory 2790 may include 3D stacked memory, including but not limited to high bandwidth memory (HBM), HBM2e, or HDM3.

SOC 2700 may implement a memory subsystem that includes any amount and type of memory controllers 2780 and memory devices (e.g., shared memory 2754) that may be dedicated to one component or shared among multiple components in order to perform any of the operations described herein. SOC 2700 can implement a cache subsystem that includes one or more cache memories (e.g., L2 caches 2728, L3 cache 2730, and L2 cache 2742) that may each be private to or shared between any number of components (e.g., cores 2720, core complex 2710, SIMD units 2752, compute units 2750, and processor complex 2740).

In at least one embodiment, SOC 2700 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 28A:
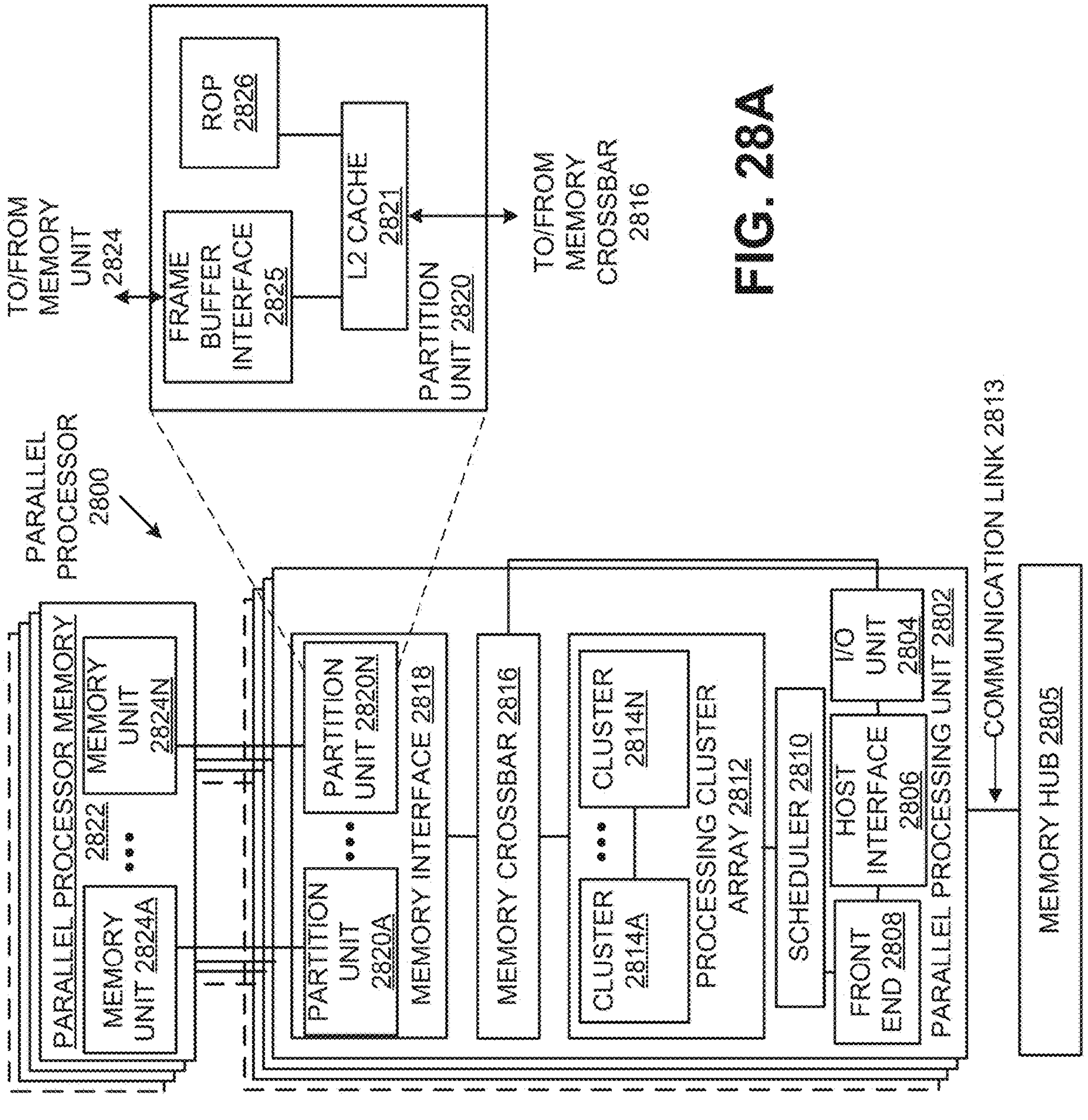
FIG. 28A illustrates a parallel processor, in accordance with at least one embodiment.

FIG. 28A illustrates a parallel processor 2800, in accordance with at least one embodiment. Parallel processor 2800 may be implemented using one or more circuits and may be referred to as a programmable processor (e.g., a CPU and/or GPU), logic, an application specific integrated circuit (ASIC), a field programmable gate array (FPGA) or other hardware (e.g., embodiments in FIGS. 27-39) to perform any of the operations described above or elsewhere herein.

Parallel processor 2800 can include a parallel processing unit 2802 to perform any of the operations described above or elsewhere herein. Parallel processing unit 2802 can include an I/O unit 2804 that enables communication with other devices, including other instances of parallel processing unit 2802. I/O unit 2804 may be directly connected to other devices. I/O unit 2804 may connect with other devices via use of a hub or switch interface, such as, but not limited to, a memory hub 2805. Connections between memory hub 2805 and I/O unit 2804 can form a communication link 2813. I/O unit 2804 may connect with a host interface 2806 and a memory crossbar 2816, where host interface 2806 receives commands directed to performing processing operations and memory crossbar 2816 receives commands directed to performing memory operations.

When host interface 2806 receives a command buffer via I/O unit 2804, host interface 2806 can direct work operations to perform those commands to a front end 2808. Front end 2808 can couple with a scheduler 2810 (which may be referred to as a sequencer), which is configured to distribute commands or other work items to a processing cluster array 2812. Scheduler 2810 can ensure that processing cluster array 2812 is properly configured and in a valid state before tasks may be distributed to a cluster of processing cluster array 2812. Scheduler 2810 may be implemented via firmware logic executing on a microcontroller. Microcontroller-implemented scheduler 2810 can be configurable to perform complex scheduling and work distribution operations at coarse and fine granularity, enabling rapid preemption and context switching of threads executing on processing array 2812. Host software can prove workloads for scheduling on processing cluster array 2812 via one of multiple graphics processing paths. Workloads can then be automatically distributed across processing array cluster 2812 by scheduler 2810 logic within a microcontroller including scheduler 2810.

Processing cluster array 2812 can perform any of the operations described above or elsewhere herein and can include up to "N" processing clusters (e.g., cluster 2814A, cluster 2814B, through cluster 2814N), where "N" represents a positive integer (which may be a different integer "N" than used in other figures). Each cluster 2814A-2814N of processing cluster array 2812 can execute a large number of concurrent threads. Scheduler 2810 can allocate work to clusters 2814A-2814N of processing cluster array 2812 using various scheduling and/or work distribution algorithms, which may vary depending on workload arising for each type of program or computation. Scheduling can be handled dynamically by scheduler 2810, or can be assisted in part by compiler logic during compilation of program logic configured for execution by processing cluster array 2812. Different clusters 2814A-2814N of processing cluster array 2812 can be allocated for processing different types of programs or for performing different types of computations.

Processing cluster array 2812 can be configured to perform various types of parallel processing operations, such as, but not limited to, any of the operations described above or elsewhere herein. Processing cluster array 2812 can be configured to perform general-purpose parallel compute operations. For example, processing cluster array 2812 can include logic to execute processing tasks including filtering of video and/or audio data, performing modeling operations, including physics operations, and performing data transformations.

Processing cluster array 2812 can be configured to perform parallel graphics processing operations. Processing cluster array 2812 can include additional logic to support execution of such graphics processing operations, including but not limited to, texture sampling logic to perform texture operations, as well as tessellation logic and other vertex processing logic. Processing cluster array 2812 can be configured to execute graphics processing related shader programs such as, but not limited to, vertex shaders, tessellation shaders, geometry shaders, and pixel shaders. Parallel processing unit 2802 can transfer data from system memory via I/O unit 2804 for processing. During processing, transferred data can be stored to on-chip memory (e.g., parallel processor memory 2822) during processing, then written back to system memory.

When parallel processing unit 2802 is used to perform graphics processing, scheduler 2810 can be configured to divide a processing workload into approximately equal sized tasks, to better enable distribution of graphics processing operations to multiple clusters 2814A-2814N of processing cluster array 2812. Portions of processing cluster array 2812 can be configured to perform different types of processing. For example, a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of clusters 2814A-2814N may be stored in buffers to allow intermediate data to be transmitted between clusters 2814A-2814N for further processing.

Processing cluster array 2812 can receive processing tasks to be executed via scheduler 2810, which receives commands defining processing tasks from front end 2808. Processing tasks can include indices of data to be processed, e.g., surface (patch) data, primitive data, vertex data, and/or pixel data, as well as state parameters and commands defining how data is to be processed (e.g., what program is to be executed). Scheduler 2810 may be configured to fetch indices corresponding to tasks or may receive indices from front end 2808. Front end 2808 can be configured to ensure processing cluster array 2812 is configured to a valid state before a workload specified by incoming command buffers (e.g., batch-buffers, push buffers, etc.) is initiated.

Each of one or more instances of parallel processing unit 2802 can couple with a parallel processor memory 2822 to perform any of the operations described above or elsewhere herein. Parallel processor memory 2822 can be accessed via memory crossbar 2816, which can receive memory requests from processing cluster array 2812 as well as I/O unit 2804. Memory crossbar 2816 can access parallel processor memory 2822 via a memory interface 2818. Memory interface 2818 can include multiple partition units (e.g., partition unit 2820A, partition unit 2820B, through partition unit 2820N) that can each couple to a portion (e.g., memory unit) of parallel processor memory 2822. A number of partition units 2820A-2820N can be configured to be equal to a number of memory units, such that a first partition unit 2820A has a corresponding first memory unit 2824A, a second partition unit 2820B has a corresponding memory unit 2824B, and an N-th partition unit 2820N has a corresponding N-th memory unit 2824N. A number of partition units 2820A-2820N may not be equal to a number of memory units.

Memory units 2824A-2824N can include various types of memory devices, including dynamic random access memory (DRAM) or graphics random access memory, such as, but not limited to, synchronous graphics random access memory (SGRAM), including graphics double data rate (GDDR) memory. Memory units 2824A-2824N may also include 3D stacked memory, including but not limited to high bandwidth memory (HBM), HBM2e, or HDM3. Render targets, such as, but not limited to, frame buffers or texture maps may be stored across memory units 2824A-2824N, allowing partition units 2820A-2820N to write portions of each render target in parallel to efficiently use available bandwidth of parallel processor memory 2822. A local instance of parallel processor memory 2822 may be excluded in favor of a unified memory design that utilizes system memory in conjunction with local cache memory.

Any one of clusters 2814A-2814N of processing cluster array 2812 can process data that will be written to any of memory units 2824A-2824N within parallel processor memory 2822. Memory crossbar 2816 can be configured to transfer an output of each cluster 2814A-2814N to any partition unit 2820A-2820N or to another cluster 2814A-2814N, which can perform additional processing operations on an output. Each cluster 2814A-2814N can communicate with memory interface 2818 through memory crossbar 2816 to read from or write to various external memory devices. Memory crossbar 2816 can have a connection to memory interface 2818 to communicate with I/O unit 2804, as well as a connection to a local instance of parallel processor memory 2822, enabling processing units within different processing clusters 2814A-2814N to communicate with system memory or other memory that is not local to parallel processing unit 2802. Memory crossbar 2816 can use virtual channels to separate traffic streams between clusters 2814A-2814N and partition units 2820A-2820N.

Multiple instances of parallel processing unit 2802 can be provided on a single add-in card, or multiple add-in cards can be interconnected. Different instances of parallel processing unit 2802 can be configured to interoperate even if different instances have different numbers of processing cores, different amounts of local parallel processor memory, and/or other configuration differences. For example, some instances of parallel processing unit 2802 can include higher precision floating point units relative to other instances. Systems incorporating one or more instances of parallel processing unit 2802 or parallel processor 2800 can be implemented in a variety of configurations and form factors, including but not limited to desktop, laptop, or handheld personal computers, servers, workstations, game consoles, and/or embedded systems.

FIG. 28A further includes a block diagram of a partition unit 2820, in accordance with at least one embodiment. Partition unit 2820 is an instance of one of partition units 2820A-2820N of FIG. 28A. Partition unit 2820 can include an L2 cache 2821, a frame buffer interface 2825, and a ROP 2826 (raster operations unit). L2 cache 2821 can be a read/write cache that is configured to perform load and store operations received from memory crossbar 2816 and ROP 2826. Read misses and urgent write-back requests can be output by L2 cache 2821 to frame buffer interface 2825 for processing. Updates can also be sent to a frame buffer via frame buffer interface 2825 for processing. Frame buffer interface 2825 may interface with one of memory units in parallel processor memory, such as, but not limited to, memory units 2824A-2824N of FIG. 28A (e.g., within parallel processor memory 2822).

ROP 2826 can be a processing unit that performs raster operations such as, but not limited to, stencil, z test, blending, etc. ROP 2826 can then output processed graphics data that is stored in graphics memory. ROP 2826 can include compression logic to compress depth or color data that is written to memory and decompress depth or color data that is read from memory. Compression logic can be lossless compression logic that makes use of one or more of multiple compression algorithms. A type of compression that is performed by ROP 2826 can vary based on statistical characteristics of data to be compressed. For example, delta color compression is performed on depth and color data on a per-tile basis.

ROP 2826 can be included within each processing cluster (e.g., cluster 2814A-2814N of FIG. 28A) instead of within partition unit 2820. Read and write requests for pixel data may be transmitted over memory crossbar 2816 instead of pixel fragment data. Processed graphics data may be displayed on a display routed for further processing by processor(s), or routed for further processing by one of processing entities within parallel processor 2800 of FIG. 28A.

In at least one embodiment, parallel processor 2800 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 28C:
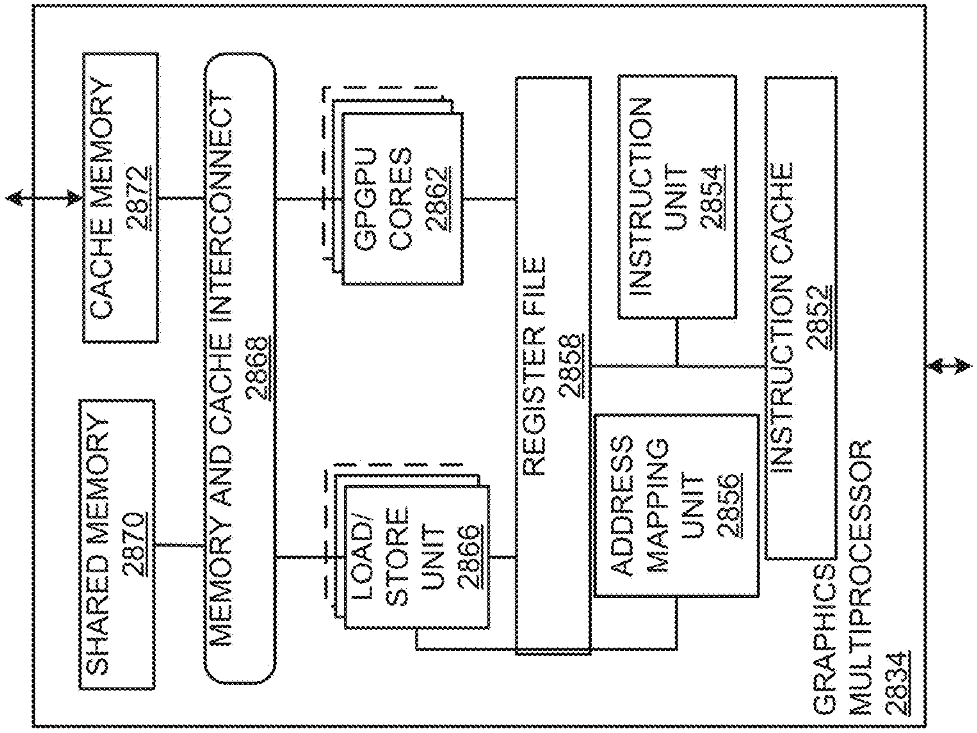
FIG. 28C illustrates a graphics multiprocessor, in accordance with at least one embodiment.
Figure 28B:
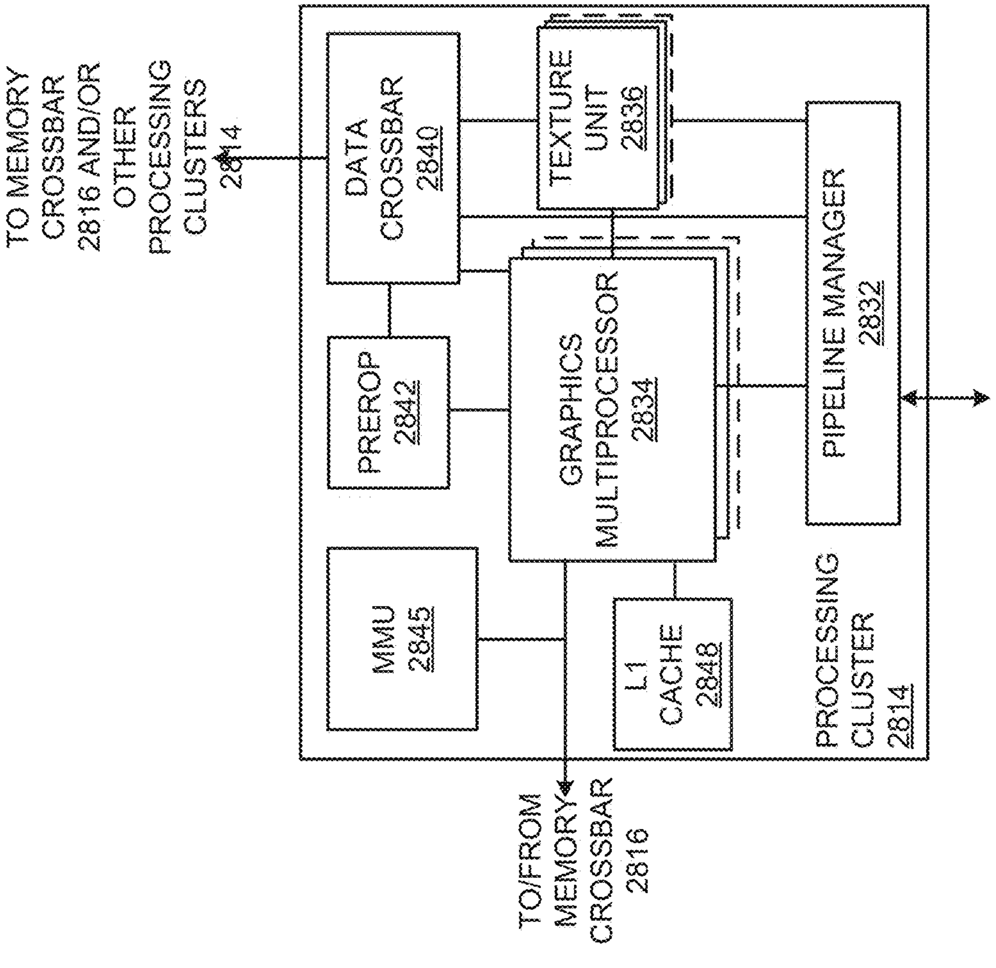
FIG. 28B illustrates a processing cluster, in accordance with at least one embodiment.

FIG. 28B includes a block diagram of a processing cluster 2814 within a parallel processing unit, in accordance with at least one embodiment. A processing cluster can be an instance of one of processing clusters 2814A-2814N of FIG. 28A that can be used to perform any of the operations described above or elsewhere herein. Processing cluster 2814 can be configured to execute many threads in parallel, where "thread" refers to an instance of a particular program executing on a particular set of input data. Single-instruction, multiple-data (SIMD) instruction issue techniques can be used to support parallel execution of a large number of threads without providing multiple independent instruction units. Single-instruction, multiple-thread (SIMT) techniques may be used to support parallel execution of a large number of generally synchronized threads, using a common instruction unit configured to issue instructions to a set of processing engines within each one of processing clusters.

Operation of processing cluster 2814 can be controlled via a pipeline manager 2832 that distributes processing tasks to SIMT parallel processors. Pipeline manager 2832 can receive instructions from scheduler 2810 of FIG. 28A and manages execution of those instructions via a graphics multiprocessor 2834 and/or a texture unit 2836. Graphics multiprocessor 2834 may be an example instance of a SIMT parallel processor. However, various types of SIMT parallel processors of differing architectures may be included within processing cluster 2814. One or more instances of graphics multiprocessor 2834 can be included within a processing cluster 2814. Graphics multiprocessor 2834 can process data and a data crossbar 2840 can be used to distribute processed data to one of multiple possible destinations, including other shader units. Pipeline manager 2832 can facilitate distribution of processed data by specifying destinations for processed data to be distributed via data crossbar 2840.

Each graphics multiprocessor 2834 within processing cluster 2814 can include an identical set of functional execution logic (e.g., arithmetic logic units, load-store units, etc.) to perform computations for any of the operations described above or elsewhere herein. Functional execution logic can be configured in a pipelined manner in which new instructions can be issued before previous instructions may be complete. Functional execution logic can support a variety of operations including integer and floating point arithmetic, comparison operations, Boolean operations, bit-shifting, and computation of various algebraic functions. Same functional-unit hardware can be leveraged to perform different operations and any combination of functional units may be present.

Instructions transmitted to processing cluster 2814 may constitute a thread, which can also be referred to as a warp, subgroup, wave, or a wavefront. A set of threads executing across a set of parallel processing engines can be referred to as a thread group. A thread group can execute a common program on different input data. Each thread within a thread group can be assigned to a different processing engine within a graphics multiprocessor 2834. A thread group may include fewer threads than a number of processing engines within graphics multiprocessor 2834. When a thread group includes fewer threads than a number of processing engines, one or more of processing engines may be idle during cycles in which that thread group is being processed. A thread group may also include more threads than a number of processing engines within graphics multiprocessor 2834. When a thread group includes more threads than number of processing engines within graphics multiprocessor 2834, processing can be performed over consecutive clock cycles. Multiple thread groups can be executed concurrently on a graphics multiprocessor 2834.

Graphics multiprocessor 2834 includes an internal cache memory to perform load and store operations, such as, but not limited to, any of the operations described above or elsewhere herein. Graphics multiprocessor 2834 can forego an internal cache and use a cache memory (e.g., L1 cache 2848) within processing cluster 2814. Each graphics multiprocessor 2834 may also have access to L2 caches within partition units (e.g., partition units 2820A-2820N of FIG. 28A) that can be shared among all processing clusters 2814 and may be used to transfer data between threads. Graphics multiprocessor 2834 may also access off-chip global memory, which can include one or more of local parallel processor memory and/or system memory. Any memory external to parallel processing unit 2802 may be used as global memory. Processing cluster 2814 can include multiple instances of graphics multiprocessor 2834 and can share common instructions and data, which may be stored in L1 cache 2848.

Each processing cluster 2814 may include an MMU 2845 (memory management unit) that can be configured to map virtual addresses into physical addresses. One or more instances of MMU 2845 may reside within memory interface 2818 of FIG. 28A. MMU 2845 can include a set of page table entries (PTEs) used to map a virtual address to a physical address of a tile and optionally a cache line index. MMU 2845 may include address translation lookaside buffers (TLB) or caches that may reside within graphics multiprocessor 2834 or L1 2848 cache or processing cluster 2814. A physical address can be processed to distribute surface data access locally to allow for efficient request interleaving among partition units. A cache line index may be used to determine whether a request for a cache line is a hit or miss.

A processing cluster 2814 may be configured such that each graphics multiprocessor 2834 is coupled to a texture unit 2836 for performing texture mapping operations, e.g., determining texture sample positions, reading texture data, and filtering texture data. Texture data can be read from an internal texture L1 cache (not shown) or from an L1 cache within graphics multiprocessor 2834 and can be fetched from an L2 cache, local parallel processor memory, or system memory, as needed. Each graphics multiprocessor 2834 can output processed tasks to data crossbar 2840 to provide processed task to another processing cluster 2814 for further processing or to store processed task in an L2 cache, local parallel processor memory, or system memory via memory crossbar 2816. A preROP 2842 (pre-raster operations unit) can be configured to receive data from graphics multiprocessor 2834, and direct data to ROP units, which may be located with partition units as described herein (e.g., partition units 2820A-2820N of FIG. 28A). PreROP 2842 unit can perform optimizations for color blending, organizing pixel color data, and performing address translations.

In at least one embodiment, processing cluster 2814 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

FIG. 28C shows a graphics multiprocessor 2834, in accordance with at least one embodiment, e.g., to perform any of the operations described above or elsewhere herein. Graphics multiprocessor 2834 can couple with pipeline manager 2832 of processing cluster 2814. Graphics multiprocessor 2834 can include an execution pipeline including but not limited to an instruction cache 2852 (that, e.g., can store instructions, such as, not limited to compiled instructions), an instruction unit 2854, an address mapping unit 2856, a register file 2858, one or more general purpose graphics processing unit (GPGPU) cores 2862, and one or more load/store units 2866, where one or more load/store units 2866 can perform load/store operations to load/store instructions corresponding to performing an operation. GPGPU cores 2862 and load/store units 2866 can be coupled with cache memory 2872 and shared memory 2870 via a memory and cache interconnect 2868. GPGPU cores 2862 can be part of an SoC such as, but not limited to, part of integrated circuit 2700 in FIG. 27.

Instruction cache 2852 can receive a stream of instructions (e.g., to perform any of the operations described above or elsewhere herein) to execute from pipeline manager 2832. Instructions can be cached in instruction cache 2852 and dispatched for execution by an instruction unit 2854. Instruction unit 2854 can dispatch instructions as thread groups (e.g., warps, subgroups, wavefronts, or waves), with each thread of thread group assigned to a different execution unit within GPGPU cores 2862. An instruction can access any of a local, shared, or global address space by specifying an address within a unified address space. Address mapping unit 2856 can be used to translate addresses in a unified address space into a distinct memory address that can be accessed by load/store units 2866.

Register file 2858 can provide a set of registers for functional units of graphics multiprocessor 2834. Register file 2858 may provide temporary storage for operands connected to data paths of functional units (e.g., GPGPU cores 2862, load/store units 2866) of graphics multiprocessor 2834. Register file 2858 may be divided between each of functional units such that each functional unit is allocated a dedicated portion of register file 2858. Register file 2858 can be divided between different warps (which may be referred to as wavefronts, subgroups, and/or waves or threads) being executed by graphics multiprocessor 2834.

GPGPU cores 2862 can each include floating point units (FPUs) and/or integer arithmetic logic units (ALUs) that can be used to execute instructions of graphics multiprocessor 2834. GPGPU cores 2862 can be similar in architecture or can differ in architecture. A first portion of GPGPU cores 2862 can include a single precision FPU and an integer ALU while a second portion of GPGPU cores include a double precision FPU. FPUs can implement IEEE 754-2008 standard floating point arithmetic or enable variable precision floating point arithmetic. Graphics multiprocessor 2834 can additionally include one or more fixed function or special function units to perform specific functions such as, but not limited to, copy rectangle or pixel blending operations. One or more of GPGPU cores 2862 can also include fixed or special function logic.

GPGPU cores 2862 can include SIMD logic capable of performing a single instruction on multiple sets of data. GPGPU cores 2862 can physically execute SIMD4, SIMD8, and SIMD16 instructions and logically execute SIMD1, SIMD2, and SIMD32 instructions. SIMD instructions for GPGPU cores can be generated at compile time by a shader compiler or automatically generated when executing programs written and compiled for single program multiple data (SPMD) or SIMT architectures. Multiple threads of a program can be configured for an SIMT execution model that can be executed via a single SIMD instruction. For example, eight SIMT threads that perform same or similar operations can be executed in parallel via a single SIMD8 logic unit.

Memory and cache interconnect 2868 can include an interconnect network that connects each functional unit of graphics multiprocessor 2834 to register file 2858 and to shared memory 2870. Memory and cache interconnect 2868 may be a crossbar interconnect that allows load/store unit 2866 to implement load and store operations between shared memory 2870 and register file 2858. register file 2858 can operate at a same frequency as GPGPU cores 2862, thus data transfer between GPGPU cores 2862 and register file 2858 can have very low latency. Shared memory 2870 can be used to enable communication between threads that execute on functional units within graphics multiprocessor 2834. Cache memory 2872 can be used as a data cache for example, to cache texture data communicated between functional units and texture unit 2836. Shared memory 2870 can also be used as a program managed cache. Threads executing on GPGPU cores 2862 can programmatically store data within shared memory in addition to automatically cached data that is stored within cache memory 2872.

A parallel processor or GPGPU as described herein may be communicatively coupled to host/processor cores to accelerate graphics operations, machine-learning operations, pattern analysis operations, and various general purpose GPU (GPGPU) functions. A GPU may be communicatively coupled to host processor/cores over a bus or other interconnect (e.g., a high-speed interconnect such as, but not limited to, PCIe or NVLink). An SoC may include a parallel processor or GPGPU as described herein, where said parallel processor or said GPGPU is performed on said SoC. A GPU may be integrated on a package or chip as cores and communicatively coupled to cores over an internal processor bus/interconnect internal to a package or chip. Regardless a manner in which a GPU is connected, processor cores may allocate work to such GPU in a form of sequences of commands/instructions contained in a work descriptor. GPU then may use dedicated circuitry/logic for efficiently processing these commands/instructions to perform any of the operations described above or elsewhere herein.

In at least one embodiment, graphics multiprocessor 2834 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 29:
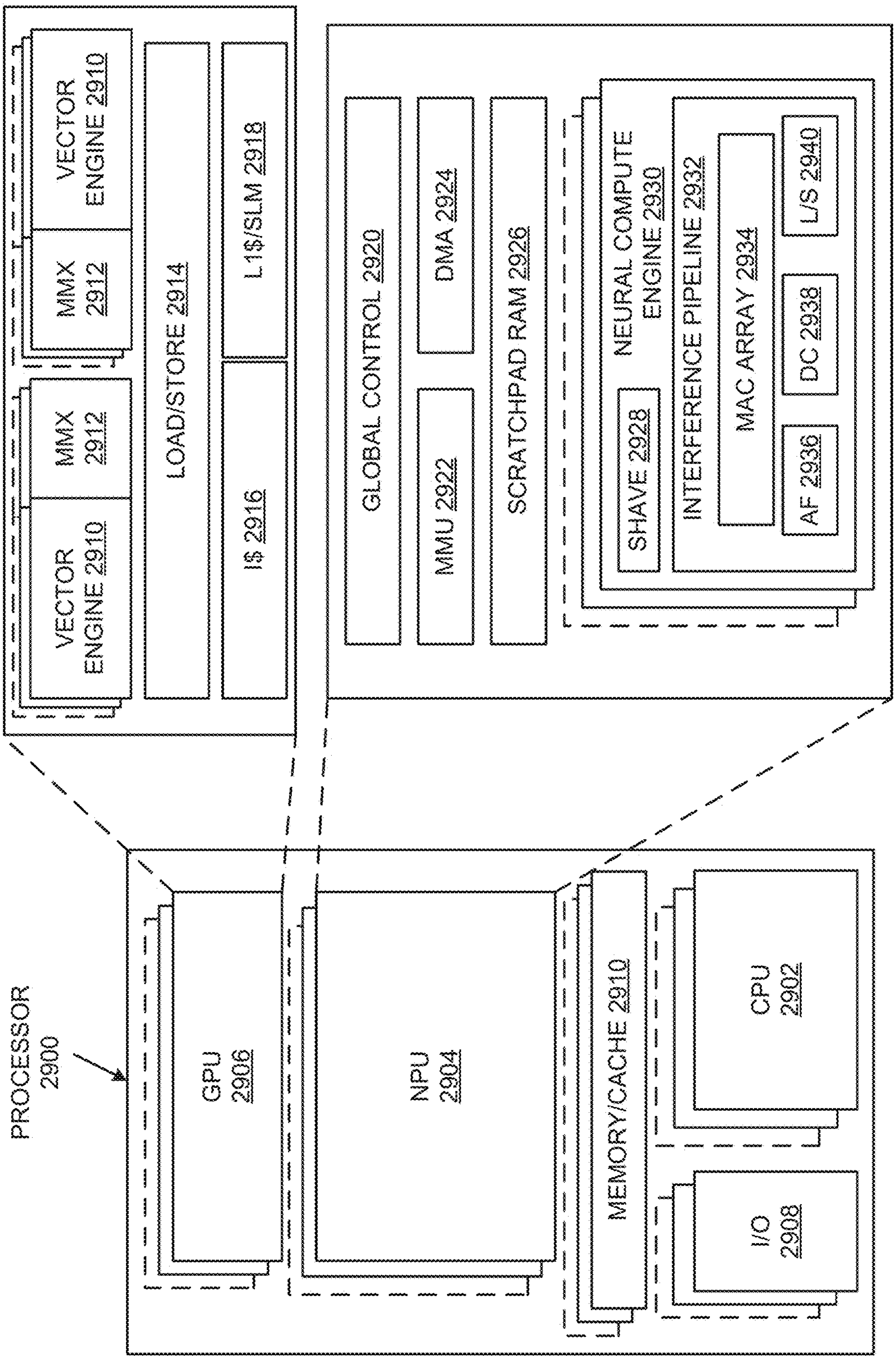
FIG. 29 illustrates an accelerator processor, in accordance with at least one embodiment.

FIG. 29 shows a processor 2900, in accordance with at least one embodiment. Processor 2900 can include a processor with hybrid architecture (e.g., Lunar Lake or Meteor Lake) from Intel Corporation in Santa Clara, CA or another processor that shares at least some of the components described herein. Processor 2900 can include one or more Central Processing Unit(s) (CPU 2902), one or more Graphics Processing Unit(s) (GPU 2906), and/or one or more Neural Processing Unit(s) (NPU 2908) that can be, e.g., a dedicated AI accelerator that offloads artificial intelligence (AI) workloads from the CPU and GPU. Processor 2900 can use instructions that, if executed cause processor 2900 and/or any of its components to perform some or all of processes and techniques described elsewhere herein. Processor 2900 may include any number of memory and cache units 2910 to facilitate processing amongst the different components. Memory and cache 2910 on processor 2900 may include one or more levels of cache (e.g., L1, L2, L3, and/or last-level cache) and high-bandwidth memory (e.g., HBM2e or HBM3) in any combination. With respect to processor 2900 and any of its components described above or elsewhere herein, one or more of APIs described herein can, for example, get compiled into instructions, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory. One or more of APIs described herein can include a call.

Processor 2900 can include compute engines as CPUs 2902 and can include any number of cores, such as, but not limited to, up to 16 cores/22 threads. Cores in CPU 2902 can include P-cores (Performance), E-cores (Efficient) & LP-E cores (Low-power Efficient). Performance-cores can be used for low latency single-threaded, compute-intensive workloads, while Efficient-cores can be used for multi-threaded, less compute-intensive workloads. Low-power Efficient cores can be used for scalable multithreaded performance and offloading background tasks. P-cores can be used for single & limited threading performance, whereas E- and LP-E cores can be used for multi-threaded throughput and power efficiency.

GPU 2906 can include any number of graphics engines, such as, but not limited to, Intel® Arc™ graphics engines (Xe LPG) with 8 Xe cores (up to 128 Execution Units or EUs). As shown in FIG. 29, GPU 2906 can include vector engines 2910 and matrix engines 2912, that, for example, can run FP, INT, and matrix operation tasks all at the same time or separately or in batches. GPU 2906 can include a load/store unit 2914, as well as other memory, such as, but not limited to, an instruction cache (I$) 2916 and L1 cache/subsystem local memory (SLM) 2918 that can, e.g., store instructions to perform any of the operations described above or elsewhere herein.

NPU 2904 can include one or more Intel® AI Boost built-in neural processing unit(s) (NPUs). NPU 2904 can be enumerated to the host processor as an integrated PCIe device. NPU 2904 can include one or more (e.g., two) Neural Compute Engine (NCE) tiles 2930. Each tile can be configured with any combination of, but not limited to, (e.g., 2000) Multiply Accumulate (MAC) Engines 2934, a Post Processing Engine (not shown), a AI DSP Processor (not shown), and memory (2 MB of dedicated SRAM) per tile as shown in FIG. 29. For general compute needs, Neural Compute Engines 2930 can include Streaming Hybrid Architecture Vector Engines (SHAVE) 2928 for high performance parallel computing, which can include DMA (Direct Memory Access) engines 2924 to shuttle the data between system memory DRAM (Dynamic Random Access Memory) 2926 and a software managed cache. Built-in device MMU (Memory Management Unit) 2922 plus IOMMU (Input-Output Memory Management Unit) (not shown) can support multiple simultaneous hardware contexts and provide security isolation between execution contexts as per MCDM (Microsoft Compute Driver Model) architecture. Processor 2900 can also include a media unit (not shown) that is included on or separately from the XCDs or other components of the processor to enable video playback and video processing of compressed or non-compressed data, such using HEVC, AV1, VP9 and AVC HW accelerated decode support and HEVC, VP9 and AVC HW accelerated encode support.

A Intel® Thread Director, which includes firmware that is built into the processor, can prioritize and manage distribution of workloads, sending tasks to optimized cores. For example, Thread Director can tie P-cores, E-cores and/or LP-E cores (described above) together with task-scheduling capabilities and ability to send less-demanding tasks to the E-cores or LP-E cores. Intel® Deep Learning Boost (Intel® DL Boost) (not shown) can provide built in AI acceleration for training and inference workloads, and may include VNNI (for CPU) and DP4a (for GPU) instruction set support. This instruction set may be optimized with OpenVINO™ Toolkit and oneAPI to accelerate INT8 inferencing. A software stack, e.g., as described elsewhere herein, can be used to enable AI inference using OpenVINO™ toolkit. Processor 2900 can be configured to execute an application program, such as, but not limited to, a CUDA program.

In at least one embodiment, processor 2900 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Processor 2900 can alternatively include a processor based on AI Engine Direct architecture from Qualcomm Corporation in Santa Clara, CA or another processor that shares at least some of the components described herein. that may include any number of NPUs, GPUs, CPUs and other related components, such as, but not limited to, NPU 2904 as a Hexagon NPU, GPU 2906 as a Adreno GPU, CPU 2902 as a Kryo or Qualcomm Oryon CPU, as well as a Qualcomm Sensing Hub (not shown) and a memory subsystem 2910, in any combination. Hexagon NPU 2904 can include a power rail a micro-tile inferencing unit, a hardware acceleration unit, a tensor unit, a scalar unit, and a vector unit (all not shown), which can have dedicated memory or share memory (e.g., cache or memory, such HBM3) for, e.g., storing instructions to perform any of the operations described above or elsewhere herein. Adreno GPU 2906 can provide graphics and parallel processing for AI in formats, such as, but not limited to, 32-bit floating point (FP32), 16-bit floating point (FP16), and 8-bit integer (INT8). Kryo or Qualcomm Oryon CPUs 2902 can perform AI workloads, and can handle contextualization for pervasive generative AI applications. CPU 2902 can also include an instruction fetch unit, a rename and retire unit, a memory management unit, a vector execution unit, an integer execution unit, and a load and store unit for processing and instruction management. With respect to processor 2900 and any of its components described above or elsewhere herein, one or more of APIs described herein can, for example, get compiled into instructions, which may be fetched by the instruction fetch unit, decoded by a processor decoder or equivalents, scheduled (e.g., in order or out of order) for execution by a scheduler or equivalents, executed by execution logic or equivalents, reordered, and then retired by the rename and retire unit. API(s) (and/or compiled instructions including API(s)) can be stored in any storage outside or inside of the processor (e.g., in cache and/or memory). Any number of CPU cores 2902 may be included in any number of CPU cluster(s) that can be coupled to memory and/or cache, such as, but not limited to a shared L2 cache. Memory can be separate or shared, e.g., CPU clusters of CPU cores 2902 can couple to memory subsystem 2910 that can include fabric, system level cache and any number of memory management units that can, for example, read and write memory (e.g., DRAM). Qualcomm Sensing Hub (not shown) includes micro NPUs, a power rail, and traditional sensors (a gyrometer, accelerometer, even a barometer) with voice and data streams. Memory subsystem 2910 can include memory and cache on processor 2900, which may include one or more levels of cache (e.g., L1, L2, L3, and/or last-level cache) and high-bandwidth memory (e.g., HBM2e or HBM3) in any combination, e.g., for storing information and/or instructions to perform any of the operations described above or elsewhere herein. All or some of the memory and/or cache in memory subsystem 2910 can be shared or used individually by any one or combinations of components (e.g., GPU 2906, NPU 2904, and CPU 2902) on processor 2900.

Qualcomm AI Engine 2900 may be programmed and controlled with an a software stack to perform some or all of the operations described herein, and include, e.g., a Qualcomm® Neural Processing SDK for inferencing with versions for Android, Linux, and Windows. Developer libraries and services support the latest programming languages, virtual platforms, and compilers. At a lower level of the software stack, system software includes the basic real-time operating system (RTOS), system interfaces, and drivers. Software stack supports different operating systems, including Android, Windows, Linux, and QNX, and deployment and monitoring infrastructure like Prometheus, Kubernetes, and Docker. For direct cross-platform access to the GPU, OpenCL and DirectML may be supported. For the CPU, a LLVM compiler infrastructure optimizations enable accelerated and efficient AI inference. With respect to Qualcomm AI Engine 2900 and any of its components described above or elsewhere herein, one or more of APIs described herein can, for example, get compiled into instructions, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory.

In at least one embodiment, processor 2900 or Qualcomm AI Engine 2900 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 30A:
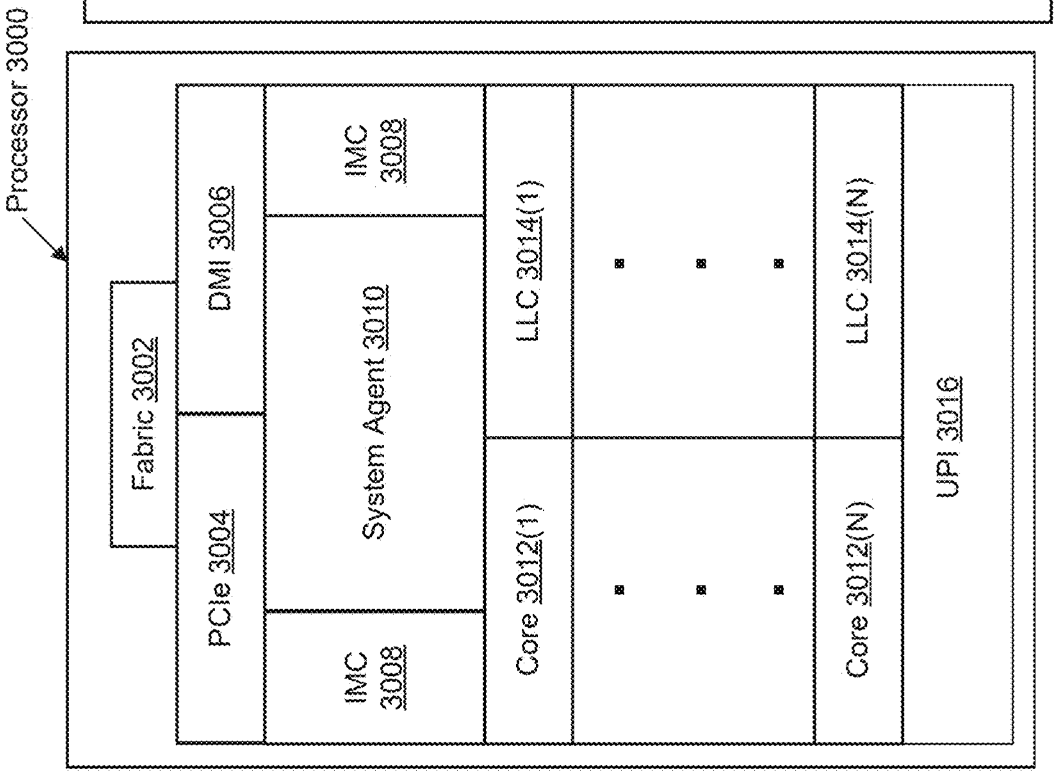
FIG. 30A illustrate a central processing unit, in accordance with at least one embodiment.

FIG. 30A illustrates a processor 3000, in accordance with at least one embodiment. Processor 3000 can include an processor with scalable family from Intel Corporation in Santa Clara, CA or another processor that shares at least some of the components described herein. Processor 3000 can include one or more cores 3012(1)-3012(N), where N is any integer greater than 1 that can perform the operations described elsewhere herein. Cores 3012(1)-3012(N) can be interlinked together using ring and/or mesh interconnects. With the mesh interconnects architecture, an array of vertical and horizontal communication paths may allow traversal from one core to another 3012(1)-3012(N) through a shortest path (hop on vertical path to correct row, and hop across horizontal path to correct column). For mesh interconnects, a die can house cores 3012(1)-3012(N) and can include a grid of converged mesh stops (CMS) that may be associated (e.g., 1:1) with cores 3012(1)-3012(N). Each core can be associated with one lower level cache (LLC) slice 3014(1)-3014(N), or cores 3012(1)-3012(N) can share cache, e.g., lower level cache. LLCs 3014(1)-3014(N) can be inclusive by incorporating blocks in higher level cache (e.g., L2 cache) or non-inclusive (having blocks that may be not present in higher level cache). Each core and LLC slice can include a Caching and Home Agent (CHA) (not shown) that can maintain cache coherency by providing scalability of resources across mesh interconnects for Intel® Ultra Path Interconnect (Intel® UPI 3016) cache coherency functionality. UPI 3016 can provide a coherent interconnect for scalable systems and can allow for multiple processors to share a single shared address space through links, such as, but not limited to, two or three UPI links per processor.

Processor 3000 can also include the System Agent 3010 that can house and/or perform various functionalities, such as, but not limited to, memory management, display functions, and/or input/output (I/O) functions. For example, processor 3000 can include one or more integrated memory controller(s) (IMC) 3008. IMC 3008 can control and manage memory, such as, but not limited to, different memory types e.g., DDR ram, like DDR4 or others described elsewhere herein. System Agent 3010 can include a display controller (not shown) to support display(s). System Agent 3010 can also incorporate PCIe 3004 (e.g., up to 20 lanes of PCIe), e.g., that can connect with an external dedicated graphics hookup over DMI bus (e.g., Intel's DMI 3.0 bus) 3006. System Agent 3010 can include an Image Processing Unit (IPU) (not shown) which incorporates an image signal processor (ISP) on-die. Fabric 3002 can provide scalability for connecting to other nodes (e.g., processors, such as processor 3000), and can, for example, be used with Cornelis Networks, an element of Intel® Scalable System Framework, that delivers the performance for high performance computing (HPC) workloads and the ability to scale to tens of thousands of nodes.

Figure 30B:
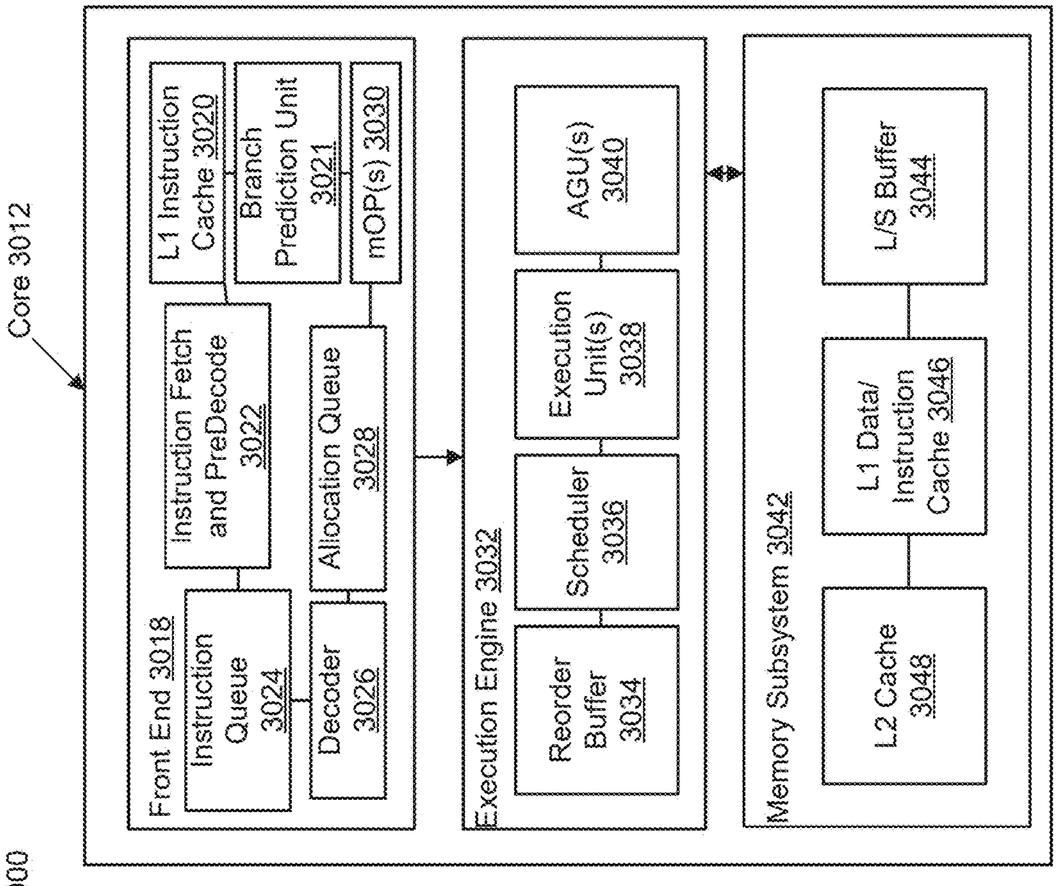
FIG. 30B illustrates a core of the central processing unit in FIG. 30A, in accordance with at least one embodiment.

FIG. 30B illustrates components within core 3012, in accordance with at least one embodiment. Core 3012 can include front-end 3018, back-end or execution engine 3032, and memory subsystem 3042. Front-end 3018 can provide execution engine 3032 with operations (e.g., operations described elsewhere herein) by decoding instructions stored in memory. For example, front-end 3018 can include a micro-operations (μOps) cache path and/or a legacy path, along with branch prediction unit 3020 that can determine paths instructions. A legacy path for instructions may include fetching variable-length (e.g., x86) instructions from L1 instruction cache, queuing the instructions in instruction queue 3024, and decoding instructions using decoder 3026 into u Ops that can be provided to allocation queue 3028. In the alternative, a μOPs cache path may include a cache containing already decoded μOps (μOps 3030) that can be sent to allocation queue 3028. Allocation queue 3028 can perform as an interface between front-end 3018 and execution engine 3032, and can provide instructions to execution engine 3032. One or more of API(s) described herein can, for example, get compiled into instructions that can be stored, processed, and executed by front-end 3018, execution engine 3032, and stored in memory subsystem 3042.

Execution engine 3032 can receive micro-operations into reorder buffer 3034, which can register allocation, rename, and retire μOPs. From the reorder buffer, μOPs can be sent to scheduler 3036 that can be connected one or more different execution units 3038. Execution units 3038 can perform, e.g., basic arithmetic logic unit (ALU) operations, multiplication, division, and/or more complex operations, such as, but not limited to, various vector operations. Scheduler 3036 may manage queuing μOPs for one or more of execution units 3038 depending, e.g., on operations needed to be performed.

Memory subsystem 3042 can process load and store requests as well as ordering operations. For example, μOPs may relate to memory access (e.g. load and store), and those can be sent on dedicated scheduler ports that can perform those memory operations. Store and load operations, for example, can be sent to load and store buffer(s) 3044. Memory subsystem 3042 can also include shared or separate L1 data and instruction cache 3046, as well as L2 cache 3048 that can be used and shared by L1 data and instruction cache 3046. As described above for FIG. 30A, each core 3012 can be connected to a slice of a third level of cache (e.g., LLC 3014) that can be shared by all core 3012.

In at least one embodiment, processor 3000 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 31:
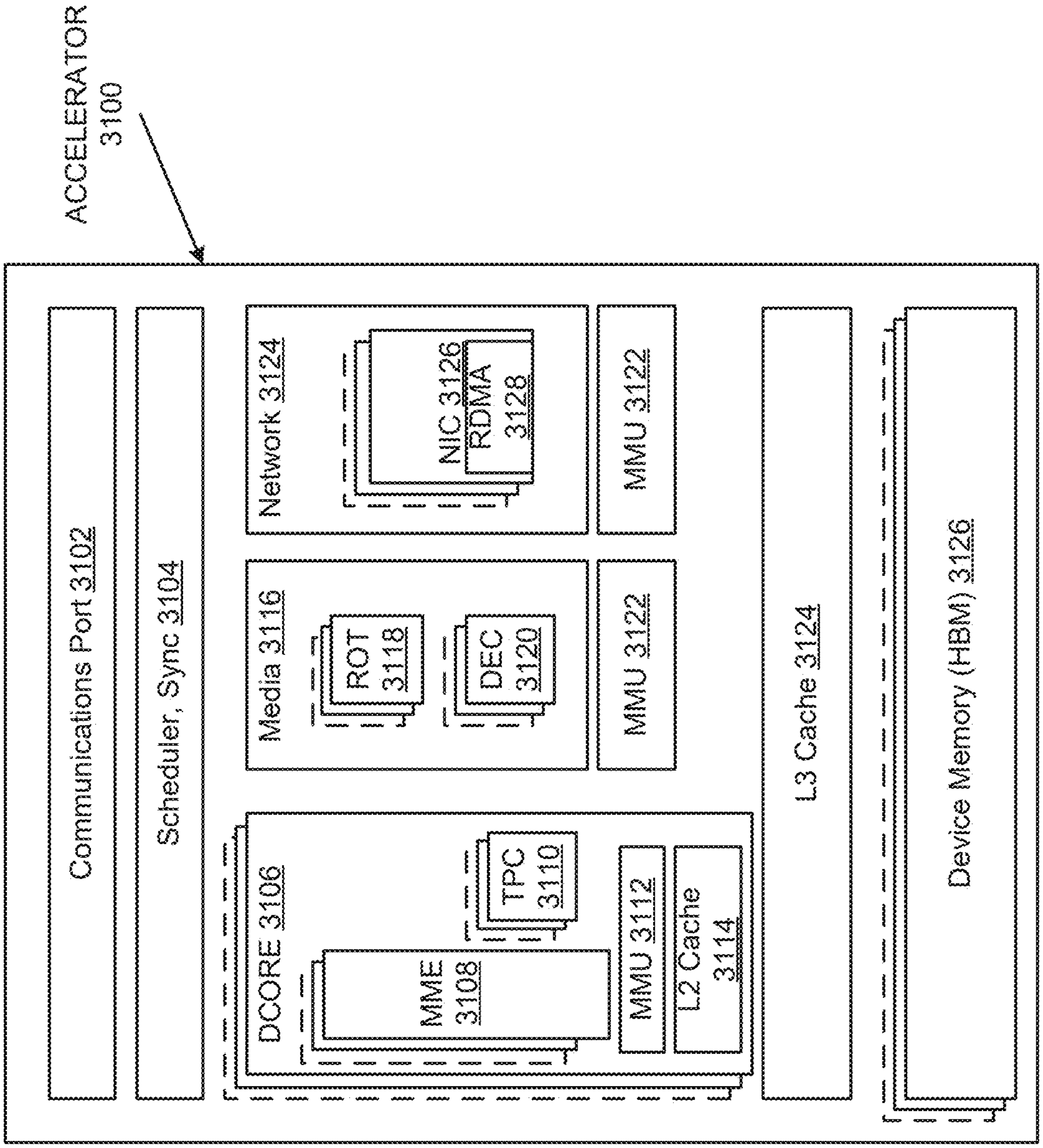
FIG. 31 illustrates another accelerator processor, in accordance with at least one embodiment.

FIG. 31 illustrates an AI accelerator 3100, in accordance with at least one embodiment. Processor 3100 can include a processor with AI accelerator architecture from Intel Corporation in Santa Clara, CA or another processor that shares at least some of the components described herein. AI accelerator 3100 may use instructions that, if executed by AI accelerator 3100, cause AI accelerator 3100 to perform some or all of processes and techniques described elsewhere herein. For example, with respect to AI accelerator 3100 and any of its components described above or elsewhere herein, one or more of APIs described herein can, for example, get compiled into instructions, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory. AI accelerator 3100 may include one or more compute dies that can include homogeneous or heterogeneous processors. Compute dies may include one or more central processing units (CPU), one or more graphics processing units (GPU), or combinations of both.

In at least one embodiment, compute dies may include compute engines to perform AI computations. In at least one embodiment, AI accelerator 3100 compute dies may be split into any number of (e.g., four) clusters that may be referred to as a DCORE (Deep Learning Core) 3106 and contain any number of Matrix Multiplication Engines (MMEs) 3108, Tensor Processor Cores (TPCs) 3110, and L2 Cache 3114, in any combination. MME(s) 3108 can perform operations that use Matrix Multiplication, like fully connected layers, convolutions and batched-General Matrix Multiplications (GEMMs). MMEs 3108 may be equipped with Multiply-Accumulate Units (MACs) (not shown) that, for example, may perform General Matrix Multiplication (GEMM) operations, such as, but not limited to, an A×B multiplication that involves generating tensor C[N×M] from two input tensors, A[N×K] and B[K×N]. MME(s) 3108 may be programmed with the array dimensions, locations, data types, and various execution operands. MME(s) 3108 can retrieve tensors A and B from memory, pulling them into its streaming buffers for the matrix multiplication to be performed in parallel by the MACs. MME(s) 3108 may push tensor C back to memory upon completion. TPC(s) 3110 may include any number of scalar units for performing scalar operations, any number of vector units for performing vector operations, any number of register files or local memory units (e.g., a vector local memory), and load and store components for instructions, which can be coupled to memory or cache (e.g., HBM, L3 cache and/or L2 cache) (all not shown). TPCs can support different types of parallel processing, e.g., Very Long Instruction Word (VLIW) Single-Instruction Multiple-Data (SIMD) that supports data types, such as, but not limited to, FP32, BF16, FP16 & FP8 (both E4M3 and E5M2), UINT32, INT32, UINT16, INT16, UINT8 and INT8 datatypes. Any number of compute dies may be connected through an interconnect. An interconnect among the compute dies can be over an interposer bridge that, e.g., is transparent to software.

Memory on AI Accelerator 3100 may include one or more levels of cache (e.g., L1, L2, L3, and/or last-level cache) and high-bandwidth memory (e.g., HBM2e or HBM3) in any combination. Memory and/or cache systems can be unified or separate. Compute dies of AI accelerator 3100 may include on-die memory that includes one or more levels (e.g., two-levels) of cache. On-die SRAM or other memory described elsewhere herein can be used as a uniformly accessible last-level cache (L3) or split to slices of L2 cache that may be accessible to groups of MMEs 3108 and TPCs 3110. Using the on-die memory as L2 or L3 cache can be fully configurable by software, which dynamically may decide per I/O tensor its optimal cache allocation. AI Accelerator 3100 may include one or more Memory Management Units (MMUs) 3122 for managing memory, such as allowing AI accelerator 3100 memory subsystem to operate in a virtual space when accessing VRAM.

AI accelerator 3100 may include a communications port (e.g., a PCIe Gen5 X16 port) 3102 for communicating with a host and Scheduling and Synchronization Unit 3104. AI accelerator 3100 may include Media Unit 3116 that may include any number or combinations of Media Decoder Engines (DECs) 3120 and Rotator Engines (ROT) 3118. AI accelerator 3100 may include a network unit 3124 that may include any number or combinations of network ports 3126 and the accompanied RDMA Engine(s) 3128, L2 Cache, and memory (e.g., HBM2e or HBM3) stacks. AI accelerator 3100 can incorporate a programmable Control Path entity (not shown) to manage the parallel and efficient execution of various engines. Control Path can include Submission Queues (SQs) that may be issued by the runtime system, Completion Queues (CQs) that may be used for job completion reporting, a Programmable Scheduling Mechanism that may be utilized for task scheduling, a Programmable Hardware Synchronization Mechanism or 'Sync Manager (SM)' that may be used for hardware synchronization, a Programmable Interrupt Service Mechanism or 'Interrupt Manager (INTR)' that can enable the passing of asynchronous events to drivers.

AI accelerator 3100 may include media decoding units that support Video Formats, such as, but not limited to, HEVC, Progressive H.264, SVC base layer, MVC, VP9, JPEG, Progressive JPEG. AI accelerator 3100 may support post processing of decoded media streams, such as, but not limited to, image down-scaling (resizing the image), vertical and horizontal scaling at different scaling ratios, Image up-scaling, Image cropping, bilinear scaling, and Lancos scaling. AI accelerator 3100 may implement two post processing channels per decoder unit, one with scalar (up and down) and one just to output the original image. AI accelerator 3100 may include a hardware rotator engine that performs the following transformations of an input image: 2D rotation, 3D rotation, Projection, distorting and undistorting images, resampling input data at user-defined coordinates, and rescaling.

RDMA 3128 over Converged Ethernet on AI accelerator 3100 may enable scaling from a single node (i.e., a single AI Accelerator 3100 to hundreds or thousands of nodes or AI Accelerators 3100). NW Subsystem 3124 can include an Intel® Gaudi® Communication Library (IGCL), a master conductor that orchestrates data movement, and a programable scheduling mechanism that can enable smooth activation of engines while maintaining task dependencies. A accelerator networking sub-system can include Gigabit Ethernet NIC ports 3126, a Layer2 MAC (not shown), and RDMA Engines 3128. AI Accelerator 3100 can include Aggregation Engines for performing summing activities. All engines in processor 3100 can operate in parallel, e.g., MME(s) 3108, TPC(s) 3110 and NIC(s) 3126 can all work at the same time. There can be dependency between operations running on different engines, e.g., the output of one engine can be used as the input of another engine, and/or MME, TPC and NIC can be scheduled to run in parallel. When one engine has completed its executing operation, another engine can be scheduled to start working on the next operation (immediately upon readiness of its inputs).

AI Accelerator 3100 can be operated and controlled using software layer 3128 that may include low-level components, such as, but not limited to, a graph compiler, an automatic kernel fuser and a library of precompiled kernels, as well as integration to AI ecosystems, such as, but not limited to, PyTorch, DeepSpeed, Hugging Face, vLLM, Ray and more, or as described elsewhere herein with respect to software and programming platforms. Software layer 3128 may include implementations of algorithms, such as, but not limited to, Paged Attention, Flash Attention and more. Software layer 3128 may generate optimized binary code that implements the given model topology, such as, but not limited to, performing operator fusion, data layout management, parallelization, pipelining and memory management, and graph-level optimizations.

In at least one embodiment, AI accelerator 3100 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 32:
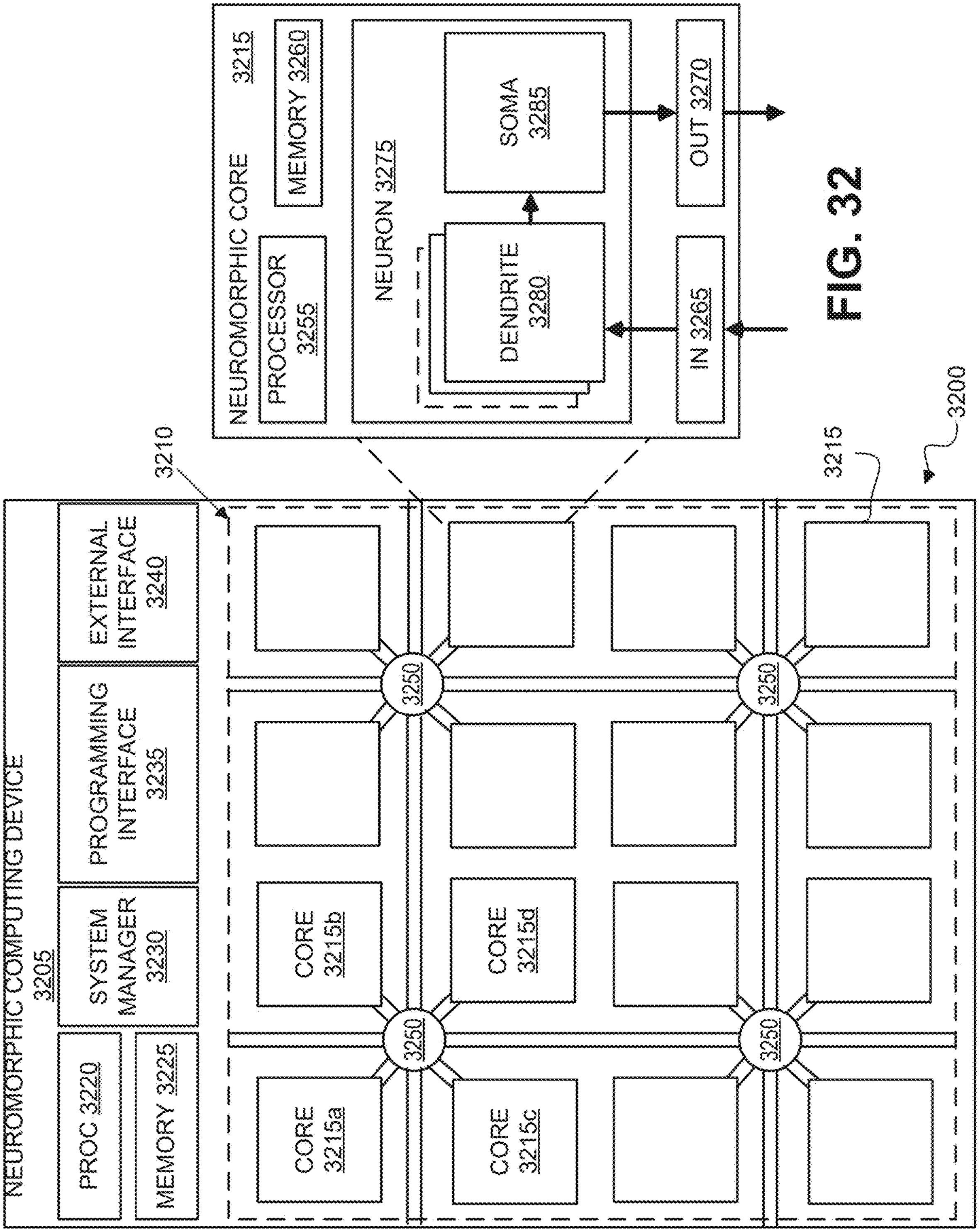
FIG. 32 illustrates a neuromorphic processor, in accordance with at least one embodiment.

A neuromorphic computing system is described that adopts a multicore architecture where each core houses the computing elements including neurons, synapses with on-chip learning capability, and local memory to store synaptic weights and routing tables. FIG. 32 is a simplified block diagram 3200 illustrating an example of at least a portion of such a neuromorphic computing device 3205, in accordance with at least one embodiment. Neuromorphic computing device 3205 can include a neuromorphic processor from Intel Corporation in Santa Clara, CA or another processor that shares at least some of the components described herein. As shown in this example, a device 3205 may be provided with a network 3210 of multiple neural network cores interconnected by an on-device network such that multiple different connections may be potentially defined between the cores. For instance, a network 3210 of spiking neural network cores may be provided in the device 3205 and may each communicate via short packetized spike messages sent from core to core over the network channels. Each core (e.g., 3215) may possess processing and memory resources and logic to implement some number of primitive nonlinear temporal computing elements, such as, but not limited to, multiple (e.g., 1000+) distinct artificial neurons (referred to herein as "neurons"). For instance, each core may be capable of concurrently implementing multiple neurons such that the collection of neuromorphic cores may implement many multiples of neurons using the device. With respect to neuromorphic computing device 3205 and any of its components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory equivalents.

Continuing with the example of FIG. 32, a neuromorphic computing device 3205 may additionally include a processor 3220 and system memory 3225 to implement one or more components to manage and provide functionality of the device. For instance, a system manager 3230 may be provided to manage global attributes and operations of the device (e.g., attributes affecting the network of cores 3210, multiple cores in the network, interconnections of the device 3205 with other devices, manage access to global system memory 3225, among other potential examples). In one example, a system manager 3230 may manage the definition and provisioning of a specific routing tables to the various routers in the network 3210, orchestration of a network definition and attributes (e.g., weights, decay rates, etc.) to be applied in the network, core synchronization and time multiplexing management, routing of inputs to the appropriate cores, among other potential functions.

As another example, a neuromorphic computing device 3205 may additionally include a programming interface 3235 through which a user or system may specify a neural network definition to be applied (e.g., through a routing table and individual neuron properties) and implemented by the mesh 3210 of neuromorphic cores. A software-based programming tool may be provided with or separate from the neuromorphic computing device 3205 through which a user may provide a definition for a particular neural network to be implemented using the network 3210 of neuromorphic cores. The programming interface 3235 may take the input of the programmer to then generate corresponding routing tables and populate local memory of individual neuromorphic cores (e.g., 3215) with the specified parameters to implement a corresponding, customized network of artificial neurons implemented by the neuromorphic cores.

In some cases, a neuromorphic computing device 3205 may advantageously interface with and interoperate with other devices, including general purpose computing devices, to realize certain applications and use cases. Accordingly, external interface logic 3240 may be provided in some cases to communicate (e.g., over one or more defined communication protocols) with one or more other devices. An external interface 3240 may be utilized to accept input data from another device or external memory controller acting as the source of the input data. An external interface 3240 may be additionally or alternatively utilized to allow results or output of computations of a neural network implemented using the neuromorphic computing device 3205 to be provided to another device (e.g., another general purpose processor implementing a machine learning algorithm) to realize additional applications and enhancements, among other examples.

As shown in FIG. 32, a network 3210 of multiple neural network cores interconnected by an on-device network is shown illustrating a portion of a network fabric interconnecting multiple neuromorphic cores (e.g., 3215 a-d). For instance, a number of neuromorphic cores (e.g., 3215 a-d) may be provided in a mesh, with each core being interconnected by a network including a number of routers (e.g., 3250). In one implementation, each neuromorphic core (e.g., 3215 a-d) may be connected to a single one of the routers (e.g., 3250) and each of the routers may be connected to at least one other router (as shown at 3210 in FIG. 32). As an example, in one particular implementation, four neuromorphic cores (e.g., 3215 a-d) may be connected to a single router (e.g., 3250) and each of the routers may be connected to two or more other routers to form a manycore mesh, allowing each of the neuromorphic cores to interconnect with each other neuromorphic core in the device. Moreover, as each neuromorphic core may be configured to implement multiple distinct neurons, the router network of the device may similarly enable connections, or artificial synapses (or, simply, "synapses"), to be defined between any two of the potentially many (e.g., 30,000+) neurons defined using the network of neuromorphic cores provided in a neuromorphic computing device.

FIG. 32 shows a block diagram illustrating internal components of one example implementation of a neuromorphic core 3215. In one example, a single neuromorphic core may implement some number of neurons (e.g. 1024) that share architectural resources of the neuromorphic core in a time-multiplexed manner. In one example, each neuromorphic core 3215 may include a processor block 3255 capable of performing arithmetic functions and routing in connection with the realization of a digitally implemented artificial neuron, such as, but not limited to, explained herein. Each neuromorphic core 3215 may additionally provide local memory in which a routing table may be stored and accessed for a neural network, accumulated potential of each soma of each neuron implemented using the core may be tracked, parameters of each neuron implemented by the core may be recorded, among other data and usage. Components, or architectural resources, of a neuromorphic core 3215 may further include an input interface 3265 to accept input spike messages generated by other neurons on other neuromorphic cores and an output interface 3270 to send spike messages to other neuromorphic cores over the mesh network. In some instances, routing logic for the neuromorphic core 3215 may be at least partially implemented using the output interface 3270. Further, in some cases, a core (e.g., 3215) may implement multiple neurons within an example SNN and some of these neurons may be interconnected. In such instances, spike messages sent between the neurons hosted on the particular core may forego communication over the routing fabric of the neuromorphic computing device and may instead by managed locally at the particular neuromorphic core.

Each neuromorphic core may additionally include logic to implement, for each neuron 3275, an artificial dendrite 3280 and an artificial soma 3285 (referred to herein, simply, as "dendrite" and "soma" respectively). The dendrite 3280 may be a hardware-implemented process that receives spikes from the network. The soma 3285 may be a hardware-implemented process that receives each dendrite's accumulated neurotransmitter amounts for the current time and evolves each dendrite and soma's potential state to generate outgoing spike messages at the appropriate times. A dendrite 3280 may be defined for each connection receiving inputs from another source (e.g., another neuron). In one implementation, the dendrite process 3280 may receive and handle spike messages as they serially arrive in time-multiplexed fashion from the network. As spikes are received, the neuron's activation (tracked using the soma 3285 (and local memory 3260)) may increase. When the neuron's activation exceeds a threshold set for the neuron 3275, the neuron may generate a spike message that is propagated to a fixed set of fanout neurons via the output interface 3270. The network distributes the spike messages to all destination neurons, and in response those neurons, in turn, may update their activations in a transient, time-dependent manner, and so on, potentially causing the activation of some of these destination neurons to also surpass corresponding thresholds and trigger further spike messages, as in real biological neural networks.

As noted above, a neuromorphic computing device may reliably implement a spike-based model of neural computation. Such models may also be referred to as Spiking Neural Networks (SNNs). In addition to neuronal and synaptic state, SNNs also incorporate the concept of time. For instance, in an SNN, communication occurs over event-driven action potentials, or spikes, that convey no explicit information other than the spike time as well as an implicit source and destination neuron pair corresponding to the transmission of the spike. Computation occurs in each neuron as a result of the dynamic, nonlinear integration of weighted spike input. In some implementations, recurrence and dynamic feedback may be incorporated within an SNN computational model. Further, a variety of network connectivity models may be adopted to model various real world networks or relationships, including fully connected (all-to-all) networks, feed-forward trees, fully random projections, "small world" networks, among other examples. A homogeneous, two-dimensional network of neuromorphic cores, such as, but not limited to, shown in the example of FIG. 32 may advantageously supports all of these network models. As all cores of the device may be connected, all neurons defined in the cores may be therefore also fully connected through some number of router hops. The device may further include fully configurable routing tables to define a variety of different neural networks by allowing each core's neurons to distribute their spikes to any number of cores in the mesh to realize fully arbitrary connectivity graphs.

In an improved implementation of a system capable of supporting SNNs, such as, but not limited to, the very large scale integration (VLSI) hardware device illustrated in the example of FIG. 9, high speed and reliable circuits may be provided to implement SNNs to model the information processing algorithms as employed by the brain, but in a more programmable manner. For instance, while a biological brain can only implement a specific set of defined behaviors, as conditioned by years of development, a neuromorphic processor device may provide the capability to rapidly reprogram all neural parameters. Accordingly, a single neuromorphic processor may be utilized to realize a broader range of behaviors than those provided by a single slice of biological brain tissue. This distinction may be realized by adopting a neuromorphic processor with neuromorphic design realizations that differ markedly from those of the neural circuits found in nature.

As an example, a neuromorphic processor may utilize time-multiplexed computation in both the spike communication network and the neuron machinery of the device to implement SNNs. Accordingly, the same physical circuitry of the processor device may be shared among many neurons to realize higher neuron density. With time multiplexing, the network can connect N cores with O(N) total wiring length, whereas discrete point-to-point wiring would scale as O(N2), realizing a significant reduction in wiring resources to accommodate planar and non-plastic VLSI wiring technologies, among other examples. In the neuromorphic cores, time multiplexing may be implemented through dense memory allocation, for instance, using Static Random Access Memory (SRAM), with shared buses, address decoding logic, and other multiplexed logic elements. State of each neuron may be stored in the processor's memory, with data describing each neuron state including state of each neuron's collective synapses, all currents and voltages over its membrane, among other example information (such as, but not limited to, configuration and other information).

A neuromorphic processor may adopt a "digital" implementation that diverts from other processors adopting more "analog" or "isomorphic" neuromorphic approaches. For instance, a digital implementation may implement the integration of synaptic current using digital adder and multiplier circuits, as opposed to the analog isomorphic neuromorphic approaches that accumulate charge on capacitors in an electrically analogous manner to how neurons accumulate synaptic charge on their lipid membranes. The accumulated synaptic charge may be stored, for instance, for each neuron in local memory of the corresponding core. Further, at the architectural level of an example digital neuromorphic processor, reliable and deterministic operation may be realized by synchronizing time across the network of cores such that any two executions of the design, given the same initial conditions and configuration, will produce identical results. Asynchrony may be preserved at the circuit level to allow individual cores to operate as fast and freely as possible, while maintaining determinism at the system level. Accordingly, the notion of time as a temporal variable may be abstracted away in the neural computations, separating it from the "wall clock" time that the hardware utilized to perform the computation. Accordingly, in some implementation, a time synchronization mechanism may be provided that globally synchronizes the neuromorphic cores at discrete time intervals. The synchronization mechanism allows the system to complete a neural computation as fast as the circuitry allows, with a divergence between run time and the biological time that the neuromorphic system models.

In operation, the neuromorphic mesh device may begin in an idle state with all neuromorphic cores inactive. As each core asynchronously cycles through its neurons, it generates spike messages that the mesh interconnect routes to the appropriate destination cores containing all destination neurons. As the implementation of multiple neurons on a single neuromorphic core may be time-multiplexed, a time step may be defined in which all spikes involving the multiple neurons may be processed and considered using the shared resources of a corresponding core. As each core finishes servicing its neurons for a respective time step, the cores may, in some implementations, communicate (e.g., using a handshake) with neighboring cores using synchronization messages to flush the mesh of all spike messages in flight, allowing the cores to safely determine that all spikes have been serviced for the time step. At that point all cores may be considered synchronized, allowing them to advance their time step and return to the initial state and begin the next time step.

Given this context, and as introduced above, a device (e.g., 3205) implementing a mesh 3210 of interconnected neuromorphic cores may be provided, with the core implementing potentially multiple artificial neurons capable of being interconnected to implement an SNN. Each neuromorphic core (e.g., 3215) may provide two loosely coupled asynchronous processes: an input dendrite process (e.g., 3280) that receives spikes from the network and applies them to the appropriate destination dendrite compartments at the appropriate future times, and an output soma process (e.g., 3285) that receives each dendrite compartment's accumulated neurotransmitter amounts for the current time and evolves each dendrite and soma's membrane potential state, generating outgoing spike messages at the appropriate times (e.g., when a threshold potential of the soma has been reached). Note that, from a biological perspective, the dendrite and soma names used here only approximate the role of these functions and should not be interpreted too literally.

In at least one embodiment, neuromorphic computing device 3205 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 33:
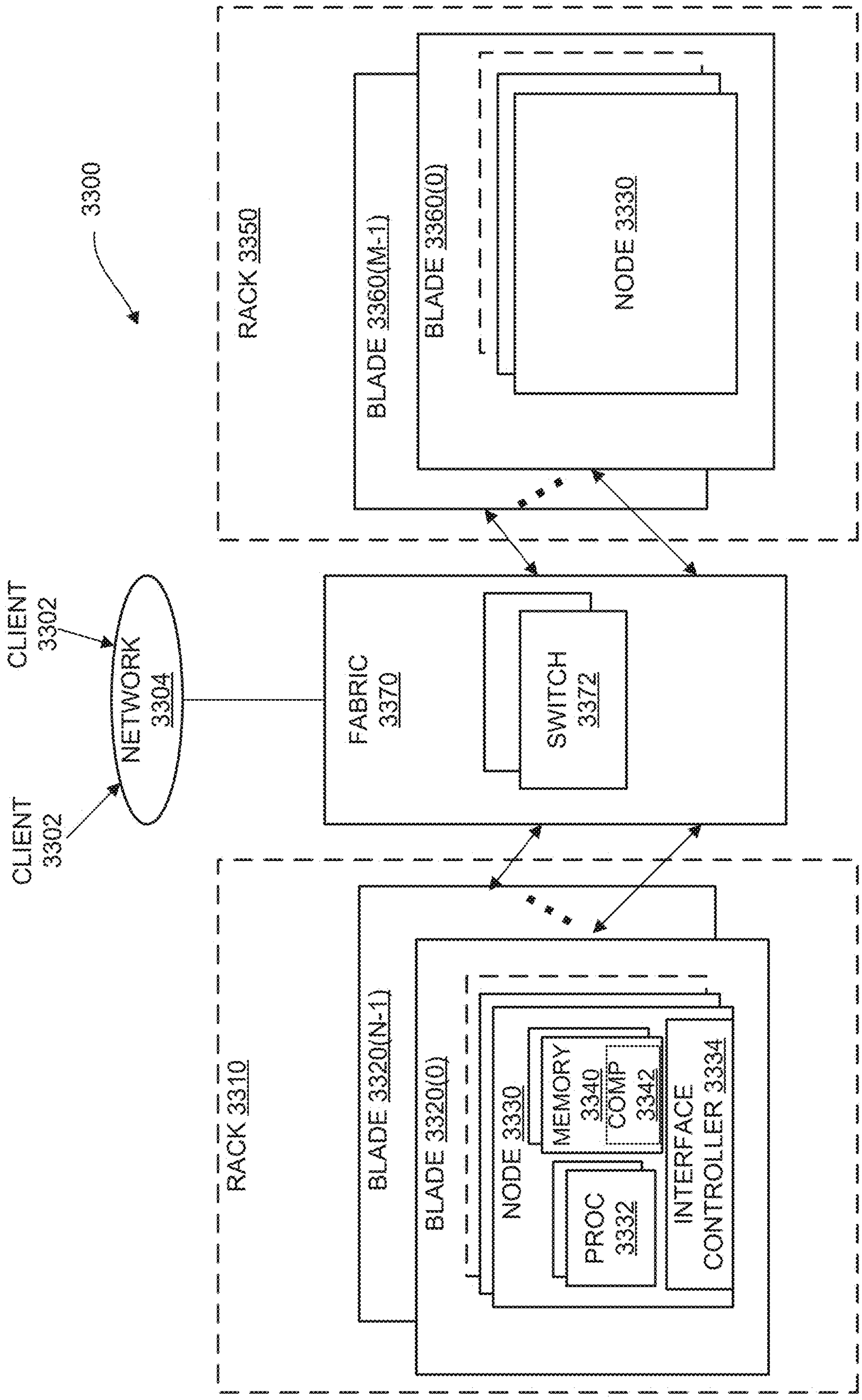
FIG. 33 illustrates a supercomputer, in accordance with at least one embodiment.

FIG. 33 is a block diagram of an embodiment of a multi-node network in which remote memory computation can be implemented, in accordance with any embodiment. System 3300 may represent a network of nodes described herein that can, e.g., be used to perform some or all of the operations described herein. System 3300 can represent a data center. System 3300 may represent a server farm. System 3300 may represent a data cloud or a processing cloud. System 3300 can represent a supercomputer. System 33 may include tens, hundreds, or thousands of nodes. The nodes of system 3300 may include processors, such as, but not limited to, central processing units (CPUs), graphics processing units (GPUs), or any combination of processors described herein, such as, but not limited to, other processors in FIGS. 27-39. With respect to any of the processors in system 3300 and any of its components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory equivalents. System 3300 may include over nine thousand nodes, with each node including two Intel Xeon Max processors, six Intel Max series GPUs and a unified memory architecture, such as, but not limited to, that used in the Intel Aurora Supercomputer from the Intel Corporation in Santa Clara, CA or another supercomputer that shares at least some of the components described herein.

One or more clients 3302 make requests over network 3304 to system 3300. Network 3304 represents one or more local networks, or wide area networks, or a combination. Clients 3302 can be human or machine clients, which generate requests for the execution of operations by system 3300. System 3300 executes applications or data computation tasks requested by clients 3302.

System 3300 can include one or more racks, which represent structural and interconnect resources to house and interconnect multiple computation nodes. Rack 3310 can include multiple nodes 3330. rack 3310 may host multiple blade components 3320. Hosting can refer to providing power, structural or mechanical support, and interconnection. Blades 3320 can refer to computing resources on printed circuit boards (PCBs), where a PCB houses the hardware components for one or more nodes 3330. Blades 3320 may or may not include a chassis or housing or other "box" other than that provided by rack 3310. Blades 3320 may include housing with exposed connector to connect into rack 3310. System 3300 may or may not include rack 3310, and each blade 3320 can include a chassis or housing that can stack or otherwise reside in close proximity to other blades and allow interconnection of nodes 3330. System 3300 may include 10,624 compute blades, which include 63,744 Intel Max Series GPUs and 21,248 Intel Xeon Max CPUs across 166 racks.

System 3300 can include fabric 3370, which represents one or more interconnectors for nodes 3330. Fabric 3370 can include multiple switches 3372 or routers or other hardware to route signals among nodes 3330. Additionally, fabric 3370 can couple system 3300 to network 3304 for access by clients 3302. In addition to routing equipment, fabric 3370 can be considered to include the cables or ports or other hardware equipment to couples nodes 3330 together. Fabric 3370 can have one or more associated protocols to manage the routing of signals through system 3300. The protocol or protocols is at least partly dependent on the hardware equipment used in system 3300.

As illustrated, rack 3310 can include N blades 3320. In addition to rack 3310, system 3300 can include rack 3350. As illustrated, rack 3350 may include M blades 3360. M is not necessarily the same as N; thus, it will be understood that various different hardware equipment components could be used, and coupled together into system 3300 over fabric 3370. Blades 3360 can be the same or similar to blades 3320. Nodes 3330 can be any type of node as described herein, and may not be necessarily all the same type of node. System 3300 is not limited to being homogenous, nor is it limited to not being homogenous.

A node in blade 3320(0) is illustrated in detail. However, other nodes in system 3300 can be the same or similar. At least some nodes 3330 may be computation nodes, with processor 3332 and memory 3340. A computation node refers to a node with processing resources (e.g., one or more processors) that executes an operating system and can receive and process one or more tasks. At least some nodes 3330 can include storage server nodes with a server as processing resources 3332 and memory 3340. A storage server refers to a node with more storage resources than a computation node, and rather than having processors for the execution of tasks, a storage server includes processing resources to manage access to the storage nodes within the storage server.

Node 3330 can include interface controller 3334, which can represent logic to control access by node 3330 to fabric 3370. Logic can include hardware resources to interconnect to the physical interconnection hardware. Logic can include software or firmware logic to manage the interconnection. Interface controller 3334 can be or includes a host fabric interface, which can be a fabric interface in accordance with any embodiment described herein.

Node 3330 may include memory subsystem 3340. Memory 3340 can include memory computation resources (comp) 3342, which represent one or more capabilities by memory 3340 to perform memory computations. System 3300 enables remote memory operations, such as, but not limited to, the operations described elsewhere herein. Thus, nodes 3330 can request memory computations by remote nodes, where data for the computation remains local to the executing node instead of being sent over fabric 3370 or instead of being sent from the memory to the fabric interface. In response to execution of the memory computation, the executing node can provide a result to the requesting node.

Processor 3332 can include one or more separate processors. Each separate processor can include a single processing unit, a multicore processing unit, or a combination. The processing unit can be a primary processor such as, but not limited to, a CPU (central processing unit), a peripheral processor such as, but not limited to, a GPU (graphics processing unit), or a combination. Memory 3340 can be or include memory devices and a memory controller.

Reference to memory devices can apply to different memory types. Memory devices generally refer to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as, but not limited to, synchronous DRAM (SDRAM). A memory subsystem as described herein may be compatible with a number of memory technologies, such as, but not limited to, DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideI02), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion by JEDEC), or others or combinations of memory technologies, and technologies based on derivatives or extensions of such specifications.

In addition to, or alternatively to, volatile memory, in one embodiment, reference to memory devices can refer to a nonvolatile memory device whose state is determinate even if power is interrupted to the device. In one embodiment, the nonvolatile memory device is a block addressable memory device, such as, but not limited to, NAND or NOR technologies. Thus, a memory device can also include a future generation nonvolatile devices, such as, but not limited to, a three dimensional crosspoint (3DXP) memory device, other byte addressable nonvolatile memory devices, or memory devices that use chalcogenide phase change material (e.g., chalcogenide glass). In one embodiment, the memory device can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

In at least one embodiment, system 3300 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 34:
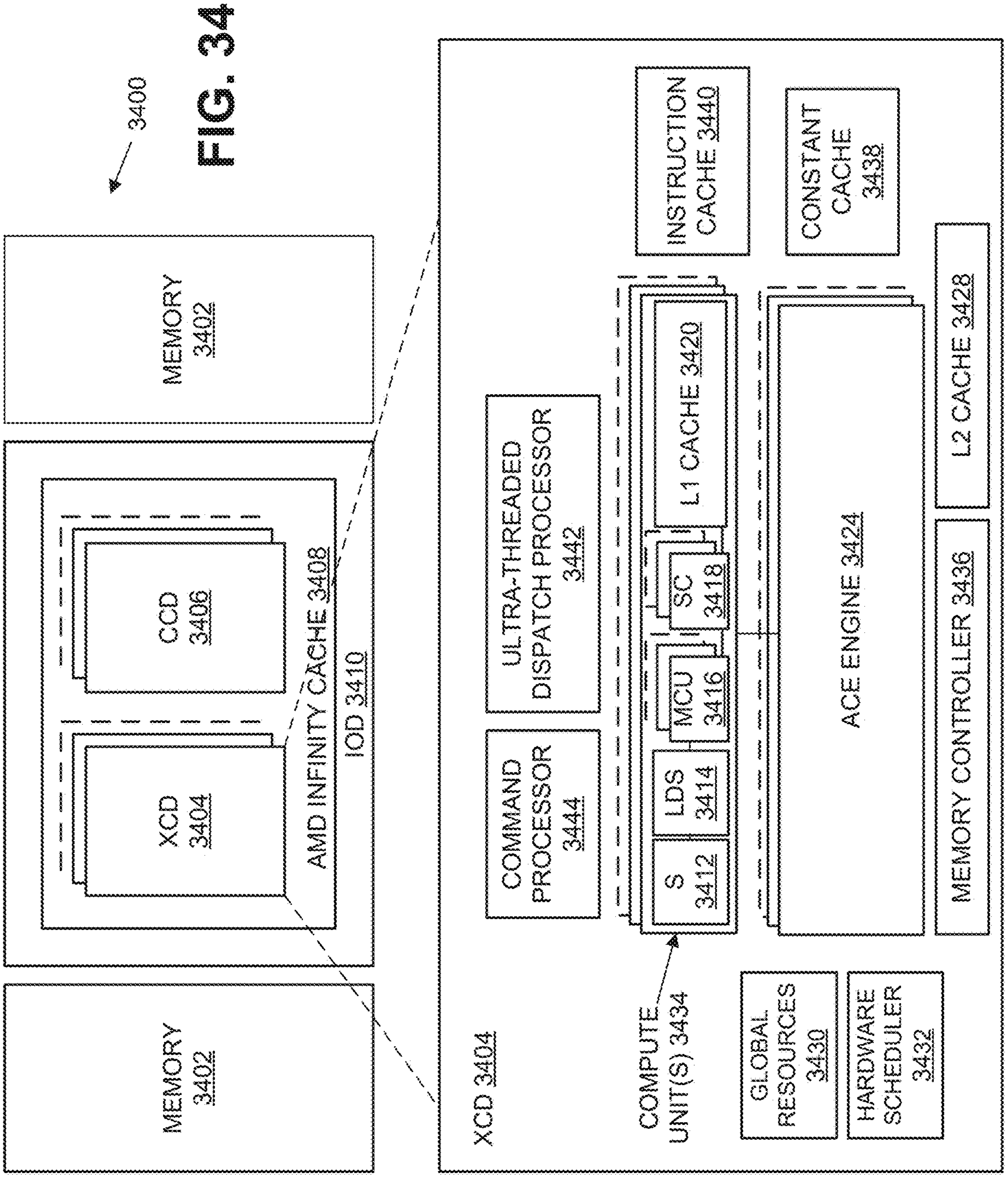
FIG. 34 illustrates another accelerator processor, in accordance with at least one embodiment.

FIG. 34 illustrates accelerated processing unit 3400, in accordance with at least one embodiment. Accelerated processing unit 3400 can include a processor based on CDNA architecture from AMD Corporation in Santa Clara, CA or another processor that shares at least some of the components described herein. Accelerated processing unit 3400 can include one or more accelerator complex dies (XCDs) 3404 for performing operations described elsewhere herein, such as, but not limited to, graphics processing and/or parallel processing as well as computations with instruction-level parallelism, including support for a broad range of precisions (INT8, FP8, BF16, FP16, TF32, FP32, and FP64) and sparse matrix data (i.e. sparsity). XCDs may, in some instances, be referred to as Graphics Compute Dies (GCDs). Accelerated processing unit 3400 can include one or more complex compute dies (CCDs) 3406 for performing operations described elsewhere herein, such as, but not limited to, those operations performed by host processors. CCDs may, in some instances, be referred to as core complexes or CCXs, such as, but not limited to, CCXs used in AMD Ryzen processors. XCDs and CCDs can share any type of cache or memory (e.g., one or more memory units 3402), or have cache or memory allocated to each XCD or CCD or groups of XCDs or CCDs. For example, on-package AMD Infinity Fabric connects XCDs and CCD into shared AMD Infinity Cache 3408 and, in some embodiments, high-bandwidth memory (e.g., HMB3). Accelerated processing unit 3400 can include an AMD MI300a processor that includes three CPU chiplets (or CCDs) and six accelerator chiplets (XCDs) on top of four input-output dies (IODs) that may be layered on a piece of silicon that links them together (e.g., via AMD Infinity Fabric) to eight stacks of high-bandwidth DRAM that ring the superchip. An AMD MI300x processor substitutes the CCDs for two more XCDs, for an accelerator-only system.

Accelerated processing unit 3400 can include one or more input/output (I/O) interfaces. For example, XCDs 3404 and CCDs 3406 can be together on one or more input-output dies (IODs) 3410 that can include one or more I/O interfaces. IODs 3410 can include of any number and type of I/O interfaces (e.g., PCI, PCI-Extended ("PCI-X"), PCIe, gigabit Ethernet ("GBE"), USB, etc.). Various types of peripheral devices can be coupled to I/O interfaces 3470. I/O interfaces from IODs 3410 can also be used for connected one or more accelerated processing units 3400, e.g., in a server architecture.

Accelerated processing unit 3400 can include one or more memory units 3402 for storing instructions and other information used to perform operations described elsewhere herein. Memory units 3402 can include any volatile memory, such as, but not limited to, memory types described elsewhere herein and can include, e.g., high-bandwidth memory (e.g., HMB3) or high-bandwidth DRAM. Memory associated with accelerated processing unit 3400 (e.g., memory units 3402) can include system memory that can be used, for example, for commands, instructions and constants, and inputs and outputs. Memory units 3402 can also include device memory that can be used as storage and, for example, for commands, instructions and constants, and inputs and outputs, as return buffer(s) and for private data. Memory units 3402 can be linked to one or more IODs 3410. In at least on embodiment, L1 cache 3420 starts a memory hierarchy that includes shared L2 cache 3428, e.g., within the XCDs. AMD Infinity Cache™, which is a last level cache (LLC) located on an active I/O die (IOD). CCDs 3406 and XCDs 3404 may have separate or shared memory. AMD Infinity Architecture and AMD Infinity Fabric™ technology can enable coherent, high-throughput unification of GPU and CPU chiplet technologies (e.g., XCDs, CCDs, and/or CCXs) with memory (e.g., stacked HBM3 memory) in single devices and across multi-device platforms.

As shown in FIG. 34, an XCD 3404 can include a shared set of global resources 3430, which can include hardware scheduler 3432 and Asynchronous Compute Engines (ACE) 3424 that send tasks (e.g., compute shader workgroups) to Compute Units (CUs or cores) 3434. ACEs 3424 (e.g., four) can be each associated with CUs 3434 (e.g., 40 CUs), and some of the CUs can be disabled for yield management. CUs 3434 can have dedicated cache or share cache (e.g., L2 cache) 3428 that may be used to coalesce all the memory traffic for the die. CUs 3434 can include threaded and parallel processor cores including instruction fetching and scheduling with Scheduler(S) 3412, matrix core unit (MCU) 3416 and shader core (SC) 3418 (e.g., execution units for scalar, vector and matrix data types), as well as load/store pipelines with an L1 cache 3420 and Local Data Share (LDS) 3414. Local data share can include, for example, a scratch RAM with built-in arithmetic capabilities that allow data to be shared between threads in a workgroup. An instruction cache 3440 (e.g., for storing and providing the instructions for performing operations described elsewhere herein) and a constant cache 3438 can be connected to one or more CUs and can be shared between two CUs. Matrix cores 3416 can process a variety of data types, such as, but not limited to, INT8, FP8, FP16, BF16 and TF32 data types. Accelerated processing unit 3400 can include compute units 3434 that may be arranged in an array format, e.g., as a data-parallel-processor (DPP) array. Ultra-threaded dispatch processor 3442 can communicate with compute units 3434, and command processor 3444 can read commands that the host has written to memory-mapped registers in a system-memory address space (not shown). Command processor 3444 can send hardware-generated interrupts to a host processor (e.g., a CCD) when the command is completed. Memory controller 3436 can also have direct access to all device memory and the host-specified areas of system memory. To satisfy read and write requests, memory controller 3436 can perform functions of a direct-memory access (DMA) controller, including computing memory-address offsets based on the format of the requested data in memory. For example, one or more of APIs described herein can, for example, get compiled into instructions that can be stored in instruction cache 3440 and then fetched by instruction fetch logic in processor 3440, decoded by a processor decoder or equivalents, scheduled (e.g., in order or out of order) for execution by a scheduler or equivalents, executed by execution logic or equivalents, reordered, and then retired by the retirement logic or equivalents. API(s) (and/or compiled instructions including API(s)) can be stored in any storage outside or inside of processor 3400 (e.g., in cache and/or memory). A result of API(s) can then be stored in storage within or outside of the processor, including registers, DRAM, flash, SRAM, cache, or other memory equivalents.

An application can include a program running on a host processor (e.g., a CCD) and programs, called kernels, running on one or more XCDs. Programs can be controlled by host commands that set internal base-address and other configuration registers, specify a data domain on which the accelerated processing unit 3400 can operate, invalidate and flush caches on accelerated processing unit 3400, and cause accelerated processing unit 3400 to begin execution of a program. Kernels can be referred to as programs executed by accelerated processing unit 3400. A kernel can be executed independently on every work item, or as groups of work-items that can be referred to as a wavefront, which can execute the kernel on all work-items in the group (e.g., 64) in one pass. Compute units 3434 can include a scalar arithmetic logic unit (ALU), which can operates on one value per wavefront (common to all work items), a vector ALU, which can operate on unique values per work-item, a local data share 3414, which can allow work-items within a workgroup to communicate and share data, a scalar memory (not shown), which can transfer data between scalar general-purpose registers (SGPRs) and memory through a cache, and vector memory, which can transfer data between vector general-purpose registers (VGPRs) and memory, including sampling texture maps. Kernel control flow can be handled using scalar ALU instructions, which can includes if/else, branches and looping. Scalar ALU (SALU) and memory instructions can work on an entire wavefront and operate on one or more SGPRs. Vector memory and ALU instructions can operate on all work-items in the wavefront at one time.

In at least one embodiment, accelerated processing unit 3400 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 35:
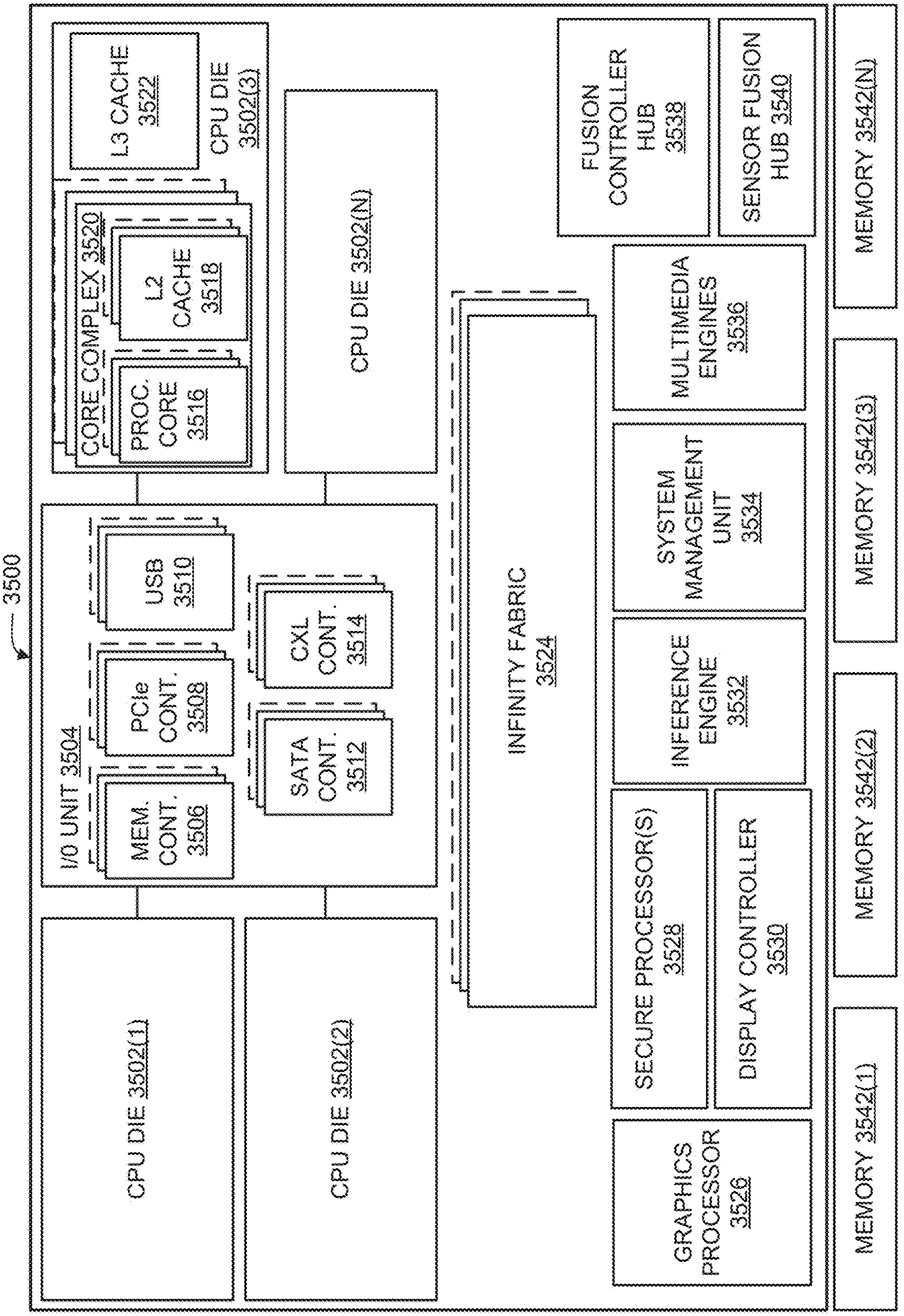
FIG. 35 illustrates another processor, in accordance with at least one embodiment.

FIG. 35 illustrates a processor 3500, such as, but not limited to, a processor based on a Zen architecture (such as, e.g., Zen 1, 2, 3, 4, 5 or other) from AMD Corporation in Santa Clara, CA or another processor that shares at least some of the components described herein. Processor 3500 includes one or more CPU dies 3502(1)-3502(N), where N is any integer greater than 1. CPU die 3502 can include any number of processor cores 3516 (e.g., to perform any of the operations described elsewhere herein) and any number of cache memories (e.g., to store instructions and other information to perform any of the operations described elsewhere herein), in any combination. For example, L2 Cache units 3518 can be coupled to processor core(s) 3516, which can share and/or couple individually to L2 Cache units 3518. Processor cores 3516 can couple to L3 cache 3522 individually and/or share L3 Cache, which can be a lowest level cache (LLC) 3522 for access to data and other information used by the processor cores 3516. One or more processor cores 3516 and one or more L2 Cache units 3518 can be included in a core complex (CCX) 3520 that can include (e.g., a 32 MB) shared cache (e.g., L3 cache 3522). Core complex 3520 can be fabricated onto a die (CCD or CPU die) 3502. For example, up to 12 core complexes 3520 can be configured into a processor along with 8 CPU dies 3502 to provide up to 96 processor cores 3516 for the processor. A 'Zen 4c' core complex 3520, for example, can include up to eight cores 3516 and a shared 16 MB L3 cache 3522. Two of these core complexes 3520 can be combined onto a single CPU die 3502 for 16 cores per die and a total of 32 MB of L3 cache 3522 per die. Up to eight of CPU dies 3502 may be combined with an I/O unit 3504 to provide CPUs with up to 128 processor cores 3516. Up to four 'Zen 4c' dies described above can be combined to provide CPUs with up to 64 processor cores 3516.

Processor 3500 can include a variety of configurations for input/output operations that are described further herein. I/O unit 3504 can include one or more memory controllers 3506 that can manage memory usage (e.g., DDR5 memory) for processor 3500. I/O unit 3504 may include one or more SATA disk controllers for managing storage 3512 and one or more Compute Express Link (CXL™) 1.1+ memory controllers 3514 that can provide CPU-to-device and CPU-to-memory connections and can be flexibly assigned to specific functions at server design time. I/O unit 3504 may include PCIe controller 3508 for connecting peripherals and other components connected to processor 3500. I/O unit 3504 may include USB ports 3510 for connecting to other components separate from processor 3500. CPU dies 3502 can support any number of connections, e.g., one or two connections, to I/O unit 3504. As shown, I/O unit 3504 includes the components described further herein, and I/O unit 3504 can be a I/O die that houses several different components. Memory controller 3506, PCIe controller 3508, USB ports 3510, SATA controller 3512, and/or CXL controller 3514 can be integrated anywhere within processor 3500 either separately or in any groups or combinations thereof.

Processor 3500 can include Infinity Fabric 3524 interconnects (which can be similar to or based on PCIe architectures) that can provide connections among CPUs (e.g., CPU dies 3502(1)-3502(N)), graphics processor(s) 3526, inference engine(s) 3532, and other components in the multi-chip architecture, such as secure processor(s) 3528 and I/O unit 3504. One or more AMD Infinity Fabric™ interconnects 3510 can connect to CPU dies 3502(1)-3502(N) and serve as a connection that is used between CPUs. One or more Infinity Fabric connections 3510 can connect each CPU die 3502 to the I/O unit 3510.

In at least one embodiment, processor 3500 can include central processing units (CPUs) and other associated hardware and software described above and further herein. Processor 3500 can also include graphics processor(s) 3526. Graphics processor 3526 can be used for image generation and processing, as well as other computations and operations described further herein. Graphics processor 3526 can be based on RDNA 3 or 3.5 architecture from AMD in Santa Clara, CA. Graphics processor 3526 can include graphics compute dies (GCDs) and memory cache dies (MCDs). GCDs can include any number of compute units (CUs) for graphics or other processing, such as operations performed by arithmetic logic units (ALUs) that are described further herein. Graphics processor 3526 can include L2 cache that can be used by compute units. MCDs (not shown) can include any number of memory units and can include cache, such as L3 cache, as well as memory interfaces for coupling to memory, such as memory 3542(1)-(N), where N is an integer. Components within graphics processor 3526 can be connected using various approaches, such as using Infinity Fabric 3524 interconnects outside or within graphics processor 3526.

Inference engine 3532 can provide neural processing capabilities for processor 3500 for computational processes that are used for neural networks, deep learning, and other artificial intelligence-related operations described further herein. Processor 3500 can include secure processor(s) 3528 for managing security of the processor, display controller 3530 for controlling displays, a system management unit 3534 for managing and operating some or all of the components on processor 3500, multimedia engines 3536 for audio and video operations, fusion controller hub 3538 for managing USB, SATA and PCIe connections to the processor, and sensor fusion hub 3540 for managing sensors, such as accelerometers. Processor 3500 can also include memory 3542(1)-(N), where N is any integer. Memory can include different memory types, such as LPDDR5 and/or DDR5, or others described elsewhere herein.

For performing operations described further herein, processor 3500 can include an execution pipeline including a front-end that can include a cache (e.g., L1 cache) that stores instructions (not shown). Flow of instructions can be modified by a branch predictor. Instructions can be decoded by a decoder, dispatched to a back-end for execution, and renamed. Instruction fetch and decode pipes, for example, can be dispatched to integer or floating point execution operations that can be scheduled by a scheduler and transferred to vector and/or general-purpose registers. Floating point multiplier and/or add operations can be processed, and arithmetic logic units (ALUs) can also be used to perform computations, such as arithmetic and logic operations. Outputs from the computation units can be coupled to a load/store queue, which can be connected to cache, such as L1 cache and/or L2 cache.

With respect to processor 3500 and any of its components described above or elsewhere herein, one or more of APIs or equivalents described herein can, for example, get compiled into instructions or equivalents (e.g., AVX-512 instructions based on an SIMD model), which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory equivalents.

In at least one embodiment, processor 3500 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 36:
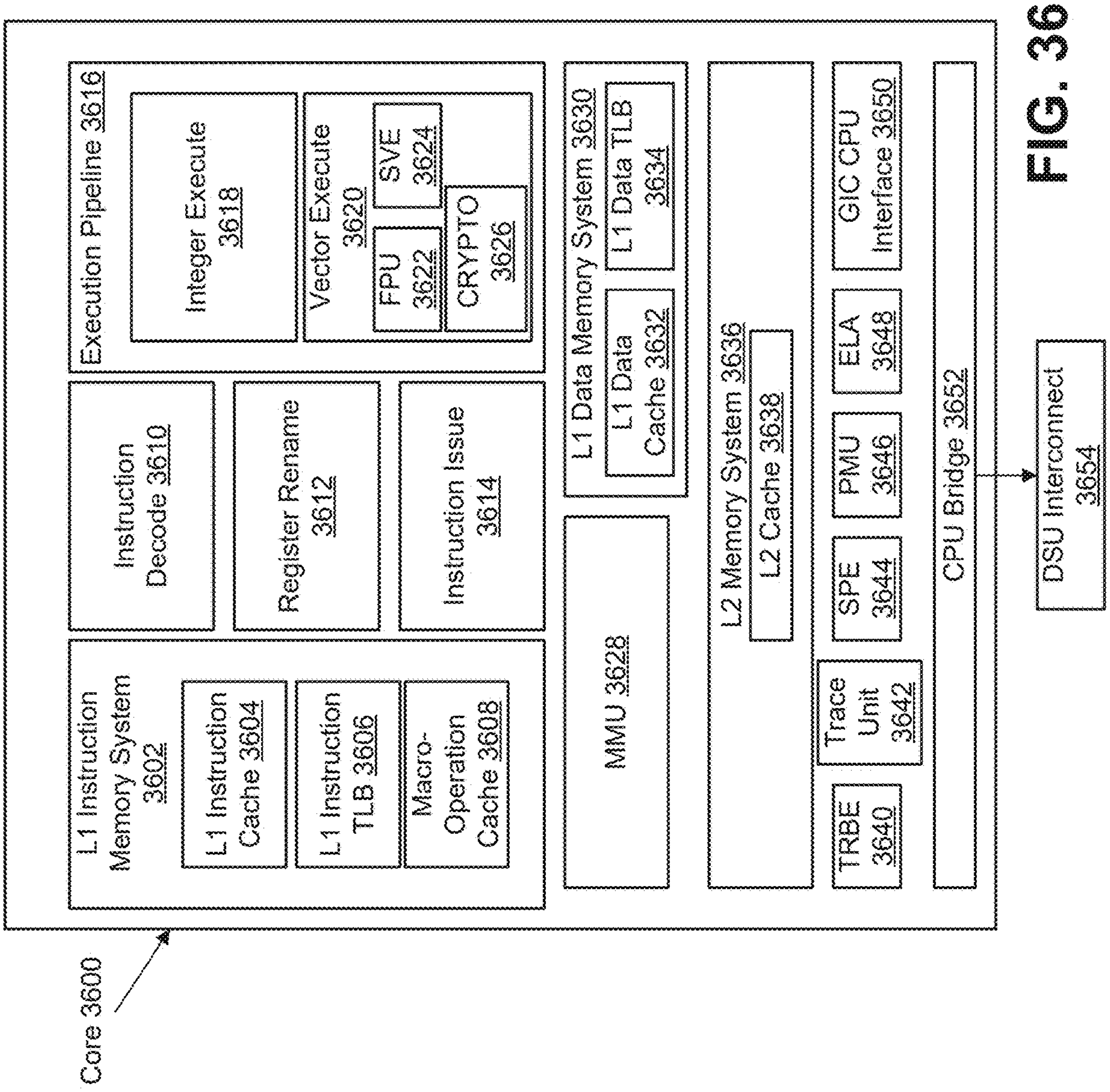
FIG. 36 illustrates another accelerator processor, in accordance with at least one embodiment.

FIG. 36 illustrates an example of a processing core 3600 that may implement Arm architecture (e.g., v9.0-A) or another processor that shares at least some of the components described herein. Neoverse™ V2 core 3600 can be implemented inside a DynamIQ Shared Unit (DSU) cluster via DSU-110 interconnect 3654 for connected one or more cores, e.g., for parallel processing. Neoverse™ V2 core may be implemented as a single core in a DSU cluster that is configured for Direct connect, with or without L3 cache, snoop filter, or Snoop Control Unit (SCU) logic (not shown). Neoverse™ V2 core can include a CPU bridge 3652 that connects core 3600 to DSU-110 interconnect, which can also connect core 3600 to an external memory system and the rest of a system-on-a-chip. The L1 instruction memory system 3602 can fetch instructions from an instruction cache 3604 and deliver the instructions (e.g., one or more APIs described herein that may be compiled into instructions) to an instruction decode unit 3610, e.g., to perform some or all of the operations described above or elsewhere herein. L1 instruction memory system 3602 may include L1 instruction cache 3604, e.g., with 64-byte cache lines, L1 instruction Translation Lookaside Buffer (TLB) 3606, e.g., with native support for 4 KB, 16 KB, 64 KB, and 2 MB page sizes, Macro-Operation Cache (MOP) 3608 (e.g., 1536-entry, 4-way skewed associative LO MOP cache), which can contain decoded and optimized instructions for higher performance. Instruction decode unit 3610 can decode AArch64 instructions into internal format. Register rename unit 3612 can perform register renaming to facilitate out-of-order execution and dispatches decoded instructions to various issue queues. Instruction issue unit 3614 can control when decoded instructions may be dispatched to the execution pipelines, and it can include issue queues for storing instructions pending dispatch to execution pipelines. Integer execution pipeline 3616 can be included in an execution pipeline and include integer execute unit 3618 that can perform arithmetic and logical data processing operations. Vector execute unit 3620 can be included in an execution pipeline and can perform Advanced SIMD and floating-point operations (FPU) 3622, execute Scalable Vector Extension (SVE) and Scalable Vector Extension 2 (SVE2) instructions 3624, and can optionally execute the cryptographic instructions (Crypto) 3626. Advanced SIMD can include media and signal processing architecture that adds instructions primarily for audio, video, 3D graphics, image, and speech processing. A floating-point architecture provides support for single-precision and double-precision floating-point operations. L1 data memory system 3630 can execute load and store instructions, as well as service memory coherency requests. L1 data memory system 3630 can include an L1 data cache 3632 and a fully associative L1 data TLB 3634 with native support for 4 KB, 16 KB and 64 KB page sizes and 2 MB and 512 MB block sizes. Memory Management Unit (MMU) 3628 can provide fine-grained memory system control through a set of virtual-to-physical address mappings and memory attributes that can be held in translation tables, which can be saved into TLB 3634 when an address is translated. L2 memory system 3636 can include L2 cache 3638, and it can be connected to DSU-110 3654 through an asynchronous CPU bridge 3652. Neoverse™ V2 core 3600 can support a range of debug, test, and trace options including a trace unit 3642 and a trace buffer 3640, and an Embedded Logic Analyzer (ELA) 3648. Neoverse™ V2 core 3600 can implement the Statistical Profiling Extension (SPE) 3644 to provide a statistical view of the performance characteristics of executed instructions that software writers can use to optimize their code for better performance. Performance Monitoring Unit (PMU) 3646 can provide performance monitors that can be configured to gather statistics on the operation of each core and the memory system. The information can be used for debug and code profiling. Generic Interrupt Controller (GIC) CPU interface 3650, when integrated with an external distributor component, can be a resource for supporting and managing interrupts in a cluster system. In a cluster, there can be one CPU bridge 3652 between each Neoverse™ V2 core 3600 and DSU-110 3654. CPU bridge 3652 can control buffering and synchronization between core 3600 and the DSU-1103654. CPU bridge 3652 can be asynchronous to allow different frequency, power, and area implementation points for each core 3600. CPU bridge 3652 can run synchronously without affecting the other interfaces such as, but not limited to, debug and trace which can be asynchronous.

In at least one embodiment, core 3600 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 37:
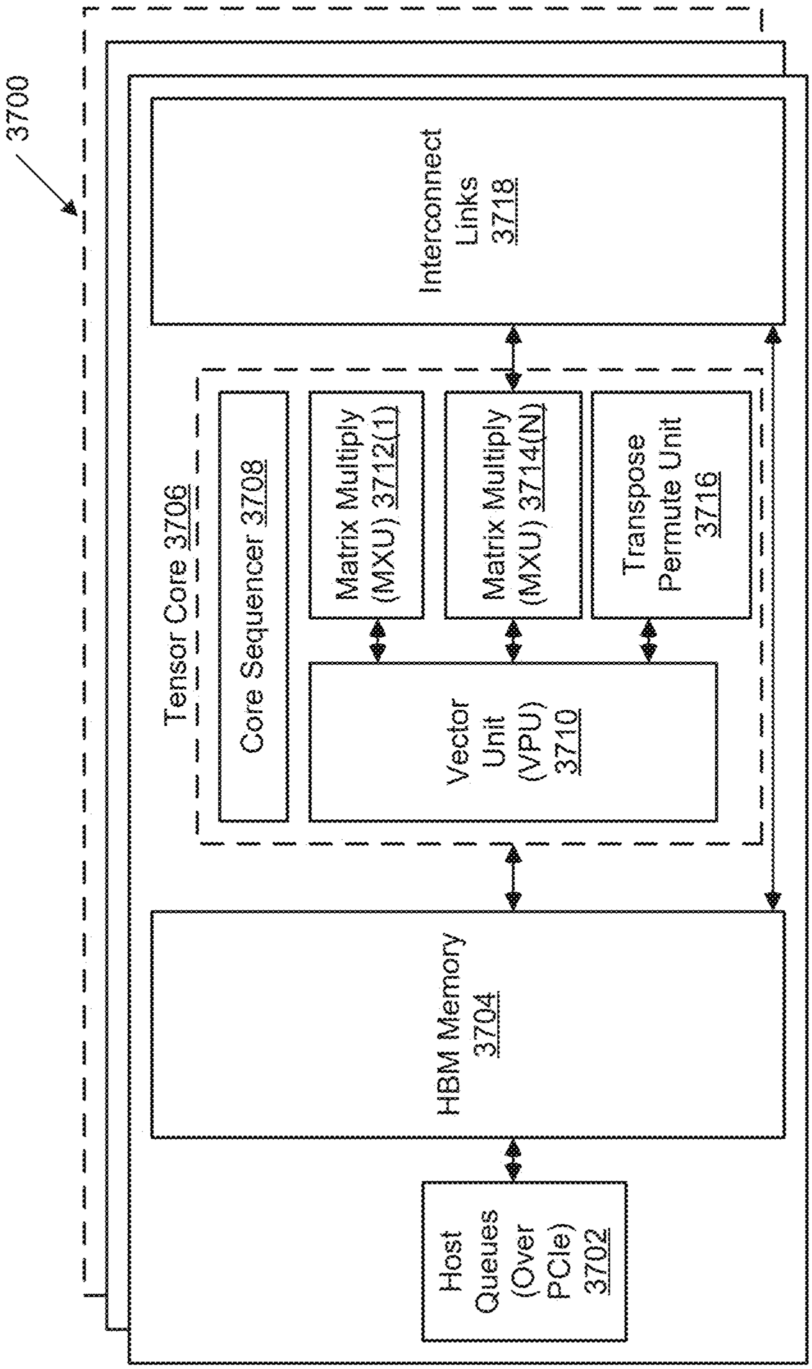
FIG. 37 illustrates a tensor processing unit, in accordance with at least one embodiment.

FIG. 37 illustrates one or more chips including one or more tensor processing units (TPUs) 3700, in accordance with at least one embodiment. TPUs 3700 in FIG. 37 can include application specific integrated circuits (ASICs), e.g., to perform some or all of the operations described above or elsewhere herein, such as, but not limited to, accelerate machine learning workloads performing matrix operations. TPUs 3700 may be ASICs from Alphabet Corporation in Mountain View, CA. Cloud TPU includes a cloud service that makes TPUs available as a scalable resource for processing tasks, such as, but not limited to, machine learning workloads that can run on frameworks such as, but not limited to, TensorFlow, Pytorch, and JAX.

Chip 3700 can include any number of TPUs that can include tensor cores 3706. Tensor core 3706 can include one or more core sequencer 3708, vector processing unit (VPU) 3710, matrix multiply unit (MXU) 3712(A)-3714(N), where N is any integer greater than 1, and a transpose permute unit 3716. Core Sequencer 3708 can fetch (e.g., VLIW (Very Long Instruction Word)) instructions from core's 3706 Instruction Memory (Imem), execute scalar operations using a scalar data memory (Smem) and scalar registers (Sregs) (not shown), and forward vector instructions to Vector Processing Unit (VPU) (3710. The instructions can, for example, launch eight operations: two scalar, two vector ALU, vector load and store, and a pair of slots that queue data to and from the matrix multiply and transpose units. VPU 3710 can perform vector operations using a large on-chip vector memory (Vmem), and vector registers (Vregs). VPU 3710 can stream data to and from the MXU through decoupling FIFOs. VPU 3710 can collect and distribute data to Vmem via data-level parallelism (2D matrix and vector functional units) and instruction-level parallelism (8 operations per instruction). A large two-dimensional matrix multiply unit (MXU) 3712(A)-3712(N) can, e.g., use a systolic array to reduce area and energy plus large, software-controlled on-chip memories instead of caches. Transpose Reduction Permute Unit 3716 can do (e.g., 128×128) matrix transposes, reductions, and permutations of the VPU 3710 lanes. High Bandwidth Memory 3704 can be used for applications on chip. One or more chips 3700 can be connected together for computing. For example, one or more chips 3700 can be connected as a torus, e.g., a 2D torus. Chip 3700 can also include any number (e.g., four) Inter-Core Interconnect (ICI) links 3718 that can enable direct connections between chips to form a supercomputer.

With respect to any of the processors in chip 3700 and any of its components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory equivalents.

In at least one embodiment, chip 3700 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 38:
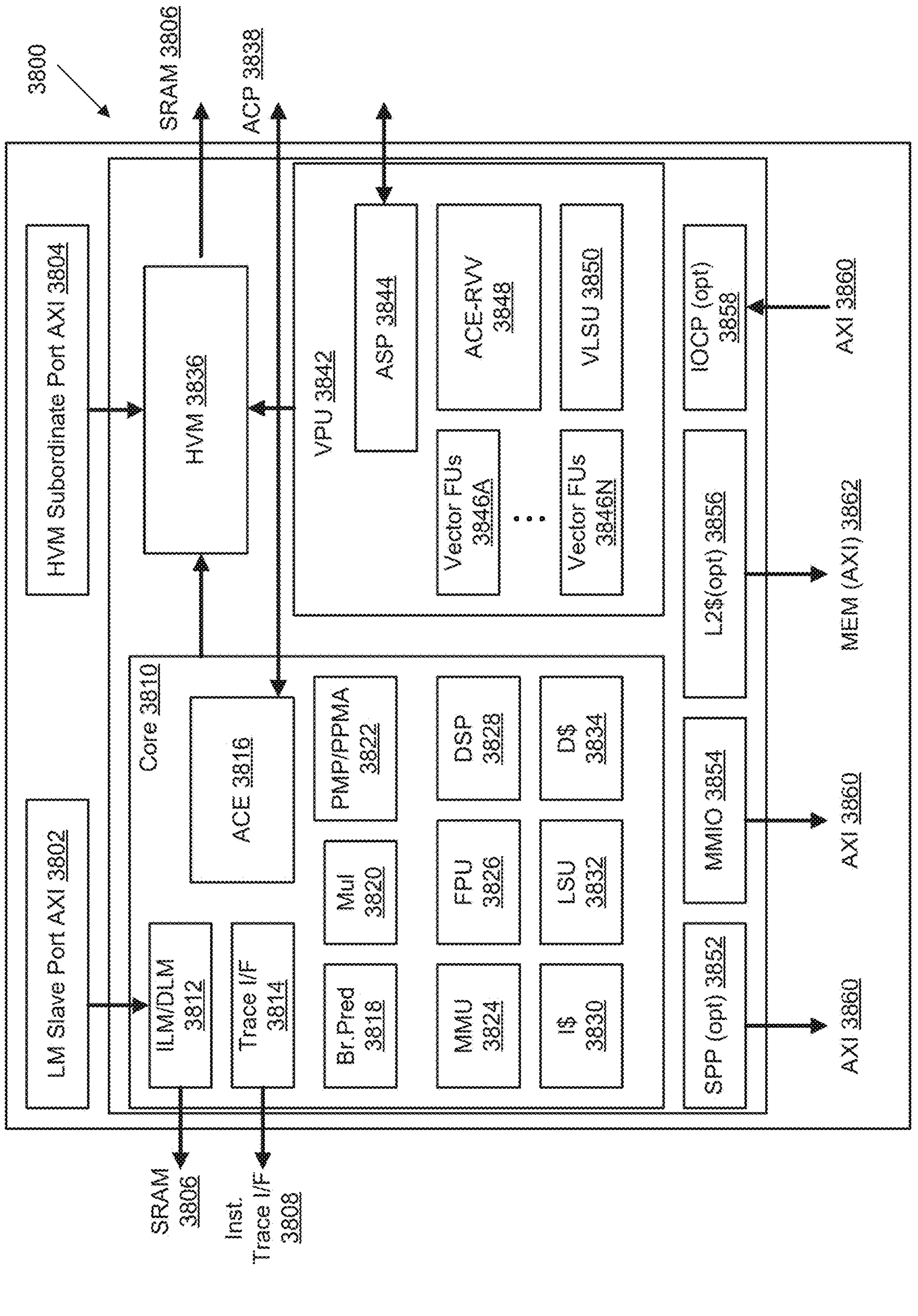
FIG. 38 illustrates a RISC-V-compatible processor, in accordance with at least one embodiment.

FIG. 38 illustrates a vector processor, in accordance with at least one embodiment. Vector processor 3800 may support a RISC-V standard. Vector processor 3800 can include one more cores 3810 (e.g., scalar units) with one or more Vector Processing Units (VPUs) 3842 (e.g., vector units) that can, e.g., perform some or all of the operations described above or elsewhere herein. Core 3810 may include Andes Custom Extension (ACE) 3816 that can be used for communication of customized instructions for the processor 3800. Core 3810 may include 1-cycle multiplier and 1-cycle instruction/data local memory (ILM/DLM) for increased parallelism by allowing simultaneous instruction fetches and data accesses. Memory management unit (MMU) 3824 may manage system memory and cache, and provide for branch execution, issuance of instruction pairs, L1 instruction/data caches and local memory storage. Core 3810 can include Physical memory protection and programmable physical memory attribute unit (PMP/PPMA) 3822. Core 3810 can include a digital signal processor (DSP) 3828, and a floating-point unit (FPU) 3826 as well as load-store unit (LSU) 3832 to interface with the memory hierarchy (D$3834 and I$3830). Core 3810 can include branch prediction unit 3818 and multiplier unit 3820.

Vector processing unit (VPU) 3842 can include one or more vector functional units (FUs) 3846(A)-3846(N) that can be chained together for parallel processing, independent memory paths for RISC-V vector (RVV) load/store via ACE-RVV 3848 and Andes Streaming port (ASP) 3844 load/store, and a vector load/store unit (VLSU) 3850.

Vector processor 3800 can include bus interfaces, such as, but not limited to, L2 cache memory port 3856 for cacheable access, a MMIO port 3854 for non-cacheable access, an input-output coherence Port (IOCP) 3858 for cacheless bus master, local memory access ports for ILM/DLM 3812 and high-bandwidth vector memory (HVM) 3836 access, a shared peripheral port (SPP) 3852 for external peripherals. Other memory ports include LM slave port AXI 3802 and HVM subordinate port AXI 3804.

With respect to any of the processors in processor 3800 and any of its components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory equivalents.

In at least one embodiment, vector processor 3800 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 39A:
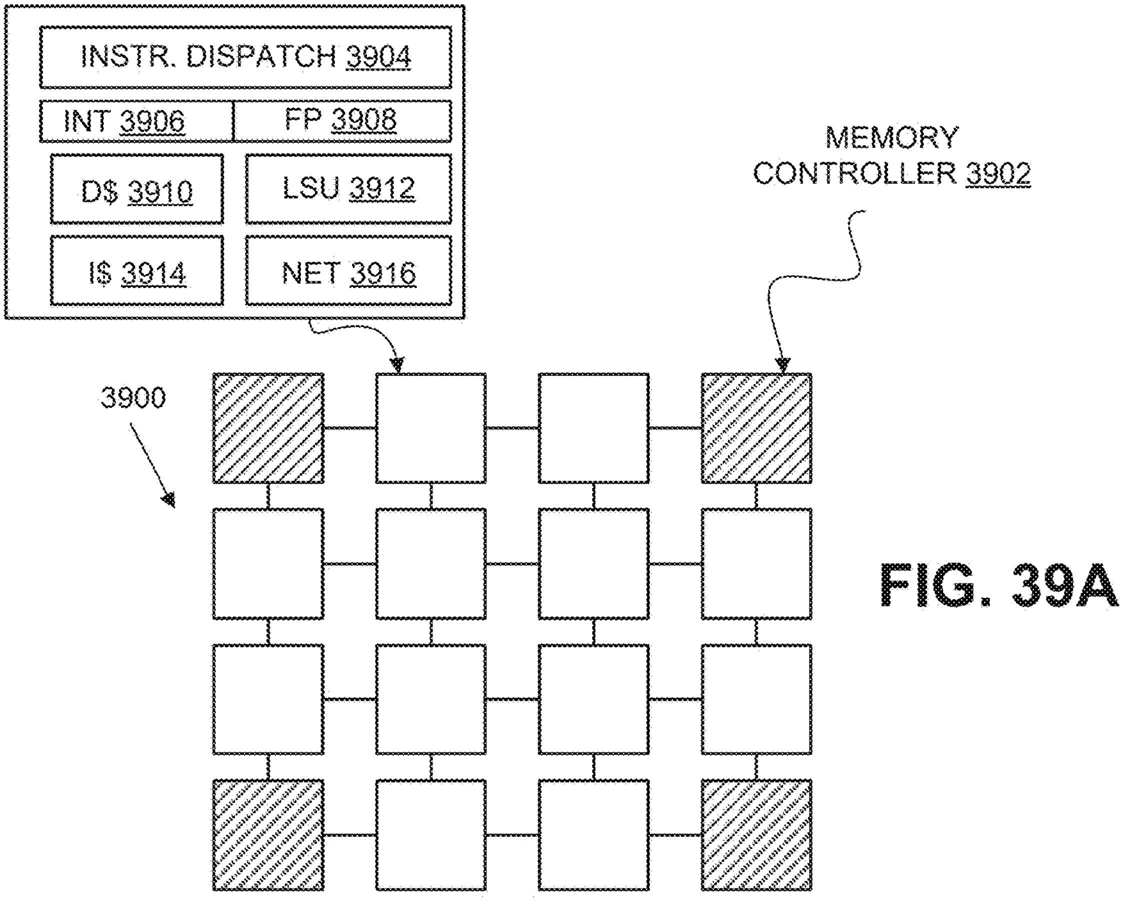
FIGS. 39A and 39B illustrate a language processing unit, in accordance with at least one embodiment.

FIG. 39A illustrates a diagram of an example many-core tiled processor microarchitecture. Many-core tiled processor in FIG. 39 can include a language processing processor. As illustrated in FIG. 39A, each "tile" of the processor architecture is a processing element tied together using a network-on-chip (NoC) that can be used, e.g., to perform some or all of the operations described above or elsewhere herein. For example, each tile may have an instruction dispatch 3904 and an integer (INT) 3906 and floating-point (FP) unit 3908 as well as load-store unit (LSU) 3912 to interface with the memory hierarchy (data cache (D$) 3910 and instruction cache (I$) 3914) and a network (NET) 3916 interface for communication with other tiles of the architecture. Some tiles in processor 3900 may include memory controller 3902 for managing and controlling memory, as described further herein. Processor 3900 can have a functional slice architecture. Processor 3900 may be located on an application specific integrated circuit (ASIC), and FIG. 39A may represent the layout of the ASIC. Processor 3900 can include a co-processor that is designed to execute instructions for a predictive model. The predictive model is any model that is configured to make a prediction from input data. The predictive model can use a classifier to make a classification prediction. The predictive model may be a machine learning model such as, but not limited to, a tensor flow model, and the processor 3900 is a tensor streaming processor.

Figure 39B:
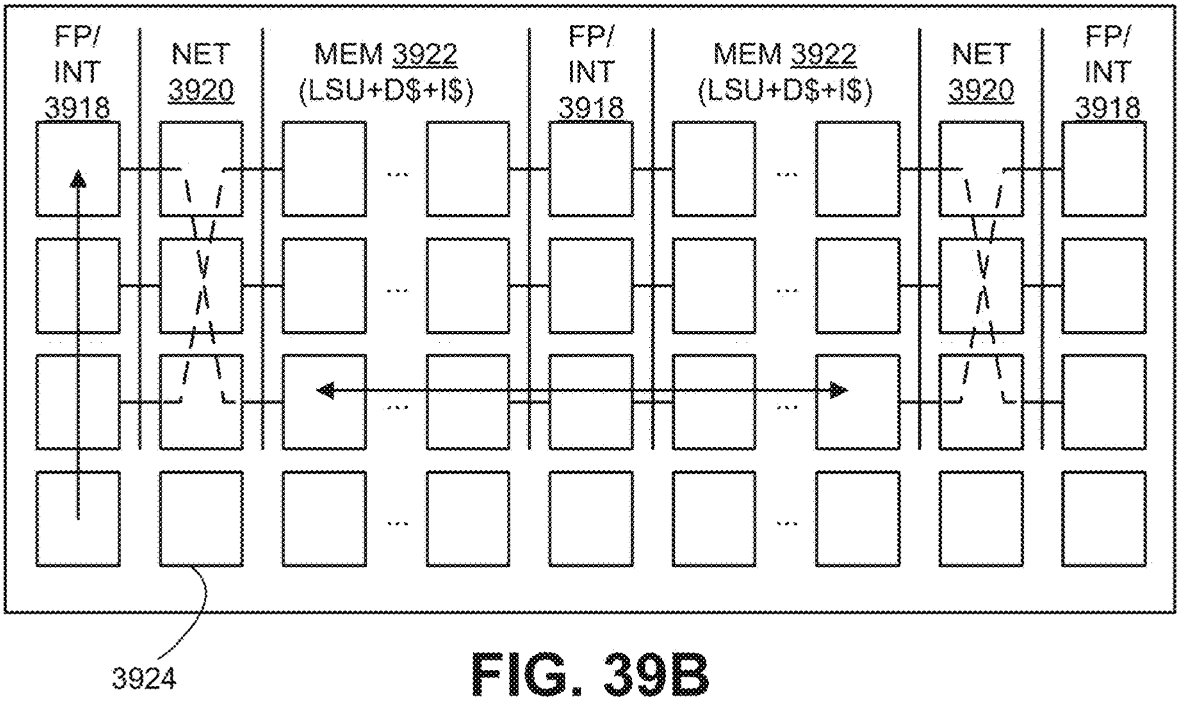

Processor 3900 can employ different microarchitectures, which disaggregates the functional units shown in each tile in FIG. 39B. Instead, the functional tiles of the processor 3900 may be aggregated into a plurality of functional process units (hereafter referred to as "slices") 3904, each corresponding to a particular function type (e.g., FP/INT 3918, NET 3920, MEM 3922). For example, as illustrated in FIG. 39B, each slice may correspond to a column of functional tiles extending in a north-south direction. In addition, the processor also includes communication lanes to carry data between the tiles of different slices, each running horizontally in an east-west direction. Each communication lane may be connected to each of the slices 3904 of the processor 3900.

The slices 3904 of the processor @ may each correspond to a different function, and may include arithmetic logic slices (e.g., FP/INT3918), lane switching slices (e.g., NET 3920), and memory slices (e.g., MEM 3922). The arithmetic logic units execute one or more arithmetic and/or logic operations on the data received via the communication lanes to generate output data. Examples of arithmetic logic units may be matrix multiplication units and vector multiplication units. The memory slices include memory cells that store data. The memory slices can provide the data to other slices through the communication lanes. The memory slices can also receive data from other slices through the communication lanes. The lane switching slices can configurably route data from one communication lane to any other communication lane. For example, data from a first lane can be provided to a second lane through a lane switching slice. In some embodiments, the lane switching slice can be implemented as a crossbar switch. Each slice 3904 also includes its own instruction queue (not shown) that stores instructions, and an instruction control unit (ICU) to control execution of the instructions. The instructions in a given instruction queue may be executed only by tiles in its associated functional slice and may not be executed by the other slice of the processor.

By arranging the tiles of the processor 3900 into different functional slices 3904, the on-chip instruction and control flow of the processor 3900 can be decoupled from the data flow. For example, one arrow in FIG. 39B illustrates the flow of instructions within the processor architecture, in accordance with some embodiments. Another arrow in FIG. 39B illustrates data flow within the processor architecture, in accordance with at least one embodiment. As illustrated, the instructions and control flow flows in a first direction across the tiles of the processor 3900 (e.g., north-south, along the length of the functional slices, as shown by the first arrow), while the data flows flow in a second direction across the tiles of the processor 3900 (e.g., east-west, across the functional slices, as shown by the second arrow) that is perpendicular to the first direction.

Different functional slices of the processor may correspond to MEM 3922 (memory), VXM (vector execution module), MXM (matrix execution module), NIM (numerical interpretation module), and SXM (switching and permutation module). Each slice may include N tiles that may all be controlled by the same instruction control unit (ICU) (not shown). Each of the slices may operate completely independently and can only be coordinated using barrier-like synchronization primitives or through the compiler by exploiting "tractable determinism." Each tile of the processor can correspond to an execution unit organized as an ×M SIMD tile. For example, each tile of the on-chip memory of the processor may be organized to store an L-element vector atomically. As such, a MEM slice having N tiles may work together to store or process a large vector (e.g., having a total of N×M elements).

The tiles in the same slice may execute instructions in a "staggered" fashion where instructions may be issued tileby-tile within the slice over a period of N cycles. Functional slices may be arranged physically on-chip to allow efficient data-flow for pipelined execution across hundreds of cycles for common patterns. Data flows can perform a single "u-turn" (change in direction) corresponding to a single matrix operation before being written back to memory, in some embodiments, a particular data flow may change direction multiple times (due to multiple matrix and vector operations) before the resulting data is written back into memory.

To get good single-thread performance, a conventional multi-core processor design (e.g., as illustrated in FIG. 39A) typically needs to dedicate a significant portion of silicon area for exposing and exploiting instruction-level parallelism (ILP). This usually involves register renaming schemes and large instruction windows over which the instructions have no explicit understanding of the hardware on which it will execute, all the while maintaining the illusion of in-order program execution. In contrast, when using a processor (e.g., TSP) having a functional slice architecture, the TSP compiler generates an explicit plan for how the processor will execute the microprogram. The compiler specifies when each operation will be executed, which functional slices will perform the work, and which STREAM registers hold the operands. The compiler maintains a high-fidelity (cycle accurate) model of the TSP's hardware state so the microprogram can orchestrate the data flow.

Processor 3900 (e.g., TSP) can use a Web-hosted compiler that takes as its input a model (e.g., a ML model such as, but not limited to, a TensorFlow model) and emits a proprietary instruction stream targeting the processor TSP hardware. The compiler is responsible for coordinating the control and data flow of the program, and specifies any instruction-level parallelism by explicitly bundling instructions that can and should execute concurrently so that they may be dispatched together. The primary hardware structure is the architecturally-visible streaming register file (STREAMs), described in greater detail below, which serves as the conduit through which operands flow from MEM slices (e.g., SRAM) to functional slices and vice versa.

The MEM unit of the processor serves as: (1) storage for model parameters, microprograms and the data on which they operate, and (2) network-on-chip (NoC) for communicating data operands from MEM to the functional slices and computed results back to MEM. In some embodiments, the on-chip memory consumes ~75% of the chip area of the processor. In some embodiments, due to the bandwidth requirements of the processor, the on-chip memory of the MEM tiles may comprise SRAM, and not DRAM. The on-chip memory capacity of the processor determines (i) the number of ML models that can simultaneously reside on-chip, (ii) size of any given model, and (iii) partitioning of large models to fit into multi-chip systems. In some embodiments, the MEM system of the processor provides a plurality of memory slices organized into two different hemispheres (referred to as "MEM WEST" and "MEM EAST", respectively).

The memory slices of each hemisphere may mirrored, such that the slices may be physically numbered {0, . . . . L} in the East hemisphere 410, and {L, . . . 0} in the West hemisphere 405, such that the memory slice 0 for each hemisphere corresponds to the slice closest to the VXM slices 415 between the hemispheres, where each hemisphere comprises L slices. The direction of data transfer towards the center of the chip may be referred to as inwards, while data transfer toward the outer (Eastern or Western most) edge of the chip may be referred to as outwards. Although the hemispheres of memory of the processor may be referred to as east and west, it is understood that in other embodiments, other names may be used to refer to the different hemispheres of memory.

In some embodiments, a streaming register file, referred to as STREAMS, transfers operands and results between SRAM of the MEM slices and the functional slices of the processor. In some embodiments, a plurality of MEM slices (e.g., between 2 and 10 adjacent MEM slices) may be physically organized as a set. Each set of slices may be located between a pair of STREAM register files, such that each slice is able to read or write to the STREAM registers in either direction. By placing STREAM register files between sets of MEM slices, a number of cycles needed for data operands to be transmitted across a hemisphere is decreased (e.g., by a factor corresponding to the number of slices per set). The number of slices per set may be configured based upon a distance over which data may be transmitted over a single clock cycle.

With respect to any of the processors in FIG. 39 and any components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory equivalents.

In at least one embodiment, processor 3900 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Software Constructions

The following figures set forth, without limitation, examples of software constructs for implementing at least one embodiment.

Figure 40:
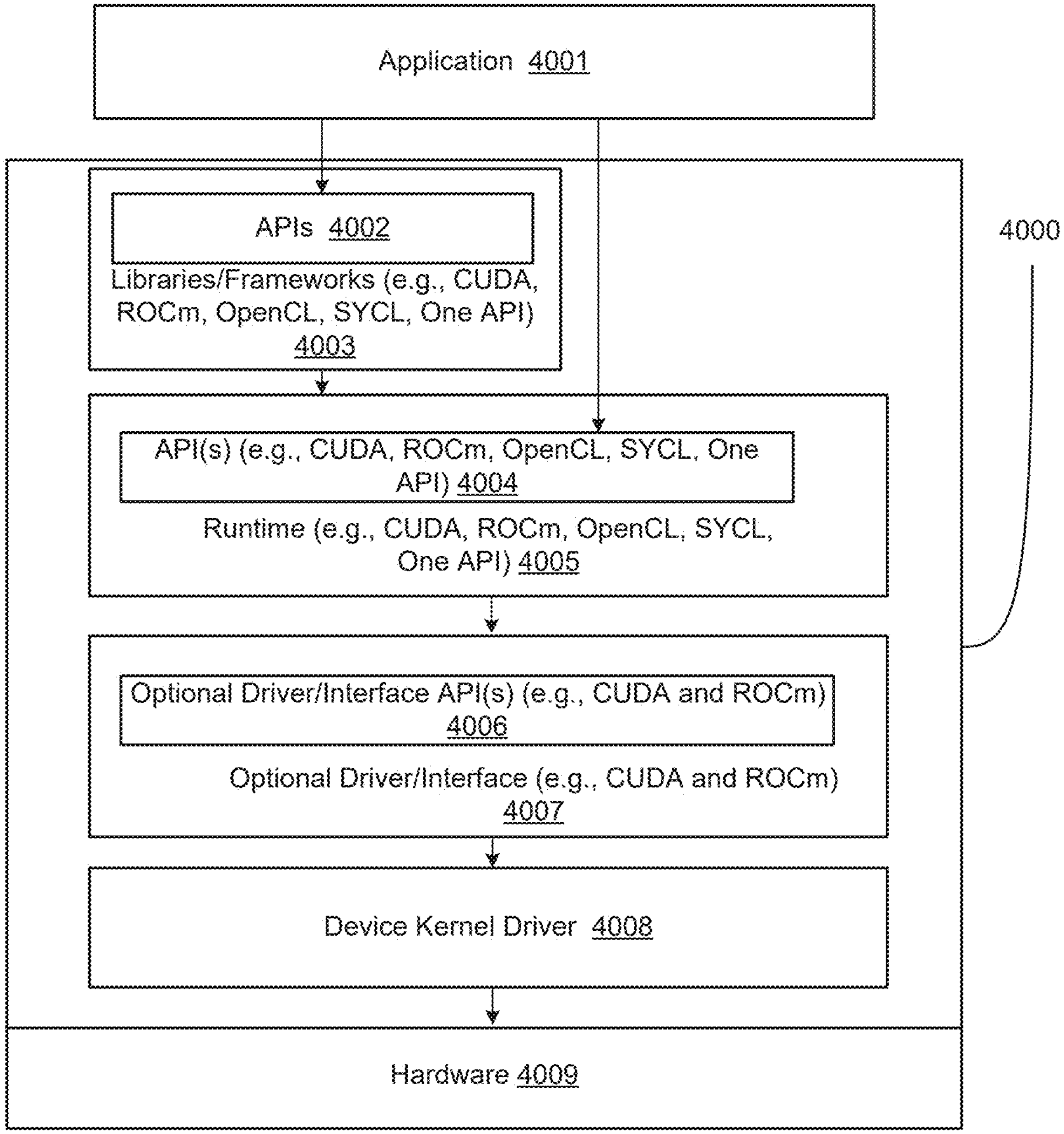
FIG. 40 illustrates a software stack of a programming platform, in accordance with at least one embodiment.

FIG. 40 illustrates a software stack of a programming platform, in accordance with at least one embodiment. A programming platform can include a platform for leveraging hardware on a computing system to accelerate computational tasks. A programming platform may be accessible to software developers through libraries, compiler directives, and/or extensions to programming languages, in at least one embodiment. A programming platform may be CUDA, Radeon Open Compute Platform ("ROCm"), OpenCL (OpenCL™ is developed by Khronos group), SYCL, or Intel oneAPI.

A software stack 4000 of a programming platform can provide an execution environment for an application 4001. Application 4001 may include any computer software capable of being launched on software stack 4000. Application 4001 may include an artificial intelligence ("AI")/machine learning ("ML") application, a high performance computing ("HPC") application, a virtual desktop infrastructure ("VDI"), or a data center workload.

Application 4001 and software stack 4000 run on hardware 4008. Hardware 4008 may include one or more GPUs, CPUs, FPGAs, AI engines, and/or other types of compute devices that support a programming platform. Software stack 4000 may be vendor specific and compatible with only devices from particular vendor(s), such as CUDA, ROCm, OneAPI, OpenCL, or other implementations. Hardware 4008 can include a host connected to one more devices that can be accessed to perform computational tasks via application programming interface ("API") calls. A device within hardware 4008 may include a GPU, FPGA, AI engine, or other compute device (but may also include a CPU) and its memory, as opposed to a host within hardware 4008 that may include a CPU (but may also include a compute device) and its memory, in at least one embodiment. With respect to any of the hardware 4008 described above or elsewhere herein, one or more of APIs described herein can, for example, get compiled into instructions, which may be fetched by instruction fetch logic, decoded by a processor decoder, scheduled (e.g., in order or out of order) for execution by a scheduler, executed by execution logic, reordered, and then retired by the retirement logic. API(s) (and/or compiled instructions including API(s)) can be stored in any storage outside or inside of the processor (e.g., in cache and/or memory). A result of API(s) can then be stored in storage within or outside of the processor, including registers, DRAM, flash, SRAM, cache, or other memory. One or more of APIs described herein can include a call. One or more of APIs described herein can include a library or a portion of a library to perform a function described by the call. One or more of APIs described herein can include a call and a library or portion of a library to perform a function described by the call.

Software stack 4000 of a programming platform can include a number of libraries 4003, a runtime 4005, an optional driver/interface 4007, and a device kernel driver 4008. Each of libraries 4003 may include data and programming code that can be used by computer programs and leveraged during software development. Libraries 4003 may include pre-written code and subroutines, classes, values, type specifications, configuration data, documentation, help data, and/or message templates. Libraries 4003 can include functions that may be optimized for execution on one or more types of devices. Libraries 4003 may include functions for performing mathematical, deep learning, and/or other types of operations on devices. Libraries 4003 can be associated with corresponding APIs 4002, which may include one or more APIs, that expose functions implemented in libraries 4003. A processor (e.g. CPU, GPU) may perform, call, or otherwise use one or more APIs to prioritize kernels. For example, a first kernel (e.g., parent) can launch a second kernel (e.g., child kernel), and said second kernel can be used by a processor to launch additional kernels (e.g., grandchildren kernels) independent of said first kernel. A processor may perform an API or calls an API from memory to be performed to support dynamic stream priority (e.g., updating priority while a stream is being used to perform operations). For example, when a processor performs said API, it allows a programmer to copy stream priority from one stream to one or more other streams.

Software stack 4000 may include an API to support dynamic stream priority (e.g., updating priority while a stream is being used to perform operations), which can allow a programmer to set priority of a stream at any time after creation. Software stack 4000 can include an API to support dynamic stream priority (e.g., updating priority while the stream is being used to perform operations), which may allow a programmer to obtain current priority of a stream, where the priority is one of a plurality of attributes of a stream. Software stack 4000 can include an API to support dynamic stream priority (e.g., updating priority while the stream is being used to perform operations), which may allow a programmer to obtain current priority of a stream as a single attribute. Software stack 4000 can include an API to support dynamic stream priority (e.g., updating priority while the stream is being used to perform operations), which allows a programmer to launch a kernel to perform operations on a stream at a set priority, which may be different from the stream priority. Software stack 4000 may include an API to indicate whether an object (e.g., a thread synchronization object such as, but not limited to, a barrier) tracks whether all data movement operations for a set of threads operating on a GPU may be complete has a specified state after a specified period of time, where a specified state can be a state indicating that data has been moved and is ready for use, and is specified using an expected parity value as an input to the API.

Software stack 4000 can include one or more APIs to updated kernels. A processor can perform an API or call an API from memory to be performed to update to an existing API is to support context-free kernels, which may allow a programmer to add a kernel node to a graph without a graphics context, so that a graphics context can be dynamically associated with a kernel at runtime. Software stack 4000 may include one or more APIs to allow a programmer to obtain a kernel identifier and a graphics context as separate parameters from a kernel node, so that parameters to be obtained from kernels and from context-free kernels. Software stack 4000 can include one or more APIs to use parallel processor(s), such as, but not limited to, one or more graphics processing units, to launch task graphs (e.g., task graphs) and to execute one or more task graphs (e.g., including one or more programs).

Software stack 4000 may include one or more APIs to associate one or more instructions with one or more memory ordering operations, such as, but not limited to, a fence or membar operation. Instructions can be associated with one or more domains such that a memory ordering operation is executed in association to one or more particular domains without interfering with instructions of other domains. An API can indicate a thread has arrived (e.g., at a thread synchronization barrier), or finished a stage of work in relation to asynchronous data movement operations on a GPU. Software stack 4000 may include one or more to allow programmers to manually indicate an expected transaction count when a thread has finished a stage of work, which can be used to update an object that tracks whether all data movement operations for a set of threads may be complete.

Application 4001 can be written as source code that is compiled into executable code, as discussed in greater detail below in conjunction with FIGS. 41 and 42. Executable code of application 4001 may run, at least in part, on an execution environment provided by software stack 4000. During execution of application 4001, code may be reached that needs to run on a device, as opposed to a host. In such a case, runtime 4005 may be called to load and launch requisite code on the device. Runtime 4005 may include any technically feasible runtime system that is able to support execution of application 4001.

Runtime 4005 can be implemented as one or more runtime libraries associated with corresponding APIs, which are shown as API(s) 4004. One or more of such runtime libraries may include functions for memory management, execution control, device management, error handling, and/or synchronization, among other things. Memory management functions may include functions to allocate, deallocate, and copy device memory, as well as transfer data between host memory and device memory. Execution control functions may include functions to launch a function (sometimes referred to as a "kernel" when a function is a global function callable from a host) on a device and set attribute values in a buffer maintained by a runtime library for a given function to be executed on a device.

Runtime libraries and corresponding API(s) 4004 may be implemented in any technically feasible manner. One (or any number of) API may expose a low-level set of functions for fine-grained control of a device, while another (or any number of) API may expose a higher-level set of such functions. A high-level runtime API may be built on top of a low-level API. One or more of runtime APIs may be language-specific APIs that may be layered on top of a language-independent runtime API.

An optional driver or interface 4007 may be implemented, e.g., for CUDA and ROCm implementations, that are described further below. Optional driver/interface 4007 may be associated with optional driver or interface API(s), such as, but not limited to, CUDA and/or ROCm API(s).

One or more processors disclosed in "processing systems" can perform, access, or otherwise use software stack 4000. For example, system-on-a-chip 2700, parallel processor 2800, graphics multiprocessor 2834, processor 2900, processor 3000, accelerator 3100, neuromorphic processor 3205, supercomputer 3300, acceleration processing unit 3400, processor 3500, processor 3600, tensor processing unit 3700, processor 3800, and language processing unit 3900 can perform, use, call, or otherwise implement (e.g., through accessing a memory) one or more APIs included in software stack 4000.

Device kernel driver 4008 can be configured to facilitate communication with an underlying device. Device kernel driver 4008 may provide low-level functionalities upon which APIs, such as, but not limited to, API(s) 4004, and/or other software relies. Device kernel driver 4008 may be configured to compile intermediate representation ("IR") code into binary code at runtime. For CUDA or other implementations such as, but not limited to, ROCm, OneAPI, or OpenCL, device kernel driver 4008 may compile Parallel Thread Execution ("PTX") IR code that is not hardware specific into binary code for a specific target device at runtime (with caching of compiled binary code), which is also sometimes referred to as "finalizing" code. Doing so may permit finalized code to run on a target device, which may not have existed when source code was originally compiled into PTX code. Alternatively, device source code may be compiled into binary code offline, without requiring device kernel driver 4008 to compile IR code at runtime.

Processors described elsewhere herein, such as, but not limited to, processors in FIGS. 27-39 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software, e.g., software stack 4000 to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

In accordance with at least one embodiment, software stack 4000 of FIG. 40 can be performed in a CUDA implementation. A CUDA software stack 4000, on which an application 4001 may be launched, may include CUDA libraries 4003, a CUDA runtime 4005, a CUDA driver 4007, and a device kernel driver 4008. CUDA software stack 4000 can execute on hardware (e.g., graphics multiprocessor 2834 that may include a GPU that supports CUDA and is developed by NVIDIA Corporation of Santa Clara, CA.

Application 4001, CUDA runtime 4005, and device kernel driver 4008 can perform functionalities that are described above and elsewhere herein. CUDA driver 4007 can include a library (libcuda.so) that may implement a CUDA driver API 4006. Similar to a CUDA runtime API 4004 implemented by a CUDA runtime library (cudart), CUDA driver API 4006 may expose functions for memory management, execution control, device management, error handling, synchronization, and/or graphics interoperability, among other things. CUDA driver API 4006 can differ from CUDA runtime API 4004 in that CUDA runtime API 4004 simplifies device code management by providing implicit initialization, context (analogous to a process) management, and module (analogous to dynamically loaded libraries) management. In contrast to high-level CUDA runtime API 4004, CUDA driver API 4006 can be a low-level API providing more fine-grained control of the device, particularly with respect to contexts and module loading. CUDA driver API 4006 may expose functions for context management that may be not exposed by CUDA runtime API 4004. CUDA driver API 4006 may also be language-independent and support, e.g., OpenCL, in addition to CUDA runtime API 4004. Further, development libraries, including CUDA runtime 4005, may be considered as separate from driver components, including user-mode CUDA driver 4007 and kernel-mode device driver 4008 (also sometimes referred to as a "display" driver).

CUDA libraries 4003 may include mathematical libraries, deep learning libraries, parallel algorithm libraries, and/or signal/image/video processing libraries, which parallel computing applications such as, but not limited to, application 4001 may utilize. CUDA libraries 4003 may include mathematical libraries such as, but not limited to, a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. CUDA libraries 4003 may include deep learning libraries such as, but not limited to, a cuDNN library of primitives for deep neural networks and a TensorRT platform for high-performance deep learning inference, among others.

In at least one embodiment, processors described elsewhere herein, such as, but not limited to, processors in FIGS. 27-39 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software, e.g., software stack 4000 to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

In accordance with at least one embodiment, software stack 4000 of FIG. 40 can be performed in a ROCm implementation. A ROCm software stack 4000, on which an application 4001 may be launched, includes a language runtime 4003, a system runtime 4005, a thunk 4007, and a ROCm kernel driver 4008. ROCm software stack 4000 executes on hardware 4009, which may include a GPU that supports ROCm and is developed by AMD Corporation of Santa Clara, CA.

Application 4001 may perform similar functionalities as discussed above in conjunction with FIG. 40. In addition, language runtime 4003 and system runtime 4005 may perform similar functionalities as runtime 4005 discussed above in conjunction with FIG. 40. Language runtime 4003 and system runtime 4005 may differ in that system runtime 4005 is a language-independent runtime that implements a ROCr system runtime API 4004 and makes use of a Heterogeneous System Architecture ("HSA") Runtime API. HSA runtime API can include a thin, user-mode API that exposes interfaces to access and interact with an AMD GPU, including functions for memory management, execution control via architected dispatch of kernels, error handling, system and agent information, and runtime initialization and shutdown, among other things. In contrast to system runtime 4005, language runtime 4003 can be an implementation of a language-specific runtime API 4002 layered on top of ROCr system runtime API 4004. Language runtime API may include a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and a HIP language runtime API may include functions that may be similar to those of CUDA runtime API discussed above in conjunction with FIG. 40, such as, but not limited to, functions for memory management, execution control, device management, error handling, and synchronization, among other things.

Thunk (ROCt) 4007 can be an interface 4006 that can be used to interact with underlying ROCm driver 4008. ROCm driver 4008 can be a ROCK driver, which is a combination of an AMDGPU driver and a HSA kernel driver (amdkfd). AMDGPU driver can be a device kernel driver for GPUs developed by AMD that performs similar functionalities as device kernel driver 4009 discussed above in conjunction with FIG. 40. HSA kernel driver can be a driver permitting different types of processors to share system resources more effectively via hardware features.

Various libraries (not shown) may be included in ROCm software stack 4000 above language runtime 4003 and provide functionality similar to CUDA libraries 4003, discussed above in conjunction with FIG. 40. Various libraries may include mathematical, deep learning, and/or other libraries such as, but not limited to, a hipBLAS library that implements functions similar to those of CUDA cuBLAS, a rocFFT library for computing FFTs that is similar to CUDA cuFFT, among others.

Processors described elsewhere herein, such as, but not limited to, processors in FIGS. 27-39 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software, e.g., software stack 4000 to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

In accordance with at least one embodiment, software stack 4000 of FIG. 40 can be performed in a OpenCL implementation. An OpenCL software stack 4000, on which an application 4001 may be launched, can include an OpenCL framework 4003, an OpenCL runtime 4005, and a driver 4008. OpenCL software stack 4000 may execute on hardware 4009 that is not vendor-specific. As OpenCL is supported by devices developed by different vendors, specific OpenCL drivers may be required to interoperate with hardware from such vendors.

Application 4001, OpenCL runtime 4005, device kernel driver 4008, and hardware 4009 may perform similar functionalities as other implementations of application 4001, runtime 4005, device kernel driver 4008, and hardware 4009, respectively, that are discussed above in conjunction with FIG. 40. Application 4001 can further include an OpenCL kernel (not shown) with code that is to be executed on a device.

OpenCL may define a "platform" that allows a host to control devices connected to the host. An OpenCL framework can provide a platform layer API and a runtime API, shown as platform API 4002 and runtime API 4004. Runtime API 4004 can use contexts to manage execution of kernels on devices. Each identified device may be associated with a respective context, which runtime API 4004 may use to manage command queues, program objects, and kernel objects, share memory objects, among other things, for that device. Platform API 4002 can expose functions that permit device contexts to be used to select and initialize devices, submit work to devices via command queues, and enable data transfer to and from devices, among other things. In addition, OpenCL framework can provide various built-in functions (not shown), including math functions, relational functions, and image processing functions, among others.

A compiler (not shown) can also be included in OpenCL framework 4003. Source code may be compiled offline prior to executing an application or online during execution of an application. In contrast to CUDA and ROCm, OpenCL applications may be compiled online by a compiler that is representative of any number of compilers that may be used to compile source code and/or IR code, such as, but not limited to, Standard Portable Intermediate Representation ("SPIR-V") code, into binary code. Alternatively, OpenCL applications may be compiled offline, prior to execution of such applications.

In at least one embodiment, processors described elsewhere herein, such as, but not limited to, processors in FIGS. 27-39 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software, e.g., software stack 4000 to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

In accordance with at least one embodiment, software can be supported by a programming platform that is configured to support various programming models, middlewares and/or libraries, and frameworks that an application may rely upon. Application may be an AI/ML application implemented using, for example, a deep learning framework such as, but not limited to, MXNet, PyTorch, or TensorFlow, which may rely on libraries such as, but not limited to, cuDNN, NVIDIA Collective Communications Library ("NCCL"), and/or NVIDA Developer Data Loading Library ("DALI") CUDA libraries to provide accelerated computing on underlying hardware.

Programming platform may be one of a CUDA, ROCm, or OpenCL platform described above in conjunction with FIG. 40. Programming platform can support multiple programming models, which may be abstractions of an underlying computing system permitting expressions of algorithms and data structures. Programming models may expose features of underlying hardware in order to improve performance. Programming models may include CUDA, HIP, OpenCL, C++ Accelerated Massive Parallelism ("C++ AMP"), Open Multi-Processing ("OpenMP"), Open Accelerators ("OpenACC"), and/or Vulcan Compute.

Libraries and/or middlewares may provide implementations of abstractions of programming models. Such libraries can include data and programming code that may be used by computer programs and leveraged during software development. Such middlewares can include software that provides services to applications beyond those available from programming platform. Libraries and/or middlewares may include cuBLAS, cuFFT, cuRAND, and other CUDA libraries, or rocBLAS, rocFFT, rocRAND, and other ROCm libraries. In addition, libraries and/or middlewares may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

Application frameworks may depend on libraries and/or middlewares. Each of application frameworks can be a software framework used to implement a standard structure of application software. Returning to the AI/ML example discussed above, an AI/ML application may be implemented using a framework such as, but not limited to, Caffe, Caffe2, TensorFlow, Keras, PyTorch, or MxNet deep learning frameworks, for example.

In at least one embodiment, processors described elsewhere herein, such as, but not limited to, processors in FIGS. 27-39 can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits can be configured by software, e.g., programming platforms described herein, to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 41:
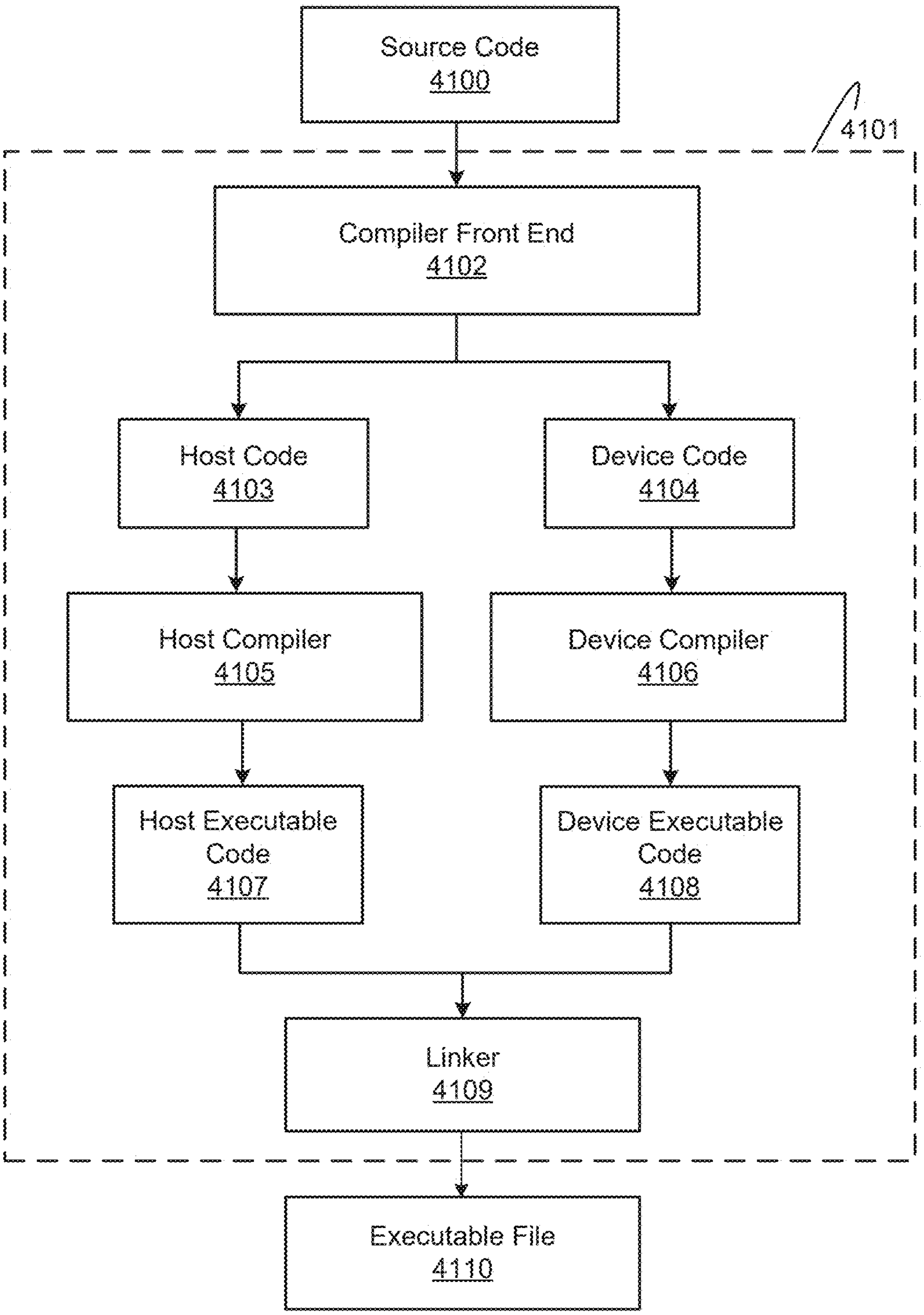
FIG. 41 illustrates software that is supported by a programming platform, in accordance with at least one embodiment.

FIG. 41 illustrates compiling code to execute on one of programming platforms of FIG. 40 described above, in accordance with at least one embodiment. A compiler 4101 is configured to receive source code 4100, compile source code 4100, and output an executable file 4110. Complier 4101 can be configured to convert source code 4100 into host executable code 4107 for execution on a host and device executable code 4108 for execution on a device. Source code 4100 may either be compiled offline prior to execution of an application, or online during execution of an application. Source code 4100 may include code in any programming language supported by compiler 4101, such as, but not limited to, C++, C, Fortran, etc. Source code 4100 may be included in a single-source file having a mixture of host code and device code, with locations of device code being indicated therein. A single-source file may be a .cu file that includes CUDA code or a .hip.cpp file that includes HIP code or a file in another format that includes both host code and device code. Alternatively, source code 5000 may include multiple source code files, rather than a single-source file, into which host code and device code may be separated. Compiler 4101 includes or has access to one or more libraries to recognize a sequence of API calls to perform a single fused API, where a single fused API is a combined API for two or more APIs. In at least one embodiment, compiler 4101 may be an NVIDIA CUDA compiler ("NVCC") for compiling CUDA code in .cu files, or a HCC compiler for compiling HIP code in .hip.cpp files, or other compilers.

Compiler 4101 can be configured to compile source code 4100 into host executable code 4107 for execution on a host and device executable code 4108 for execution on a device. Compiler 4101 performs operations including parsing source code 4100 into an abstract system tree (AST), performing optimizations, and generating executable code. When source code 4100 includes a single-source file, compiler 4101 may separate device code from host code in such a single-source file, compile device code and host code into device executable code 4108 and host executable code 4107, respectively, and link device executable code 4108 and host executable code 4107 together in a single file.

Compiler 4101 can include a compiler front end 4102, a host compiler 4105, a device compiler 4106, and a linker 4109. Compiler front end 4102 can be configured to separate device code 4104 from host code 4103 in source code 4100. Device code 4104 may be compiled by device compiler 4106 into device executable code 4108, which as described may include binary code or IR code, in at least one embodiment. Separately, host code 4103 may be compiled by host compiler 4105 into host executable code 4107. For NVCC other compilers, such as, but not limited to, those for oneAPI, ROCm, and OpenCL, host compiler 4105 may be a general purpose C/C++ compiler that outputs native object code, while device compiler 4106 may be a Low Level Virtual Machine ("LLVM")-based compiler that forks a LLVM compiler infrastructure and outputs PTX code or binary code. For HCC, both host compiler 4105 and device compiler 4106 may be LLVM-based compilers that output target binary code.

Subsequent to compiling source code 4100 into host executable code 4107 and device executable code 4108, linker 4109 can link host and device executable code 4107 and 4108 together in executable file 4110. Native object code for a host and PTX or binary code for a device may be linked together in an Executable and Linkable Format ("ELF") file, which is a container format used to store object code. Host executable code 4107 and device executable code 4108 may be in any suitable format, such as, but not limited to, binary code and/or IR code. In the case of CUDA, host executable code 4107 may include native object code and device executable code 4108 may include code in PTX intermediate representation, in at least one embodiment. In the case of ROCm, both host executable code 4107 and device executable code 4108 may include target binary code, in at least one embodiment. Other implementations, such as, but not limited to, oneAPI, OpenCL are contemplated and can be performed similarly to the CUDA and ROCm implementations above.

Source code 4100 may be translated prior to compiling source code. Source code is passed through a translation tool (not shown), which translates source code 4100 into translated source code. A compiler 4101 can be used to compile translated source code into host executable code 4107 and device executable code 4108 in a process that is similar to compilation of source code 4100 by compiler 4101 into host executable code 4107 and device executable code 4108, as discussed above in conjunction with FIG. 41.

A translation performed by translation tool can be used to port source code 4100 for execution in a different environment than that in which it was originally intended to run. Translation tool may include a HIP translator that is used to "hipify" CUDA code intended for a CUDA platform into HIP code that can be compiled and executed on a ROCm platform. Translation of source code 4100 may include parsing source code 4100 and converting calls to API(s) provided by one programming model (e.g., CUDA) into corresponding calls to API(s) provided by another programming model (e.g., HIP), as discussed in greater detail below in conjunction with FIG. 42. Returning to the example of hipifying CUDA code, calls to CUDA runtime API, CUDA driver API, and/or CUDA libraries may be converted to corresponding HIP API calls. Automated translations performed by translation tool 4101 may sometimes be incomplete, requiring additional, manual effort to fully port source code 4100.

One or more techniques described herein may utilize other methods of converting one type of code to another type of code to enable interchangeability between different device architectures. In at least one embodiment, an application for one platform (e.g., a CUDA application) can be compiled into code for implementation on another platform (e.g., an AMD processor, Intel processor, or other processor). For example, source code 4100 can include source code for one platform (e.g., CUDA). Compiler 4101 can compile the source 4100 into an executable file 4110 that can be used by another platform (e.g., AMD or Intel). Programming toolkits can allow applications for one platform (e.g., CUDA) to be compiled (e.g., natively) for another platform (e.g., AMD or Intel). For example, a GPGPU programming toolkit can allow for CUDA applications to be natively compiled for AMD GPUs. Programs (e.g., CUDA programs) or its build system do not have to be modified or translated to another language before compiling to code for another platform. A compiler may accept the same command-line options and programming dialect (e.g., CUDA dialect) as another compiler (e.g., nvcc for CUDA), serving as a drop-in replacement to impersonate an installation of a toolkit (e.g., NVIDIA CUDA Toolkit), so existing build tools and scripts (e.g., like cmake) work without further modification. In at least one embodiment, an nvcc-compatible compiler can be used to compile nvcc-dialect CUDA for AMD GPUs, including PTX asm. Implementations of CUDA runtime and driver APIs for AMD GPUs can be used. Libraries (e.g., open source wrapper libraries) can provide APIs, such as "CUDA-X" APIs by delegating to the corresponding ROCm libraries. An example implementation includes SCALE from Spectral Compute in London, England. Instead of providing a new way to write GPGPU software, SCALE allows programs written using the widely-popular CUDA language to be directly compiled for AMD GPUs. Additional implementations can include a Clang compiler that provides a language front-end and tooling infrastructure for languages in the C language family (C, C++, Objective C/C++, OpenCL, CUDA, and RenderScript). In at least one embodiment, compilers described herein, such as, but not limited to compiler 4101, compiler 4105, and/or compiler 4106 can include one or more circuits to compile code (e.g., CUDA, HIP, OpenCL, OneAPI, or others) to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, and/or perform any of the operations described above or elsewhere herein.

Figure 42:
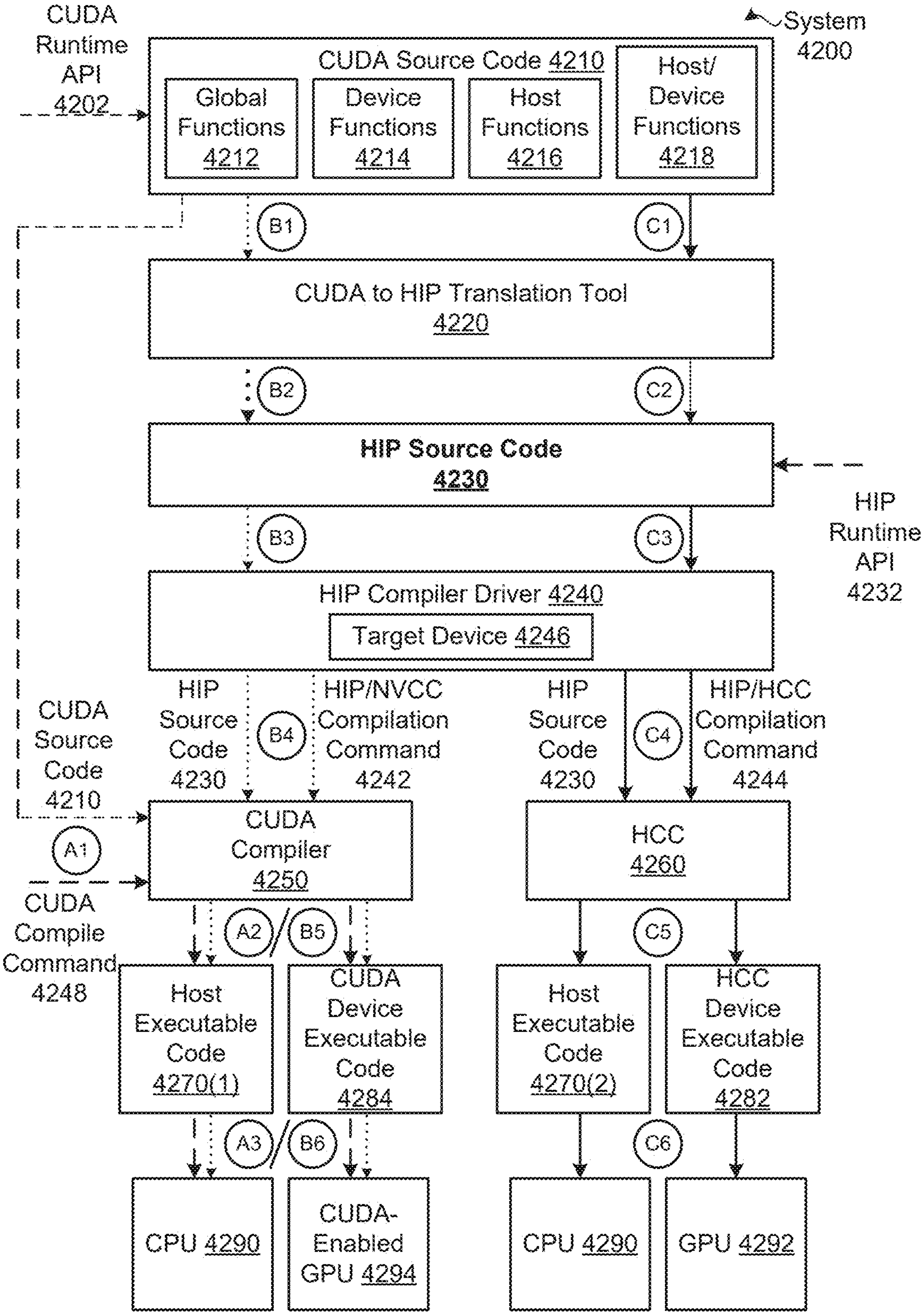
FIG. 42 illustrates compiling code to execute on programming platforms of FIG. 41, in accordance with at least one embodiment.

FIG. 42 illustrates a system 4200 configured to compile and execute CUDA source code 4210 using different types of processing units, in accordance with at least one embodiment. System 4200 includes CUDA source code 4210, a CUDA compiler 4250, host executable code 4270(1), host executable code 4270(2), CUDA device executable code 4284, a CPU 4290, a CUDA-enabled GPU 4294, a GPU 4292, a CUDA to HIP translation tool 4220, HIP source code 4230, a HIP compiler driver 4240, an HCC 4260, and HCC device executable code 4282.

CUDA source code 4210 may be a collection of human-readable code in a CUDA programming language. A CUDA programming language can be an extension of the C++ programming language that includes mechanisms to define device code and distinguish between device code and host code. Device code can include source code that, after compilation, is executable in parallel on a device. A device may be a processor that is optimized for parallel instruction processing, such as, but not limited to, CUDA-enabled GPU 4290, GPU 4292, or another GPGPU, etc. Host code is source code that, after compilation, is executable on a host. A host is a processor that is optimized for sequential instruction processing, such as, but not limited to, CPU 4290.

CUDA source code 4210 can include any number (including zero) of global functions 4212, any number (including zero) of device functions 4214, any number (including zero) of host functions 4216, and any number (including zero) of host/device functions 4218. Global functions 4212, device functions 4214, host functions 4216, and host/device functions 4218 may be mixed in CUDA source code 4210. Each of global functions 4212 may be executable on a device and callable from a host. One or more of global functions 4212 may therefore act as entry points to a device. Each of global functions 4212 can be a kernel. In a technique known as dynamic parallelism, one or more of global functions 4212 can define a kernel that is executable on a device and callable from such a device. A kernel can be executed N (where N is any positive integer) times in parallel by N different threads on a device during execution.

Each of device functions 4214 can be executed on a device and callable from such a device only. Each of host functions 4216 can be executed on a host and callable from such a host only. Each of host/device functions 4216 may define both a host version of a function that is executable on a host and callable from such a host only and a device version of the function that is executable on a device and callable from such a device only.

CUDA source code 4210 may also include any number of calls to any number of functions that may be defined via a CUDA runtime API 4202. CUDA runtime API 4202 may include any number of functions that execute on a host to allocate and deallocate device memory, transfer data between host memory and device memory, manage systems with multiple devices, etc. CUDA source code 4210 may also include any number of calls to any number of functions that may be specified in any number of other CUDA APIs. A CUDA API may be any API that is designed for use by CUDA code. CUDA APIs can include CUDA runtime API 4202, a CUDA driver API, APIs for any number of CUDA libraries, etc, including any API(s) described elsewhere herein. Relative to CUDA runtime API 4202, a CUDA driver API can be a lower-level API but can provide finer-grained control of a device. Examples of CUDA libraries include cuBLAS, cuFFT, cuRAND, cuDNN, etc.

CUDA compiler 4250 may compile input CUDA code (e.g., CUDA source code 4210) to generate host executable code 4270(1) and CUDA device executable code 4284. CUDA compiler 4250 may be, but is not limited to, NVCC. Host executable code 4270(1) can be a compiled version of host code included in input source code that is executable on CPU 4290. CPU 4290 may be any processor that is optimized for sequential instruction processing.

CUDA device executable code 4284 may be a compiled version of device code included in input source code that is executable on CUDA-enabled GPU 4294. CUDA device executable code 4284 may include binary code. CUDA device executable code 4284 can include IR code, such as, but not limited to, PTX code, that is further compiled at runtime into binary code for a specific target device (e.g., CUDA-enabled GPU 4294) by a device driver. CUDA-enabled GPU 4294 may include any processor that is optimized for parallel instruction processing and that supports CUDA. CUDA-enabled GPU 4294 may be developed by NVIDIA Corporation of Santa Clara, CA.

CUDA to HIP translation tool 4220 can be configured to translate CUDA source code 4210 to functionally similar HIP source code 4230. HIP source code 4230 may include a collection of human-readable code in a HIP programming language. HIP code can include human-readable code in a HIP programming language. A HIP programming language can include an extension of the C++ programming language that includes functionally similar versions of CUDA mechanisms to define device code and distinguish between device code and host code. A HIP programming language may include a subset of functionality of a CUDA programming language. For example, a HIP programming language includes mechanism(s) to define global functions 4212, but such a HIP programming language may lack support for dynamic parallelism and therefore global functions 4212 defined in HIP code may be callable from a host only.

HIP source code 4230 may include any number (including zero) of global functions 4212, any number (including zero) of device functions 4214, any number (including zero) of host functions 4216, and any number (including zero) of host/device functions 4218. HIP source code 4230 may also include any number of calls to any number of functions that may be specified in a HIP runtime API 4232. HIP runtime API 4232 may include functionally similar versions of a subset of functions included in CUDA runtime API 4202. HIP source code 4230 may also include any number of calls to any number of functions that may be specified in any number of other HIP APIs. A HIP API may be any API that is designed for use by HIP code and/or ROCm. HIP APIs may include HIP runtime API 4232, a HIP driver API, APIs for any number of HIP libraries, APIs for any number of ROCm libraries, etc.

CUDA to HIP translation tool 4220 can convert each kernel call in CUDA code from a CUDA syntax to a HIP syntax and can convert any number of other CUDA calls in CUDA code to any number of other functionally similar HIP calls. A CUDA call can include a call to a function specified in a CUDA API, and a HIP call can include a call to a function specified in a HIP API. CUDA to HIP translation tool 4220 may convert any number of calls to functions specified in CUDA runtime API 4202 to any number of calls to functions specified in HIP runtime API 4232.

CUDA to HIP translation tool 4220 can include a tool known as hipify-perl that executes a text-based translation process. CUDA to HIP translation tool 4220 can include a tool known as hipify-clang that, relative to hipify-perl, executes a more complex and more robust translation process that involves parsing CUDA code using clang (a compiler front-end) and then translating resulting symbols. Converting CUDA code to HIP code may include modifications (e.g., manual edits) in addition to those performed by CUDA to HIP translation tool 4220.

HIP compiler driver 4240 can include a front end that determines a target device 4246 and then configures a compiler that is compatible with target device 4246 to compile HIP source code 4230. Target device 4246 can include a processor that is optimized for parallel instruction processing. HIP compiler driver 4240 may determine target device 4246 in any technically feasible fashion.

If target device 4246 is compatible with CUDA (e.g., CUDA-enabled GPU 4294), then HIP compiler driver 4240 can generate a HIP/NVCC compilation command 4242. HIP/NVCC compilation command 4242 can configure CUDA compiler 4250 to compile HIP source code 4230 using a HIP to CUDA translation header and a CUDA runtime library. In response to HIP/NVCC compilation command 4242, CUDA compiler 4250 may generate host executable code 4270(1) and CUDA device executable code 4284.

If target device 4246 is not compatible with CUDA, then HIP compiler driver 4240 may generate a HIP/HCC compilation command 4244. HIP/HCC compilation command 4244 can configure HCC 4260 to compile HIP source code 4230 using an HCC header and a HIP/HCC runtime library. In response to HIP/HCC compilation command 4244, HCC 4260 may generate host executable code 4270(2) and HCC device executable code 4282. HCC device executable code 4282 may be a compiled version of device code included in HIP source code 4230 that is executable on GPU 4292. GPU 4292 may be any processor that is optimized for parallel instruction processing, is not compatible with CUDA, and is compatible with HCC. GPU 4292 can be developed by AMD Corporation of Santa Clara, CA. GPU 4292 can include a non-CUDA-enabled GPU 4292.

For explanatory purposes only, three different flows that may be implemented in at least one embodiment to compile CUDA source code 4210 for execution on CPU 4290 and different devices are depicted in FIG. 42. A direct CUDA flow can compile CUDA source code 4210 for execution on CPU 4290 and CUDA-enabled GPU 4294 without translating CUDA source code 4210 to HIP source code 4230. An indirect CUDA flow can translate CUDA source code 4210 to HIP source code 4230 and then compiles HIP source code 4230 for execution on CPU 4290 and CUDA-enabled GPU 4294. A CUDA/HCC flow can translate CUDA source code 4210 to HIP source code 4230 and then can compile HIP source code 4230 for execution on CPU 4290 and GPU 4292.

A direct CUDA flow that may be implemented is depicted via dashed lines and a series of bubbles annotated A1-A3. As depicted with bubble annotated A1, CUDA compiler 4250 can receive CUDA source code 4210 and a CUDA compile command 4248 that can configure CUDA compiler 4250 to compile CUDA source code 4210. CUDA source code 4210 that can be used in a direct CUDA flow can be written in a CUDA programming language that is based on a programming language other than C++ (e.g., C, Fortran, Python, Java, etc.). In response to CUDA compile command 4248, CUDA compiler 4250 can generate host executable code 4270(1) and CUDA device executable code 4284 (depicted with bubble annotated A2). As depicted with bubble annotated A3, host executable code 4270(1) and CUDA device executable code 4284 may be executed on, respectively, CPU 4290 and CUDA-enabled GPU 4294. CUDA device executable code 4284 can include binary code. CUDA device executable code 4284 can include PTX code and can be further compiled into binary code for a specific target device at runtime.

An indirect CUDA flow that may be implemented is depicted via dotted lines and a series of bubbles annotated B1-B6. As depicted with bubble annotated B1, CUDA to HIP translation tool 4220 can receive CUDA source code 4210. As depicted with bubble annotated B2, CUDA to HIP translation tool 4220 can translate CUDA source code 4210 to HIP source code 4230. As depicted with bubble annotated B3, HIP compiler driver 4240 can receive HIP source code 4230 and can determine that target device 4246 is CUDA-enabled.

As depicted with bubble annotated B4, HIP compiler driver 4240 can generate HIP/NVCC compilation command 4242 and can transmit both HIP/NVCC compilation command 4242 and HIP source code 4230 to CUDA compiler 4250. HIP/NVCC compilation command 4242 can configure CUDA compiler 4250 to compile HIP source code 4230 using a HIP to CUDA translation header and a CUDA runtime library. HIP to CUDA translation header can translate any number of mechanisms (e.g., functions) specified in any number of HIP APIs to any number of mechanisms specified in any number of CUDA APIs. CUDA compiler 4250 may use HIP to CUDA translation header in conjunction with a CUDA runtime library corresponding to CUDA runtime API 4202 to generate host executable code 4270(1) and CUDA device executable code 4284. In response to HIP/NVCC compilation command 4242, CUDA compiler 4250 can generate host executable code 4270(1) and CUDA device executable code 4284 (depicted with bubble annotated B5). As depicted with bubble annotated B6, host executable code 4270(1) and CUDA device executable code 4284 may be executed on, respectively, CPU 4290 and CUDA-enabled GPU 4294. CUDA device executable code 4284 can include binary code. CUDA device executable code 4284 can include PTX code and can be further compiled into binary code for a specific target device at runtime.

A CUDA/HCC flow that may be implemented is depicted via solid lines and a series of bubbles annotated C1-C6. As depicted with bubble annotated C1, CUDA to HIP translation tool 4220 can receive CUDA source code 4210. As depicted with bubble annotated C2, CUDA to HIP translation tool 4220 can translate CUDA source code 4210 to HIP source code 4230. As depicted with bubble annotated C3, HIP compiler driver 4240 can receive HIP source code 4230 and can determine that target device 4246 is not CUDA-enabled.

HIP compiler driver 4240 may generate HIP/HCC compilation command 4244 and may transmit both HIP/HCC compilation command 4244 and HIP source code 4230 to HCC 4260 (depicted with bubble annotated C4). HIP/HCC compilation command 4244 can configure HCC 4260 to compile HIP source code 4230 using an HCC header and a HIP/HCC runtime library. HIP/HCC runtime library can correspond to HIP runtime API 4232. HCC header may include any number and type of interoperability mechanisms for HIP and HCC. In response to HIP/HCC compilation command 4244, HCC 4260 can generate host executable code 4270(2) and HCC device executable code 4282 (depicted with bubble annotated C5). As depicted with bubble annotated C6, host executable code 4270(2) and HCC device executable code 4282 may be executed on, respectively, CPU 4290 and GPU 4292.

After CUDA source code 4210 is translated to HIP source code 4230, HIP compiler driver 4240 may subsequently be used to generate executable code for either CUDA-enabled GPU 4294 or GPU 4292 without re-executing CUDA to HIP translation tool 4220. CUDA to HIP translation tool 4220 can translate CUDA source code 4210 to HIP source code 4230 that is then stored in memory. HIP compiler driver 4240 can then configure HCC 4260 to generate host executable code 4270(2) and HCC device executable code 4282 based on HIP source code 4230. In at least one embodiment, HIP compiler driver 4240 subsequently configures CUDA compiler 4250 to generate host executable code 4270(1) and CUDA device executable code 4284 based on stored HIP source code 4230.

An example kernel may be translated by CUDA-to-HIP translation tool 4220 of FIG. 42, in accordance with at least one embodiment. CUDA source code 4210 partitions an overall problem that a given kernel is designed to solve into relatively coarse sub-problems that can independently be solved using thread blocks. Each thread block includes any number of threads. Each sub-problem can be partitioned into relatively fine pieces that can be solved cooperatively in parallel by threads within a thread block. Threads within a thread block can cooperate by sharing data through shared memory and by synchronizing execution to coordinate memory accesses.

CUDA source code 4210 can organize thread blocks associated with a given kernel into a one-dimensional, a two-dimensional, or a three-dimensional grid of thread blocks. Each thread block includes any number of threads, and a grid includes any number of thread blocks.

A kernel can be a function in device code that is defined using a "_global_" declaration specifier. The dimension of a grid that executes a kernel for a given kernel call and associated streams may be specified using a CUDA kernel launch syntax. CUDA kernel launch syntax is specified as "KernelName<<<GridSize, BlockSize, SharedMemorySize, Stream>>>(KernelArguments);". An execution configuration syntax can include a "<<< . . . >>>" construct that is inserted between a kernel name ("KernelName") and a parenthesized list of kernel arguments ("KernelArguments"). CUDA kernel launch syntax can include a CUDA launch function syntax instead of an execution configuration syntax.

"GridSize" can be of a type dim3 and specify the dimension and size of a grid. Type dim3 may be a CUDA-defined structure that includes unsigned integers x, y, and z. If z is not specified, then z may default to one. If y is not specified, then y may default to one. The number of thread blocks in a grid can be equal to the product of GridSize.x, GridSize.y, and GridSize.z. "BlockSize" can be of type dim3 and specify the dimension and size of each thread block. The number of threads per thread block may be equal to the product of BlockSize.x, BlockSize.y, and BlockSize.z. Each thread that executes a kernel may be given a unique thread ID that is accessible within the kernel through a built-in variable (e.g., "threadIdx").

With respect to CUDA kernel launch syntax, "SharedMemorySize" may be an optional argument that may specify a number of bytes in a shared memory that is dynamically allocated per thread block for a given kernel call in addition to statically allocated memory. With respect to CUDA kernel launch syntax, SharedMemorySize may default to zero. With respect to CUDA kernel launch syntax, "Stream" may be an optional argument that specifies an associated stream and defaults to zero to specify a default stream. A stream may be a sequence of commands (possibly issued by different host threads) that execute in order. Different streams may execute commands out of order with respect to one another or concurrently.

CUDA source code 4210 may include a kernel definition for an example kernel "MatAdd" and a main function. Main function may be host code that executes on a host and includes a kernel call that causes kernel MatAdd to execute on a device. Kernel MatAdd can add two matrices A and B of size N×N, where N is a positive integer, and store the result in a matrix C. Main function can define a threadsPerBlock variable as 16 by 16 and a numBlocks variable as N/16 by N/16. Main function can then specify kernel call "MatAdd<<<numBlocks, threadsPerBlock>>> (A, B, C);". As per CUDA kernel launch syntax, kernel MatAdd can be executed using a grid of thread blocks having a dimension N/16 by N/16, where each thread block has a dimension of 16 by 16. Each thread block can include 256 threads, a grid can be created with enough blocks to have one thread per matrix element, and each thread in such a grid may execute kernel MatAdd to perform one pair-wise addition.

While translating CUDA source code 4210 to HIP source code 4230, CUDA to HIP translation tool 4220 may translate each kernel call in CUDA source code 4210 from CUDA kernel launch syntax to a HIP kernel launch syntax and may convert any number of other CUDA calls in source code 4210 to any number of other functionally similar HIP calls. HIP kernel launch syntax can be specified as "hipLaunchKernelGGL (KernelName,GridSize, BlockSize, SharedMemorySize, Stream, KernelArguments);". Each of KernelName, GridSize, BlockSize, ShareMemorySize, Stream, and KernelArguments can have the same meaning in HIP kernel launch syntax as in CUDA kernel launch syntax (described previously herein). Arguments SharedMemorySize and Stream can be required in HIP kernel launch syntax and can be optional in CUDA kernel launch syntax.

A portion of HIP source code 4230 can be identical to a portion of CUDA source code 4210 depicted except for a kernel call that causes kernel MatAdd to execute on a device. Kernel MatAdd may be defined in HIP source code 4230 with the same "_global_" declaration specifier with which kernel MatAdd is defined in CUDA source code 4210. A kernel call in HIP source code 4230 may be "hipLaunchKernelGGL (MatAdd, numBlocks, threadsPerBlock, 0, 0, A, B, C);", while a corresponding kernel call in CUDA source code 4210 is "MatAdd<<<numBlocks, threadsPerBlock>>> (A, B, C);".

Other implementations are contemplated and can be performed similarly to the CUDA and HIP implementations above, such as oneAPI, OpenCL, and other programming platforms. Code can be translated in any direction. For example, CUDA can be translated to HIP, and CUDA can be translated to OpenCL. SnuCL-Tr and CUCL can be used to translate OpenCL to CUDA or CUDA to OpenCL, respectively. Compiled code or intermediate representations (e.g., CUDA PTX code) can also be translated to run on other processor platforms (e.g., AMD or Intel). For example, PTX code can be translated to run on Intel or AMD processors using a translation tool, such as ZLUDA.

One or more techniques described herein can utilize a oneAPI programming model. A oneAPI programming model can refer to a programming model for interacting with various compute accelerator architectures. OneAPI may refer to an application programming interface (API) designed to interact with various compute accelerator architectures. A oneAPI programming model may utilize a DPC++ programming language. A DPC++ programming language may refer to a high-level language for data parallel programming productivity. A DPC++ programming language can be based at least in part on C and/or C++ programming languages. A oneAPI programming model can be a programming model such as, but not limited to, those developed by Intel Corporation of Santa Clara, CA.

OneAPI and/or oneAPI programming model can be utilized to interact with various accelerator, GPU, processor, and/or variations thereof, architectures. OneAPI may include a set of libraries that implement various functionalities. OneAPI may include at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

A oneAPI DPC++ library, also referred to as oneDPL, can be a library that implements algorithms and functions to accelerate DPC++ kernel programming. OneDPL may implement one or more standard template library (STL) functions. OneDPL can implement one or more parallel STL functions. OneDPL can provide a set of library classes and functions such as, but not limited to, parallel algorithms, iterators, function object classes, range-based API, and/or variations thereof. OneDPL can implement one or more classes and/or functions of a C++ standard library. OneDPL can implement one or more random number generator functions.

A oneAPI math kernel library, also referred to as oneMKL, can be a library that implements various optimized and parallelized routines for various mathematical functions and/or operations. OneMKL can implement one or more basic linear algebra subprograms (BLAS) and/or linear algebra package (LAPACK) dense linear algebra routines. OneMKL may implement one or more sparse BLAS linear algebra routines. OneMKL can implement one or more random number generators (RNGs). OneMKL may implement one or more vector mathematics (VM) routines for mathematical operations on vectors. OneMKL may implement one or more Fast Fourier Transform (FFT) functions.

A oneAPI data analytics library, also referred to as oneDAL, can include a library that implements various data analysis applications and distributed computations. OneDAL can implement various algorithms for preprocessing, transformation, analysis, modeling, validation, and decision making for data analytics, in batch, online, and distributed processing modes of computation. OneDAL can implement various C++ and/or Java APIs and various connectors to one or more data sources. OneDAL may implement DPC++ API extensions to a traditional C++ interface and enables GPU usage for various algorithms.

A oneAPI deep neural network library, also referred to as oneDNN, can include a library that implements various deep learning functions. OneDNN may implement various neural network, machine learning, and deep learning functions, algorithms, and/or variations thereof.

A oneAPI collective communications library, also referred to as oneCCL, can include a library that implements various applications for deep learning and machine learning workloads. OneCCL can be built upon lower-level communication middleware, such as, but not limited to, message passing interface (MPI) and libfabrics. OneCCL can enable a set of deep learning specific optimizations, such as, but not limited to, prioritization, persistent operations, out of order executions, and/or variations thereof. OneCCL can implement various CPU and GPU functions.

A oneAPI threading building blocks library, also referred to as oneTBB, can include a library that implements various parallelized processes for various applications. OneTBB can be utilized for task-based, shared parallel programming on a host. OneTBB may implement generic parallel algorithms. OneTBB may implement concurrent containers. OneTBB may implement a scalable memory allocator. OneTBB may implement a work-stealing task scheduler. OneTBB may implement low-level synchronization primitives. OneTBB may be compiler-independent and usable on various processors, such as, but not limited to, GPUs, PPUs, CPUs, and/or variations thereof.

A oneAPI video processing library, also referred to as oneVPL, can include a library that is utilized for accelerating video processing in one or more applications. OneVPL can implement various video decoding, encoding, and processing functions. One VPL can implement various functions for media pipelines on CPUs, GPUs, and other accelerators. OneVPL can implement device discovery and selection in media centric and video analytics workloads. One VPL can implement API primitives for zero-copy buffer sharing.

A oneAPI programming model may utilize a DPC++ programming language. A DPC++ programming language can include a programming language that can include functionally similar versions of CUDA mechanisms to define device code and distinguish between device code and host code. A DPC++ programming language may include a subset of functionality of a CUDA programming language. One or more CUDA programming model operations may be performed using a oneAPI programming model using a DPC++ programming language.

Any application programming interface (API) described herein can be compiled into one or more instructions, operations, or any other signal by a compiler, interpreter, or other software tool. Compilation can include generating one or more machine-executable instructions, operations, or other signals from source code. An API compiled into one or more instructions, operations, or other signals, when performed, can cause one or more processors such as, but not limited to, processors described, e.g., in FIG. 27-39, or any other logic circuit further described herein to perform one or more computing operations.

In at least one embodiment, translation tools described elsewhere herein, such as, but not limited to, can include one or more circuits to translate CUDA code to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, to HIP, oneAPI, OpenCL, or any other language used to perform any of the operations described above or elsewhere herein. One or more circuits can be configured by software to translate CUDA code to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, to HIP, oneAPI, OpenCL, or any other language used to perform any of the operations described above or elsewhere herein.

Autonomous Vehicle

Figure 43:
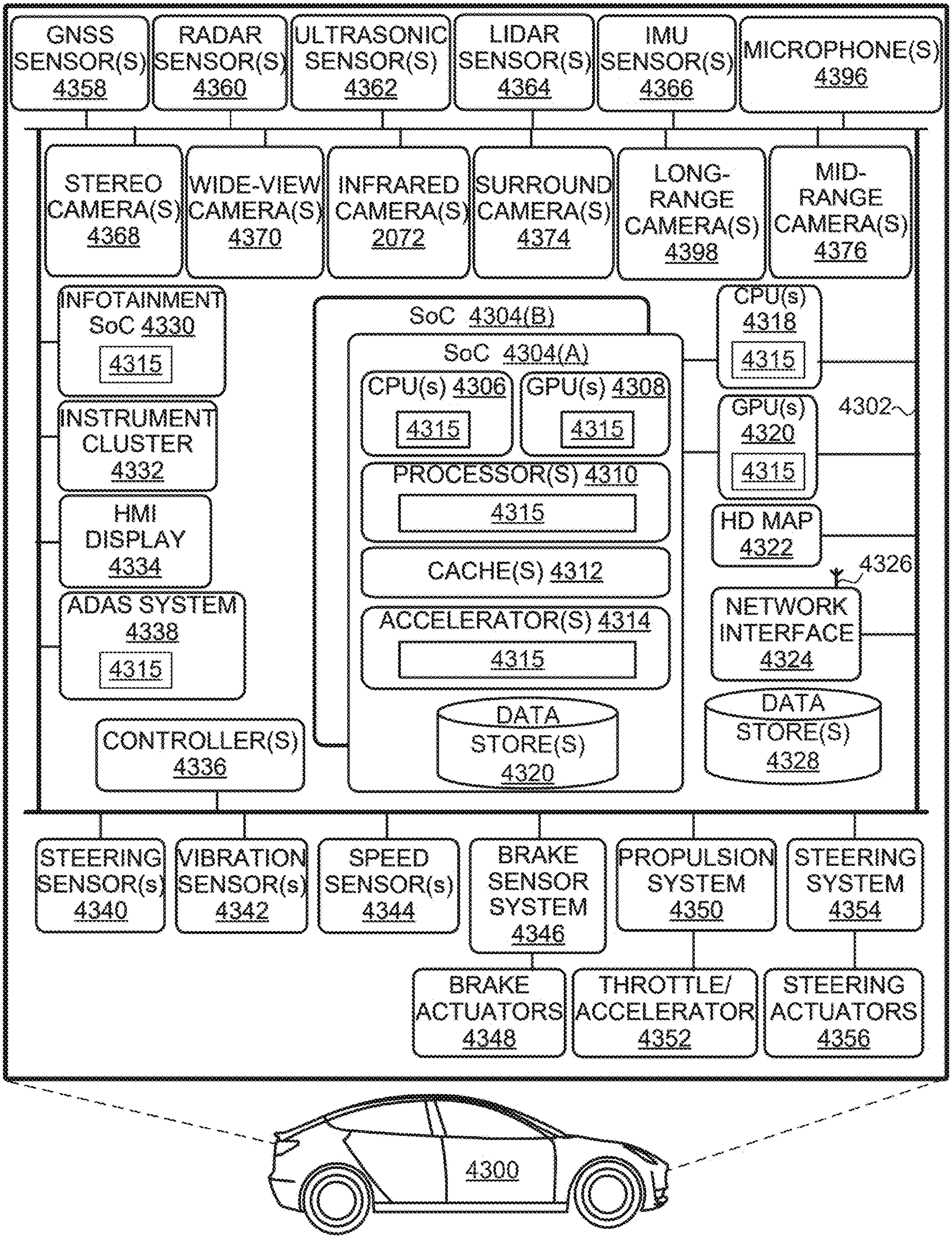
FIG. 43 illustrates an example of an autonomous vehicle and its system architecture, in accordance with at least one embodiment.

FIG. 43 illustrates an example of an autonomous vehicle 4300, in accordance with at least one embodiment. Autonomous vehicle 4300 (alternatively referred to herein as "vehicle 4300") may be a passenger vehicle, such as, but not limited to, a car, a truck, a bus, and/or another type of vehicle that accommodates one or more passengers. In at least one embodiment, vehicle 4300 may be a semi-tractor-trailer truck used for hauling cargo. Vehicle 4300 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, vehicle 4300 may be capable of functionality in accordance with one or more of Level 1 through Level 5 of autonomous driving levels. For example, in at least one embodiment, vehicle 4300 may be capable of conditional automation (Level 3), high automation (Level 4), and/or full automation (Level 5), depending on embodiment.

Vehicle 4300 may include components such as, but not limited to, a chassis, a vehicle body, wheels (e.g., 2, 4, 6, 8, 18, etc.), tires, axles, and other components of a vehicle. Vehicle 4300 may include a propulsion system 4350, such as, but not limited to, an internal combustion engine, hybrid electric power plant, an all-electric engine, and/or another propulsion system type. Propulsion system 4350 may be connected to a drive train of vehicle 4300, which may include a transmission, to enable propulsion of vehicle 4300. Propulsion system 4350 may be controlled in response to receiving signals from a throttle/accelerator(s) 4352.

A steering system 4354, which may include a steering wheel, is used to steer vehicle 4300 (e.g., along a desired path or route) when propulsion system 4350 is operating (e.g., when vehicle 4300 is in motion). Steering system 4354 may receive signals from steering actuator(s) 4356. A steering wheel may be optional for full automation (Level 5) functionality. A brake sensor system 4346 may be used to operate vehicle brakes in response to receiving signals from brake actuator(s) 4348 and/or brake sensors.

Controller(s) 4336, which may include one or more system on chips ("SoCs") and/or graphics processing unit(s) ("GPU(s)"), can provide signals (e.g., representative of commands) to one or more components and/or systems of vehicle 4300. For instance, controller(s) 4336 may send signals to operate vehicle brakes via brake actuator(s) 4348, to operate steering system 4354 via steering actuator(s) 4356, to operate propulsion system 4350 via throttle/accelerator(s) 4352. Controller(s) 4336 may include one or more onboard (e.g., integrated) computing devices that process sensor signals, and output operation commands (e.g., signals representing commands) to enable autonomous driving and/or to assist a human driver in driving vehicle 4300. Controller(s) 4336 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. A single controller may handle two or more of above functionalities, two or more controllers may handle a single functionality, and/or any combination thereof.

Controller(s) 4336 may provide signals for controlling one or more components and/or systems of vehicle 4300 in response to sensor data received from one or more sensors (e.g., sensor inputs). Sensor data may be received from, for example, global navigation satellite systems ("GNSS") sensor(s) 4358 (e.g., Global Positioning System sensor(s)), RADAR sensor(s) 4360, ultrasonic sensor(s) 4362, LIDAR sensor(s) 4364, inertial measurement unit ("IMU") sensor(s) 4366 (e.g., accelerometer(s), gyroscope(s), a magnetic compass or magnetic compasses, magnetometer(s), etc.), microphone(s) 4396, stereo camera(s) 4368, wide-view camera(s) 4370 (e.g., fisheye cameras), infrared camera(s) 4372, surround camera(s) 4374 (e.g., 360 degree cameras), long-range cameras 4398, mid-range camera(s) 4376, speed sensor(s) 4344 (e.g., for measuring speed of vehicle 4300), vibration sensor(s) 4342, steering sensor(s) 4340, brake sensor(s) (e.g., as part of brake sensor system 4346), and/or other sensor types.

One or more of controller(s) 4336 may receive inputs (e.g., represented by input data) from an instrument cluster 4332 of vehicle 4300 and provide outputs (e.g., represented by output data, display data, etc.) via a human-machine interface ("HMI") display 4334, an audible annunciator, a loudspeaker, and/or via other components of vehicle 4300. Outputs may include information such as, but not limited to, vehicle velocity, speed, time, map data (e.g., a High Definition map (not shown), location data (e.g., vehicle's 4300 location, such as, but not limited to, on a map), direction, location of other vehicles (e.g., an occupancy grid), information about objects and status of objects as perceived by controller(s) 4336, etc. For example, HMI display 4334 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

Each of components, features, and systems of vehicle 4300 in FIG. 43 may be connected via a bus 4302. Bus 4302 may include a CAN data interface (alternatively referred to herein as a "CAN bus"). A CAN may be a network inside vehicle 4300 used to aid in control of various features and functionality of vehicle 4300, such as, but not limited to, actuation of brakes, acceleration, braking, steering, windshield wipers, etc. Bus 4302 may be configured to have dozens or even hundreds of nodes, each with its own unique identifier (e.g., a CAN ID). Bus 4302 may be read to find steering wheel angle, ground speed, engine revolutions per minute ("RPMs"), button positions, and/or other vehicle status indicators. Bus 4302 may be a CAN bus that is ASIL B compliant.

In addition to, or alternatively from CAN, FlexRay and/or Ethernet protocols may be used. There may be any number of busses forming bus 4302, which may include zero or more CAN busses, zero or more FlexRay busses, zero or more Ethernet busses, and/or zero or more other types of busses using different protocols. Two or more busses may be used to perform different functions, and/or may be used for redundancy. For example, a first bus may be used for collision avoidance functionality and a second bus may be used for actuation control. Each bus of bus 4302 may communicate with any of components of vehicle 4300, and two or more busses of bus 4302 may communicate with corresponding components. Each of any number of system(s) on chip(s) ("SoC(s)") 4304 (such as, but not limited to, SoC 4304(A) and SoC 4304(B)), each of controller(s) 4336, and/or each computer within vehicle may have access to same input data (e.g., inputs from sensors of vehicle 4300), and may be connected to a common bus, such CAN bus.

Any number of cameras can be positioned at any choice of camera locations and fields of view for autonomous vehicle 4300 of FIG. 43A, in accordance with at least one embodiment. Cameras and respective fields of view may be one example embodiment and are not intended to be limiting. For instance, additional and/or alternative cameras may be included and/or cameras may be located at different locations on vehicle 4300.

Camera types for cameras may include digital cameras that may be adapted for use with components and/or systems of vehicle 4300. Camera(s) may operate at automotive safety integrity level ("ASIL") B and/or at another ASIL. Camera types may be capable of any image capture rate, such as, but not limited to, 60 frames per second (fps), 1220 fps, 240 fps, etc., depending on embodiment. Cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. Clear pixel cameras, such as, but not limited to, cameras with an RCCC, an RCCB, and/or an RBGC color filter array, may be used in an effort to increase light sensitivity.

One or more of camera(s) may be used to perform advanced driver assistance systems ("ADAS") functions (e.g., as part of a redundant or fail-safe design). For example, a Multi-Function Mono Camera may be installed to provide functions including lane departure warning, traffic sign assist and intelligent headlamp control. One or more of camera(s) (e.g., all cameras) may record and provide image data (e.g., video) simultaneously.

One or more cameras may be mounted in a mounting assembly, such as, but not limited to, a custom designed (three-dimensional ("3D") printed) assembly, in order to cut out stray light and reflections from within vehicle 4300 (e.g., reflections from dashboard reflected in windshield mirrors) which may interfere with camera image data capture abilities. With reference to wing-mirror mounting assemblies, wing-mirror assemblies may be custom 3D printed so that a camera mounting plate matches a shape of a wing-mirror. Camera(s) may be integrated into wing-mirrors. For side-view cameras, camera(s) may also be integrated within four pillars at each corner of a cabin.

Cameras with a field of view that include portions of an environment in front of vehicle 4300 (e.g., front-facing cameras) may be used for surround view, to help identify forward facing paths and obstacles, as well as aid in, with help of one or more of controller(s) 4336 and/or control SoCs, providing information critical to generating an occupancy grid and/or determining preferred vehicle paths. Front-facing cameras may be used to perform many similar ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as, but not limited to, traffic sign recognition.

A variety of cameras may be used in a front-facing configuration, including, for example, a monocular camera platform that includes a CMOS ("complementary metal oxide semiconductor") color imager. A wide-view camera 4370 may be used to perceive objects coming into view from a periphery (e.g., pedestrians, crossing traffic or bicycles). There may be any number (including zero) wide-view cameras 4370 on vehicle 4300. Any number of long-range camera(s) 4398 (e.g., a long-view stereo camera pair) may be used for depth-based object detection, especially for objects for which a neural network has not yet been trained. Long-range camera(s) 4398 may also be used for object detection and classification, as well as basic object tracking.

Any number of stereo camera(s) 4368 may also be included in a front-facing configuration. One or more of stereo camera(s) 4368 may include an integrated control unit comprising a scalable processing unit, which may provide a programmable logic ("FPGA") and a multi-core microprocessor with an integrated Controller Area Network ("CAN") or Ethernet interface on a single chip. Such a unit may be used to generate a 3D map of an environment of vehicle 4300, including a distance estimate for all points in an image. One or more of stereo camera(s) 4368 may include compact stereo vision sensor(s) that may include two camera lenses (one each on left and right) and an image processing chip that may measure distance from vehicle 4300 to target object and use generated information (e.g., metadata) to activate autonomous emergency braking and lane departure warning functions. Other types of stereo camera(s) 4368 may be used in addition to, or alternatively from, those described herein.

Cameras with a field of view that include portions of environment to sides of vehicle 4300 (e.g., side-view cameras) may be used for surround view, providing information used to create and update an occupancy grid, as well as to generate side impact collision warnings. For example, surround camera(s) 4374 (e.g., four surround cameras) could be positioned on vehicle 4300. Surround camera(s) 4374 may include any number and combination of wide-view cameras, fisheye camera(s), 360 degree camera(s), and/or similar cameras. For instance, four fisheye cameras may be positioned on a front, a rear, and sides of vehicle 4300. Vehicle 4300 may use three surround camera(s) 4374 (e.g., left, right, and rear), and may leverage one or more other camera(s) (e.g., a forward-facing camera) as a fourth surround-view camera.

Cameras with a field of view that include portions of an environment behind vehicle 4300 (e.g., rear-view cameras) may be used for parking assistance, surround view, rear collision warnings, and creating and updating an occupancy grid. A wide variety of cameras may be used including, but not limited to, cameras that may be also suitable as a front-facing camera(s) (e.g., long-range cameras 4398 and/or mid-range camera(s) 4376, stereo camera(s) 4368, infrared camera(s) 4372, etc.) as described herein.

Vehicle 4300 may include any number of SoCs 4304 or other processors described elsewhere herein, such as, but not limited to, processors and/or components illustrated and described for FIGS. 27-39. Each of SoCs 4304 may include central processing units ("CPU(s)") 4306, graphics processing units ("GPU(s)") 4308, processor(s) 4310, cache(s) 4312, accelerator(s) 4314, data store(s) 4316, and/or other components and features not illustrated. SoC(s) 4304 may be used to control vehicle 4300 in a variety of platforms and systems. For example, SoC(s) 4304 may be combined in a system (e.g., system of vehicle 4300) with a High Definition ("HD") map 4322 which may obtain map refreshes and/or updates via network interface 4324 from one or more servers (not shown).

CPU(s) 4306 may include a CPU cluster or CPU complex (alternatively referred to herein as a "CCPLEX"). CPU(s) 4306 may include multiple cores and/or level two ("L2") caches. For instance, CPU(s) 4306 may include eight cores in a coherent multi-processor configuration. CPU(s) 4306 may include four dual-core clusters where each cluster has a dedicated L2 cache (e.g., a 2 megabyte (MB) L2 cache). CPU(s) 4306 (e.g., CCPLEX) may be configured to support simultaneous cluster operations enabling any combination of clusters of CPU(s) 4306 to be active at any given time.

One or more of CPU(s) 4306 may implement power management capabilities that include one or more of following features: individual hardware blocks may be clock-gated automatically when idle to save dynamic power; each core clock may be gated when such core is not actively executing instructions due to execution of Wait for Interrupt ("WFI")/Wait for Event ("WFE") instructions; each core may be independently power-gated; each core cluster may be independently clock-gated when all cores may be clock-gated or power-gated; and/or each core cluster may be independently power-gated when all cores may be power-gated. CPU(s) 4306 may further implement an enhanced algorithm for managing power states, where allowed power states and expected wakeup times may be specified, and hardware/microcode determines which best power state to enter for core, cluster, and CCPLEX. Processing cores may support simplified power state entry sequences in software with work offloaded to microcode.

GPU(s) 4308 may include an integrated GPU (alternatively referred to herein as an "iGPU"). GPU(s) 4308 may be programmable and may be efficient for parallel workloads. GPU(s) 4308 may use an enhanced tensor instruction set. GPU(s) 4308 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). GPU(s) 4308 may include at least eight streaming microprocessors. GPU(s) 4308 may use compute application programming interface(s) (API(s)). GPU(s) 4308 may use one or more parallel computing platforms and/or programming models (e.g., NVIDIA's CUDA model). Streaming microprocessors may be referred to as streaming multiprocessors ("SMs"), stream processors ("SPs"), stream processing units ("SPUs"), compute units ("CUs"), execution units ("EUs"), and/or slices, where a slice in this context can refer to a portion of processing resources in a processing unit (e.g., 16 cores, a ray tracing unit, a thread director or scheduler).

One or more of GPU(s) 4308 may be power-optimized for best performance in automotive and embedded use cases. For example, GPU(s) 4308 could be fabricated on Fin field-effect transistor ("FinFET") circuitry. Each streaming microprocessor may incorporate a number of mixed-precision processing cores partitioned into multiple blocks. For example, 64 PF32 cores and 32 FP64 cores could be partitioned into four processing blocks. Each processing block could be allocated 16 FP32 cores, 8 FP64 cores, 16 INT32 cores, two mixed-precision NVIDIA Tensor cores for deep learning matrix arithmetic, a level zero ("L0") instruction cache, a scheduler (e.g., warp scheduler) or sequencer, a dispatch unit, and/or a 64 KB register file. Streaming microprocessors may include independent parallel integer and floating-point data paths to provide for efficient execution of workloads with a mix of computation and addressing calculations. Streaming microprocessors may include independent thread scheduling capability to enable finer-grain synchronization and cooperation between parallel threads. Streaming microprocessors may include a combined L1 data cache and shared memory unit in order to improve performance while simplifying programming.

One or more of GPU(s) 4308 may include a high bandwidth memory ("HBM") and/or a 16 GB HBM2 memory subsystem to provide, in some examples, about 900 GB/second peak memory bandwidth. In addition to, or alternatively from, HBM memory, a synchronous graphics random-access memory ("SGRAM") may be used, such as, but not limited to, a graphics double data rate type five synchronous random-access memory ("GDDR5").

GPU(s) 4308 may include unified memory technology. Address translation services ("ATS") support may be used to allow GPU(s) 4308 to access CPU(s) 4306 page tables directly. When a GPU of GPU(s) 4308 memory management unit ("MMU") experiences a miss, an address translation request may be transmitted to CPU(s) 4306. In response, 2 CPU of CPU(s) 4306 may look in its page tables for a virtual-to-physical mapping for an address and transmit translation back to GPU(s) 4308. Unified memory technology may allow a single unified virtual address space for memory of both CPU(s) 4306 and GPU(s) 4308, thereby simplifying GPU(s) 4308 programming and porting of applications to GPU(s) 4308.

GPU(s) 4308 may include any number of access counters that may keep track of frequency of access of GPU(s) 4308 to memory of other processors. Access counter(s) may help ensure that memory pages may be moved to physical memory of a processor that is accessing pages most frequently, thereby improving efficiency for memory ranges shared between processors.

One or more of SoC(s) 4304 may include any number of cache(s) 4312, including those described herein. For example, cache(s) 4312 could include a level three ("L3") cache that is available to both CPU(s) 4306 and GPU(s)

4308 (e.g., that is connected to CPU(s) 4306 and GPU(s) 4308). Cache(s) 4312 may include a write-back cache that may keep track of states of lines, such as, but not limited to, by using a cache coherence protocol (e.g., MEI, MESI, MSI, etc.). A L3 cache may include 4 MB of memory or more, depending on embodiment, although smaller cache sizes may be used.

One or more of SoC(s) 4304 may include one or more accelerator(s) 4314 (e.g., hardware accelerators, software accelerators, or a combination thereof). SoC(s) 4304 may include a hardware acceleration cluster that may include optimized hardware accelerators and/or large on-chip memory. Large on-chip memory (e.g., 4 MB of SRAM), may enable a hardware acceleration cluster to accelerate neural networks and other calculations. A hardware acceleration cluster may be used to complement GPU(s) 4308 and to off-load some of tasks of GPU(s) 4308 (e.g., to free up more cycles of GPU(s) 4308 for performing other tasks). Accelerator(s) 4314 could be used for targeted workloads (e.g., perception, convolutional neural networks ("CNNs"), recurrent neural networks ("RNNs"), etc.) that may be stable enough to be amenable to acceleration. A CNN may include a region-based or regional convolutional neural networks ("RCNNs") and Fast RCNNs (e.g., as used for object detection) or other type of CNN.

Accelerator(s) 4314 (e.g., hardware acceleration cluster) may include one or more deep learning accelerator ("DLA"). DLA(s) may include one or more Tensor processing units ("TPUs") that may be configured to provide an additional ten trillion operations per second for deep learning applications and inferencing, such as TPU(s) described herein, e.g., in FIG. 37. TPUs may be accelerators configured to, and optimized for, performing image processing functions (e.g., for CNNs, RCNNs, etc.). DLA(s) may further be optimized for a specific set of neural network types and floating point operations, as well as inferencing. Design of DLA(s) may provide more performance per millimeter than a typical general-purpose GPU, and typically vastly exceeds performance of a CPU. TPU(s) may perform several functions, including a single-instance convolution function, supporting, for example, INT8, INT16, and FP16 data types for both features and weights, as well as post-processor functions. DLA(s) may quickly and efficiently execute neural networks, especially CNNs, on processed or unprocessed data for any of a variety of functions, including, for example: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

DLA(s) may perform any function of GPU(s) 4308, and by using an inference accelerator, for example, a designer may target either DLA(s) or GPU(s) 4308 for any function. For example, a designer may focus processing of CNNs and floating point operations on DLA(s) and leave other functions to GPU(s) 4308 and/or accelerator(s) 4314.

Accelerator(s) 4314 may include programmable vision accelerator ("PVA"), which may alternatively be referred to herein as a computer vision accelerator. PVA may be designed and configured to accelerate computer vision algorithms for advanced driver assistance system ("ADAS") 4338, autonomous driving, augmented reality ("AR") applications, and/or virtual reality ("VR") applications. PVA may provide a balance between performance and flexibility. For example, each PVA may include, for example, any number of reduced instruction set computer ("RISC") cores, direct memory access ("DMA"), and/or any number of vector processors.

RISC cores may interact with image sensors (e.g., image sensors of any cameras described herein), image signal processor(s), etc. Each RISC core may include any amount of memory. RISC cores may use any of a number of protocols, depending on embodiment. RISC cores may execute a real-time operating system ("RTOS"). RISC cores may be implemented using one or more integrated circuit devices, application specific integrated circuits ("ASICs"), and/or memory devices. For example, RISC cores could include an instruction cache and/or a tightly coupled RAM.

DMA may enable components of PVA to access system memory independently of CPU(s) 4306. DMA may support any number of features used to provide optimization to a PVA including supporting multi-dimensional addressing and/or circular addressing. DMA may support up to six or more dimensions of addressing, which may include block width, block height, block depth, horizontal block stepping, vertical block stepping, and/or depth stepping.

Vector processors may be programmable processors that may be designed to efficiently and flexibly execute programming for computer vision algorithms and provide signal processing capabilities. A PVA may include a PVA core and two vector processing subsystem partitions. A PVA core may include a processor subsystem, DMA engine(s) (e.g., two DMA engines), and/or other peripherals. A vector processing subsystem may operate as a primary processing engine of a PVA, and may include a vector processing unit ("VPU"), an instruction cache, and/or vector memory (e.g., "VMEM"). VPU core may include a digital signal processor such as, but not limited to, a single instruction, multiple data ("SIMD"), very long instruction word ("VLIW") digital signal processor. A combination of SIMD and VLIW may enhance throughput and speed.

Each of vector processors may include an instruction cache and may be coupled to dedicated memory. As a result, each of vector processors may be configured to execute independently of other vector processors. Vector processors that may be included in a particular PVA may be configured to employ data parallelism. For instance, plurality of vector processors included in a single PVA may execute a common computer vision algorithm, but on different regions of an image. Vector processors included in a particular PVA may simultaneously execute different computer vision algorithms, on one image, or even execute different algorithms on sequential images or portions of an image. Among other things, any number of PVAs may be included in hardware acceleration cluster and any number of vector processors may be included in each PVA. PVA may include additional error correcting code ("ECC") memory, to enhance overall system safety.

Accelerator(s) 4314 may include a computer vision network on-chip and static random-access memory ("SRAM"), for providing a high-bandwidth, low latency SRAM for accelerator(s) 4314. On-chip memory may include at least 4 MB SRAM, including, for example, eight field-configurable memory blocks, that may be accessible by both a PVA and a DLA. Each pair of memory blocks may include an advanced peripheral bus ("APB") interface, configuration circuitry, a controller, and a multiplexer. Any type of memory may be used. A PVA and a DLA may access memory via a backbone that provides a PVA and a DLA with high-speed access to memory. A backbone may include a computer vision network on-chip that interconnects a PVA and a DLA to memory (e.g., using APB).

A computer vision network on-chip may include an interface that determines, before transmission of any control signal/address/data, that both a PVA and a DLA provide ready and valid signals. An interface may provide for separate phases and separate channels for transmitting control signals/addresses/data, as well as burst-type communications for continuous data transfer. An interface may comply with International Organization for Standardization ("ISO") 26262 or International Electrotechnical Commission ("IEC") 61508 standards, although other standards and protocols may be used.

One or more of SoC(s) 4304 may include a real-time ray-tracing hardware accelerator. Real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

Accelerator(s) 4314 can have a wide array of uses for autonomous driving. A PVA may be used for key processing stages in ADAS and autonomous vehicles. A PVA's capabilities may be a good match for algorithmic domains needing predictable processing, at low power and low latency. In other words, a PVA can perform well on semi-dense or dense regular computation, even on small data sets, which might require predictable run-times with low latency and low power. In vehicle 4300, PVAs might be designed to run classic computer vision algorithms, as they can be efficient at object detection and operating on integer math. For example, a PVA is used to perform computer stereo vision. A semi-global matching-based algorithm may be used in some examples, although this is not intended to be limiting. Applications for Level 3-5 autonomous driving use motion estimation/stereo matching on-the-fly (e.g., structure from motion, pedestrian recognition, lane detection, etc.). A PVA may perform computer stereo vision functions on inputs from two monocular cameras. A PVA may be used to perform dense optical flow. For example, a PVA could process raw RADAR data (e.g., using a 4D Fast Fourier Transform) to provide processed RADAR data. A PVA is used for time of flight depth processing, by processing raw time of flight data to provide processed time of flight data, for example.

A DLA may be used to run any type of network to enhance control and driving safety, including, for example, a neural network that outputs a measure of confidence for each object detection. Confidence may be represented or interpreted as a probability, or as providing a relative "weight" of each detection compared to other detections. A confidence measure enables a system to make further decisions regarding which detections should be considered as true positive detections rather than false positive detections. A system may set a threshold value for confidence and consider only detections exceeding threshold value as true positive detections. When an automatic emergency braking ("AEB") system is used, false positive detections can cause vehicle to automatically perform emergency braking, which is obviously undesirable. Highly confident detections may be considered as triggers for AEB. a DLA may run a neural network for regressing confidence value. A neural network may take as its input at least some subset of parameters, such as, but not limited to, bounding box dimensions, ground plane estimate obtained (e.g., from another subsystem), output from IMU sensor(s) 4366 that correlates with vehicle 4300 orientation, distance, 3D location estimates of object obtained from neural network and/or other sensors (e.g., LIDAR sensor(s) 4364 or RADAR sensor(s) 4360), among others.

One or more of SoC(s) 4304 may include data store(s) 4316 (e.g., memory). Data store(s) 4316 may be on-chip memory of SoC(s) 4304, which may store neural networks to be executed on GPU(s) 4308 and/or a DLA. Data store(s) 4316 may be large enough in capacity to store multiple instances of neural networks for redundancy and safety. Data store(s) 4316 may comprise L2 or L3 cache(s).

One or more of SoC(s) 4304 may include any number of processor(s) 4310 (e.g., embedded processors). Processor(s) 4310 may include a boot and power management processor that may be a dedicated processor and subsystem to handle boot power and management functions and related security enforcement. A boot and power management processor may be a part of a boot sequence of SoC(s) 4304 and may provide runtime power management services. A boot power and management processor may provide clock and voltage programming, assistance in system low power state transitions, management of SoC(s) 4304 thermals and temperature sensors, and/or management of SoC(s) 4304 power states. Each temperature sensor may be implemented as a ring-oscillator whose output frequency is proportional to temperature, and SoC(s) 4304 may use ring-oscillators to detect temperatures of CPU(s) 4306, GPU(s) 4308, and/or accelerator(s) 4314. If temperatures may be determined to exceed a threshold, then a boot and power management processor may enter a temperature fault routine and put SoC(s) 4304 into a lower power state and/or put vehicle 4300 into a chauffeur to safe stop mode (e.g., bring vehicle 4300 to a safe stop).

Processor(s) 4310 may further include a set of embedded processors that may serve as an audio processing engine which may be an audio subsystem that enables full hardware support for multi-channel audio over multiple interfaces, and a broad and flexible range of audio I/O interfaces. An audio processing engine is a dedicated processor core with a digital signal processor with dedicated RAM.

Processor(s) 4310 may further include an always-on processor engine that may provide necessary hardware features to support low power sensor management and wake use cases. An always-on processor engine may include a processor core, a tightly coupled RAM, supporting peripherals (e.g., timers and interrupt controllers), various I/O controller peripherals, and routing logic.

Processor(s) 4310 may further include a safety cluster engine that may include a dedicated processor subsystem to handle safety management for automotive applications. A safety cluster engine may include two or more processor cores, a tightly coupled RAM, support peripherals (e.g., timers, an interrupt controller, etc.), and/or routing logic. In a safety mode, two or more cores may operate, in a lockstep mode and function as a single core with comparison logic to detect any differences between their operations. Processor(s) 4310 may further include a real-time camera engine that may include a dedicated processor subsystem for handling real-time camera management. Processor(s) 4310 may further include a high-dynamic range signal processor that may include an image signal processor that is a hardware engine that is part of a camera processing pipeline.

Processor(s) 4310 may include a video image compositor that may be a processing block (e.g., implemented on a microprocessor) that implements video post-processing functions needed by a video playback application to produce a final image for a player window. A video image compositor may perform lens distortion correction on wide-view camera(s) 4370, surround camera(s) 4374, and/or on in-cabin monitoring camera sensor(s). In-cabin monitoring camera sensor(s) may be preferably monitored by a neural network running on another instance of SoC 4304, configured to identify in cabin events and respond accordingly. An in-cabin system may perform lip reading to activate cellular service and place a phone call, dictate emails, change a vehicle's destination, activate or change a vehicle's infotainment system and settings, or provide voice-activated web surfing. Certain functions may be available to a driver when a vehicle is operating in an autonomous mode and may be disabled otherwise.

A video image compositor may include enhanced temporal noise reduction for both spatial and temporal noise reduction. For example, where motion occurs in a video, noise reduction weights spatial information appropriately, decreasing weights of information provided by adjacent frames. Where an image or portion of an image does not include motion, temporal noise reduction performed by video image compositor may use information from a previous image to reduce noise in a current image.

A video image compositor may also be configured to perform stereo rectification on input stereo lens frames. A video image compositor may further be used for user interface composition when an operating system desktop is in use, and GPU(s) 4308 may not be required to continuously render new surfaces. When GPU(s) 4308 are powered on and active doing 3D rendering, a video image compositor may be used to offload GPU(s) 4308 to improve performance and responsiveness.

One or more SoC of SoC(s) 4304 may further include a mobile industry processor interface ("MIPI") camera serial interface for receiving video and input from cameras, a high-speed interface, and/or a video input block that may be used for a camera and related pixel input functions. One or more of SoC(s) 4304 may further include an input/output controller(s) that may be controlled by software and may be used for receiving I/O signals that may be uncommitted to a specific role.

One or more SoC of SoC(s) 4304 may further include a broad range of peripheral interfaces to enable communication with peripherals, audio encoders/decoders ("codecs"), power management, and/or other devices. SoC(s) 4304 may be used to process data from cameras (e.g., connected over Gigabit Multimedia Serial Link and Ethernet channels), sensors (e.g., LIDAR sensor(s) 4364, RADAR sensor(s) 4360, etc. that may be connected over Ethernet channels), data from bus 4302 (e.g., speed of vehicle 4300, steering wheel position, etc.), data from GNSS sensor(s) 4358 (e.g., connected over a Ethernet bus or a CAN bus), etc. One or more SoC of SoC(s) 4304 may further include dedicated high-performance mass storage controllers that may include their own DMA engines, and that may be used to free CPU(s) 4306 from routine data management tasks.

SoC(s) 4304 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. SoC(s) 4304 may be faster, more reliable, and even more energy-efficient and space-efficient than conventional systems. For example, accelerator(s) 4314, when combined with CPU(s) 4306, GPU(s) 4308, and data store(s) 4316, may provide for a fast, efficient platform for Level 3-5 autonomous vehicles.

Computer vision algorithms may be executed on CPUs, which may be configured using a high-level programming language, such as, but not limited to, C, to execute a wide variety of processing algorithms across a wide variety of visual data. However, CPUs may be oftentimes unable to meet performance requirements of many computer vision applications, such as, but not limited to, those related to execution time and power consumption, for example. Many CPUs may be unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, a CNN executing on a DLA or a discrete GPU (e.g., GPU(s) 4320) may include text and word recognition, allowing reading and understanding of traffic signs, including signs for which a neural network has not been specifically trained. A DLA may further include a neural network that is able to identify, interpret, and provide semantic understanding of a sign, and to pass that semantic understanding to path planning modules running on a CPU Complex.

Multiple neural networks may be run simultaneously, as for Level 3, 4, or 5 driving. For example, a warning sign stating "Caution: flashing lights indicate icy conditions," along with an electric light, may be independently or collectively interpreted by several neural networks. Such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights may be detected, icy conditions exist. A flashing light may be identified by operating a third deployed neural network over multiple frames, informing a vehicle's path-planning software of a presence (or an absence) of flashing lights. All three neural networks may run simultaneously, such as, but not limited to, within a DLA and/or on GPU(s) 4308.

A CNN for facial recognition and vehicle owner identification may use data from camera sensors to identify presence of an authorized driver and/or owner of vehicle 4300. An always-on sensor processing engine may be used to unlock a vehicle when an owner approaches a driver door and turns on lights, and, in a security mode, to disable such vehicle when an owner leaves such vehicle. In this way, SoC(s) 4304 can provide for security against theft and/or carjacking.

A CNN for emergency vehicle detection and identification may use data from microphones 4396 to detect and identify emergency vehicle sirens. SoC(s) 4304 use a CNN for classifying environmental and urban sounds, as well as classifying visual data. A CNN running on a DLA is trained to identify a relative closing speed of an emergency vehicle (e.g., by using a Doppler effect). A CNN may also be trained to identify emergency vehicles specific to a local area in which a vehicle is operating, as identified by GNSS sensor(s) 4358. When operating in Europe, a CNN may seek to detect European sirens, and when in North America, a CNN may seek to identify only North American sirens. Once an emergency vehicle is detected, a control program may be used to execute an emergency vehicle safety routine, slowing a vehicle, pulling over to a side of a road, parking a vehicle, and/or idling a vehicle, with assistance of ultrasonic sensor(s) 4362, until emergency vehicles pass.

Vehicle 4300 may include CPU(s) 4318 (e.g., discrete CPU(s), or dCPU(s)), that may be coupled to SoC(s) 4304 via a high-speed interconnect (e.g., PCIe). CPU(s) 4318 may include an X86 processor, for example. CPU(s) 4318 may be used to perform any of a variety of functions, including arbitrating potentially inconsistent results between ADAS sensors and SoC(s) 4304, and/or monitoring status and health of controller(s) 4336 and/or an infotainment system on a chip ("infotainment SoC") 4330, for example. SoC(s) 4304 may include one or more interconnects, and an interconnect can include a peripheral component interconnect express (PCIe).

Vehicle 4300 may include GPU(s) 4320 (e.g., discrete GPU(s), or dGPU(s)), that may be coupled to SoC(s) 4304 via a high-speed interconnect (e.g., NVIDIA's NVLINK channel). GPU(s) 4320 may provide additional artificial intelligence functionality, such as, but not limited to, by executing redundant and/or different neural networks, and may be used to train and/or update neural networks based at least in part on input (e.g., sensor data) from sensors of a vehicle 4300.

Vehicle 4300 may further include network interface 4324 which may include wireless antenna(s) (e.g., one or more wireless antennas 4326 for different communication protocols, such as, but not limited to, a cellular antenna, a Bluetooth antenna, etc.). Network interface 4324 may be used to enable wireless connectivity to Internet cloud services (e.g., with server(s) and/or other network devices), with other vehicles, and/or with computing devices (e.g., client devices of passengers). To communicate with other vehicles, a direct link may be established between vehicle 4300 and another vehicle and/or an indirect link may be established (e.g., across networks and over the Internet). Direct links may be provided using a vehicle-to-vehicle communication link. A vehicle-to-vehicle communication link may provide vehicle 4300 information about vehicles in proximity to vehicle 4300 (e.g., vehicles in front of, on a side of, and/or behind vehicle 4300). Such aforementioned functionality may be part of a cooperative adaptive cruise control functionality of vehicle 4300.

Network interface 4324 may include an SoC that provides modulation and demodulation functionality and enables controller(s) 4336 to communicate over wireless networks. Network interface 4324 may include a radio frequency front-end for up-conversion from baseband to radio frequency, and down conversion from radio frequency to baseband. Frequency conversions may be performed in any technically feasible fashion. For example, frequency conversions could be performed through well-known processes, and/or using super-heterodyne processes. Radio frequency front end functionality may be provided by a separate chip. Network interfaces may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

Vehicle 4300 may further include data store(s) 4328 which may include off-chip (e.g., off SoC(s) 4304) storage. Data store(s) 4328 may include one or more storage elements including RAM, SRAM, dynamic random-access memory ("DRAM"), video random-access memory ("VRAM"), flash memory, hard disks, and/or other components and/or devices that may store at least one bit of data.

Vehicle 4300 may further include GNSS sensor(s) 4358 (e.g., GPS and/or assisted GPS sensors), to assist in mapping, perception, occupancy grid generation, and/or path planning functions. Any number of GNSS sensor(s) 4358 may be used, including, for example, a GPS using a USB connector with an Ethernet-to-Serial (e.g., RS-232) bridge.

Vehicle 4300 may further include RADAR sensor(s) 4360. RADAR sensor(s) 4360 may be used by vehicle 4300 for long-range vehicle detection, even in darkness and/or severe weather conditions. RADAR functional safety levels may be ASIL B. RADAR sensor(s) 4360 may use a CAN bus and/or bus 4302 (e.g., to transmit data generated by RADAR sensor(s) 4360) for control and to access object tracking data, with access to Ethernet channels to access raw data in some examples. A wide variety of RADAR sensor types may be used. For example, RADAR sensor(s) 4360 may be suitable for front, rear, and side RADAR use. One or more sensor of RADAR sensors(s) 4360 is a Pulse Doppler RADAR sensor.

RADAR sensor(s) 4360 may include different configurations, such as, but not limited to, long-range with narrow field of view, short-range with wide field of view, short-range side coverage, etc. Long-range RADAR may be used for adaptive cruise control functionality. Long-range RADAR systems may provide a broad field of view realized by two or more independent scans, such as, but not limited to, within a 250 m (meter) range. RADAR sensor(s) 4360 may help in distinguishing between static and moving objects, and may be used by ADAS system 4338 for emergency brake assist and forward collision warning. Sensors 4360 (*s*) included in a long-range RADAR system may include monostatic multimodal RADAR with multiple (e.g., six or more) fixed RADAR antennae and a high-speed CAN and FlexRay interface. With six antennae, a central four antennae may create a focused beam pattern, designed to record vehicle's 4300 surroundings at higher speeds with minimal interference from traffic in adjacent lanes. Another two antennae may expand field of view, making it possible to quickly detect vehicles entering or leaving a lane of vehicle 4300.

Mid-range RADAR systems may include, as an example, a range of up to 160 m (front) or 80 m (rear), and a field of view of up to 42 degrees (front) or 150 degrees (rear). Short-range RADAR systems may include any number of RADAR sensor(s) 4360 designed to be installed at both ends of a rear bumper. When installed at both ends of a rear bumper, a RADAR sensor system may create two beams that constantly monitor blind spots in a rear direction and next to a vehicle. Short-range RADAR systems may be used in ADAS system 4338 for blind spot detection and/or lane change assist.

Vehicle 4300 may further include ultrasonic sensor(s) 4362. Ultrasonic sensor(s) 4362, which may be positioned at a front, a back, and/or side location of vehicle 4300, may be used for parking assist and/or to create and update an occupancy grid. A wide variety of ultrasonic sensor(s) 4362 may be used, and different ultrasonic sensor(s) 4362 may be used for different ranges of detection (e.g., 2.5 m, 4 m). Ultrasonic sensor(s) 4362 may operate at functional safety levels of ASIL B.

Vehicle 4300 may include LIDAR sensor(s) 4364. LIDAR sensor(s) 4364 may be used for object and pedestrian detection, emergency braking, collision avoidance, and/or other functions. LIDAR sensor(s) 4364 may operate at functional safety level ASIL B. Vehicle 4300 may include multiple LIDAR sensors 4364 (e.g., two, four, six, etc.) that may use an Ethernet channel (e.g., to provide data to a Gigabit Ethernet switch).

LIDAR sensor(s) 4364 may be capable of providing a list of objects and their distances for a 360-degree field of view. Commercially available LIDAR sensor(s) 4364 may have an advertised range of approximately 100 m, with an accuracy of 2 cm to 3 cm, and with support for a 100 Mbps Ethernet connection, for example. One or more non-protruding LIDAR sensors may be used. LIDAR sensor(s) 4364 may include a small device that may be embedded into a front, a rear, a side, and/or a corner location of vehicle 4300. LIDAR sensor(s) 4364, in such an embodiment, may provide up to a 120-degree horizontal and 35-degree vertical field-of-view, with a 200 m range even for low-reflectivity objects. Front-mounted LIDAR sensor(s) 4364 may be configured for a horizontal field of view between 45 degrees and 135 degrees.

LIDAR technologies, such as, but not limited to, 3D flash LIDAR, may also be used. 3D flash LIDAR uses a flash of a laser as a transmission source, to illuminate surroundings of vehicle 4300 up to approximately 200 m. A flash LIDAR unit may include a receptor, which records laser pulse transit time and reflected light on each pixel, which in turn corresponds to a range from vehicle 4300 to objects. Flash LIDAR may allow for highly accurate and distortion-free images of surroundings to be generated with every laser flash. Four flash LIDAR sensors may be deployed, one at each side of vehicle 4300. 3D flash LIDAR systems include a solid-state 3D staring array LIDAR camera with no moving parts other than a fan (e.g., a non-scanning LIDAR device). Flash LIDAR device may use a 5 nanosecond class I (eye-safe) laser pulse per frame and may capture reflected laser light as a 3D range point cloud and co-registered intensity data.

Vehicle 4300 may further include IMU sensor(s) 4366. IMU sensor(s) 4366 may be located at a center of a rear axle of vehicle 4300. IMU sensor(s) 4366 may include, for example, accelerometer(s), magnetometer(s), gyroscope(s), a magnetic compass, magnetic compasses, and/or other sensor types. In six-axis applications, but not limited to, IMU sensor(s) 4366 may include accelerometers and gyroscopes. In nine-axis applications, but not limited to, IMU sensor(s) 4366 may include accelerometers, gyroscopes, and magnetometers.

IMU sensor(s) 4366 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. IMU sensor(s) 4366 may enable vehicle 4300 to estimate its heading without requiring input from a magnetic sensor by directly observing and correlating changes in velocity from a GPS to IMU sensor(s) 4366. IMU sensor(s) 4366 and GNSS sensor(s) 4358 may be combined in a single integrated unit.

Vehicle 4300 may include microphone(s) 4396 placed in and/or around vehicle 4300. Microphone(s) 4396 may be used for emergency vehicle detection and identification, among other things.

Vehicle 4300 may further include any number of camera types, including stereo camera(s) 4368, wide-view camera(s) 4370, infrared camera(s) 4372, surround camera(s) 4374, long-range camera(s) 4398, mid-range camera(s) 4376, and/or other camera types. Cameras may be used to capture image data around an entire periphery of vehicle 4300. Types of cameras used may depend on vehicle 4300. Any combination of camera types may be used to provide necessary coverage around vehicle 4300. A number of cameras deployed may differ depending on embodiment. For example, vehicle 4300 could include six cameras, seven cameras, ten cameras, twelve cameras, or another number of cameras. Cameras may support, as an example, Gigabit Multimedia Serial Link ("GMSL") and/or Gigabit Ethernet communications. Each camera might be as described with more detail previously herein.

Vehicle 4300 may further include vibration sensor(s) 4342. Vibration sensor(s) 4342 may measure vibrations of components of vehicle 4300, such as, but not limited to, axle(s). For example, changes in vibrations may indicate a change in road surfaces. When two or more vibration sensors 4342 may be used, differences between vibrations may be used to determine friction or slippage of road surface (e.g., when a difference in vibration is between a power-driven axle and a freely rotating axle).

Vehicle 4300 may include ADAS system 4338. ADAS system 4338 may include an SoC, in some examples. ADAS system 4338 may include any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW") system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

ACC system may use RADAR sensor(s) 4360, LIDAR sensor(s) 4364, and/or any number of camera(s). ACC system may include a longitudinal ACC system and/or a lateral ACC system. A longitudinal ACC system monitors and controls distance to another vehicle immediately ahead of vehicle 4300 and automatically adjusts speed of vehicle 4300 to maintain a safe distance from vehicles ahead. A lateral ACC system performs distance keeping, and advises vehicle 4300 to change lanes when necessary. A lateral ACC is related to other ADAS applications, such as, but not limited to, LC and CW.

A CACC system uses information from other vehicles that may be received via network interface 4324 and/or wireless antenna(s) 4326 from other vehicles via a wireless link, or indirectly, over a network connection (e.g., over the Internet). Direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 4300), while I2V communication provides information about traffic further ahead. A CACC system may include either or both I2V and V2V information sources. Given information of vehicles ahead of vehicle 4300, a CACC system may be more reliable and it has potential to improve traffic flow smoothness and reduce congestion on road.

An FCW system is designed to alert a driver to a hazard, so that such driver may take corrective action. An FCW system uses a front-facing camera and/or RADAR sensor(s) 4360, coupled to a dedicated processor, DSP, FPGA, and/or ASIC, that is electrically coupled to provide driver feedback, such as, but not limited to, a display, speaker, and/or vibrating component. An FCW system may provide a warning, such as, but not limited to, in form of a sound, visual warning, vibration and/or a quick brake pulse.

An AEB system detects an impending forward collision with another vehicle or other object, and may automatically apply brakes if a driver does not take corrective action within a specified time or distance parameter. AEB system may use front-facing camera(s) and/or RADAR sensor(s) 4360, coupled to a dedicated processor, DSP, FPGA, and/or ASIC. When an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. An AEB system may include techniques such as, but not limited to, dynamic brake support and/or crash imminent braking.

An LDW system provides visual, audible, and/or tactile warnings, such as, but not limited to, steering wheel or seat vibrations, to alert driver when vehicle 4300 crosses lane markings. An LDW system does not activate when a driver indicates an intentional lane departure, such as, but not limited to, by activating a turn signal. An LDW system may use front-side facing cameras, coupled to a dedicated processor, DSP, FPGA, and/or ASIC, that is electrically coupled to provide driver feedback, such as, but not limited to, a display, speaker, and/or vibrating component. An LKA system is a variation of an LDW system. An LKA system provides steering input or braking to correct vehicle 4300 if vehicle 4300 starts to exit its lane.

A BSW system detects and warns a driver of vehicles in an automobile's blind spot. A BSW system may provide a visual, audible, and/or tactile alert to indicate that merging or changing lanes is unsafe. A BSW system may provide an additional warning when a driver uses a turn signal. A BSW system may use rear-side facing camera(s) and/or RADAR sensor(s) 4360, coupled to a dedicated processor, DSP, FPGA, and/or ASIC, that is electrically coupled to driver feedback, such as, but not limited to, a display, speaker, and/or vibrating component.

An RCTW system may provide visual, audible, and/or tactile notification when an object is detected outside a rear-camera range when vehicle 4300 is backing up. An RCTW system includes an AEB system to ensure that vehicle brakes may be applied to avoid a crash. An RCTW system may use one or more rear-facing RADAR sensor(s) 4360, coupled to a dedicated processor, DSP, FPGA, and/or ASIC, that is electrically coupled to provide driver feedback, such as, but not limited to, a display, speaker, and/or vibrating component.

Conventional ADAS systems may be prone to false positive results which may be annoying and distracting to a driver, but typically may not be catastrophic, because conventional ADAS systems alert a driver and allow that driver to decide whether a safety condition truly exists and act accordingly. Vehicle 4300 itself decides, in case of conflicting results, whether to heed result from a primary computer or a secondary computer (e.g., a first controller or a second controller of controllers 4336). For example, ADAS system 4338 may be a backup and/or secondary computer for providing perception information to a backup computer rationality module. A backup computer rationality monitor may run redundant diverse software on hardware components to detect faults in perception and dynamic driving tasks. Outputs from ADAS system 4338 may be provided to a supervisory MCU. If outputs from a primary computer and outputs from a secondary computer conflict, a supervisory MCU can determine how to reconcile conflict to ensure safe operation.

A primary computer may be configured to provide a supervisory MCU with a confidence score, indicating that primary computer's confidence in a chosen result. If that confidence score exceeds a threshold, that supervisory MCU may follow that primary computer's direction, regardless of whether that secondary computer provides a conflicting or inconsistent result. Where a confidence score does not meet a threshold, and where primary and secondary computers indicate different results (e.g., a conflict), a supervisory MCU may arbitrate between computers to determine an appropriate outcome.

A supervisory MCU may be configured to run a neural network(s) that is trained and configured to determine, based at least in part on outputs from a primary computer and outputs from a secondary computer, conditions under which that secondary computer provides false alarms. Neural network(s) in a supervisory MCU may learn when a secondary computer's output may be trusted, and when it cannot. For example, when that secondary computer is a RADAR-based FCW system, a neural network(s) in that supervisory MCU may learn when an FCW system is identifying metallic objects that may not be, in fact, hazards, such as, but not limited to, a drainage grate or manhole cover that triggers an alarm. When a secondary computer is a camera-based LDW system, a neural network in a supervisory MCU may learn to override LDW when bicyclists or pedestrians may be present and a lane departure is, in fact, a safest maneuver. A supervisory MCU may include at least one of a DLA or a GPU suitable for running neural network(s) with associated memory. A supervisory MCU may comprise and/or be included as a component of SoC(s) 4304.

ADAS system 4338 may include a secondary computer that performs ADAS functionality using traditional rules of computer vision, and that secondary computer may use classic computer vision rules (if-then), and presence of a neural network(s) in a supervisory MCU may improve reliability, safety and performance. For example, diverse implementation and intentional non-identity makes an overall system more fault-tolerant, especially to faults caused by software (or software-hardware interface) functionality. For example, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

An output of ADAS system 4338 may be fed into a primary computer's perception block and/or a primary computer's dynamic driving task block. For example, if ADAS system 4338 indicates a forward crash warning due to an object immediately ahead, a perception block may use this information when identifying objects. A secondary computer may have its own neural network that is trained and thus reduces a risk of false positives, as described herein.

Vehicle 4300 may further include infotainment SoC 4330 (e.g., an in-vehicle infotainment system (IVI)). Although illustrated and described as an SoC, infotainment system SoC 4330, may not be an SoC, and may include two or more discrete components. Infotainment SoC 4330 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as, but not limited to, fuel level, total distance covered, brake fuel level, oil level, door open/close, air filter information, etc.) to vehicle 4300. For example, infotainment SoC 4330 could include radios, disk players, navigation systems, video players, USB and Bluetooth connectivity, carputers, in-car entertainment, WiFi, steering wheel audio controls, hands free voice control, a heads-up display ("HUD"), HMI display 4334, a telematics device, a control panel (e.g., for controlling and/or interacting with various components, features, and/or systems), and/or other components. Infotainment SoC 4330 may further be used to provide information (e.g., visual and/or audible) to user(s) of vehicle 4300, such as, but not limited to, information from ADAS system 4338, autonomous driving information such as, but not limited to, planned vehicle maneuvers, trajectories, surrounding environment information (e.g., intersection information, vehicle information, road information, etc.), and/or other information.

Infotainment SoC 4330 may include any amount and type of GPU functionality. Infotainment SoC 4330 may communicate over bus 4302 with other devices, systems, and/or components of vehicle 4300. Infotainment SoC 4330 may be coupled to a supervisory MCU such that a GPU of an infotainment system may perform some self-driving functions in event that primary controller(s) 4336 (e.g., primary and/or backup computers of vehicle 4300) fail. Infotainment SoC 4330 may put vehicle 4300 into a chauffeur to safe stop mode, as described herein.

Vehicle 4300 may further include instrument cluster 4332 (e.g., a digital dash, an electronic instrument cluster, a digital instrument panel, etc.). Instrument cluster 4332 may include a controller and/or supercomputer (e.g., a discrete controller or supercomputer). Instrument cluster 4332 may include any number and combination of a set of instrumentation such as, but not limited to, a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. Information may be displayed and/or shared among infotainment SoC 4330 and instrument cluster 4332. Instrument cluster 4332 may be included as part of infotainment SoC 4330, or vice versa.

System may include server(s), network(s), and any number and type of vehicles, including vehicle 4300. Server(s) may include a plurality of GPUs, PCIe switches, and/or CPUs. GPUs, CPUs, and PCIe switches may be interconnected with high-speed interconnects such as, but not limited to, for example, NVLink interfaces developed by NVIDIA and/or PCIe connections. GPUs can be connected via any interconnects, such as NVLink and/or NVSwitch SoC, and GPUs and PCIe switches can be, for example, connected via PCIe interconnects. Each of server(s) may include any number of GPUs, CPUs, and/or PCIe switches, in any combination. For example, server(s) could each include eight, sixteen, thirty-two, and/or more GPUs.

Server(s) may receive, over network(s) and from vehicles, image data representative of images showing unexpected or changed road conditions, such as, but not limited to, recently commenced road-work. Server(s) may transmit, over network(s) and to vehicles, neural networks, updated or otherwise, and/or map information, including information regarding traffic and road conditions. Updates to map information may include updates for HD map, such as, but not limited to, information regarding construction sites, potholes, detours, flooding, and/or other obstructions. Neural networks, and/or map information may have resulted from new training and/or experiences represented in data received from any number of vehicles in an environment, and/or based at least in part on training performed at a data center (e.g., using server(s) and/or other servers).

Server(s) may be used to train machine learning models (e.g., neural networks) based at least in part on training data. Training data may be generated by vehicles, and/or may be generated in a simulation (e.g., using a game engine). Any amount of training data can be tagged (e.g., where associated neural network benefits from supervised learning) and/or undergoes other pre-processing. Any amount of training data may not be tagged and/or pre-processed (e.g., where associated neural network does not require supervised learning). Once machine learning models are trained, machine learning models may be used by vehicles (e.g., transmitted to vehicles over network(s)), and/or machine learning models may be used by server(s) to remotely monitor vehicles.

Server(s) may receive data from vehicles and apply data to up-to-date real-time neural networks for real-time intelligent inferencing. Server(s) may include deep-learning supercomputers and/or dedicated AI computers powered by GPU(s), such as, but not limited to, a DGX and DGX Station machines developed by NVIDIA. Alternatively, server(s) may include deep learning infrastructure that uses CPU-powered data centers.

Deep-learning infrastructure of server(s) may be capable of fast, real-time inferencing, and may use that capability to evaluate and verify health of processors, software, and/or associated hardware in vehicle 4300. For example, deep-learning infrastructure may receive periodic updates from vehicle 4300, such as, but not limited to, a sequence of images and/or objects that vehicle 4300 has located in that sequence of images (e.g., via computer vision and/or other machine learning object classification techniques). Deep-learning infrastructure may run its own neural network to identify objects and compare them with objects identified by vehicle 4300 and, if results do not match and deep-learning infrastructure concludes that AI in vehicle 4300 is malfunctioning, then server(s) may transmit a signal to vehicle instructing a fail-safe computer of vehicle 4300 to assume control, notify passengers, and complete a safe parking maneuver.

Server(s) may include GPU(s) and one or more programmable inference accelerators (e.g., NVIDIA's TensorRT 3 devices). A combination of GPU-powered servers and inference acceleration may make real-time responsiveness possible. Where performance is less critical, servers powered by CPUs, FPGAs, and other processors may be used for inferencing.

In at least one embodiment, autonomous vehicle 4300 described elsewhere herein, can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits in autonomous vehicle 4300 can be configured by software, e.g., programming platforms described herein, to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Cloud and Web-Based Services

The following description sets forth, without limitation, cloud-based and/or web-based services and/or systems that can be used to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform some or all of processes, operations and/or and techniques described elsewhere herein. cloud-based and/or web-based services and/or systems can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Cloud computing can include a style of computing in which dynamically scalable and often virtualized resources are provided as a service over the Internet. Users need not have knowledge of, expertise in, or control over technology infrastructure, which can be referred to as "in the cloud," that supports them. Cloud computing may incorporate infrastructure as a service, platform as a service, software as a service, and other variations that have a common theme of reliance on the Internet for satisfying computing needs of users. A typical cloud deployment, such as in a private cloud (e.g., enterprise network), or a data center (DC) in a public cloud (e.g., Internet) can include thousands of servers (or alternatively, VMs), hundreds of Ethernet, Fiber Channel or Fiber Channel over Ethernet (FCOE) ports, switching and storage infrastructure, etc. A cloud can also include network services infrastructure like IPsec VPN hubs, firewalls, load balancers, wide area network (WAN) optimizers etc. Remote subscribers can access cloud applications and services securely by connecting via a VPN tunnel, such as an IPsec VPN tunnel.

Cloud computing may include a model for enabling convenient, on-demand network access to a shared pool of configurable computing resources (e.g., networks, servers, storage, applications, and services) that can be rapidly provisioned and released with minimal management effort or service provider interaction.

Cloud computing may be characterized by on-demand self-service, in which a consumer can unilaterally provision computing capabilities, such as server time and network storage, as needed automatically without requiring human inter-action with each service's provider. Cloud computing may be characterized by broad network access, in which capabilities are available over a network and accessed through standard mechanisms that promote use by heterogeneous thin or thick client platforms (e.g., mobile phones, laptops, and PDAs). Cloud computing may be characterized by resource pooling, in which a provider's computing resources are pooled to serve multiple consumers using a multi-tenant model, with different physical and virtual resources dynamically as-signed and reassigned according to consumer demand. In at least one embodiment, there is a sense of location independence in that a customer generally has no control or knowledge over an exact location of provided resources, but may be able to specify location at a higher level of abstraction (e.g., country, state, or datacenter). Examples of resources include storage, processing, memory, network bandwidth, and virtual machines. Cloud computing may be characterized by rapid elasticity, in which capabilities can be rapidly and elastically provisioned, in some cases automatically, to quickly scale out and rapidly released to quickly scale in. In at least one embodiment, to a consumer, capabilities available for provisioning often appear to be unlimited and can be purchased in any quantity at any time. Cloud computing may be characterized by measured service, in which cloud systems automatically control and optimize resource use by leveraging a metering capability at some level of abstraction appropriate to a type of service (e.g., storage, processing, bandwidth, and active user accounts). Resource usage can be monitored, controlled, and reported providing transparency for both a provider and consumer of a utilized service.

Cloud computing may be associated with various services. Cloud Software as a Service (SaaS) may refer to as service in which a capability provided to a consumer is to use a provider's applications running on a cloud infrastructure. Applications can be accessible from various client devices through a thin client interface such as a web browser (e.g., web-based email). In at least one embodiment, consumer does not manage or control underlying cloud infrastructure including network, servers, operating systems, storage, or even individual application capabilities, with a possible exception of limited user-specific application configuration settings.

Cloud Platform as a Service (PaaS) may refer to a service in which a capability provided to consumer is to deploy onto cloud infrastructure consumer-created or acquired applications created using programming languages and tools supported by a provider. In at least one embodiment, a consumer does not manage or control underlying cloud infrastructure including networks, servers, operating systems, or storage, but has control over deployed applications and possibly application hosting environment configurations.

Cloud Infrastructure as a Service (IaaS) may refer to a service in which a capability provided to a consumer is to provision processing, storage, networks, and other fundamental computing resources where a consumer is able to deploy and run arbitrary software, which can include operating systems and applications. In at least one embodiment, consumer does not manage or control underlying cloud infrastructure, but has control over operating systems, storage, deployed applications, and possibly limited control of select networking components (e.g., host firewalls).

Cloud computing may be deployed in various ways. A private cloud may refer to a cloud infrastructure that is operated solely for an organization. A private cloud may be managed by an organization or a third party and may exist on-premises or off-premises. A community cloud may refer to a cloud infrastructure that is shared by several organizations and supports a specific community that has shared concerns (e.g., mission, security requirements, policy, and compliance considerations). A community cloud may be managed by organizations or a third party and may exist on-premises or off-premises. A public cloud may refer to a cloud infrastructure that is made available to a general public or a large industry group and is owned by an organization providing cloud services. A hybrid cloud may refer to a cloud infrastructure that is a composition of two or more clouds (private, community, or public) that remain unique entities, but are bound together by standardized or proprietary technology that enables data and application portability (e.g., cloud bursting for load-balancing between clouds). A cloud computing environment is service oriented with a focus on statelessness, low coupling, modularity, and semantic interoperability.

Logic and Neural Network Training and Deployment

The following figures set forth, without limitation, examples of logic and artificial intelligence-based systems that can be used to implement functionality and/or operations described herein.

FIGS. 44A and 44B illustrate logic 4415 which, as described elsewhere herein, can be used in one or more devices or systems (e.g., such as any of the processors, data centers, cloud or web-based services described herein) to perform operations such as, but not limited to, those discussed herein, in accordance with at least one embodiment. Logic can refer to any combination of software logic, hardware logic, and/or firmware logic to provide functionality and/or operations described herein, wherein logic may be, collectively or individually, embodied as circuitry that forms part of a larger system, for example, an integrated circuit (IC), an application-specific integrated circuit (ASIC), a field programmable array (FPGA), system-on-chip (SoC), or one or processors (e.g., CPU, GPU). Logic 4415 illustrated in FIGS. 44A and 44B may be used in conjunction with an application-specific integrated circuit ("ASIC"), such as, but not limited to, a TensorFlow® Processing Unit from Google, an inference processing unit (IPU) from Graphcore™, or a Nervana® (e.g., "Lake Crest") processor from Intel Corp. Logic 4415 illustrated in FIGS. 44A and 44B may be used in conjunction with central processing unit ("CPU") hardware, graphics processing unit ("GPU") hardware or other hardware, such as, but not limited to, field programmable gate arrays ("FPGAs").

Logic 4415 can be used to perform inferencing and/or training operations associated with one or more embodiments. Logic 4415 may be inference and/or training logic. In at least one embodiment, FIG. 44A illustrates inference and/or training logic 4415 used to perform inferencing and/or training operations associated with one or more embodiments. Inference and/or training logic 4415 may include code and/or data storage 4401 to store forward and/or output weight and/or input/output data, and/or other parameters to configure neurons or layers of a neural network trained and/or used for inferencing in aspects of one or more embodiments. Training logic 4415 may include, or be coupled to code and/or data storage 4401 to store graph code or other software to control timing and/or order, in which weight and/or other parameter information is to be loaded to configure, logic, including integer and/or floating point units (collectively, arithmetic logic units (ALUs). Code, such as, but not limited to, graph code, can load weight or other parameter information into processor ALUs based on an architecture of a neural network to which such code corresponds. Code and/or data storage 4401 can store weight parameters and/or input/output data of each layer of a neural network trained or used in conjunction with one or more embodiments during forward propagation of input/output data and/or weight parameters during training and/or inferencing using aspects of one or more embodiments. Any portion of code and/or data storage 4401 may be included with other on-chip or off-chip data storage, including a processor's L1, L2, or L3 cache or system memory.

Any portion of code and/or data storage 4401 may be internal or external to one or more processors or other hardware logic devices or circuits. Code and/or code and/or data storage 4401 may be cache memory, dynamic randomly addressable memory ("DRAM"), static randomly addressable memory ("SRAM"), non-volatile memory (e.g., flash memory), or other storage. A choice of whether code and/or code and/or data storage 4401 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

Inference and/or training logic 4415 may include a code and/or data storage 4405 to store backward and/or output weight and/or input/output data corresponding to neurons or layers of a neural network trained and/or used for inferencing in aspects of one or more embodiments. Code and/or data storage 4405 can store weight parameters and/or input/output data of each layer of a neural network trained or used in conjunction with one or more embodiments during backward propagation of input/output data and/or weight parameters during training and/or inferencing using aspects of one or more embodiments. Training logic 4415 may include, or be coupled to code and/or data storage 4405 to store graph code or other software to control timing and/or order, in which weight and/or other parameter information is to be loaded to configure, logic, including integer and/or floating point units (collectively, arithmetic logic units (ALUs).

Code, such as, but not limited to, graph code, may cause loading of weight or other parameter information into processor ALUs based on an architecture of a neural network to which such code corresponds. Any portion of code and/or data storage 4405 may be included with other on-chip or off-chip data storage, including a processor's L1, L2, or L3 cache or system memory. Any portion of code and/or data storage 4405 may be internal or external to one or more processors or other hardware logic devices or circuits. Code and/or data storage 4405 may be cache memory, DRAM, SRAM, non-volatile memory (e.g., flash memory), or other storage. A choice of whether code and/or data storage 4405 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

Code and/or data storage 4401 and code and/or data storage 4405 may be separate storage structures. Code and/or data storage 4401 and code and/or data storage 4405 may be a combined storage structure. Code and/or data storage 4401 and code and/or data storage 4405 may be partially combined and partially separate. Any portion of code and/or data storage 4401 and code and/or data storage 4405 may be included with other on-chip or off-chip data storage, including a processor's L1, L2, or L3 cache or system memory.

Inference and/or training logic 4415 may include one or more arithmetic logic unit(s) ("ALU(s)") 4410, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 4420 that may be functions of input/output and/or weight parameter data stored in code and/or data storage 4401 and/or code and/or data storage 4405. Activations stored in activation storage 4420 may be generated according to linear algebraic and or matrix-based mathematics performed by ALU(s) 4410 in response to performing instructions or other code, wherein weight values stored in code and/or data storage 4405 and/or data storage 4401 may be used as operands along with other values, such as, but not limited to, bias values, gradient information, momentum values, or other parameters or hyperparameters, any or all of which may be stored in code and/or data storage 4405 or code and/or data storage 4401 or another storage on or off-chip.

ALU(s) 4410 can be included within one or more processors or other hardware logic devices or circuits, whereas in another embodiment, ALU(s) 4410 may be external to a processor or other hardware logic device or circuit that uses them (e.g., a co-processor). ALUs 4410 may be included within a processor's execution units or otherwise within a bank of ALUs accessible by a processor's execution units either within same processor or distributed between different processors of different types (e.g., central processing units, graphics processing units, fixed function units, etc.). Code and/or data storage 4401, code and/or data storage 4405, and activation storage 4420 may share a processor or other hardware logic device or circuit, whereas in another embodiment, they may be in different processors or other hardware logic devices or circuits, or some combination of same and different processors or other hardware logic devices or circuits. Any portion of activation storage 4420 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

Activation storage 4420 may be cache memory, DRAM, SRAM, non-volatile memory (e.g., flash memory), or other storage. Activation storage 4420 may be completely or partially within or external to one or more processors or other logical circuits. A choice of whether activation storage 4420 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 4415 illustrated in FIG. 44A may be used in conjunction with an application-specific integrated circuit ("ASIC"), such as, but not limited to, a TensorFlow® Processing Unit from Google, an inference processing unit (IPU) from Graphcore™, or a Nervana® (e.g., "Lake Crest") processor from Intel Corp. In at least one embodiment, inference and/or training logic 4415 illustrated in FIG. 44A may be used in conjunction with central processing unit ("CPU") hardware, graphics processing unit ("GPU") hardware or other hardware, such as, but not limited to, field programmable gate arrays ("FPGAs").

FIG. 44B illustrates inference and/or training logic 4415, in accordance with at least one embodiment. Inference and/or training logic 4415 may include hardware logic in which computational resources may be dedicated or otherwise exclusively used in conjunction with weight values or other information corresponding to one or more layers of neurons within a neural network. Inference and/or training logic 4415 illustrated in FIG. 44B may be used in conjunction with an application-specific integrated circuit (ASIC), such as, but not limited to, TensorFlow® Processing Unit from Google, an inference processing unit (IPU) from Graphcore™, or a Nervana® (e.g., "Lake Crest") processor from Intel Corp. Inference and/or training logic 4415 illustrated in FIG. 44B may be used in conjunction with central processing unit (CPU) hardware, graphics processing unit (GPU) hardware or other hardware, such as, but not limited to, field programmable gate arrays (FPGAs). Inference and/or training logic 4415 can include code and/or data storage 4401 and code and/or data storage 4405, which may be used to store code (e.g., graph code), weight values and/or other information, including bias values, gradient information, momentum values, and/or other parameter or hyperparameter information. In FIG. 44B, for example, each of code and/or data storage 4401 and code and/or data storage 4405 is associated with a dedicated computational resource, such as, but not limited to, computational hardware 4402 and computational hardware 4406, respectively. Each of computational hardware 4402 and computational hardware 4406 can include one or more ALUs that perform mathematical functions, such as, but not limited to, linear algebraic functions, only on information stored in code and/or data storage 4401 and code and/or data storage 4405, respectively, result of which is stored in activation storage 4420.

Each of code and/or data storage 4401 and 4405 and corresponding computational hardware 4402 and 4406, respectively, correspond to different layers of a neural network, such that resulting activation from one storage/computational pair 4401/4402 of code and/or data storage 4401 and computational hardware 4402 is provided as an input to a next storage/computational pair 4405/4406 of code and/or data storage 4405 and computational hardware 4406, in order to mirror a conceptual organization of a neural network. Each of storage/computational pairs 4401/4402 and 4405/4406 may correspond to more than one neural network layer. Additional storage/computation pairs (not shown) subsequent to or in parallel with storage/computation pairs 4401/4402 and 4405/4406 may be included in inference and/or training logic 4415.

In at least one embodiment, logic 4415 described elsewhere herein, can include one or more circuits to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more circuits in logic 4415 can be configured by software described herein, to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

Figure 44C:
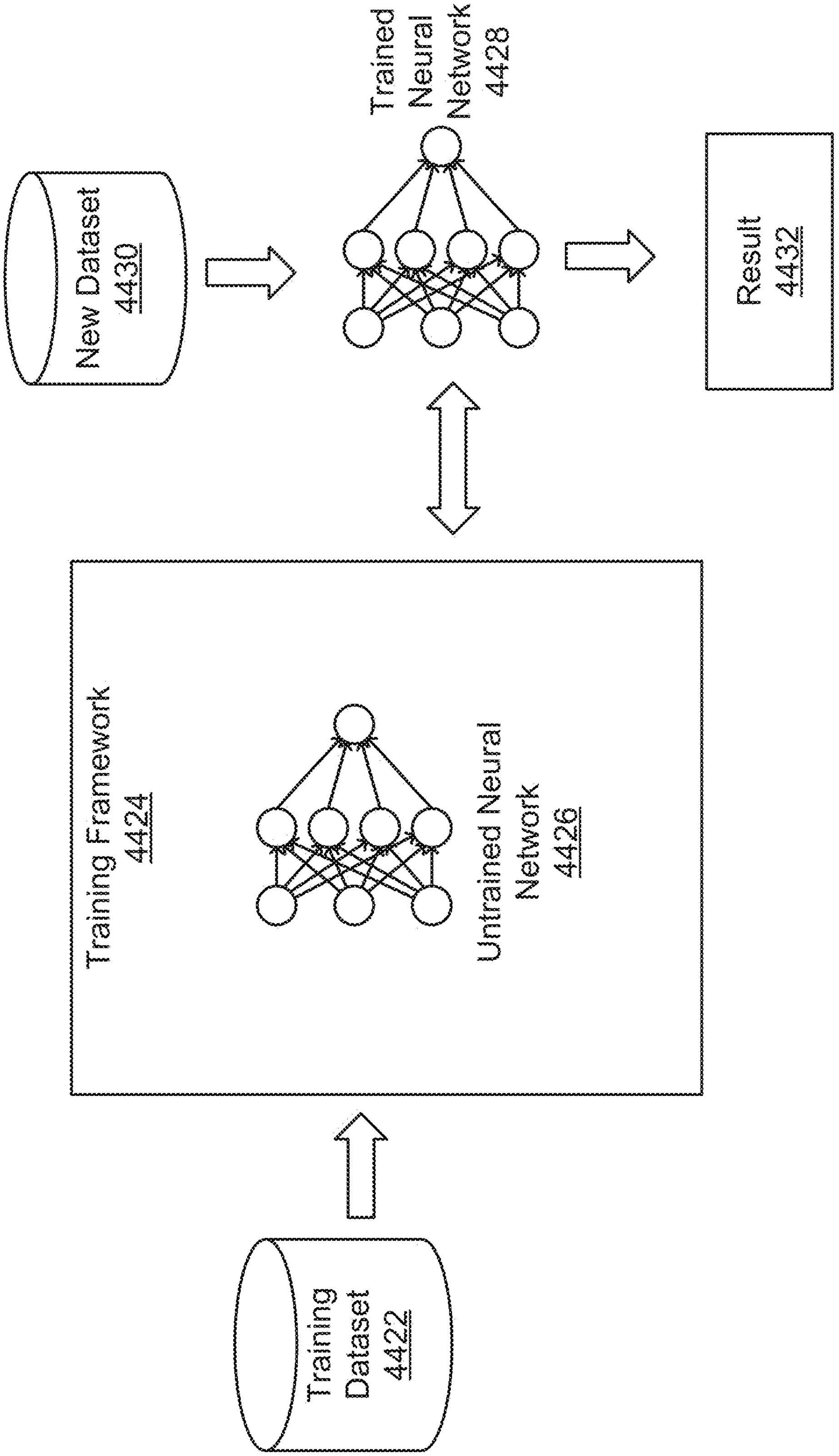
FIG. 44C illustrates training and deployment of a neural network, in accordance with at least one embodiment.

FIG. 44C illustrates training and deployment of a deep neural network, in accordance with at least one embodiment. An untrained neural network 4426 can be trained using a training dataset 4422. Training framework 4424 can be a PyTorch framework, and/or a training framework 4404 can include a TensorFlow, Boost, Caffe, Microsoft Cognitive Toolkit/CNTK, MXNet, Chainer, Keras, Deeplearning4j, or other training framework. Training framework 4424 can train an untrained neural network 4426 and enables it to be trained using processing resources described herein to generate a trained neural network 4428. Weights may be chosen randomly or by pre-training using a deep belief network. Training may be performed in either a supervised, partially supervised, or unsupervised manner.

Untrained neural network 4426 can be trained using supervised learning, wherein training dataset 4422 includes an input paired with a desired output for an input, or where training dataset 4422 includes input having a known output and an output of neural network 4426 is manually graded. Untrained neural network 4426 can be trained in a supervised manner and processes inputs from training dataset 4422 and compares resulting outputs against a set of expected or desired outputs. Errors can then be propagated back through untrained neural network 4426. Training framework 4424 can adjust weights that control untrained neural network 4426. Training framework 4424 can include tools to monitor how well untrained neural network 4426 is converging towards a model, such as, but not limited to, trained neural network 4428, suitable to generating correct answers, such as, but not limited to, in result 4432, based on input data such as, but not limited to, a new dataset 4430. Training framework 4424 can train untrained neural network 4426 repeatedly while adjust weights to refine an output of untrained neural network 4426 using a loss function and adjustment algorithm, such as, but not limited to, stochastic gradient descent. Training framework 4424 can train untrained neural network 4426 until untrained neural network 4426 achieves a desired accuracy. Trained neural network 4428 can then be deployed to implement any number of machine learning operations.

Untrained neural network 4426 can be trained using unsupervised learning, wherein untrained neural network 4426 attempts to train itself using unlabeled data. Unsupervised learning training dataset 4422 can include input data without any associated output data or "ground truth" data. Untrained neural network 4426 can learn groupings within training dataset 4422 and can determine how individual inputs may be related to untrained dataset 4422. Unsupervised training can be used to generate a self-organizing map in trained neural network 4428 capable of performing operations useful in reducing dimensionality of new dataset 4430. Unsupervised training can also be used to perform anomaly detection, which allows identification of data points in new dataset 4430 that deviate from normal patterns of new dataset 4430.

Semi-supervised learning may be used, which is a technique in which in training dataset 4422 includes a mix of labeled and unlabeled data. Training framework 4424 may be used to perform incremental learning, such as, but not limited to, through transferred learning techniques. Incremental learning can enable trained neural network 4428 to adapt to new dataset 4430 without forgetting knowledge instilled within trained neural network 4428 during initial training.

Training framework 4424 can include a framework processed in connection with a software development toolkit such as, but not limited to, an OpenVINO (Open Visual Inference and Neural network Optimization) toolkit. An OpenVINO toolkit can include a toolkit such as, but not limited to, those developed by Intel Corporation of Santa Clara, CA.

OpenVINO can include a toolkit for facilitating development of applications, specifically neural network applications, for various tasks and operations, such as, but not limited to, human vision emulation, speech recognition, natural language processing, recommendation systems, and/or variations thereof. Open VINO can support neural networks such as, but not limited to, convolutional neural networks (CNNs), recurrent and/or attention-based neural networks, and/or various other neural network models. OpenVINO can support various software libraries such as, but not limited to, OpenCV, OpenCL, and/or variations thereof.

Open VINO can support neural network models for various tasks and operations, such as, but not limited to, classification, segmentation, object detection, face recognition, speech recognition, pose estimation (e.g., humans and/or objects), monocular depth estimation, image inpainting, style transfer, action recognition, colorization, and/or variations thereof.

OpenVINO can include one or more software tools and/or modules for model optimization, also referred to as a model optimizer. A model optimizer can include a command line tool that facilitates transitions between training and deployment of neural network models. A model optimizer may optimize neural network models for execution on various devices and/or processing units, such as, but not limited to, a GPU, CPU, PPU, GPGPU, and/or variations thereof. A model optimizer can generate an internal representation of a model, and can optimize said model to generate an intermediate representation. A model optimizer may reduce a number of layers of a model. A model optimizer can remove layers of a model that may be utilized for training. A model optimizer may perform various neural network operations, such as, but not limited to, modifying inputs to a model (e.g., resizing inputs to a model), modifying a size of inputs of a model (e.g., modifying a batch size of a model), modifying a model structure (e.g., modifying layers of a model), normalization, standardization, quantization (e.g., converting weights of a model from a first representation, such as, but not limited to, floating point, to a second representation, such as, but not limited to, integer), and/or variations thereof.

Open VINO can include one or more software libraries for inferencing, also referred to as an inference engine. An inference engine can include a C++ library, or any suitable programming language library. An inference engine can be utilized to infer input data. An inference engine may implement various classes to infer input data and generate one or more results. An inference engine can implement one or more API functions to process an intermediate representation, set input and/or output formats, and/or execute a model on one or more devices.

Open VINO may provide various abilities for heterogeneous execution of one or more neural network models. Heterogeneous execution, or heterogeneous computing, can refer to one or more computing processes and/or systems that utilize one or more types of processors and/or cores. OpenVINO can provide various software functions to execute a program on one or more devices. OpenVINO may provide various software functions to execute a program and/or portions of a program on different devices. OpenVINO may provide various software functions to, for example, run a first portion of code on a CPU and a second portion of code on a GPU and/or FPGA. OpenVINO may provide various software functions to execute one or more layers of a neural network on one or more devices (e.g., a first set of layers on a first device, such as, but not limited to, a GPU, and a second set of layers on a second device, such as, but not limited to, a CPU).

Open VINO can include various functionality similar to functionalities associated with a CUDA programming model, such as, but not limited to, various neural network model operations associated with frameworks such as, but not limited to, TensorFlow, PyTorch, and/or variations thereof. One or more CUDA programming model operations may be performed using Open VINO. Various systems, methods, and/or techniques described herein may be implemented using Open VINO.

In at least one embodiment, one or more circuits can be used to cause one or more neural networks and training frameworks described elsewhere herein to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein. One or more neural networks and training frameworks can be configured by software to perform an instruction to read one or more exclusive storage bits and generate one or more errors if one or more subsequent instructions are to access one or more storages corresponding to the one or more exclusive storage bits, to perform an instruction to generate error information if one or more other instructions are to access storage not allocated to the one or more other instructions, to generate error information if one or more other instructions are to access one or more invalid storage locations, to prevent one or more other instructions from accessing storage not allocated to the one or more other instructions, to perform an instruction to generate an error if one or more other instructions are to cause invalid allocation of storage, to perform an application programming interface (API) to indicate whether one or more instructions cause an invalid storage access, to perform a compiler to cause one or more software programs to include one or more first instructions to generate one or more errors if one or more second instructions are to access memory not allocated to the one or more second instructions, or otherwise perform any of the operations described above or elsewhere herein.

At least one embodiment of the disclosure can be described in view of the following clauses:

1. A processor, comprising: one or more circuits to perform an instruction to generate an error if one or more other instructions are to cause invalid allocation of storage.
2. The processor of clause 1, wherein the one or more other instructions are to allocate storage with a number of columns that is not a power of 2.
3. The processor of clause 1 or 2, wherein the one or more other instructions are to allocate storage with a number of columns that is not a multiple of 32.
4. The processor of any of clauses 1-3, wherein the one or more other instructions are to allocate storage with a number of columns greater than a maximum number of columns available in memory.

5. The processor of any of clauses 1-4, wherein the one or more other instructions are to allocate storage of a size greater than any previous allocation performed by one or more threads that include the one or more other instructions.
6. The processor of any of clauses 1-5, wherein the one or more circuits are to prevent the one or more other instructions from being performed.
7. The processor of any of clauses 1-6, wherein the error includes information about a size of the invalid allocation of storage.
8. A method comprising: performing an instruction to generate an error if one or more other instructions are to cause invalid allocation of storage.
9. The processor of clause 8, wherein the one or more other instructions are to cause the invalid allocation of storage when attempting to allocate storage with a number of columns that is not a power of 2.
10. The processor of clause 8 or 9, wherein the one or more other instructions are to cause the invalid allocation of storage when attempting to allocate storage with a number of columns that is not a multiple of 32.
11. The processor of any of clauses 8-10, wherein the one or more other instructions are to cause the invalid allocation of storage when attempting to allocate storage with a number of columns greater than a maximum number of columns available in memory.
12. The processor of any of clauses 8-11, wherein the one or more other instructions are to cause the invalid allocation of storage when allocating storage of a size greater than any previous allocation performed by one or more threads that include the one or more other instructions.
13. The processor of any of clauses 8-12, wherein the one or more circuits are to prevent the one or more other instructions from being performed.
14. The processor of any of clauses 8-13, wherein the error is to be stored in one or more registers.
15. A system comprising: one or more processors to perform an instruction to generate an error if one or more other instructions are to cause invalid allocation of storage.
16. The system of clause 15, wherein the invalid allocation of storage occurs when a number of columns of storage to be allocated is not a power of 2.
17. The system of clause 15 or 16, wherein the invalid allocation of storage occurs when a number of columns of storage to be allocated is not a multiple of 32.
18. The system of any of clauses 15-17, wherein the invalid allocation of storage occurs when a number of columns of storage to be allocated exceeds a maximum number of columns available in memory.
19. The system of any of clauses 15-18, wherein the invalid allocation of storage occurs when a size of storage to be allocated exceeds a size of storage in any previous allocation performed by one or more threads that include the one or more other instructions.
20. The system of any of clauses 15-19, wherein the error information is to be stored in a register accessible by a debugger.

As will be apparent to one of ordinary skill in the art, other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms “a” and “an” and “the” and similar referents in context of describing disclosed embodiments (especially in context of following claims) are to be construed to cover both singular and plural, unless otherwise indicated herein or clearly contradicted by context, and not as a definition of a term. Terms “comprising,” “having,” “including,” and “containing” are to be construed as open-ended terms (meaning “including, but not limited to,”) unless otherwise noted. Use of “may” and/or “can” is intended to indicate by way of example without limiting any particular embodiment or component or other function described above, below, or elsewhere herein. “Connected,” when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term “set” (e.g., “a set of items”) or “subset” unless otherwise noted or contradicted by context, is to be construed as a nonempty collection comprising one or more members. Further, unless otherwise noted or contradicted by context, term “subset” of a corresponding set does not necessarily denote a proper subset of corresponding set, but subset and corresponding set may be equal.

Conjunctive language, such as, but not limited to, phrases of form “at least one of A, B, and C,” or “at least one of A, B and C,” unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases “at least one of A, B, and C” and “at least one of A, B and C” refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term “plurality” indicates a state of being plural (e.g., “a plurality of items” indicates multiple items). Number of items in a plurality can be at least two, but can be more when so indicated either explicitly or by context. Further, unless stated otherwise or otherwise clear from context, phrase “based on” means “based at least in part on” and not “based solely on.”

Operations of processes described herein can be performed in any suitable order unless otherwise indicated herein or otherwise clearly contradicted by context. A process such as, but not limited to, those processes described herein (or variations and/or combinations thereof) can be performed under control of one or more computer systems configured with executable instructions and is implemented as code (e.g., executable instructions, one or more computer programs or one or more applications) executing collectively on one or more processors, by hardware or combinations thereof. Code can be stored on a computer-readable storage medium, for example, in form of a computer program comprising a plurality of instructions executable by one or more processors. A computer-readable storage medium can be a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. Code (e.g., executable code or source code) can be stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media can include multiple non-transitory computer-readable storage media and one or more of individual non-transitory storage media of multiple non-transitory computer-readable storage media lack all of code while multiple non-transitory computer-readable storage media collectively store all of code. Executable instructions can be executed such that different instructions are executed by different processors—for example, a non-transitory computer-readable storage medium store instructions and a main central processing unit ("CPU") executes some of instructions while a graphics processing unit ("GPU") executes other instructions. Different components of a computer system can have separate processors and different processors execute different subsets of instructions.

An arithmetic logic unit can include a set of combinational logic circuitry that takes one or more inputs to produce a result. An arithmetic logic unit can be used by a processor to implement mathematical operation such as, but not limited to, addition, subtraction, or multiplication. An arithmetic logic unit is used to implement logical operations such as, but not limited to, logical AND/OR or XOR. An arithmetic logic unit can be stateless, and made from physical switching components such as, but not limited to, semiconductor transistors arranged to form logical gates. An arithmetic logic unit may operate internally as a stateful logic circuit with an associated clock. An arithmetic logic unit may be constructed as an asynchronous logic circuit with an internal state not maintained in an associated register set. An arithmetic logic unit can be used by a processor to combine operands stored in one or more registers of the processor and produce an output that can be stored by the processor in another register or a memory location.

As a result of processing an instruction retrieved by the processor, the processor may present one or more inputs or operands to an arithmetic logic unit, causing the arithmetic logic unit to produce a result based at least in part on an instruction code provided to inputs of the arithmetic logic unit. The instruction codes provided by the processor to the ALU may be based at least in part on the instruction executed by the processor. Combinational logic in the ALU may process the inputs and produces an output which is placed on a bus within the processor. A processor can select a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

One or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

Computer systems can be configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or example language (e.g., "such as, but not limited to,") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as, but not limited to, "processing," "computing," "calculating," "determining," or like, refer to action and/or processes of a computer or computing system, or similar electronic computing device, that manipulate and/or transform data represented as physical, such as, but not limited to, electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as, but not limited to, tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

References may be made to obtaining, acquiring, receiving, or inputting analog or digital data into a subsystem, computer system, or computer-implemented machine. Processes of obtaining, acquiring, receiving, or inputting analog and digital data can be accomplished in a variety of ways such as, but not limited to, by receiving data as a parameter of a function call or a call to an application programming interface. Processes of obtaining, acquiring, receiving, or inputting analog or digital data can be accomplished by transferring data via a serial or parallel interface. Processes of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as example forms of implementing the claims.

What is claimed is:

1. One or more processors, comprising:

circuitry to perform an instruction of a thread to generate an error if one or more other instructions of the thread are to cause invalid allocation of storage.

2. The one or more processors of claim 1, wherein the one or more other instructions are to allocate storage with a number of columns that is not a power of 2.

3. The one or more processors of claim 1, wherein the one or more other instructions are to allocate storage with a number of columns that is not a multiple of 32.

4. The one or more processors of claim 1, wherein the one or more other instructions are to allocate storage with a number of columns greater than a maximum number of columns available in memory.

5. The one or more processors of claim 1, wherein the one or more other instructions are to allocate storage of a size greater than any previous allocation performed by one or more threads that include the one or more other instructions.

6. The one or more processors of claim 1, wherein the circuitry is to prevent the one or more other instructions from being performed.

7. The one or more processors of claim 1, wherein the error includes information about a size of the invalid allocation of storage.

8. A method comprising:

performing an instruction of a thread to generate an error if one or more other instructions of the thread are to cause invalid allocation of storage.

9. The method of claim 8, wherein the one or more other instructions are to cause the invalid allocation of storage when attempting to allocate storage with a number of columns that is not a power of 2.

10. The method of claim 8, wherein the one or more other instructions are to cause the invalid allocation of storage when attempting to allocate storage with a number of columns that is not a multiple of 32.

11. The method of claim 8, wherein the one or more other instructions are to cause the invalid allocation of storage when attempting to allocate storage with a number of columns greater than a maximum number of columns available in memory.

12. The method of claim 8, wherein the one or more other instructions are to cause the invalid allocation of storage when allocating storage of a size greater than any previous allocation performed by one or more threads that include the one or more other instructions.

13. The method of claim 8, further comprising preventing the one or more other instructions from being performed.

14. The method of claim 8, wherein the error is to be stored in one or more registers.

15. A system comprising:

one or more processors to perform an instruction of a thread to generate an error if one or more other instructions of the thread are to cause invalid allocation of storage.

16. The system of claim 15, wherein the invalid allocation of storage occurs when a number of columns of storage to be allocated is not a power of 2.

17. The system of claim 15, wherein the invalid allocation of storage occurs when a number of columns of storage to be allocated is not a multiple of 32.

18. The system of claim 15, wherein the invalid allocation of storage occurs when a number of columns of storage to be allocated exceeds a maximum number of columns available in memory.

19. The system of claim 15, wherein the invalid allocation of storage occurs when a size of storage to be allocated exceeds a size of storage in any previous allocation performed by one or more threads that include the one or more other instructions.

20. The system of claim 15, wherein the error information is to be stored in a register accessible by a debugger.

* * * * *